J. D. PEDERSEN.
AUTOLOADING FIREARM.
APPLICATION FILED JULY 30, 1915, RENEWED JULY 17, 1919.
1,348,733.
Patented Aug. 3, 1920.
19 SHEETS—SHEET 6.
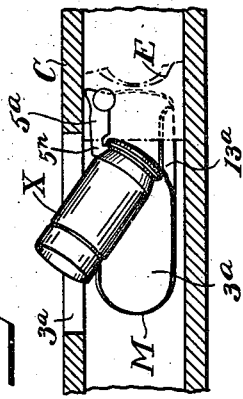
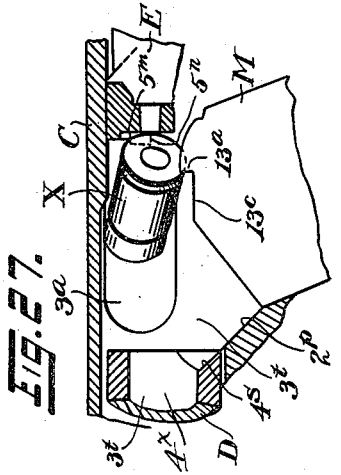
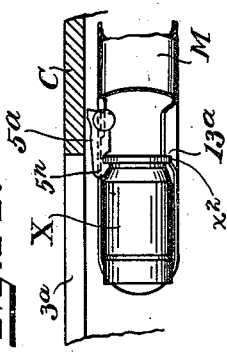
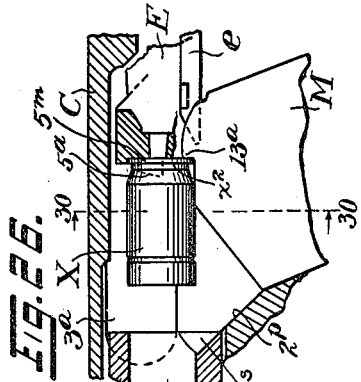
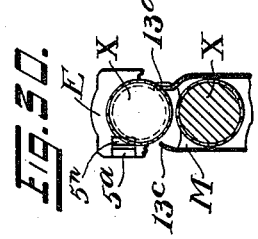
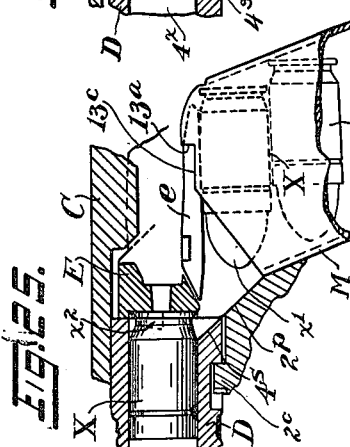
Witnesses:
Chas. E. Whiteman
H. D. Penney.
Inventor:
John D. Pedersen,
By his Atty, F. H. Richards.

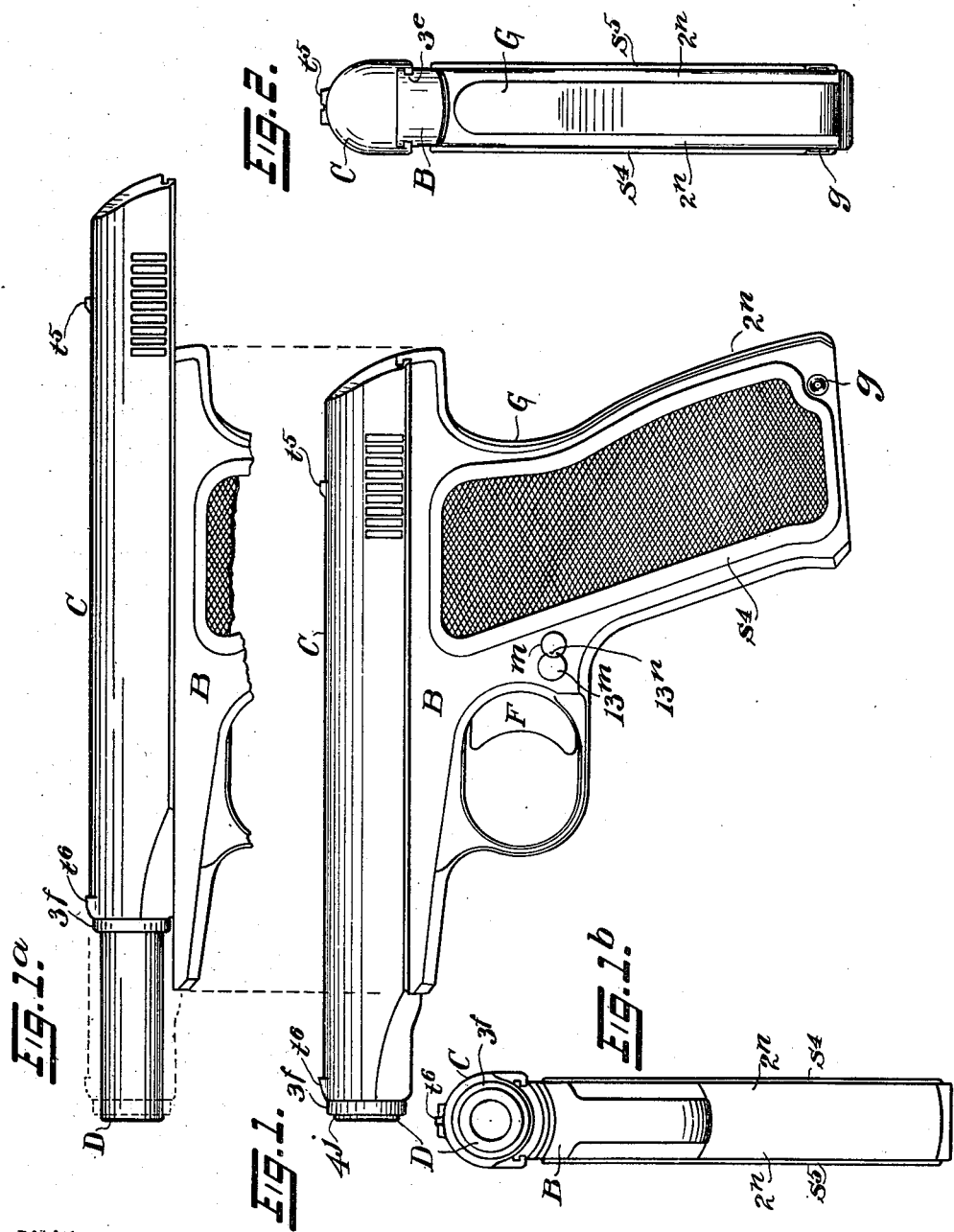

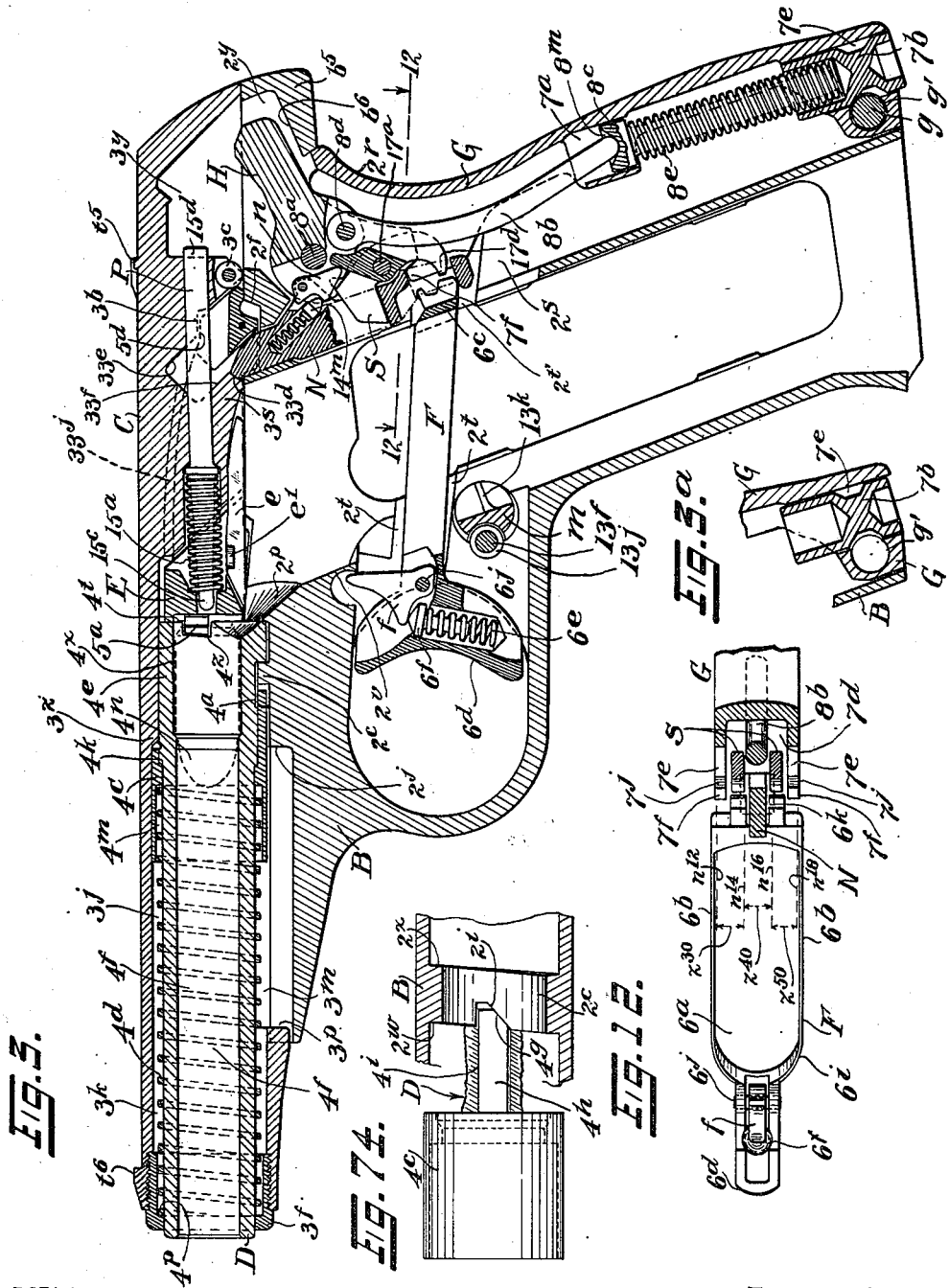

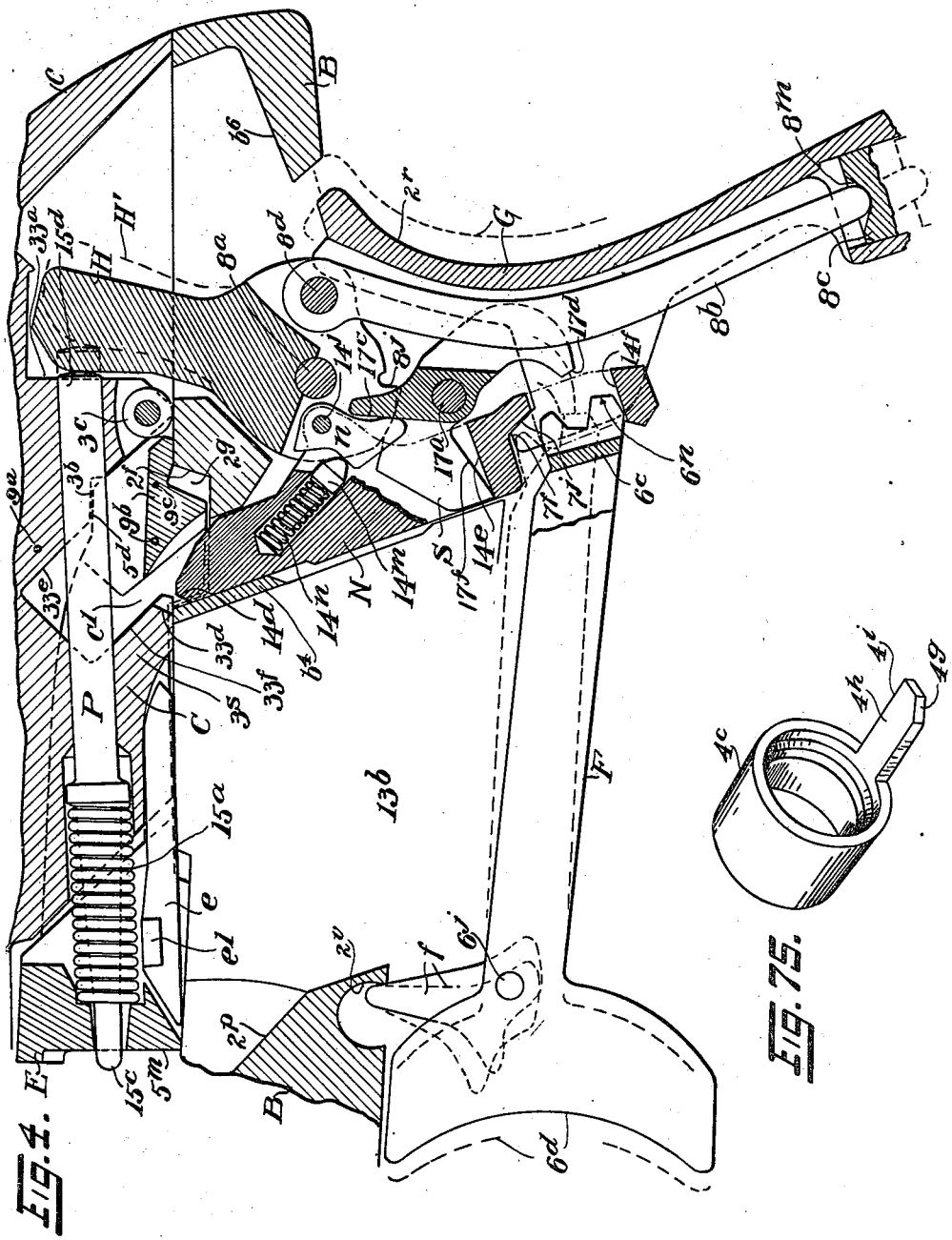

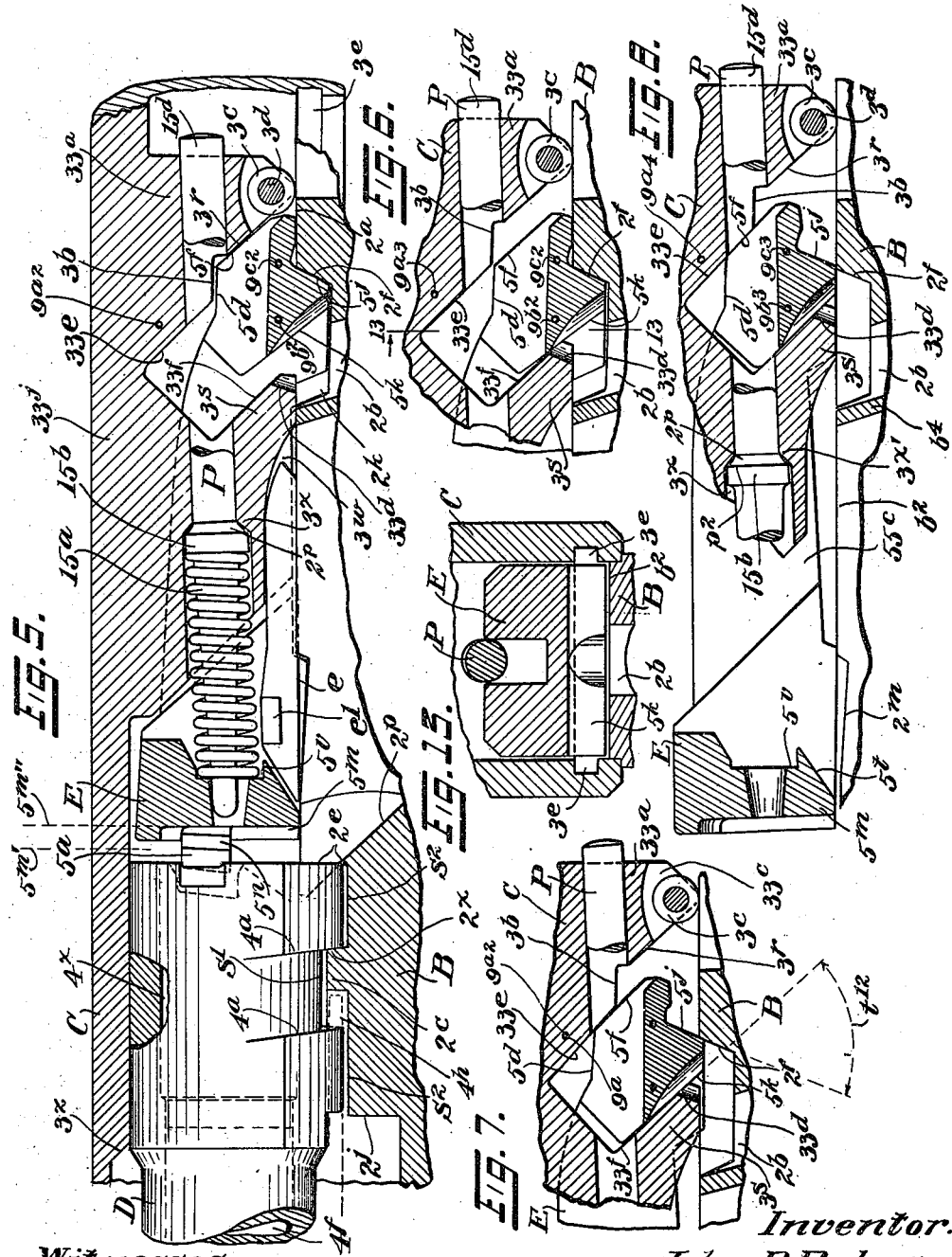

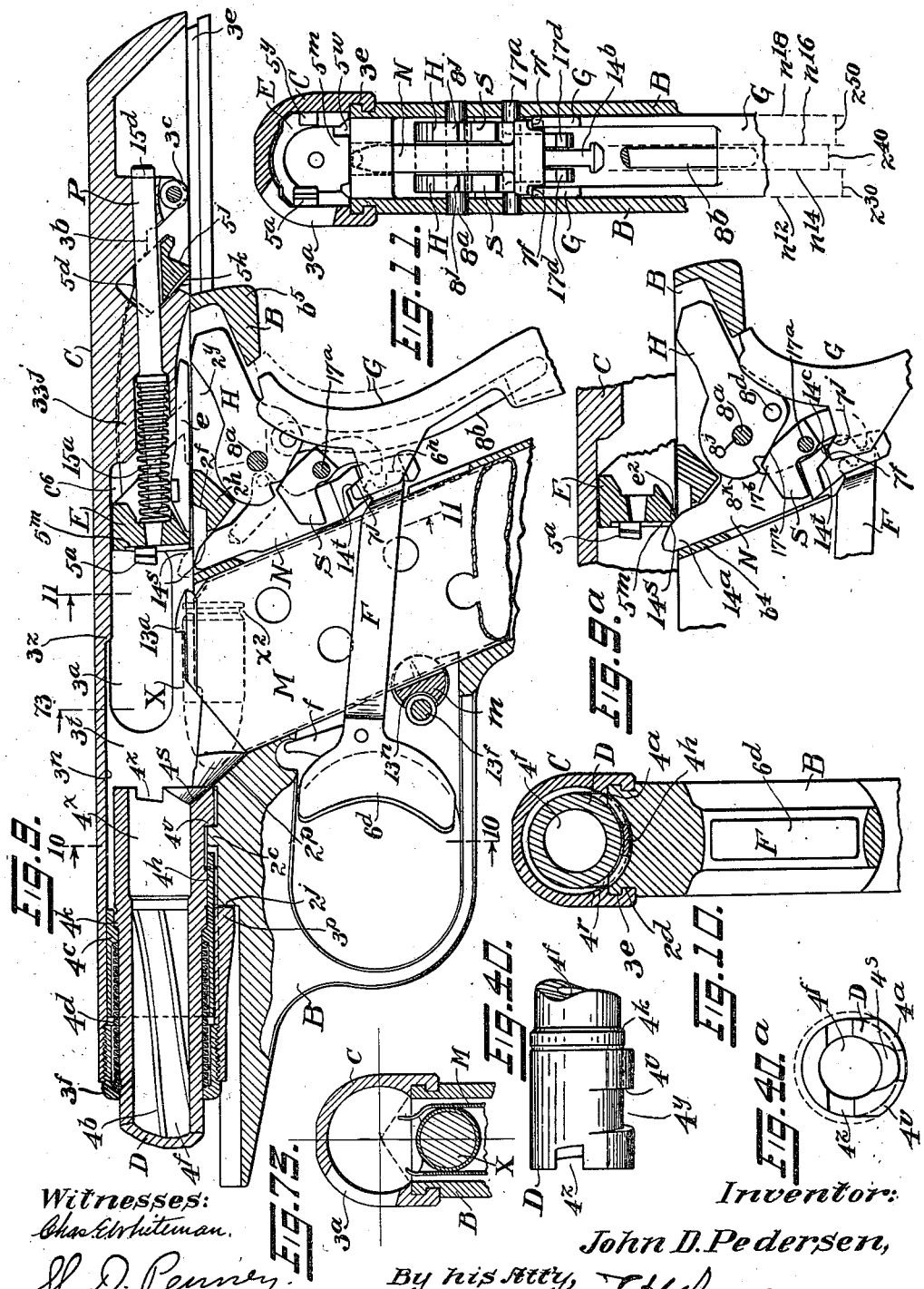

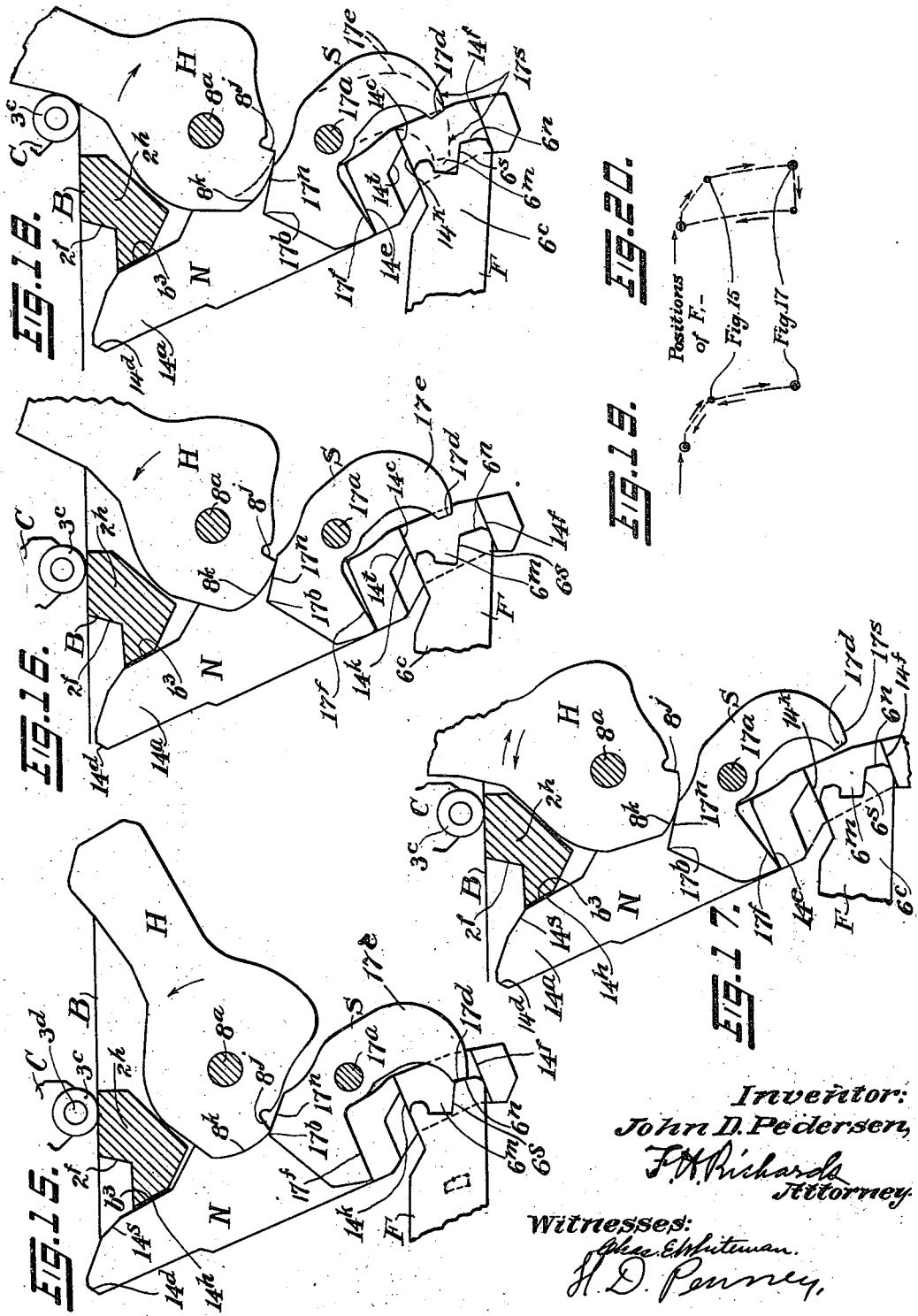

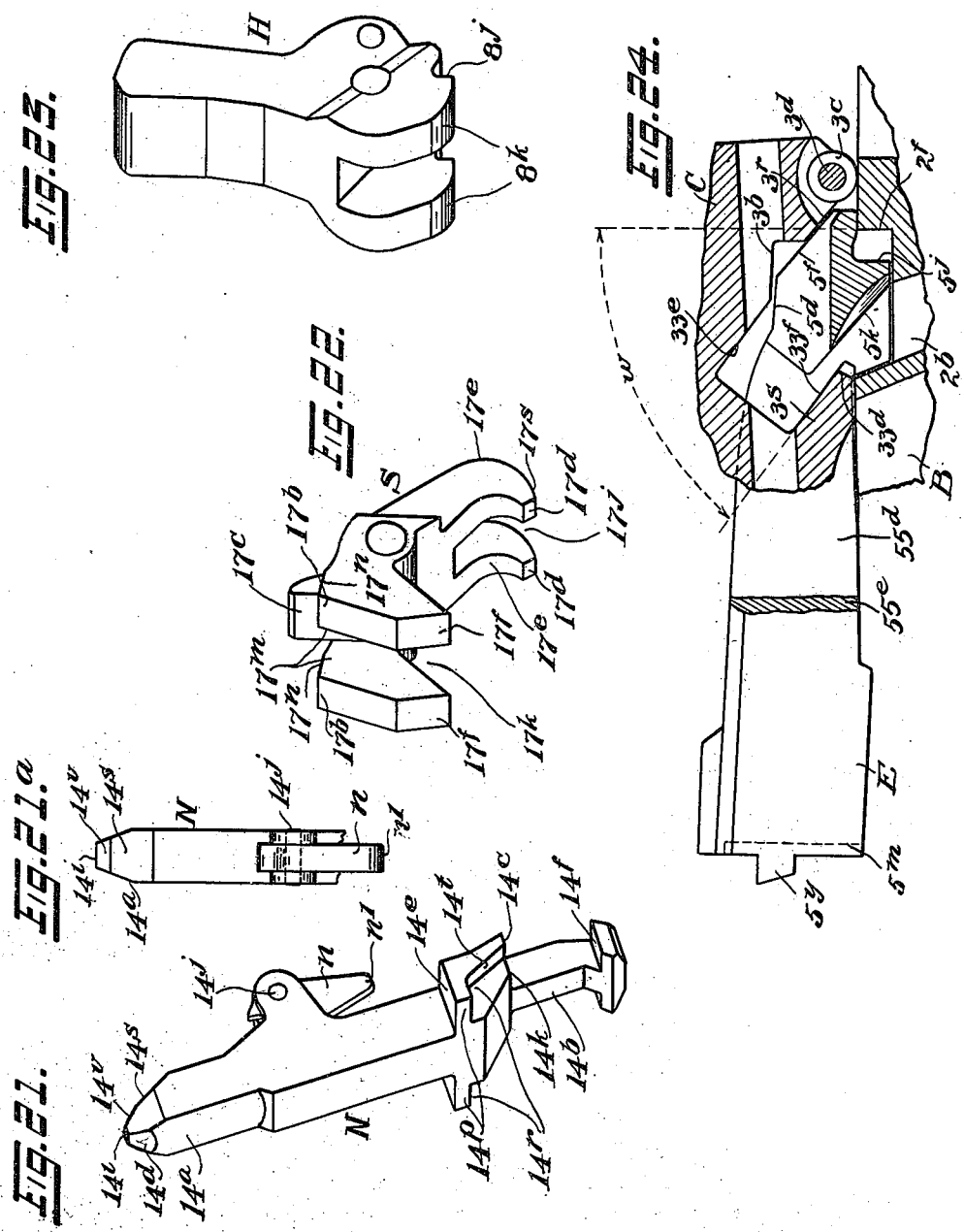

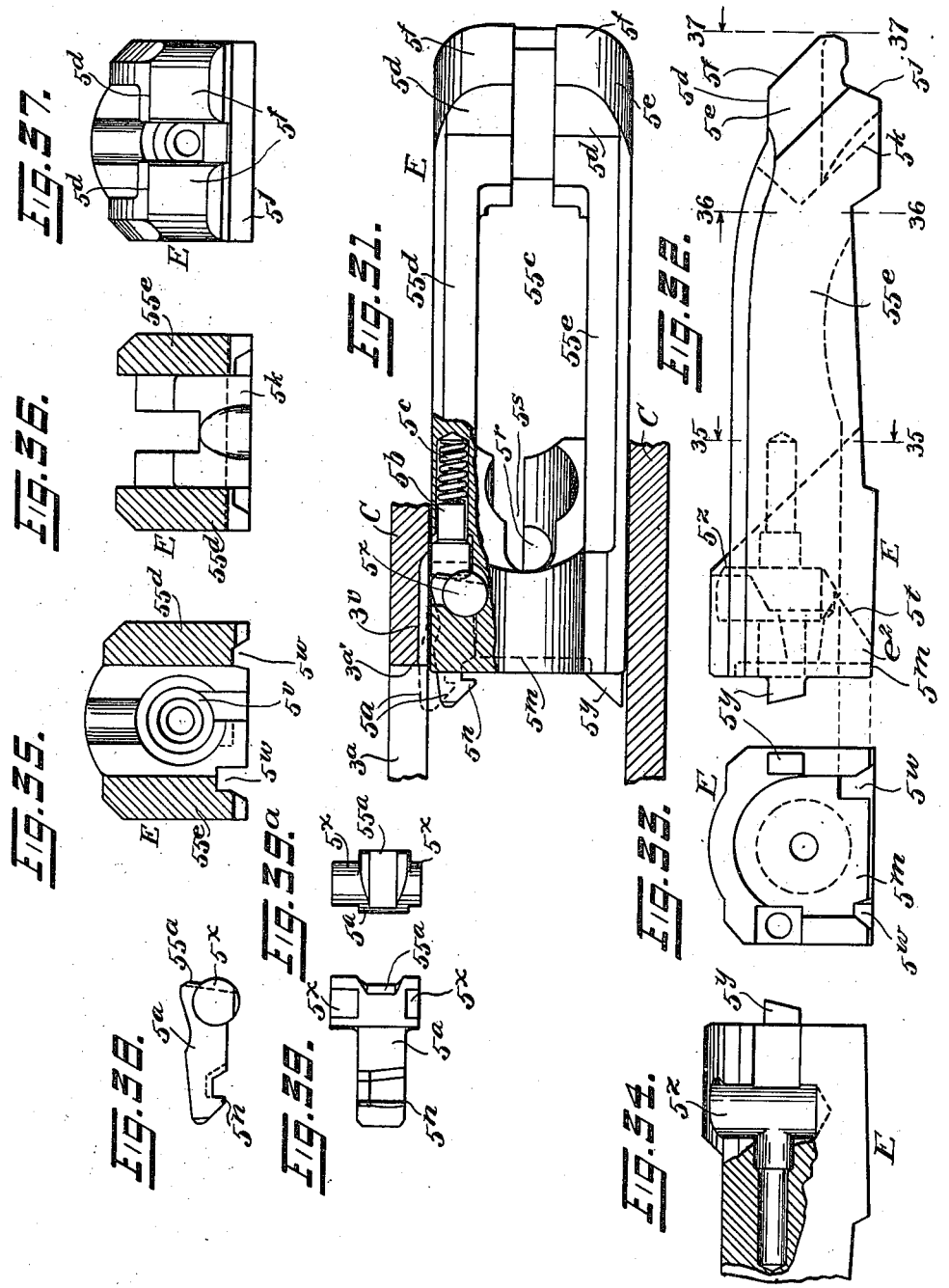

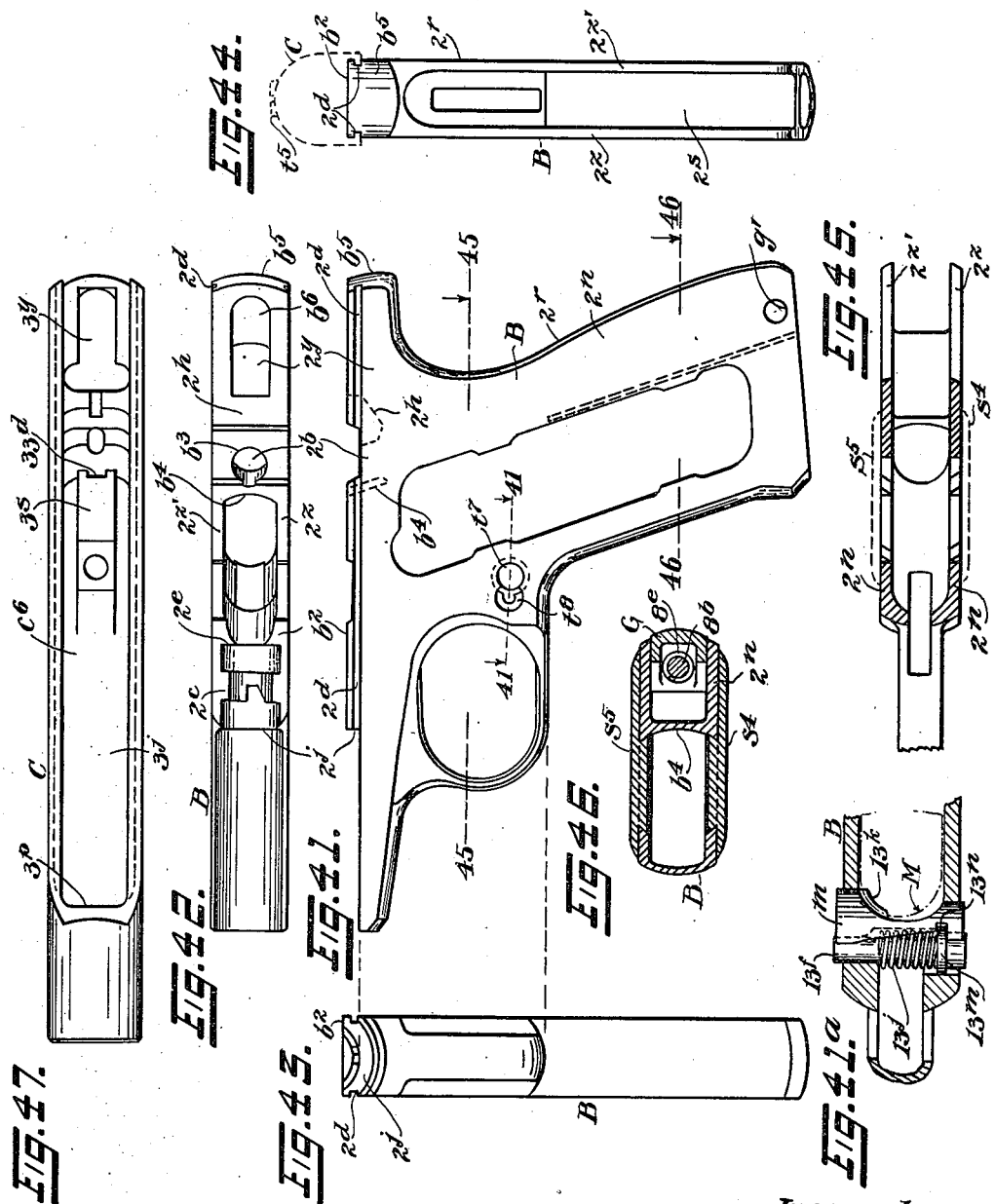

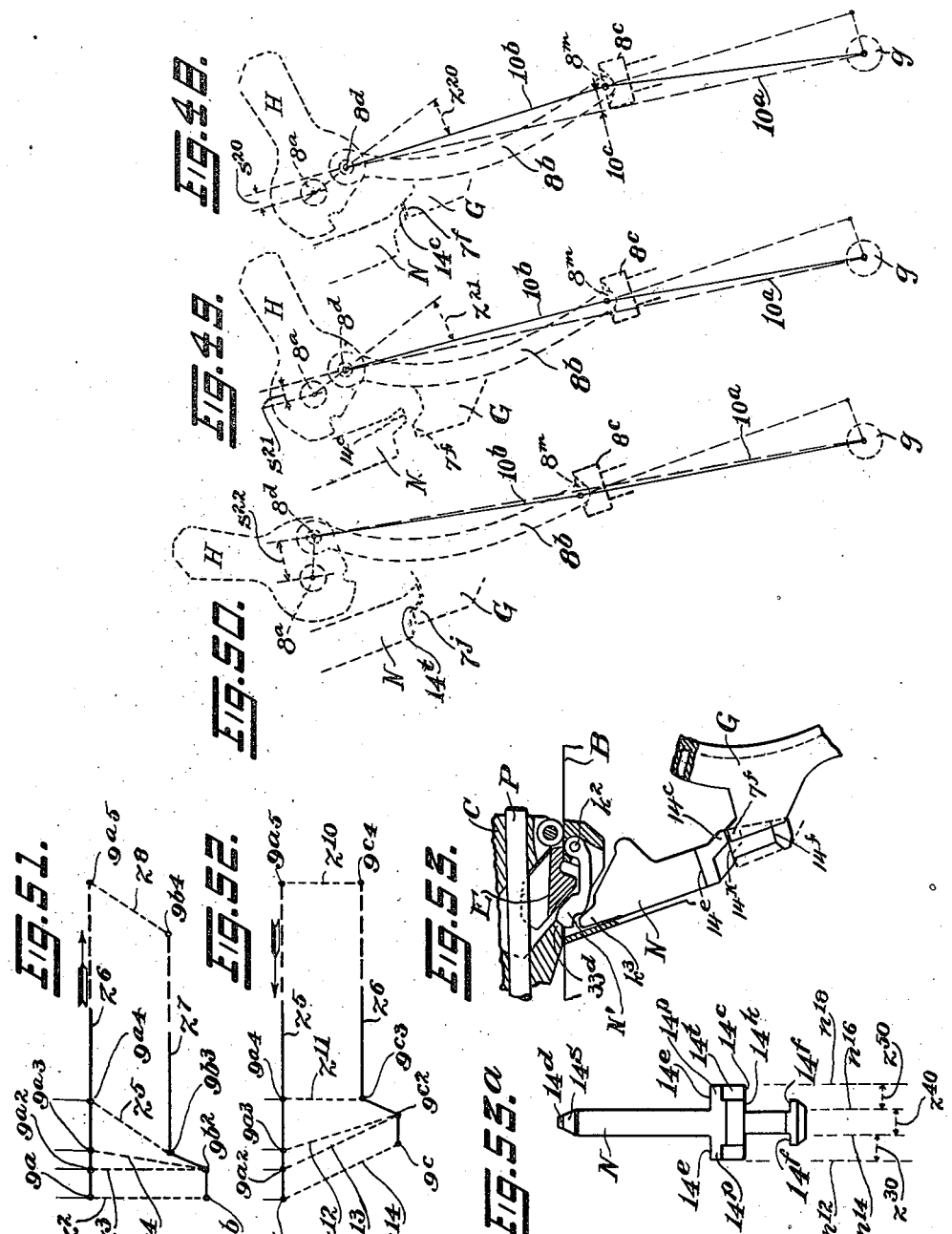

J. D. PEDERSEN.
AUTOLOADING FIREARM.
APPLICATION FILED JULY 30, 1915. RENEWED JULY 17, 1919.
1,348,733.
Patented Aug. 3, 1920.
19 SHEETS—SHEET 12.
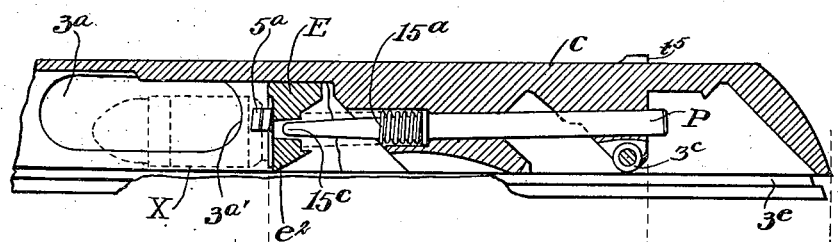
Fig.54.
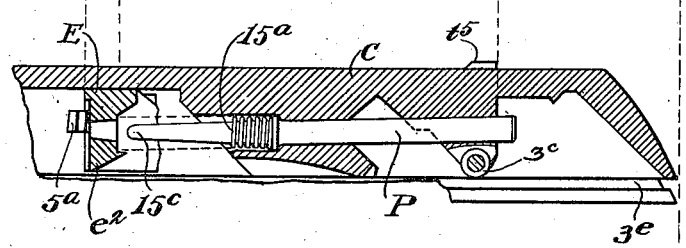
Fig.54.a
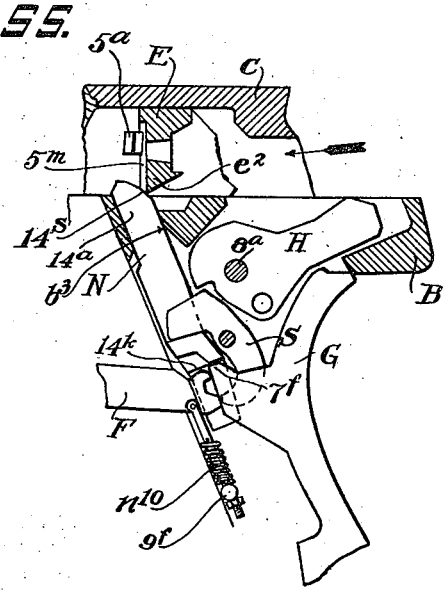
Fig.55.
Witnesses:
Inventor:
John D. Pedersen,
By his Atty,

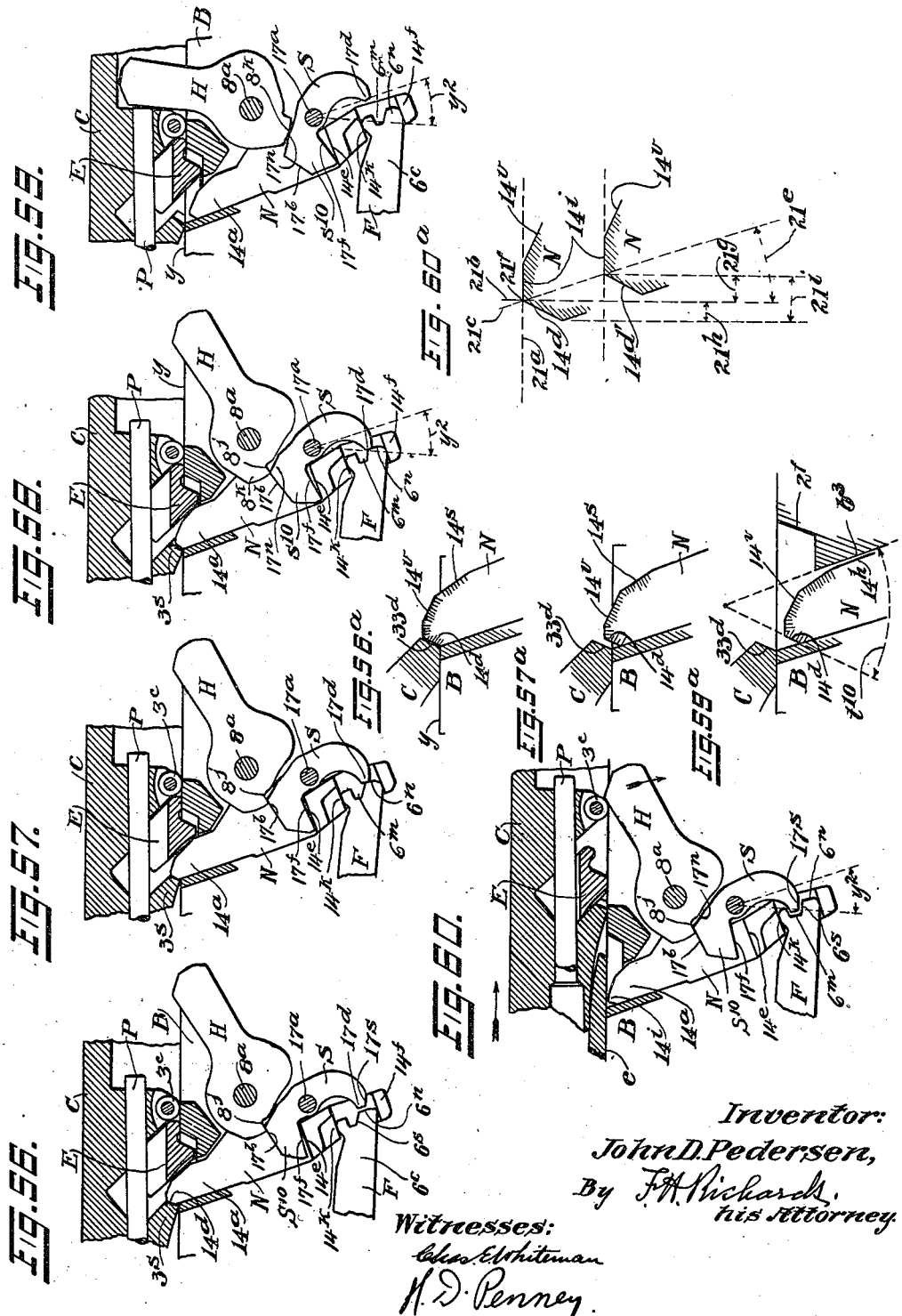

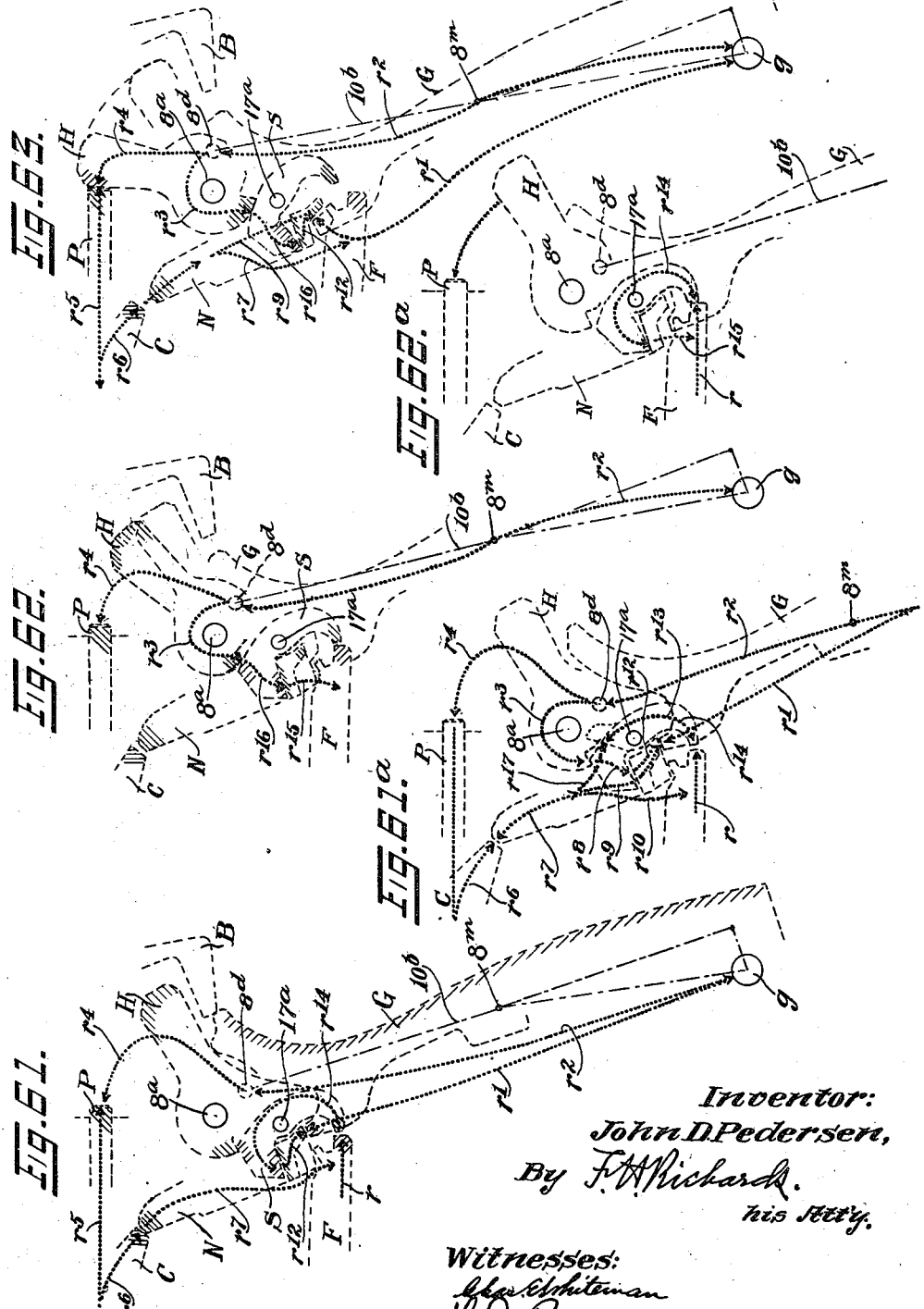

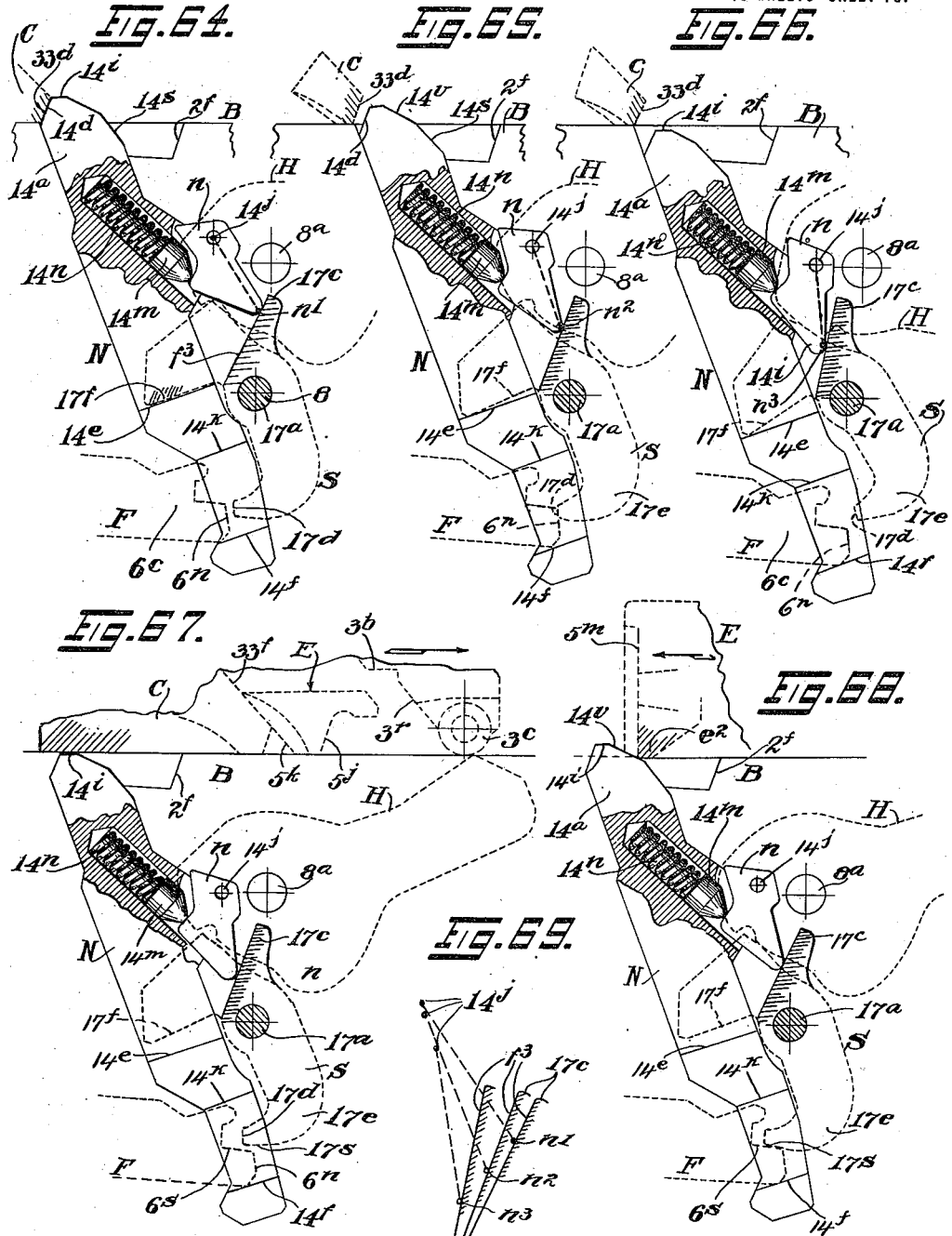

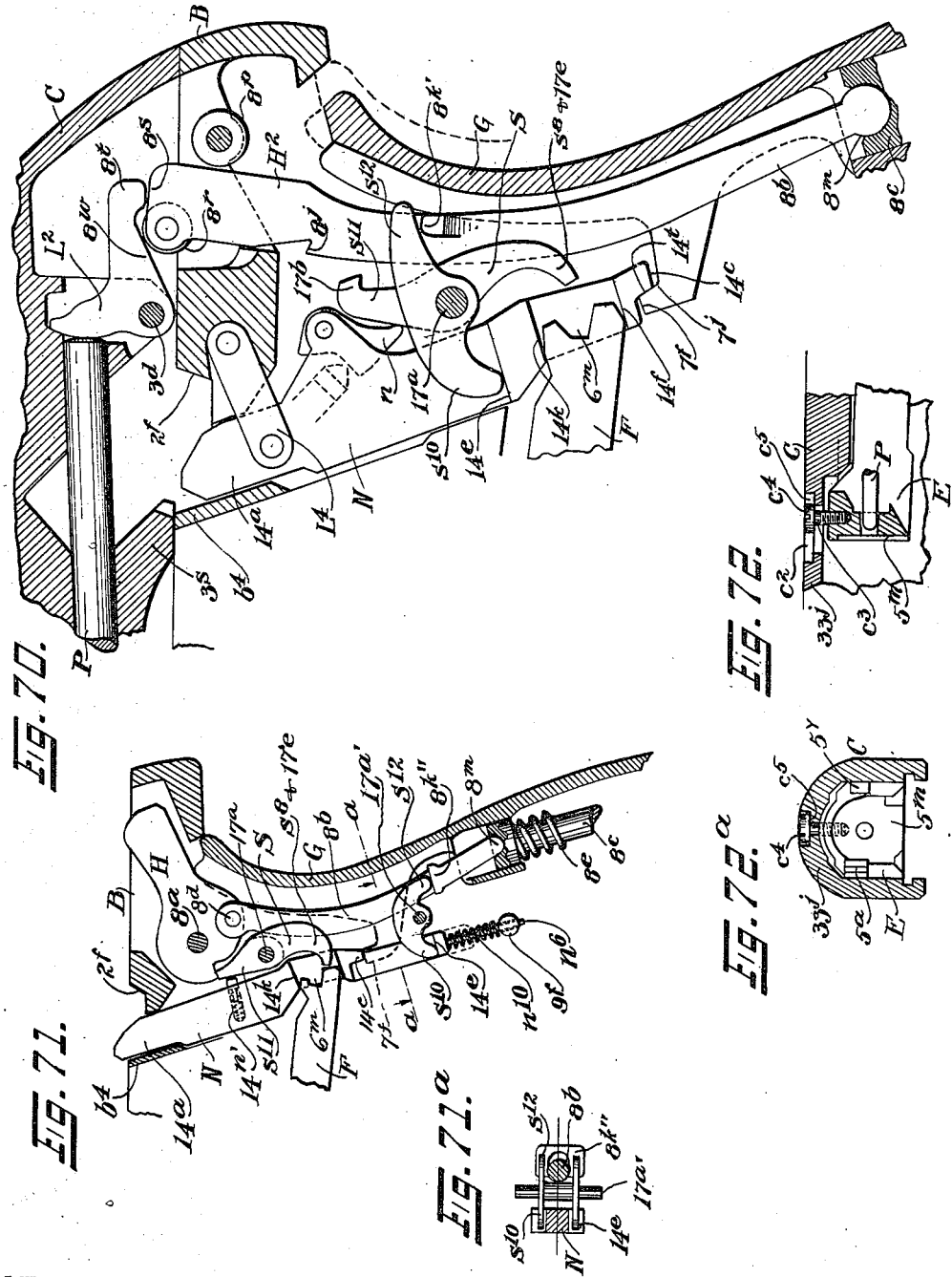

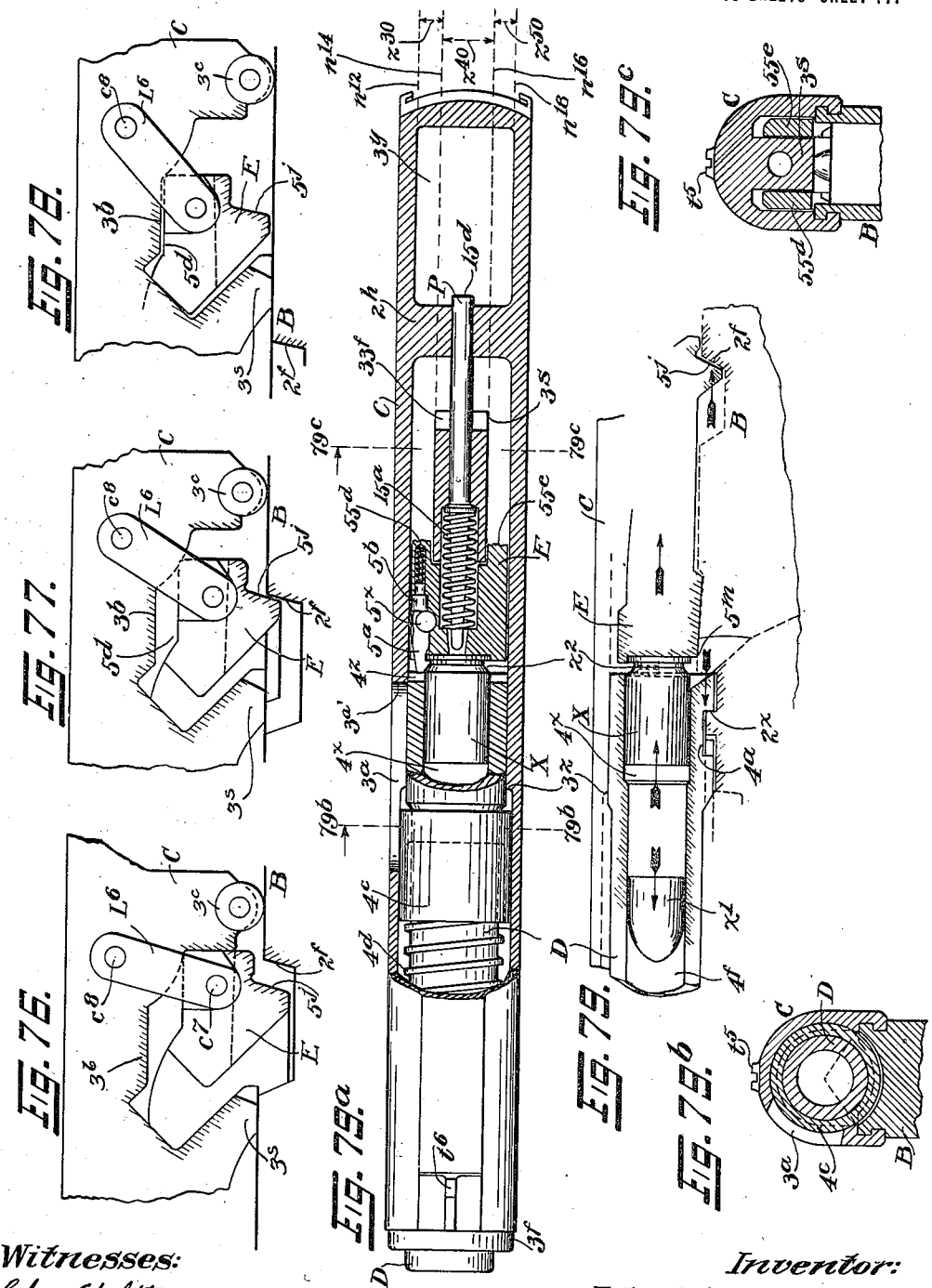

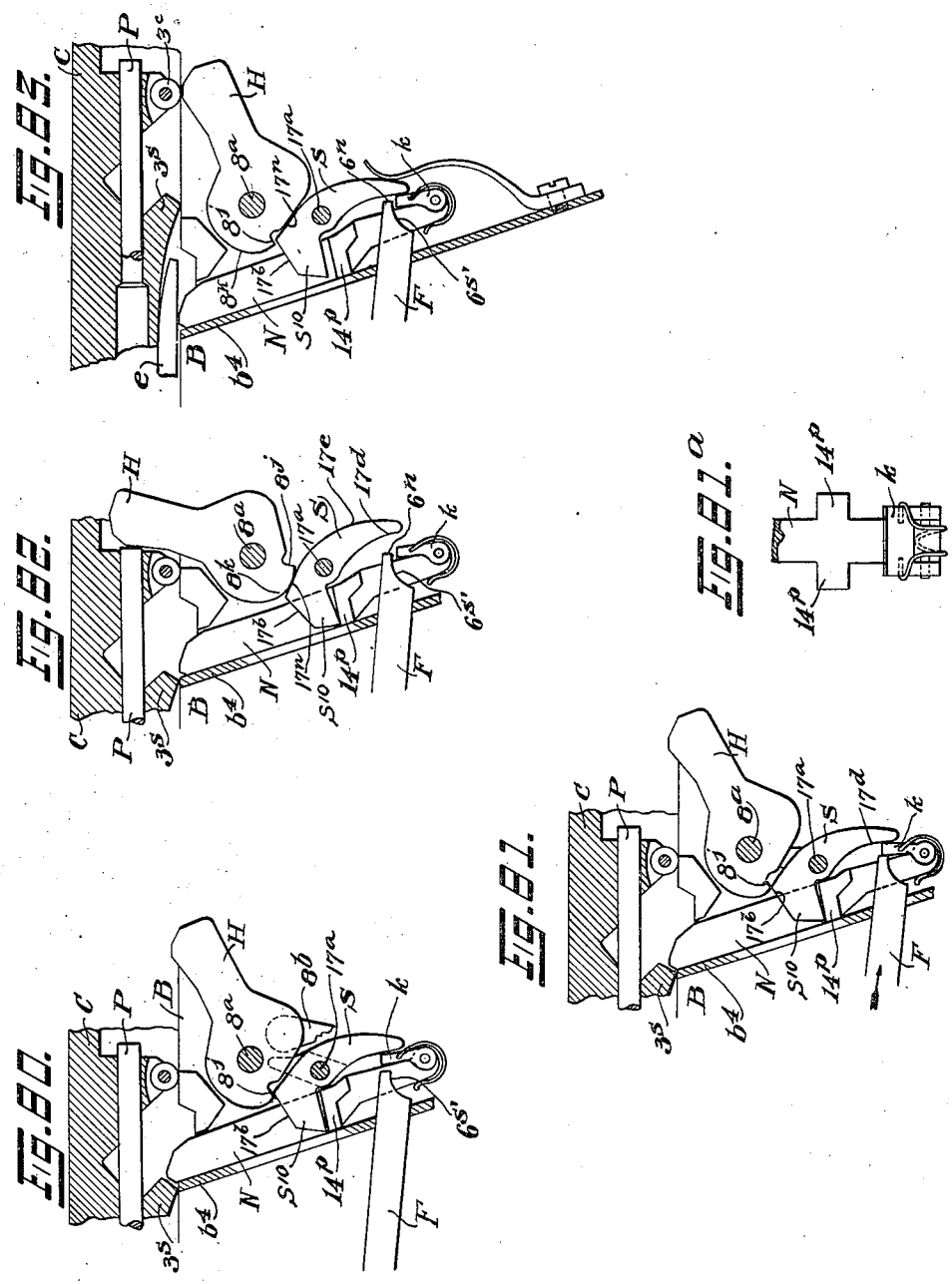

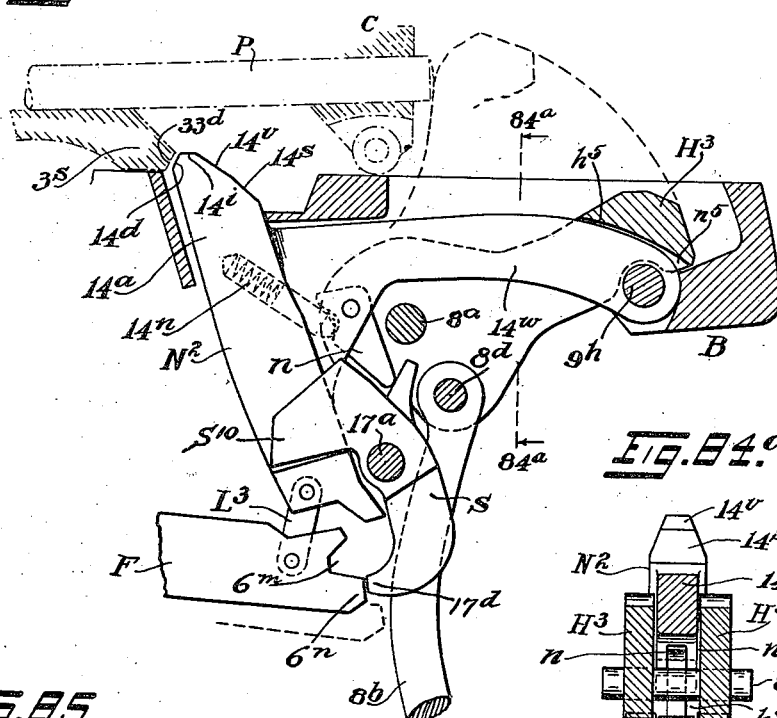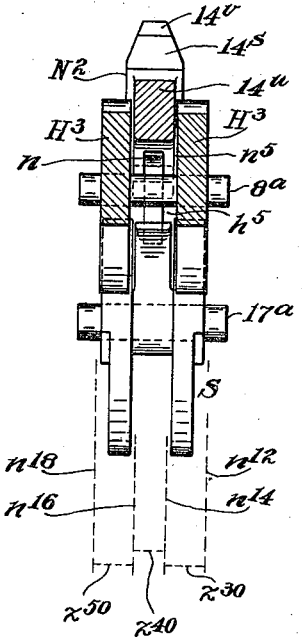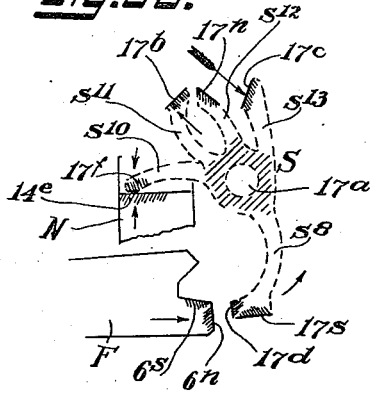

UNITED STATES PATENT OFFICE.

JOHN D. PEDERSEN, OF JACKSON, WYOMING.

AUTOLOADING FIREARM.

1,348,733.　　　　Specification of Letters Patent.　　Patented Aug. 3, 1920.

Application filed July 30, 1915, Serial No. 42,774. Renewed July 17, 1919. Serial No. 311,689.

*To all whom it may concern:*

Be it known that I, JOHN D. PEDERSEN, a citizen of the United States, residing in Jackson, in the county of Uinta and State of Wyoming, have invented certain new and useful Improvements in Autoloading Firearms, of which the following is a specification.

This invention relates more especially to that class of auto-loading firearms in which the loading and shell-extraction devices and the firing-train mechanism are operated from a power-slide that is actuated by the force of the powder gases transmitted through a rearwardly-moving member or device usually consisting of the cartridge-shell or a portion thereof.

My present improvements are adapted for use in firearms of various sizes and styles, including shoulder-arms of different varieties and calibers, and are particularly adapted,—especially as regards certain features of these improvements,—for use in those varieties of guns and pistols which are commonly designated as "auto-loading", and "automatic". Therefore, and in view of the circumstance that auto-loading pistols have become one of the more important branches of the firearms art, I have herein described and illustrated my invention as applied to, or embodied in, a firearm of this class; and in doing this I have, in the principal views, shown the firing-train provided with trigger devices arranged for a non-automatic operation of the firearm, whereby a separate pull upon the trigger will be required for each discharge of the arm.

A principal object of this invention is to furnish (more especially for use in arms of the classes described), simple and effective mechanism for loading and firing, and to provide safety-devices and means so arranged,—and so controlling the loading, firing, shell-extracting and other devices and operations,—as to secure a maximum degree of reliability in the operation of the firearm as a whole, and in the operation, individually, of the several elements, devices and combinations which are comprised therein. For aiding in the attainment of these results, one object of the invention is to furnish a breeching mechanism comprising a power-slide so arranged that the force of the powder gases will be, or may be, transmitted to this slide through a rigid block or transmission member, and without any intervening spring or yielding device, and so that after such transmission member shall have been stopped in its rearward movement and at the end of a relatively short power-stroke by a direct engagement with the frame of the arm, said power-slide shall next continue its rearward-movement during a substantial time-interval, and relatively to said transmission member and the frame, and immediately thereafter shall have a further continued and relatively long-stroke rearward movement concurrently with a corresponding long-stroke movement of said transmission member. Thus the block or transmission-member and the power-slide begin their rearward movement concurrently, and continue moving along together by an accelerated movement until the transmission member is halted by its engagement with the frame.

In my improved firearm, the complete mechanism, in addition to some framework suitable for receiving the several operating-parts and details, includes a barrel, a magazine, a breech action, and a compound mechanism which,—considered as a whole,—I designate as the fire-control action, and which comprises two coacting mechanism trains, of which one is a firing-train, and the other is a controller-train, while each of these trains is also directly coöperative with the breech action; and which also comprises in the preferable and more complete form thereof, a sear-actuating trigger, a trigger-shifting controller-member, a controller-retracting sear-member and a sear-actuating firing-member. And one feature which is of a peculiar importance in my present invention, relates to an organization within this mechanism and arranged in such a manner, that the complex of coacting and operative members constitute a series of circuits each comprising a plurality of inter-acting members, and in which some members are comprised in several different circuits each having, respectively, a different function and a different scope and range of action. For instance the sear-actuating trigger, the sear-member and that part of the controller-member which directly coacts with the sear, may be said to constitute a relatively short three-member circuit in which each member operates by a direct action and reaction with each of the other two members of the circuit. Similarly, the trigger, sear, firing-member and controller, may be said to constitute one of several relatively-longer four-member circuits, each having analogous but more extended inter-acting relations. Another such circuit comprises,—or involves in part,—the controller, the sear, the hammer or other form of firing-member and the breech action. And in similar manner, other and more extended circuits of inter-acting members, including some having a larger number of members, are comprised in the complete mechanism, as will be evident from the drawings as herein described.

A further object is to furnish,—more especially for use in small arms of the auto-loading class,—a fire-control action coöperative with a retractably-supported breech action, and in which a grip-operable safety-member may be made effective for blocking the operation not only of the firing-member, but also for blocking by a relatively direct locking-action the breech action in the firing - position thereof. And for effecting these objects, and other purposes as hereinafter more fully explained, the invention provides a relatively simple train or trains of coacting members which are arranged in a highly organized system, in which the mechanism comprises a plurality of circuits each having a plurality of coacting-members, and in which each circuit in a series of circuits includes one member of each preceding circuit, while two members of one circuit (except of the last one of a series of them) are also comprised in the next following circuit. Thus by reason of an intricacy of relation as between the several members, and a complex organization involving several and relatively diverse functions for each one of a series of members, the plurality of inter-acting circuits, or trains of mechanism,—these being of varying extent, respectively,—is obtained while securing a high degree of efficiency, and preserving a high degree of simplicity in the firearm mechanism as a whole.

A further object of my present invention is to furnish an auto-loading firearm in which a grip-operable safety-member will be so arranged and connected (when the firearm is not in use) as to lock the breech-block in forward position and with the cartridge-supporting face thereof against (or close to) the rearward end of the barrel, and to do this in a direct and positive manner by a train of coacting members, or parts of members, which does not include the trigger, sear or firing-member; also to thus effect the locking of the cartridge into the barrel by means of a four-member train comprising therein three coacting pairs of members of which one pair is comprised in the breech action, a second pair in the fire-control action, while a third pair comprises one member in each said action in combination with a firing-train which is coöperative with each of the members of such third coacting pair.

A further object is to furnish an auto-loading firearm having as a part of the fire-control action thereof, a trigger-sear-controller combination which is coöperative with a grip-operable safety-member, and which is also provided with means whereby to lock the safety-member in an ineffective position thereof on the pull-stroke of the trigger, and to continue this locking of the safety-member, until after the trigger shall have been released and returned to its forward position; also, by these means to render both the trigger and the safety-member inoperative during the operation of automatically re-loading the barrel, and until (when and after the firearm has been once fired), the entire breech action shall have resumed its extreme forward, or firing-position; also, to accomplish these purposes in connection with the safety-member when this is arranged for blocking the firing-member and the breech action,—one or both of them,—by a resistance transmitted through a member of such trigger-sear-controller combination or mechanism.

A further object of the invention is to furnish a firearm mechanism in which the barrel is, or may be, supported free of any direct dependence on the frame. One purpose of this system and construction is to insure a permanent and precisionized relation as to the alinement between the bore of the barrel and the sights of the firearm, when these are carried on a combined sight-carrying and barrel-carrying member which also constitutes a main-slide for the firearm mechanism, so that such relation as to precision of alinement will not be affected by any looseness of the fitting as between the slide and the frame. Thus the barrel may be said to slide within the barrel-carrying main-slide, and to do this simultaneously with the movement of the main-slide on the frame,—and by an equal amount of sliding-movement,—while free of any supportive engagement on or with the frame, and without any kind of engagement with the frame itself except as regards the longitudinal position of the barrel relatively to the frame.

It will be remembered that in some auto-loading firearms, especially in certain well-known kinds of pistols, there is sometimes employed a "breech-slide" which consists in a single member,—and this usually formed in a single piece,—and which comprises a slideway-engaging portion and a breech-bolt portion, so that these two portions have each of them precisely the same movements longitudinally of the frame of the arm both in extent of movement and in the timing thereof. In my present improvements, and contrary to that old mode of construction, the breech-bolt is a separate and independent member having only a coöperative relation to the main carrier or slide, and having (during certain parts of the complete cycle of operations), movements which are not accompanied by concurrent or synchronous movements of the breech-bolt member. In said old form of breech-slide, both the slide portion and the breech-bolt portion are parts of one member which constitutes a "momentum block", whereas in my present improvements the momentum of the separate breech-bolt is discharged or transmitted into the frame by a direct contact of the bolt with the frame at the end of a relatively short power-stroke which is only an initial part of the total rearward stroke, so that the subsequent and much longer rearward movement of the breech-bolt is accomplished by force (power) supplied from the power-slide after this slide has ceased receiving any force from the cartridge. In these movements the breech-bolt after the short power-stroke thereof, first moves upwardly to disengage from the frame, next moves rearwardly through a long stroke by power from the main carrier or slide. On the return stroke, the breech-bolt first moves forward through a long-stroke while in said elevated position, is next lowered (depressed) into a position forward of the frame recoil-abutment, and is finally carried forward through a breech-closing stroke, all three of these breech-bolt movements being effected by power from the operating member or slide, which itself has a total stroke in excess of the total stroke of said breech-bolt member.

For the purpose of illustration, I have in the accompanying drawings, forming a part of this specification, shown my present improvements applied and adapted to an auto-loading pistol of that class in which the cartridges are supplied to the barrel from a magazine removably-fixed in a chamber within the grip or handle portion of the frame of the firearm, and in which the loading and firing trains or mechanisms are operated through a power-slide which extends over substantially the entire length of the firearm and constitutes a principal member of the breech action and of the operative mechanism, and also constitutes an actuating member by and through which the force of the explosive gases are utilized for actuating the entire operative mechanism. In giving a description of the mechanism in the particular form and arrangement thereof herein illustrated, I will first briefly describe the several views and diagrams of the drawings, next describe the construction and arrangement, and the mode of operation of the firearm mechanism, and then more fully explain in detail the several component mechanisms and coacting devices, and also point out the way in which these mechanisms and devices, and the elements thereof, perform their respective functions, and how the same are combined and organized for effecting the various and numerous purposes and objects of the invention.

In the drawings, Figure 1 is a side view of an auto-loading pistol made in accordance with my present invention, and Fig. 1ª is a similar view of the upper portion of the pistol as shown in Fig. 1, but with the power-slide, C, slid backwardly (toward the right hand in Fig. 1) to the end of its rearward stroke, as further shown in Fig. 9.

Fig. 1ᵇ is a front end elevation of the firearm, as seen from the left hand in Fig. 1, and Fig. 2 is a rear-end elevation of the pistol, as seen from the right hand in Fig. 1.

Fig. 3 is a longitudinal, vertical section on an enlarged scale for illustrating the construction and arrangement of the operative parts of the mechanism, and without any cartridge magazine in the magazine chamber; and, Fig. 3ª is a fragmentary view illustrating the operation of a detail shown in Fig. 3.

Fig. 4 is a view, on a still larger scale, of the parts shown in the upper and right hand portion of Fig. 3, for illustrating more clearly certain details of the mechanism, particularly of the firing train and of certain devices coacting therewith, when constructed and arranged in the preferred form thereof herein described.

Fig. 5 is a view corresponding to a part of the upper portion of Fig. 4, but showing the breech-block, E, located at the rearward end of its power-stroke; and Figs. 6, 7 and 8 are detail views corresponding to the right hand portion of Fig. 5 for illustrating, in connection with the preceding figures, the operation of certain features of the frame, the power-slide, the breech-block and the firing pin.

Fig. 9 is a view similar to the upper portion of Fig. 3, but showing the mechanism with the power-slide retracted to its most rearward position; and Fig. 9ª is a view corresponding to a portion of Fig. 9, for showing a different position of some of the operative parts of the mechanism, as hereinafter more fully described.

Fig. 10 is a sectional view in line 10—10 of Fig. 9, as seen from the left hand of said line 10—10, and Fig. 11 is a sectional view in line 11—11 of Fig. 9, showing certain parts of the mechanism as seen from the left hand of said line 11—11.

Fig. 12 is a sectional view in line 12—12 of Fig. 3, showing the arrangement of certain details of the firing-train and safety devices, which are hereinafter more fully described, and Fig. 13 is a sectional view in line 13—13 of Fig. 6, for more fully showing certain details particularly illustrated in Figs. 5 to 8 inclusive.

Fig. 14 is a fragmentary view drawn as the horizontal section of the forward end of the breech-block E, for illustrating certain details of said block, in connection with the same details as shown in Figs. 3, 5, 8 and 9, and as further shown in Figs. 31 to 35, inclusive.

Figs. 15, 16, 17 and 18 are a series of enlarged and similar fragmentary views corresponding to a portion of Fig. 4, for illustrating certain successive stages in the operation of some of the principal members of the firing-train, and devices coöperative therewith, including the hammer H, the controller member N, the sear S, and trigger F; these views especially illustrate the separate uses and the several successive functions of the sear-member S, particularly as regards its purpose and mode of operation as the sear, as a slide-lock retractor, and as a trigger-shifter actuator.

Figs. 19 and 20 are diagrammatic views illustrative, as hereinafter more fully explained, of certain movements involved in the operation of the trigger-sear-controller mechanism of the fire-control action.

Figs. 21, 22 and 23 are enlarged perspective views of the controller N, the sear S, and the hammer, H, respectively, when made to conform in minor detail to the specific form and proportions illustrated in preceding figures; and Fig. 21ᵃ is a fragmentary view drawn adjacent to and in projection with a portion of Fig. 21 for illustrating certain minor details thereof.

Fig. 24 is a view supplemental to Figs. 5 to 8 inclusive, for indicating how certain features may be modified in their arrangement.

Fig. 25 is a fragmentary, vertical section corresponding to a portion of Fig. 3, for illustrating a certain stage of the operation of the loading mechanism, and showing the cartridge, X, in the firing position.

Fig. 26 is a view similar to Fig. 25, but showing the breech-block, E, retracted to the position where the cartridge shell, X, is about to be thrown out through the side opening 3ᵃ of the power-slide, C.

Fig. 27 ·, a view similar to Figs. 25 and 26, with the exception that the breech-block, E, is here shown further retracted while the shell, X, is shown as when being thrown out by the coöperation of the extractor 5ᵃ and the abutment face 13ᵃ, which is here shown on the magazine M.

Fig. 28 is a plan view of certain parts shown in Fig. 26, for more clearly showing the arrangement of the details therein illustrated, and Fig. 29 is a similar plan view illustrating the operation of the parts in the positions shown in the side view Fig. 27.

Fig. 30 is a sectional view in line 30—30 of Fig. 26, for showing the parts as seen from the left hand of said line, and for more fully illustrating the details and operations especially shown in Figs. 25 to 29, inclusive.

Fig. 31 is a plan view of the breech-block E, with some parts broken away for showing certain details coöperative therewith; Fig. 32 is a side view of the breech-block E as seen from below in Fig. 31; Fig. 33 is an end elevation of the breech-block E as seen from the left hand in Fig. 32; and, Fig. 34 is a view of the forward end of the breech-block, with some parts broken away, as seen from the left hand in Fig. 33,—these views are drawn in alinement each with an other one, to facilitate comparison.

Fig. 35 is a sectional view in line 35—35 of Fig. 32, showing the forward part of the breech-block as seen from the right hand of said line 35—35; Fig. 36 is a sectional view in line 36—36 of Fig. 32, showing the parts at the right hand as seen from the left hand of said line 36—36; and, Fig. 37 is an end elevation of the breech-block as seen from the right hand in Fig. 32.

Figs. 38 and 39 and 39ᵃ are a plan view, a side view, and an end view, respectively, of the shell-extractor 5ᵃ, which is also indicated in plan view in Figs. 28, 29 and 31.

Fig. 40 is a side view of the rearward end of the barrel D, and is drawn in projection with the same member as shown in Fig. 10, for more clearly illustrating certain minor features in connection with the illustration of the barrel and frame connection as illustrated more especially in Figs. 5, 9 and 10; and, Fig. 40ᵃ is an end view of the barrel as seen from the left-hand in Fig. 40, and from the right-hand in Fig. 9.

Figs. 41 to 46, are a series of views illustrating the frame, B, in a preferred form and arrangement thereof; of these views, Fig. 41 is a side elevation and corresponds in position with the frame as shown (or partially shown) in Figs. 1, 1ᵃ, 3, 4, 5 to 8, and 9; Fig. 42 is a plan view, as seen from above in Fig. 41; Fig. 43 is a front-end view, as seen from the left-hand in Fig. 41; Fig. 44 is a rear-end elevation, as seen from the right-hand in Fig. 41; Fig. 45 is a sectional view in line 45—45, in Fig. 41, Fig. 46 is a sectional view in line 46—46, in Fig. 41, and Fig. 41ᵃ is a sectional view in line 41—41, of Fig. 41, but with the addition of the magazine-lock devices.

Fig. 47 is an underside plan view of the main-slide of the breech action, as seen from below in Figs. 1 and 3, and is drawn in alinement with and above Figs. 41 and 42, to facilitate the comparison thereof with the frame.

Figs. 48, 49 and 50 are diagrams illustrating some of the operational relations of the firing-train and the safety-train in three successive relative positions, respectively, of the pivotally-supported hammer, H, and the grip-operable safety-member G; in Figs. 48 and 49, the position of the hammer corresponds with the position thereof in Figs. 3, 15, 56 and 57, while in Fig. 50, the position of said members corresponds with Figs. 4, 17 and 59.

Figs. 51 and 52 are diagrams illustrative of the timing of the power-slide and breech-block strokes relatively to each other and with relation to the frame of the firearm.

Fig. 53 is a sectional and fragmentary side-view corresponding to a portion of Fig. 3, for illustrating a modification of the breech action-locking means, especially as regards the slide-engaging portion of the controller-member which, for certain purposes, also constitutes a part of the safety-train; and, Fig. 53ª is a view of such controller as seen from the left-hand in Fig. 53.

Figs. 54 and 54ª are longitudinal sectional views of a part of the breech action,—and correspond, respectively, to portions of Figs. 3 and 9,—for illustrating certain features indicated in Figs. 51 and 52, and for more clearly showing certain of the operational relations of the slide C, the breech-block E and the firing-pin P.

Fig. 55 is a view similar to Fig. 9ª, but showing a modified arrangement of controller and controller-actuator.

Figs. 56 to 60, inclusive, are a series of similar views, for illustrating the operation and coaction of the fire-control action and the breech action; these views show five successive stages, respectively, of the cycle of movements as regards the trigger-sear devices, the controller member, the hammer, and certain of the directly coacting members of the breech action. Figs. 56ª, 57ª and 59ª are enlarged detail views corresponding with portions of Figs. 56, 57 and 59, respectively, (also, of Figs. 3, 15 and 17, respectively) for more fully illustrating the coaction of the slide-locking end of the controller, N, with a lock-face (as 33ᵈ, Fig. 4) of the main slide of the breech action.

Fig. 60ª is a diagram supplemental to Figs. 56 to 60, inclusive, and is explanatory of an operational feature hereinafter described.

Figs. 61, 62 and 63 are a series of diagrams illustrating certain features and operational relations of the fire-control action when this corresponds to the arrangement shown in Figs. 3, 4 and 9; in Fig. 61 the principal parts correspond with the positions thereof shown in Figs. 3 and 57; in Fig. 62, with the positions in Figs. 15 and 58; in Fig. 63, with the positions in Figs. 17 and 59; these three diagrams also correspond with the arrangements and positions shown in Figs. 48, 49 and 50, respectively, as regards the firing-member, H, and the interlocking relations of the safety-train members N and G. Figs. 61ª and 62ª are diagrams corresponding to portions of Figs. 61 and 62, respectively,—and are supplemental thereto,—for illustrating some of the more restricted, or shorter coaction-circuits which occur within the described system of fire-control mechanism.

Figs. 64 to 68, inclusive, are a series of views similar in arrangement to Figs. 15–18, for illustrating successive positions of the actuation and force-modifying means which is operatively intermediate to and actuates the controller and sear into engagement with the main-slide and firing-member, respectively, when the firearm mechanism is of the form and arrangement shown in Figs. 3, 4 and 9; Fig. 69 is a diagram in which certain features illustrated in Figs. 64 to 68, are brought into one view for comparison.

Fig. 70 is a side-view partially in section, and similar to Fig. 4, for illustrating how some of the members, and operating means and details of the fire-control action, may be varied in form and arrangement as regards some of the subjects-matter which are herein set forth and defined, and especially as regards the form and arrangement of the firing-member, the controller support and connections, and the actuation-means operatively-intermediate the firing-train and other parts of the action.

Fig. 71 is a view analogous and supplemental to Fig. 70, for further illustrating certain variations in the specific character and arrangement of some of the members and details of the fire-control action, and Fig. 71ª is a section in line a—a, of Fig. 71, for showing the lever-device which is located below said line.

Figs. 72 and 72ª are sectional detail views illustrating how the breech-block E when assembled on the slide C, as in Fig. 5, may be held from contacting at the forward end thereof, with the frame B.

Fig. 73 is a cross-sectional view in line 73—73 of Fig. 9, for illustrating certain features and details relating to the magazine, and is supplemental to Fig. 9 and to Figs. 25 and 29.

Fig. 74 is a horizontal and fragmentary sectional view for more fully showing certain details of a means (which comprises a barrel-guiding ring that slides within the slide C) for detaining the barrel D in proper rotative position while free of any supportive connection with the frame B.

Fig. 75 is a perspective view of the barrel-guiding ring, 4ᵉ, together with certain coacting details, as seen in an oblique direction from a point to the right-hand of Fig. 74.

Figs. 76, 77 and 78 illustrate a modification in three successive positions respectively, of the means for operating the rearward end of the breech-bolt E relatively to the main-slide C; the position shown in Fig. 76 is comparable with Fig. 4; the position in Fig. 77, with Fig. 7, and the position in Fig. 78, with Fig. 8, as hereinafter more fully explained.

Fig. 79 is a diagrammatic view illustrative of certain features of the coaction, especially during the firing of a cartridge, as between the breech action, the barrel and the frame of the firearm.

Fig. 79$^a$ is a plan view drawn on a scale corresponding to Fig. 3 and having some parts broken away for more clearly showing the relation of the barrel and its mounting relatively to the main slide C, and the arrangement of the breech-bolt E, firing pin P and extractor 5$^a$, and the manner in which the extractor space 4$^x$ is covered during the power stroke of the breech action. Said Fig. 79$^a$ is drawn in such a position above the diagram Fig. 79, that the several members which are especially illustrated in the two views considered together, are in alinement, as for instance, the cartridge X and the head portion $x^2$ thereof.

Fig. 79$^b$ is a cross-sectional view in line 79$^b$, 79$^b$, Fig. 79$^a$,—for more fully illustrating the way in which the barrel, D, is herein shown slidably supported within and by the slide C, and free of any direct supportive engagement with the frame B; Fig. 79$^c$ is a cross-sectional view in line 79$^c$, 79$^c$ of Fig. 79$^a$.

Figs. 80, 81, 81$^a$, 82 and 83 illustrate a modification of the trigger-and-sear disconnection means. In these views, Fig. 80 corresponds with Fig. 56; Fig. 81 corresponds with Fig. 58; Fig. 82 corresponds with Fig. 59; Fig. 83 nearly corresponds with Fig. 60; Fig. 81$^a$ is a view of the modified disconnection device as seen from the right hand in Fig. 81.

Fig. 84 is a view similar and supplemental to Figs. 80—83 for showing a variation in the specific arrangement of the controller actuating means and the trigger shifting connection between the controller N and the trigger F; and Fig. 84$^a$ is a sectional view on line 84$^a$, 84$^a$ of Fig. 84, for showing certain relations of the members N$^2$, H$^3$, and S, as arranged in said Fig. 84.

Fig. 85 is a diagram illustrative of the operational features of the sear-member S, and is especially supplemental to Figs. 15 to 18, inclusive.

Similar characters designate like parts in all the views.

The several component mechanisms and the operative members thereof are herein shown assembled upon, and in part within, a framework or "receiver" which,—in accordance with a conventional system of firearms manufacture,—is preferably made in a single piece. This frame,—herein designated in a general way by B,—may, in practice, have any structural size and shape suitable or convenient for the purposes of the mechanism, and may be provided with such coacting details as those purposes may require. In the present instance, the frame B has interiorly thereof certain chamber-spaces for some of the operative members, and is provided with various guideways, stop-faces and other structural features which are coöperative with or supplemental to those operative parts and members. The frame B when thus constructed and provided, having been illustrated by a series of separate views,—Figs. 41 to 46,—a further and more particular account of the various features thereof, will now be given from time to time in connection with and during the following description of the several principal mechanisms, and of the various trains and members, the coacting pairs of members and inter-coacting pluralities of pairs, and the devices and details thereof.

The firearm mechanism considered as a whole,—and excepting (in certain respects) the frame, the barrel and the magazine,—may be regarded as being organized into two main mechanisms, or "actions," viz: a "breech action" which is herein shown supported upon the frame for a sliding engagement therewith, and a "fire-control action" which is mainly located in the chamber-spaces within the grip or handle portion of the frame B, and which comprises a complex of coöperative members and devices arranged and operating in coacting pairs and inter-coacting trains. The breech action and the fire-control action besides being each coöperative, directly and for various purposes, with the other, are also each coactive with the magazine and the barrel, for one or more purposes, and either directly or indirectly, as will more clearly appear from a comparison of the drawings as hereinafter more fully explained.

The breech action is retractable along and upon the frame B from a forward position (Figs. 1, 3 and 4) through a loading-stroke to a rearward position, Fig. 9, and comprises as a principal member thereof, a carrier or slide, as C, having therein chambers or spaces for the barrel, D, and the operably-supported and connected breech-block, E. Thus the slide C is in the nature of a frame for the breech action considered as one of the mechanisms of the firearm, and this frame-member, C, is provided with means (preferably such as herein illustrated and explained) for carrying the various operative members of such mechanism. The member C, therefore, constitutes a main carrier in the form of a main slide, and is a momentum-block, and a power-slide; also, it is a principal operating member from and through which power is transmitted from the fired cartridge to other parts and details of the firearm mechanism. Also the slide C is arranged to be retracted by hand when occasion may require, and some suitable slide-actuating spring is provided and arranged for returning the slide and the parts carried thereby from the said rearward position to the said forward position thereof, and thereby also effect the re-loading operation in an automatic manner. In practice, various arrangements (not shown) of such a spring may be employed, but I prefer to use a helical spring, as $4^d$, Fig. 3. and to arrange this spring to surround the barrel in the manner there illustrated.

The main slide, C, is shown so formed and arranged that the barrel D may be carried within and thereby, and may thus be held in alinement with the slideway surfaces of this slide without having any support on or directly by, the frame itself in a direction transversely of the bore of the barrel. Thus the main slide in the described preferred form thereof, constitutes a barrel-carrier,—and also a barrel-carrying power-slide,—the barrel being fitted, equipped and arranged for a reciprocatory or sliding movement within and relatively to said carrier during the sliding movement of the carrier (through an equal stroke) on and relatively to the frame. For effecting such sliding movement of the barrel within the barrel-carrier, some suitable barrel-positioning means or device should be provided and arranged as between the barrel and the frame for preventing any considerable longitudinal movement of the barrel relatively to the frame during the said sliding movement of the barrel-carrier upon and relatively to the frame. By the term barrel-positioning, as applied to means, connection or device, I refer, of course, to the holding or detaining of the barrel against movement in a direction longitudinally of the frame.

The frame B is shown provided with a guideway for the power-slide C, which in practice will be provided with the usual firearm-sights, as $t^5$, $t^6$. In Figs. 1 and $1^a$, also in Figs. 3 and 9, these sights are indicated as being of a well-known and simple kind, but other kinds of sights may be used in place thereof. Said guideway may be said to comprise, in the preferred form thereof, two slideways, or guides as $3^e$, $3^e$, located one on either side of the frame, (see Figs. 10, 11 and others). The power-slide C is mounted on the frame in sliding engagement with said slideways, and has formed therein a barrel-chamber, $3^j$, Fig. 3. The barrel, D, is located and arranged in said barrel-chamber for sliding and rotative movements within said chamber and relatively to the power-slide, and free of any supportive engagement with the frame.

The breech action-slide C is shown with the barrel-chamber $3^j$ sufficiently enlarged for the barrel D, with the slide-spring $4^d$ and guide-ring $4^c$ thereon, (Fig. 3), to be inserted from the forward end thereof. The forward end, $4^F$, of the barrel is held in alinement and guided by a bushing or bearing $3^t$ which is removably fixed in the forward end, $3^k$, of the member C, (see Figs. 1 and 3.) Said bearing ring $3^t$ also forms the bearing or abutment against which the slide-spring $4^d$ acts at all times for moving or holding the main-slide forwardly on the frame B. The ring $3^t$ is, or may be, held in place by a screw thread, in the well-known manner indicated in Fig. 3 by the lines of the drawing.

On the barrel is mounted a bushing $4^c$ of suitable internal diameter to pass over the front end $4^j$ of the barrel and to bear against a shoulder, $4^k$, formed by the slightly enlarged rear end $4^e$ of the barrel D. This bushing $4^c$ has an annular recess $4^m$ at its front end to receive the rear end $4^n$ of said slide spring $4^d$, the external diameter of the bushing being made to produce a close but freely working fit in the corresponding bore $3^j$ in the forward end $3^k$ of the slide, (see Figs. 3, $79^a$, $79^b$.)

The chamber $3^j$ in the forward end $3^k$ of the slide C which receives and guides the barrel-bushing, is reduced in diameter at a point just to the rear of the rear end of the bushing $4^c$, when the parts are assembled in the arm and the slide C is in its forward or "breeched-up" position, Fig. 3. The diameter of this reduced bore is slightly larger than the diameter of the enlarged rear end $4^e$ of the barrel D, so that the slide may move longitudinally over the barrel D.

For holding the barrel, D, in proper position within the slide C, during the sliding movements of said member C relatively to the frame B, the barrel may have formed and transversely-located therein a single recess, as $4^y$, (Fig. 40) and the frame may have a correspondingly formed and located projection, as $2^c$, extending into said recess, (Fig. 5), and may have forward and rearward surfaces $2^w$, $2^x$, engaging with the forward and rearward surfaces $4^a$ and $4^v$, respectively, of the recess,—see Figs. 3, 5 and 9. A clear space is shown at $s^1$ and also at $s^2$, $s^2$, so as to prevent the barrel from having any supportive bearing on, or supportive engagement with, the frame, and thereby prevent, also, the positioning engagement of the barrel and frame from having a disturbing effect upon the alinement relations of and as between the barrel and its carrying-slide C and the sights thereon. Should it be deemed desirable, in any given instance, to provide a larger surface area of the contacting faces at the recess $4^y$, those faces may be increased in size or in number, or both; also, if preferred, other suitable or well-known means or device (not shown in this application)

may be substituted, within the purview of my present invention, for said barrel-recess and frame-projection.

The above described pairs of barrel-locating surfaces, are preferably of a screw-like, or helical form and arrangement, (Figs. 5, 42, 74), so that in assembling the mechanism the barrel may be thus drawn backwardly when it is rotated during the operation of engaging the barrel-end 4ᵉ with the frame B. Just to the rear of the said surface 2ʷ, the receiver B has a segmental annular drawing shoulder 2ᵉ, so arranged that when the barrel D is revolved to its position of normal engagement with the receiver B, the rear end of the barrel D is drawn back in a positive manner against the shoulder 2ᵉ. Since the forward movement of the breech-block E is limited by striking the rear end 4ᵉ of the barrel D, (Fig. 3), this arrangement of the said locating and drawing surfaces locates the rear end of the barrel longitudinally in the frame with extreme accuracy, so that the distance from the rear end of the barrel D to the recoil shoulder or abutment 2ᶠ of the receiver B may be maintained with a minimum amount of variation. The advantage of maintaining this distance closely will be apparent from the description hereinafter given, of the breech-block movements.

The barrel D is shown provided with rifling, as 4ᵇ, (see Fig. 9) which is of the same "hand" as the screw-like locating-surfaces at the rear end of the barrel. One effect of this is that when the projectile $x^1$ is advancing through the barrel D its inertia resists the "spin" given to the projectile by the rifling, so that this inertia or resistance of the projectile tends to rotate the barrel D in a direction opposite to the twist of the rifling. This rotative impulse imparted to the barrel in the said opposite direction from the twist of the rifling, has the effect of tending to move the barrel D backward with respect to the receiver B and thus,—controlled by the screw-like engaging surfaces of the barrel and the receiver,—to securely draw the barrel backward into engagement with the aforesaid segmental annular drawing shoulder 2ᵉ located in the receiver.

It will be understood that prior to the firing of the shot, and if there is a relatively free fit between the barrel D and the slide C, the barrel may not at that time have been rotated precisely to its true position and therefore may not be in actual or firm contact with said annular locating or drawing shoulder, 2ᵉ, in the receiver B, but as the projectile $x^1$ advances up the bore 4ᶠ, this contact will normally be effected.

The slide C is provided on each side with a longitudinal groove 3ᵉ, and with a pair of parallel ribs (Figs. 10, 11) at the bottom side of the slide. The top of the receiver B, (which should or generally may be a flat surface), carries on its sides a corresponding pair of grooves 2ᵈ, so that the slide C may be assembled on the receiver from the front; the said ribs at the bottom of the slide C taking into the said grooves near the top of the receiver. The said ribs formed at the bottom of the slide open rearwardly, and the slot in the bottom of the slide C is terminated at its front end by a stop abutment 3ᵖ. A corresponding abutment 2ʲ, to engage this stop abutment 3ᵖ on the slide, is located near the front of the receiver B, so that the rearward movement of the slide C will be positively limited when the slide is moved backward to engage these two surfaces 3ᵖ and 2ʲ, as in Fig. 9. It follows from this that the operator of the arm could not be injured by the slide being thrown to the rear and off of the receiver.

To assemble the slide C to the receiver B, the rear ends of the ribs on the slide are engaged into the corresponding grooves at the front of the receiver and the slide carrying the breech-block E, and the barrel D, assembled as above described, is slid backward onto the receiver until the rear end of the barrel D brings up against the aforesaid segmental annular shoulder 2ᵉ of the receiver. While the slide C is held in this position (not shown) the barrel D is rotated into its normal engagement with the rib 2ᶜ of the receiver B. The slide C is then released and under the action of the said slide-spring is drawn forward to its normal or breeched-up position, as in Figs. 1 and 3.

In order to remove the slide C and barrel D from the receiver B, the slide is moved backward on the receiver to a position (about midway between positions Fig. 3 and Fig. 9) where the shouldered end at 3ᶻ, formed by the rear end of the large bore, 3ʲ, in the slide will be to the rearward of the rear end of the barrel. The barrel is now grasped at the muzzle and rotated one-half turn in the proper direction to disengage its faces 4ⁿ, 4ᵛ, from the receiver B, then the slide and barrel are pulled forward off of the receiver. After this, the barrel and other details in the power-slide or carrier C may be removed and replaced, as hereinafter more fully set forth. The particular construction herein illustrated and described with regard to the mounting and mode of assembling the barrel within the power-slide, is not specifically claimed herein but will constitute in part the subject-matter of a separate application to be concurrently pending herewith, and to which reference may be had.

The rearward end of the slide C is suitably formed with a chamber-space at $c^6$, Fig. 47, to inclose and carry the breech-block E (see Figs. 3 and 5). The breech-block E, carries at its front end a surface $5^m$ (Fig. 33) which abuts a cartridge, X, in the cartridge-chamber $4^x$ of the barrel. The rearward end $5^e$ of the breech-block has an inclined surface, $5^t$, which is engaged, when the slide C is in its forward position, (see Figs. 3 and 5), by a suitably inclined surface $3^r$ formed in, and near the rearward part of, the slide C, the effect being that the slide holds the breech-block forward against the rear end of the barrel and holds the rear end $5^e$ of the breech-block downward by the forward action of the slide-spring $4^d$.

On the bottom of the said breech-block, and near its rear end, is located the breech-block recoil shoulder $5^j$. The position of this shoulder, when the slide C is in its forward position, is in advance of the corresponding recoil shoulder or abutment, $2^f$, in the receiver B, and is held downward opposite the recoil shoulder $5^j$ in the receiver B by means of the engaging inclines above noted. The downward or locked position of the breech-block E is limited by a suitable stop shoulder; in this case just to the rear of the said recoil shoulder. Assuming that a cartridge be now exploded in the barrel-chamber, the rear end of the cartridge will be forced violently rearward against the face of the breech-block E. This would move the breech-block rearwardly at high speed until the said recoil shoulder of the breech-block is stopped by striking the recoil shoulder of the receiver, (Fig. 5). The slide C being in contact with the rear end of the breech-block E, would also be moved backward against the influence of the slide-spring $4^d$. The slide C, however, having considerable weight and not striking any positive stop, would be carried on rearwardly (Fig. 6) by its momentum acquired during this initial rearward movement of the breech-block; this movement of the breech-block may be termed the "power stroke."

At the termination of the power stroke, the slide C having momentum continues on its rearward movement holding the breech-block locked to the receiver (Fig. 8). This portion of the rearward motion of the slide C,—which we may term its free movement independent of the breech-block,—is of a duration sufficient to allow the shot $x^1$ to leave the barrel of the arm, and also, preferably, to thereafter allow the gas-pressure in the barrel D to drop (see Fig. 79 and description thereof). The free movement of the slide C is then terminated by an inclined bearing-face $33^f$ (Fig. 6) centrally located in the slide C which now engages an inclined and coacting face $5^k$ near the rear end of the breech-block. This interlocking block-lifting part $3^s$ of the slide C revolves, or tilts and lifts, the rear end $5^e$ of the breech-block upward out of its engagement with the recoil shoulder in the receiver (see Fig. 7). The breech-block now being interlocked with the power-slide and thus held securely in and by the slide, this member moves backward (Fig. 8) to complete the full opening stroke (Fig. 9) of the breech action.

On the top of the receiver B, just back of the annular drawing shoulder $2^o$ for the breech-end of the barrel D, less inclined surfaces $2^m$ are located which allow clearance for the corresponding pair of guide surfaces at the under side of the front end of the breech-block when the breech-block is in its forward and locked position,—see Figs. 3, 4, 5 and 8.

The breech-block carries on its forward end adjacent to the face $5^m$, (see Figs. 31 to 39), an extractor $5^a$ which will be hereinafter more fully described. The claw $5^n$ of this extractor grasps the rim of the fired cartridge in the barrel-chamber and extracts this cartridge during the rearward movements of the breech-block in a manner similar, in a general way, to the usual operation of shell-extractors of the hook-form class. After the shell is drawn out of the barrel-chamber during the rearward movement of the breech-block, it is ejected from the face of the breech-block by means which will later be described, especially in connection with Figs. 25 to 30, inclusive; by a comparison of said views as described, the said mode of operation will be evident.

The rearward movement together of the slide C and the breech-block, is terminated as before stated by the abutment $3^p$ at the front end of the lower side of the slide C striking the stop abutment $2^j$ at the front end of the receiver B. The grip $2^n$, or handle portion of the receiver, carries a magazine, M, which may be of the usual box type herein shown and will be furnished with a suitable magazine-spring, (not shown). This magazine is adjusted to and slightly below the rear end of the barrel D. The breech-block and slide C, during their rearward movement, ride over and to the rear of the top cartridge, (shown by dotted lines at X, Fig. 9), and when the face of the breech-block has moved rearward sufficient to free the topmost cartridge in the magazine M, this cartridge is moved upward by the magazine spring to a position in front of the face of the breech-block,—this position being indicated at X, Fig. 30.

On the forward or return stroke of the interlocked breech-block E and slide C, the face of the breech-block engages the base of this top cartridge in the magazine and pushes it forward and upward into the barrel D (see Fig. 25), the front end of the cartridge being guided upward by suitably inclined surfaces, $2^p$ and $4^s$ (Fig. 9), formed at the rear end of the barrel. During the forward or closing stroke of the breech-block, after the front end of the cartridge has entered the cartridge-chamber $4^x$, the rear end of the cartridge is centered on the breech-block by the recessed breeching-up face of the breech-block. To more completely effect this centering of the rear end of the cartridge or to prevent the cartridge from jamming crosswise when partially entered in the chamber $4^x$, the front end of the breech-block on its left side is provided with an inclined surface called a "guide prong," $5^y$,—see Figs. 31 to 34.

When the breech-block is in its forward position against the rear end of the barrel, (Figs. 3 and 4) the said guide-prong $5^y$ occupies a suitably formed clearance space $4^z$ which is formed in the barrel. Near the termination of the forward or closing stroke of the slide and the interlocked breech-block, the front end, $5^m$, of the breech-block strikes the rear end of the barrel D, (Fig. 3), which stops further forward movement of the breech-block. A second inclined surface $33^e$ in the slide acting on the rear inclined surface, $5^f$, on the breech-block (Fig. 8), serves to swing or depress the rear end of the breech-block downward to its locked position with the receiver (Fig. 5), and after this, the slide C continuing on forward through its free or idle movement with respect to the breech-block and finally the main or lower incline $3^r$ on the slide, brings up against the inclined rear end $5^f$ of the breech-block, as in said Fig. 3. This, of course, stops the forward movement of the slide C, whereupon the slide spring $4^d$ retains all of the parts in this "firing" position.

Some suitable shell-extractor, as $5^a$, is pivoted in the breech-block (see Figs. 31 to 38) by means of a pair of trunnions $5^x$ bearing in corresponding holes at $5^z$ in the breech-block. At the rear end of the extractor, a hole is located in the breech-block for receiving the extractor spring $5^c$, (Fig. 31) and the front end of the extractor is swung inwardly by a plunger $5^b$ which bears against the rear end $55^a$ of the extractor; this bearing point is so far outside of the axis of said trunnions, that the effect is to yieldingly force the front end or claw $5^n$ inwardly and toward the cartridge held on the recessed front end of the breech-block. This action is indicated in Fig. 31 by the solid and dotted line positions of the hook $5^a$. The extractor is also an indicator to show the operator of the arm, by sight or feeling, whether or not the chamber of the arm is charged. When there is no cartridge in the chamber the claw at $5^a$ is moved inward considerably more than is common with an extractor of the ordinary type.

In the particular form of breech-mechanism herein shown, when the breech-block E is unlocked from the receiver B and is interlocked to and moving backward or forward with the slide C, a gap would extend between the front end of the unlocking face $33^f$ of the slide C and the rear portion of the breech-block, unless a guide-surface were provided to bridge over such space. When the slide and interlocking breech-block are passing backwardly and forward over the magazine M, the topmost cartridge in the magazine might be caught or might jam into this gap or opening so as to retard or drag the slide movements. The upper end portion $14^a$ of the disconnector or controller N (of the fire-control action) similarly would strike either end of this gap or space and tend to resist the free movement of the slide. To provide against such results, and for other reasons elsewhere herein indicated, a cartridge guide $e$ is provided to bridge this gap and so preserve an uninterrupted track at the bottom line on the breech-block, extending from the face of the breech-block back to the rear end of the interlocking part of the slide. This particular piece, $e$, I designate as the cartridge guide, and its use is in part to facilitate assembly; this guide may be maintained in the breech-block, and held from endwise movement in the block, by the engagement of a retaining lug $e^1$, bearing into a recess formed by square-bottomed hole, $5^r$. (See Figs. 3, 4 and 5; also compare with Figs. 14 and 31). Said retaining lug $e^1$ also holds the front end of the cartridge guide $e$ from moving downward. The body portion of the cartridge guide $e$ itself occupies a slot $5^s$ formed in the bottom of the breech-block and on an angle, so that when the cartridge guide $e$ is assembled into the breech-block and the rear end of the cartridge guide is moved downward to approximately the plane of the bottom of the breech-block E, the extreme front portion of the cartridge guide $e$ will engage the abutment $5^t$ in this inclined slot $5^s$ which it occupies, and so limit the further downward movement of the cartridge guide. The front end of the cartridge guide $e$ is held from upward movement in the breech-block by means of the firing-pin spring $15^a$ which lies immediately over this end of said cartridge guide (see Figs. 4, 5 and 9). The rear end of the cartridge guide $e$ occupies a suitably formed slot, as $3^w$, in the bottom of the interlocking part $3^s$ on the slide C, so that the slide may move longitudinally independently of the breech-block through the required distance and still allow clearance for the rear end of the cartridge guide. Thus the total length of the said guide-surface is variable, according to the movement of the block E relatively to the slide C. The depth from top to bottom of said slot $3^w$ in the slide is about equal to the height from top to bottom of the rear end of the cartridge guide $e$, so that the rear end of said guide will be held flush or nearly so with the bottom of said part 3ˢ and thereby a continuous track be formed at or near the line of the bottom of the breech-block and extending from the face of the breech-block to the rearward end thereof.

A firing pin, as P (of any suitable form and proportions), is shown mounted in the slide C, being insertible from the front when the block E is removed. The interlocking part 3ˢ of the slide C has a bore through which the firing pin P can pass (and is thus a firing-pin bearing) and has a shouldered hole $3^x$; the shoulder face $p^2$ on the firing pin striking the shoulder face $3^{x\prime}$ in the hole, limits the backwardly moving firing pin, as in Figs. 5 and 8. This hole through the said interlocking part or bearing is continued rearwardly from the cross-wall, as 33ª, in the slide which holds the breech-block forwardly and downwardly during the locked position of the arm. The rear end 15ᵈ of the firing pin normally projects to the rear end of the rear end of this cross wall of the slide, as in Figs. 5 and 7. In the rear end of the slide is formed a recess, which provides clearance or space, 3ʸ, for the hammer H so that the hammer may move upward to deliver its blow to the rear end of the firing-pin, as indicated in Figs. 4 and 17.

On the front end of the firing-pin (Fig. 5), forward of the collar or shoulder 15ᵇ, is mounted a firing-pin spring 15ª. The rear end of this spring bears against the collar or shoulder on the firing-pin and the front end of this spring bears against a counter-bore 5ᵛ in the firing-pin hole in the front end of the breech-block, the effect of this being to force the firing-pin rearward at all times in the slide and to force the breech-block forward in the slide. This arrangement, therefore, holds the breech-block upward in its unlocked position or its interlocked position with the slide C by means of the contact of the inclined surfaces of the interlocking parts of the slide C and the coacting surfaces of the breech-block. (This action of the firing pin spring 15ª is also of particular advantage in holding the breech-block E to the slide C when the slide is dismounted from the receiver.)

In the cross wall 33ª near the rear end of the slide C, a slot 33ᶜ is formed to receive a roll, 3ᶜ, held in place by an ordinary cross-pin 3ᵈ. Said roll 3ᶜ projects beyond surfaces forming the cross wall and reduces the friction between the hammer and the slide during the travel of the latter; but the use of such a roller-surface is not always necessary, and a fixed surface may be substituted therefor, if desired.

The rear end 2ʳ, of the receiver, back of the recess for the magazine M, is slotted out at 2ˢ to allow the insertion therethrough of most of the parts constituting the firing train, or mechanism, (see Figs. 3, 4, 9). In said recess, or chamber, the hammer H is pivoted to the receiver by a pin 8ª. A strut or main-spring rod 8ᵇ is pivoted to the lower end of the hammer H to the rear of the pivot 8ª on which the hammer turns, and the lower end of this main-spring rod 8ᵇ is seated in the cupped upper end of the main spring plunger, 8ᶜ, which terminates the upper end of the coil main spring 8ᵉ. Adjacent to the hammer H the sear S is pivoted to the receiver B by means of a pin 17ª. The upper end of the sear S carries the cocking-shoulder 17ᵇ so that when the hammer H is moved to its cocked position by the backwardly moving slide C, the upper end of the sear S on revolving toward the hammer H will snap into a corresponding cock-notch 8ʲ in the hammer and hold the latter in its cocked position against the tension of the main spring 8ᵉ. The lower end of the sear S carries a forwardly facing abutment 17ᵈ. A trigger F is mounted,—preferably in a slidable manner,—in the receiver B, the front end of the trigger being located forward of said magazine recess or chamber. The body of the trigger F extends rearwardly into the slot at $2^{t\prime}$ (Fig. 3) back of the magazine recess 13ᵇ. This body portion of the trigger is slotted through at 6ª (Fig. 12) from top to bottom to provide the necessary space and clearance for the magazine M, and to allow for the required movement of the trigger. This slotting of the trigger for the magazine M, leaves the body of the trigger composed of a pair of side bars, 6ᵇ, 6ᵇ, and these side bars occupy slots 2ᵗ in the receiver, which are wider than the side bars 6ᵇ, so that the trigger F at its rear end 6ᶜ may have an up and down or swinging movement in addition to its normal forward and rearward, or longitudinal movements, (see Figs. 19 and 20). The front end of the trigger or the finger piece 6ᵈ is slotted to receive the trigger lever spring 6ᵉ and plunger 6ᶠ, and the trigger lever $f$ is retained in the trigger F by means of a pin 6ʲ.

A shoulder 2ᵛ formed in the top wall of the vertical slot in the receiver B (Figs. 4 and 9), which receives the front end of the trigger F, forms an abutment for the top end of the trigger lever $f$. To assemble these parts, the trigger may be introduced in the receiver B from the rear, and before it is moved to its complete forward position, the top end of the trigger lever $f$ may be revolved or turned forwardly and downwardly so as to be depressed below the top wall of said vertical slot which receives the front end of the trigger F. The trigger may then be moved forward and released. The connection of the trigger spring 6ᵉ and trigger lever $f$ now holds the trigger bodily in its forward position in the receiver B (Fig. 9), and also tends to yieldingly hold the rear end of the trigger upward, the forward movement of the trigger F being limited by the curved ends of the side bars $6^i$ striking the curved ends of the slots $2^t$ which they occupy in the receiver B. The rear end $6^c$ of the trigger F carries a surface which, in the firing position of the arm, is just in front of the corresponding faces $17^d$ on the sear S, so that if the trigger F be pulled in the usual manner its rearward movement will revolve the top of the sear S forward and out of the hammer notch $8^j$ (Fig. 15) allowing the hammer H to be driven forward (Fig. 16) by the main spring $8^e$ to strike the firing-pin P (Fig. 4) and explode the cartridge X in the barrel-chamber $4^x$.

It being deemed desirable to render the firing mechanism inoperative during the operation of the breech mechanism, so that the firearm cannot be fired prematurely or before the breech mechanism is completely locked, some suitable disconnector or controller, as N, is provided. This device or feature may have various specific forms,—as hereinafter further explained,—but a preferred form and arrangement thereof is shown in the principal views, and may be briefly described as follows: The controller, N, is mounted adjacent to the sear S and arranged to coact with the sear. The lower end, $14^b$, of the controller occupies a slot, $6^k$, in the rear end of the trigger F, and is coupled to the trigger as regards a movement in a vertical direction. The trigger, however, may move longitudinally independently of the controller N, but vertical movement of the controller N would carry along with it the rear end-portion, $6^c$, of the trigger F. The upper end portion $14^a$ of the controller is projectable through and above the top of the receiver B. This upper end portion of the controller has a face $14^d$, Fig. 4, which engages a face $33^d$ on the rear end of the interlocking part $3^s$ of the slide C when the slide is in its forward or normal position, (see Figs. 3, 15, 56, 61). These engaging surfaces $33^d$ and $14^d$ are also shown inclined so that if the slide would be forcibly pulled rearwardly it will ride over the top end of and depress the controller N. The controller being moved downward and being coupled to the rear end of the trigger (Figs. 15–18) would move the rear end $6^c$ of the trigger downward below the trigger-engaging face $17^d$ of the sear S, (Figs. 9, 18, 59, 63) so that a backward pull on the front end of the trigger F would not now be transmitted to the sear S.

On allowing the slide C to move forward to its breeched-up or firing position, the controller N under the influence of its spring $14^n$ would tend to move upward and assume its normal position, (Fig. 3) thus bringing the rear end of the trigger F upward and restoring the operative engagement between the trigger and the sear S, as hereinafter more fully explained. The controller N is provided with a lever $n$, spring $14^n$ and plunger $14^m$, mounted in the controller, the lever being pivoted to the controller by a pin $14^l$. The lower end of this lever $n$ bears against a suitable lever-arm face $17^c$ located at the top of the sear S, the continuously-acting spring $14^n$ being, therefore, at all times in position to move the controller N toward its upward or normal position and to move the top end $17^m$ (Fig. 22) of the sear S toward the hammer H. The controller N is confined between the slot or opening $17^k$ in the front, upper side of the sear and the slot it occupies in the receiver, so that the body of the controller N may only move longitudinally, or in the direction of the greatest length of the controller.

In any arm of this type it is desirable to provide means for preventing more than one shot being fired at one pull on the trigger, and for this purpose I have, in the present instance, provided a sear-and-trigger mechanism having the following features: The sear S carries a pair of arms $17^t$, (Figs. 11, 12, 22) so located as to straddle the controller N, and the front ends of these arms bearing on the top side $14^e$ of the shoulders $14^p$ on the controller N. On the pulling of the trigger F, (Fig. 15), which rotates the top end of the sear away from the hammer H, this pair of arms $17^t$ on the sear moves the controller downwardly. As the downward movement of the controller N (in the said preferred form of the device) carries with it the rear end $6^c$ of the trigger F it follows that the extent of the engagement between the rear end of the trigger F and the sear S will be reduced during this movement. By the time the sear has moved far enough to release the cock-notch $8^j$ of the hammer, however, the trigger has not been moved downward far enough to completely break its engagement with the sear S. The hammer now moves forward (Fig. 16) impelled by the main spring $8^e$ and thereupon the eccentric cam face $8^k$ on the hammer, located just above the cock-notch $8^j$, cams the front end of the sear still further away from the hammer pivot (Fig. 18) and hence completes the downward movement of the controller, and also completely breaks the engagement between the trigger and sear S, and moves the trigger downward to a position below the sear, as in Fig. 18. If the rearward pressure on the trigger be maintained, the sear will be free to snap into the cock-notch of the hammer when the latter is again moved to its cocked position, which is indicated by the dotted-line position of the sear-arm in Fig. 18, and is also shown in Figs. 60 and 68.

By the means here described, the disengagement of the sear from the hammer is assured prior to the disengagement of the trigger from the sear, so that, in practice, some variation in, and impairment of, the various coacting parts and their working faces,—even to a considerable accumulation of play or slack due to continued wear,— may take place without making it possible for the trigger to become inoperative before the hammer has been released. In this manner I overcome most effectively one of the objections and hazards incident to firearms of this class.

In order to fire the arm again, assuming that the cycle of movements for reloading and locking has been completed (Fig. 3), it will be necessary to release the rearward pull on the trigger. The trigger will then move forward under the influence of the trigger spring $6^e$ and after it moves forward and out from under the lower portion of the sear, if the slide is in its complete forward position, the controller will rise to lock the slide C forward and at the same time raise the trigger opposite its engaging face on the sear S so that now another rearward pull on the trigger will revolve or turn and retract the sear to release the hammer H and fire another shot.

A grip safety member, designated in a general way by G, is shown, pivoted to the receiver B near the lower end of the handle-portion thereof, (Fig. 3). The member G closes the slot or space $2^s$ formed in the frame to receive said member, (Fig. 46), and for use in assembling the details of the firing mechanism. Said grip-safety member, is shown bored out at $7^a$ from below to receive the main-spring $8^e$; the main-spring plunger, $8^c$, and the main spring plug or abutment, $7^b$, are shown operatively connecting with the main spring $8^e$. The main spring plug $7^b$, the upper end of which receives the lower end of the main spring $8^e$, has an annular groove $7^e$. The loose fitting pin $g$ which pivots the grip-safety to the receiver may also have an annular groove (Fig. 3), so that when the main spring $8^e$ is compressed in the grip-safety by moving the main spring plug $7^b$ upwardly, (Fig. $3^a$), the grip-safety pin $g$ may be inserted to pivotally connect the grip-safety G to the receiver B. On releasing the main-spring plug $7^b$, the main-spring $8^e$ will move it downward until the top side of the annular groove in the plug bears against the top of the pivot-pin $g$ and in said groove thereof, and thus holds said pin against being moved endwise, as in Fig. 3.

To remove the grip-safety pin $g$, it is only necessary to push the main-spring plug $7^b$ upward (Fig. $3^a$) to release this locking engagement. As before stated the cupped top $8^m$ of the main spring plunger $8^c$ receives the lower end of the main-spring rod $8^b$, the effect of the main-spring being to throw or press the hammer forwardly at all times. When the hammer is in its cocked position (see Figs. 3, 9 and $9^a$), a line drawn through the pivot $8^d$, which secures the main-spring rod $8^b$ to the hammer H, and through the grip-safety pin $g$ will pass in front of the center of the cupped or ball-and-socket engagement between the main-spring plunger $8^c$ and the main-spring rod $8^b$. Hence the action of the main-spring $8^e$ tends to hold the grip-safety G in its rearmost position when the hammer is cocked, (Fig. 48). If the hammer be released to its down position, after the top end of the grip-safety G is moved to its forward position, a line drawn through the main-spring rod pin $8^d$ and the grip-safety pin $g$ will pass to the rear of the ball-and-socket engagement between the main-spring plunger $7^b$ and the main-spring rod $8^b$, so that the action of the main-spring $8^e$ will be to hold the grip-safety G in its forward or depressed position,—see Fig. 50. One of the particular advantages of this arrangement is that the re-action of the main-spring $8^e$ on the grip-safety G, due to the sudden arresting of the hammer H when it strikes the firing-pin P, (Fig. 4), will be neutralized so that the grip-safety G will have no tendency to sting the hand of the shooter.

The top portion of the grip-safety G is slotted out at $7^d$ (Fig. 12) to furnish clearance for the hammer H and the sear S, leaving a pair of side walls $7^e$, which are extended to a pair of locking prongs, $7^f$. These prongs or lever-arms are located outside of, and clear of, the rear end of the trigger F, and when the grip-safety is in its outward or safety position, these arms are immediately below the bottom sides $14^c$ of the shoulders $14^p$ on the controller or disconnector N, which is thereby positively locked against downward movement, (see Figs. 11, 12, 21). Locking the disconnector N against downward movement not only positively locks the sear S into the hammer notch $8^j$ (Figs. 3, 61) but locks the slide C in its forward position. In addition, if the notch $8^j$ on the hammer H, for instance, should give away or be accidentally chipped or broken, the hammer H in flying forward would be arrested during this movement and before it struck the firing-pin, since the sear would not be allowed to yield and revolve away from the hammer H under the camming effect of the eccentric cam surfaces $8^k$ on the hammer; this resistant action will be evident from Figs. 15 and 16, by comparison with Figs. 3 and 4.

In order to release the hammer H to fire the arm, the grip-safety G must be moved to its depressed or forward position (Figs. 4, 9) prior to the pulling of the trigger F. This brings the locking arms $7^t$ on the grip-safety forward from under the locking shoulders $14^c$ on the controller N to the recess $14^r$, and thus allows the sear S to be revolved to release the hammer H, as in Figs. 15, 62, 65. On the hammer being so released the controller N will be moved downward as before explained, thereby locking the grip-safety G in its forward or depressed position,—Figs. 4, 50, 63. The grip-safety G therefore,—when free of external pressure,—is an indicator of the hammer position in that this safety-member is always in its forward or depressed position when the hammer H is forward, and will be in its backward or locking position when the hammer is cocked, and if the grip-safety is allowed by the shooter to assume this backward or locking position.

The described arrangement of controller N and the grip-operable safety-member G also provides means for holding the slide C in the retracted or rear position on the receiver B. To do this it is necessary to move the slide C to its rearmost position (Fig. 9) which brings the face $5^m$ of the breech-block back of the top $14^a$ of the controller N, and this controller is now moved upward in front of the face of the breech-block,—see Figs. $9^a$ and 68. If the grip-safety G be now released,—(see Figs. $9^a$ and 68), and allowed to assume its rear or locked position, it will lock the controller upward so that the breech-block and slide will be thereby held in the described open position, as in Fig. 19. In order to allow the slide and breech-block to go forward again to the closed position it is only necessary to grasp the firearm and depress the grip-safety G,—but without requiring the trigger to be pulled,—when the face of the breech-block will ride over and depress the controller so as to allow the breech-block and slide instantly to move forward.

When the cartridge is exploded in the barrel, the breech-block is forced violently rearward, the rear inclined face $5^t$ of the breech-block engages the power-slide C and forces this slide rearwardly with the breech-block; but the inertia of said slide, by reason of the inclined engaging faces $5^t$ and $3^r$, tends to hold the rear end of the breech-block downward into complete engagement with the receiver B. In this condition the parallel face $5^d$ (Fig. 5) at the top and rear of the breech-block is slightly out of contact with the parallel safety face $3^b$ of the slide. One advantage of this arrangement is that when the rear end of the breech-block brings up against the recoil shoulder $2^t$ of the receiver, the rear end of the breech-block is normally held completely downward on the receiver, so that now the "free" rearward travel of the slide is not subjected to so much "drag" from frictional resistance as might otherwise result if said safety faces were in contact. Thus the said parallel face on the slide is a safeguard as against an emergency, which is a feature of special importance. In practice, it is found that the slide C when in its forward position should, preferably, engage and lock the breech-block E to its forward position by means of a bearing face inclined relatively to the direction of travel of the power-slide, in order that the resulting action may be more uniform under varying conditions. Accordingly, I have provided, as already explained, a distinct means for completing the final locking of the breech-block on the forward stroke of the power-slide, and after the breech-block has been nearly completely locked by an earlier and separate movement.

The magazine lock $m$ works in conjunction with a follower $13^f$ and spring $13^j$ on its posterior face; the lock carries a ledge $13^k$ which snaps under the top edge of a suitably located cut or notch in the magazine when the magazine on being introduced is passed beyond the magazine lock (Fig. 9) and into its proper position in the receiver. The magazine lock follower is composed of a flanged head and cylindrical body. The flanged head $13^m$ is adapted to engage into a corresponding recess $13^n$ formed on the side of the magazine lock $m$. At the other end of the magazine lock is a semi-circular groove which is occupied by the cylindrical body portion of the follower. Suitable intersecting holes, $t^7$ and $t^8$, (Figs. 41 and $41^a$) are formed in the receiver B to hold the magazine lock $m$ and follower $13^f$ in proper relation to each other. The magazine lock is assembled from the right side of the receiver and the follower from the left side of the receiver. The end of the magazine lock is retired below the left side of the receiver and bodily swung to the rear away from the head of the follower $13^f$. The follower is now introduced so that its stem occupies its proper hole and also the notch formed for that purpose on the right end of the magazine lock $m$. The follower is depressed inward below the left side of the receiver until its flanged head is opposite the recess $13^n$ in the magazine lock. The recessed end of the magazine lock $m$ is then moved toward the follower $13^f$ to engage the flanged head of the latter. Both parts thus connected are allowed to move outward toward the left influenced by the magazine lock spring. The engagement between the stem of the follower $13^f$ and the magazine lock $m$ serves as a key to prevent the magazine lock turning or revolving in the receiver. This improved construction of a magazine lock, although of my invention is not claimed herein, but will constitute in part the subject-matter of a separate application.

The sides of the grip portion 2ⁿ of the frame B are preferably cut away,—as shown in Figs. 3, 41, 45,—leaving two pairs of under-cut and oppositely-disposed stock-engaging surfaces or lips on each side. The stocks, $s^4$, $s^5$, are suitably formed with corresponding pairs of under-cut frame-engaging surfaces, (see Fig. 46). Below each pair of engaging surfaces in the receiver is located a clearance so that each stock may be placed on its proper side of the receiver and moved upward to a position which brings the said pairs of engaging surfaces into contact. When said stocks are thus assembled, the grip-safety pin $g$ is inserted in the receiver. This grip-safety pivot-pin, by projecting on each side of the receiver (Fig. 1) holds the stocks upward in their secured position. The special features here described and relating to the stocks and retaining devices, are not specifically claimed herein, but are intended to constitute in part the subject-matter of a separate application, to be concurrently pending herewith.

The magazine M may generally be of the well-known "box-type" commonly used for arms of this class, and it is herein shown provided with the usual retaining lips, as $13^c$, which hold the contained cartridges from moving directly upward out of the same or into the receiver. One side of the top end of the magazine M in addition to the cartridge retaining lip $13^c$, carries an ejection lug, $13^a$. The bottom side of the breech-block is shown provided with clearance slots $5^w$, (Fig. 33) in position and properly made for said block to clear the top end of the magazine and also to clear the ejection lug $13^a$ thereof, when the magazine is properly entered into the receiver. Said ejection lug $13^a$ is so located that it will intercept the rear face of a cartridge being extracted from the chamber $3^t$ at a point nearly diametrically opposite the extractor $5^a$, so that the cartridge will be tipped sidewise (Fig. 27) and ejected from the arm on the side toward the extractor $5^a$, see Figs. 25 to 29.

The placing of the ejection lug on the magazine, and this magazine being usually made relatively thin, does not always provide in itself a sufficiently durable shell-ejecting means, and therefore I provide a raised or welded-on reinforce portion, preferably located on the outer side of that portion of the magazine which is upturned to form the ejecting lug $13^a$ (Fig. 30). Said ejecting lug may, in practice, and to save expense in manufacture, be made by first making the top portion of the magazine M a little longer than usual, and then turning it outward and down and back upon itself, a portion of the excess length of the magazine prior to brazing or welding. This particularly facilitates the manufacture of the ejecting lug.

It will be noted that in the present instance the magazine M is not shown located at right angles to the axis of the barrel D but is inclined backwardly and downward at a relatively considerable angle (herein shown at about 20 degrees). The topmost cartridge, X, in the magazine (Figs. 9, 25 and 30), is normally jammed upward against the retaining lips $13^c$ at the top of the magazine,—excepting when this topmost cartridge is the last cartridge in the magazine,—by the cartridge immediate under it. It is desirable to make the angular position or pitch of the magazine sufficient to bring each cartridge in the magazine far enough forward of the cartridge immediately below so that the extracting rim of the upper cartridge will be forward of the inclined front end of the extractor groove of the cartridge immediately below. It follows therefore that when the topmost cartridge (in position X, Fig. 9) is to be driven forward out of the magazine M by the advancing breech-block E, the slide spring $4^d$, which furnishes the power for this movement, will not have to overcome any resistance between the rim of the topmost cartridge and the forwardly inclined wall of the extractor slot in the cartridge next below, as $X^b$, Fig. 25.

The power-slide C, during the later portion of its forward stroke, carries the block E to the firing position (Fig. 3), by the coaction of the spring $15^a$ and upper inclined power-transmitting faces $5^t$ and $33^e$, (see Figs. 5 and 8), then lowers the rearward end $5^e$ of the breech-block by the further action of said inclined faces, and finally brings the guide-face $3^b$ over the depression-face $5^d$ of the block, (Fig. 5), whereby to hold the block downwardly into the proper alinement for the firing position, and then advance the lowered block to its fully forward position (Figs. 3 and 4) ready for firing. By this operation, and after the firing-pin point $15^e$ is brought up (by the completion of the forward movement of slide C) to the block-face $5^m$, the hammer guard-face $33^a$,—also the roll $3^c$,—passes so far forward (see Fig. 4) that the hammer H when released can move forward to strike the rearward end $15^d$ of said firing pin, (Fig. 4). During the forward stroke of the slide C, and until after the rearward face $5^j$ of the block E passes forwardly of the limiter-face and recoil shoulder $2^f$, (Fig. 4) the firing-pin cannot be advanced by a hammer blow to said firing position relatively to the block, nor can this occur until after the guide-face $3^b$ has passed well over the depressed block-end $5^e$, thereby safeguarding the cartridge and the mechanism against accident (as from blows or otherwise) prior to the lowering of the block into position forward of said limiter-face and recoil shoulder $2^r$, and also similarly safeguarding the firing-pin itself from being struck by the hammer, should this be prematurely released from any cause.

The pair of coacting power-stroke-limiting faces $2^t$ and $5^j$ are shown located each in an upwardly and rearwardly inclined position, and at about the angle-of-response, on the frame and breech-block, respectively, and they are arranged for stopping the breech-block on the rearward movement thereof through a relatively short power-stroke. The pair of upwardly and forwardly inclined coacting power-transmission faces, $5^t$, $3^r$, on the breech-block and power-slide, respectively, are arranged for operating the power-slide from the breech-block during and to the end (Fig. 6) of the said power-stroke of said block. The pair of block-depression stop faces $5^d$, $3^b$, are located on the breech-block and power-slide, respectively, and are arranged in position for the slide-depression-face $3^b$ to pass over the block-depression face $5^d$ on the completion of the forward movement of the slide,—see Figs. 3, 4 and 5. The pair of upwardly and forwardly inclined coacting block-operating faces $5^k$, $33^f$, are located on the breech-block and power-slide, respectively, and are preferably located forward of said power-stroke-limiting faces, and are located with an intervening space, $c^1$, (Fig. 4), when the mechanism is in firing position, for operating and lifting the block E from (and by) the movement of the power-slide only after this slide has moved backwardly for a short distance subsequently to the breech-block reaching the end of its own power-stroke,—see Figs. 6 and 7. By this means I provide for a time-interval (in addition to the time-interval of the breech-block power-stroke), between the termination of the breech-block power-stroke and the inauguration of the breech-block retraction by the power-slide. Thus the breech-block is released (Fig. 6) from the depression stop-face $3^b$ during such additional time-interval and prior to the beginning of the operation of elevating of the rearward end of the breech-block by the power-slide, this operation being shown completed in Fig. 8. The successive movements and positions here described are indicated in and by a comparison of Figs. 5, 6, 7 and 8, in connection with the principal enlarged views, Figs. 3, 4 and 9.

Owing to the forward position of the breech-block relatively to the power-slide during the earlier part of the forward movement of this slide, the cartridge is thus first pushed well into the barrel and then the breech-block is shifted downwardly in front of the abutment $2^f$, before the power-slide brings forward the firing-pin into a position with its point near to the cartridge; and by the same means, and prior to the time when the point $15^c$ of the firing-pin P could be driven forward to hit the cartridge, the depression face $3^b$ on the slide C runs over the coacting face $5^d$ of the then depressed rearward end $5^d$ (Fig. 5) of the block E, so that the firing of the cartridge by the firing-pin is rendered impossible until after the breech-block shall have been depressed forward of said abutment and locked in that position by the power-slide, and this by a forward movement of said slide occurring prior to the firing-pin coming into operative position. Thus, in the cycle of these movements, the initial rearward movement of the breech-block E imparts to the power-slide C its initial rearward movement; and the final forward movement of the power-slide imparts to the breech-block its final forward movement; and during these forward movements, a rearward face of the slide C,—in this instance, the surface of the roller $3^c$ as will be evident from Fig. 18,—prevents the hammer H from reaching the rearward end $15^d$ of the firing-pin P, until after the block-end $5^e$ has been shifted to and locked in its depressed position,—see and compare Figs. 4 and 5.

One feature illustrated in the drawings, is the preferred organization of the mechanism whereby the length of the breech-block, and its relations to the coacting parts, are such that the face $5^m$ of said block is made available for engagement with the stop-face $14^s$,—see Fig. $9^a$,—for holding the block E and slide C retracted. When so held, as shown in said Fig. $9^a$, the slide-operating spring $4^d$ acts forwardly on said slide C with a continuous force or pressure, and thus firmly holds the slide-face $33^e$ against the block-face $5^f$, so that on the withdrawal of the stop (as in Fig. 9), there is no slack, or play, to be taken up by the slide-movement before the breech-block starts forward. Since the breech-block normally offers, in practice, some resistance to the power-slide during the whole of such forward movement, the said faces $33^e$ and $5^t$ are normally kept in contact throughout the entire forward movement of the slide, and are then held firmly in contact while the parts remain in the firing position, (see Fig. 4) so there can be no slack, or play, to be taken up on firing the cartridge, by an initial rearward movement of the block E, and before the power-slide actually starts on its rearward stroke.

In some cases, if for any reason it is deemed desirable, the angular relation of the several block-stopping and block-operating faces as $33^f$ and $5^k$, $33^e$ and $5^t$, $5^d$ and $3^b$ (see Figs. 5–8), may be modified, and the arrangement and specific construction thereof may be varied within the purview of my present invention. For instance, as indicated in Fig. 24, said power-stroke-limiting faces 2ᶠ and 5ʲ may be located at about right-angles to the line of movement of the power-slide C; and the block-lifting faces 33ᶠ, also may be varied in their angular position. One variation in those angular positions is indicated in Fig. 24 by the arc w; and in practice this arc should be great enough to provide sufficient block-lifting effect for the faces 33ᶠ easily to shift the block-end 5ʲ out of engagement (similarly as in Fig. 6) with the abutment face 2ᶠ of the frame B. Similarly, the inclination of the block-operating faces 5ᶠ, 5ᵏ, may be considerably modified within practicable working limits.

The part of the mechanism which I have herein sometimes designated as the "safety-stop device" may properly be considered as comprising two members, a primary and a secondary member, these being arranged for working movements in transverse directions, and being provided with coöperative interlock stop-faces which are arranged in two pairs that are inoperative as to one pair when the other pair is in position to be operative. In the form of construction illustrated, the primary member consists of the grip-operated part G, while the secondary member consists of the controller or intermediate member N. And,—as indicated in the drawings,—the working movements of these members G and N are in such transverse directions that their respective stop-faces will be coöperative in pairs. Thus when the said primary and secondary members, G and N, are in the position shown in Fig. 3, the face 7ᶠ on the member G stands under the face 14ᶜ (Fig. 15) on the member N, thereby making said faces operative for the purpose of preventing a premature downward movement of the member N. Similarly, the face 14ᵗ on the member N and the face 7ʲ on the member G are operative,—when the member N is lowered to its position in Fig. 4,—for preventing the grip-operated member G from returning to its initial position shown in Fig. 3. By means therefore of this organization of the two members of the safety-stop device or train, these members are reciprocally coöperative as interlocking means in direct connection not only with the breeching mechanism but also with the firing-train of the firearm; and, the coöperation is such as to bring the grip-operable member, the intermediate member or controller, and the main-slide of the breeching mechanism into a train of directly coacting members which, in respect of the locking of the breech-block E (see Fig. 3) constitute for that purpose a grip-operated safety-stop mechanism coacting with, and constituting parts of a train with, the breech-block itself.

It will be evident that a considerable time-interval is required for the retracting cartridge-shell, (this operating, of course, through the transmission member, which is herein shown as consisting of the breech-block E,) to transmit sufficient force for accelerating the movement of the relatively heavy power-slide C, up to the maximum velocity and energy, or momentum, by the time this power-slide reaches the position thereof shown in Fig. 5, at which time the said breech-block is initially arrested in its rearward movement by the power-stroke-limiting faces 5ʲ and 2ᶠ. This time-interval of the breech-block power-stroke, however, is found in practice to be less than is desirable as between the inauguration of that power-stroke and the beginning of the shell-extraction operation. Accordingly, I provide a further time-interval by employing means which operate to delay the release and further retraction of the breech-block until the power-slide shall have moved rearwardly through a substantial distance, as for instance, from the position shown in Fig. 5 to the position indicated in Fig. 8. For this purpose among others, I have provided the stop-and-guide face 3ᵇ (see Figs. 5 to 8) which is so located on the power-slide (when the mechanism is in firing-position,—see Fig. 3,) as to resist the shifting of the breech-block out of engagement with said abutment face 2ᶠ, until after the power-slide shall have moved rearwardly from about the position indicated in Figs. 3 and 4, to about the position indicated in Fig. 8. At this time said stop-face 3ᵇ (which I also designate as a depression face) passes rearwardly of the face 5ᵈ, thereby elevating the rearward end of the block E, which is then carried rearwardly by and with the power-slide to their most rearward positions, about as indicated in Figs. 1ᵃ, 9 and 9ᵃ.

It should be noted that the power-slide C is preferably made of a considerable weight relatively to the weight of the frame B and mechanism contained therein, in order to reduce the initial rearward velocity of the breech action, and thus modify in a favorable manner, the operation of the firearm as a whole, especially as regards the recoil and the consequent unsteadiness which might arise from the use of a relatively light momentum member.

The initial action of the cartridge, when fired, being against the breech-block E, (Fig. 5), the rearwardly-acting force of the cartridge is then transmitted through the faces 5ᶠ and 3ʳ to the main-slide C while this is held in forward position (Fig. 3) by the spring 4ᵈ. The said faces 5ᶠ on block E, and 3ʳ on slide D being one or both of them upwardly and forwardly inclined, the effect of said initial action of the cartridge is normally to apply an upward thrust to the slide C, and to operate after the manner of a wedge for increasing the frictional engagement of the engaging slideways $3^e$, $3^e$, of the said slide with the upper surfaces of the ribs or slideways $2^d$, $2^d$, of the frame, and thus automatically produce an increased resistance operating as a braking action during the power-stroke; in this manner, a part of the excess force of the cartridge may be expended as between the slide and frame partly in an upward direction, and within the mechanism, and thereby to some extent tend to lessen the velocity or violence, or both, of the power-stroke. An analogous mode of operation also obtains in the modified arrangement illustrated in Fig. 24 and also in the one herein described in connection with Figs. 76, 77, 78.

The member E may be described as a slidable, single-piece, tiltable breech-block, arranged for retraction along the slide-ways $2^d$ of the frame B and arranged for a stroke in excess of a cartridge-length; and as having on one (the lower) side thereof a power-stroke-limiting face $5^j$ located in position for engaging a coacting abutment-face $2^f$ located on the frame (in position for stopping said block-retraction at the end of a relatively short power-stroke) and having on another (the opposite) side thereof one of a pair of block-operating faces the other of which is on the power-slide, whereby to effect the disengagement of said limiting and abutment faces; the location of these two faces, respectively, should be in such relative positions as only begin the said disengagement after a time-interval that is subsequent to the termination of the power-stroke of the breech-block.

The upper surface $b^2$ of the frame B constitutes a slide-way on and above which the forward end or head portion, of the breech-bolt member E is fitted to slide, while inclosed within the chamber-spaces of the main-carrier C,—see Figs. 3, 4, 5, 8, 9. Thus the bolt E is not only supported at its forward end upon and directly by the frame B, but it is prevented by the shape and arrangement of the slide-way surface from having any tendency to rotate or turn,—as if upon a longitudinal axis,—within the interior space of the main-slide or carrier,—see Fig. 13 and Figs. 31–37.

Owing to the peculiarly simple manner in which the breech-block E is operably-arranged as between and relatively to the frame B and the power-slide C, this block may, in practice, be so freely fitted that it may have a slight but substantial amount of sidewise and vertical freedom or "play" between said frame and the member C; this feature provides for such a free working of these parts that even when much befouled by powder gases and sedimental matter collecting thereon, this obstructive matter will be readily worked out by the movements of the mechanism, and thereby avoid any clogging of the operative devices from such causes.

As a means for arranging the lock-face $33^d$ of slide C, in a laterally central position (Figs. 5, 6, 7 and 8) and also bring said face $33^d$ near to or below the lower side of the rearward end $5^e$ of the block E, this block is preferably made with a middle opening, as $55^c$, Figs. 31–8, through which space the bearing-prong or depending arm $3^a$ of the slide C may extend downwardly from the upper wall $33^j$ (Figs. 5, $79^c$) which may,—as herein shown,—also constitute a cover-wall for closing in, or covering over, the top of the mechanism chambers of the frame B, (see Figs. 3 and 9). These features of the structural organization, provided for carrying (and wholly or chiefly supporting) the firing-pin P in a bearing which is on,—and may be an integral part of,—the slide C, and for locating said pin P directly over the lock-face $33^d$ of said slide, Fig. 5, and thereby provide for a convenient and effective arrangement of all those parts and members relatively to the faces $33^d$ and $14^d$ of the coacting controller-member N, the positions of which are hereinafter more fully described.

The member E, as will now be evident, operates in various ways, and serves several different purposes. Since said member E, on the firing of the cartridge, supports the base of the cartridge shell, and for this purpose effects such support by a direct engagement with a recoil-abutment, as $2^f$, on the frame B, the member E may properly be regarded as being primarily a breech-bolt. In its capacity as a breech-bolt, the member E supports the cartridge against undue rearward movement during the time-interval while the operating slide, C, (as the main "carrier" of the mechanism) is moving rearwardly just prior to the shifting of the breech-bolt out of its said direct engagement with the frame, (see the diagrams, Figs. 51, 52, as elsewhere herein described). Thus the member E as regards certain of its purposes, is a completely separate element from the operating-slide C, both physically and functionally. The member E is also an extractor-carrier and an extractor-retractor, and is arranged for shifting the extractor at the proper time forwardly along, or relatively to, the main-carrier or power-slide, as and for the purposes elsewhere herein more fully explained. Also, by reason of the described frame-engagement, the member E is a power-stroke-limiter for the main-carrier or slide, when this is a power-slide, while it also operates, but for a limited stroke only,—as a power-slide-actuator and as a power-transmitter from the cartridge to the power-slide. The rearward position of the member E is provided with means coöperative with complemental means on the main-carrier C, whereby the said portion of the breech-block member becomes or serves as a slide-engaging block-shifting means, thereby at the proper time (Fig. 6) to shift the member E itself out of its power-stroke-limiting engagement with the said frame abutment $2^f$,—see Fig. 8.

When the block member E is made with the relatively long and central opening $55^c$ vertically therethrough, the two side-bars $55^d$ and $55^e$, serve as sufficiently rigid connecting bars whereby to unite (preferably in the integral manner illustrated), the forward or head-portion and the rearward or operating-portion $5^e$ (see Figs. 31, 32) of said block member. This construction and arrangement therefore,—as elsewhere herein more fully explained,—provides for locating the bearing-block part $3^s$ of the slide C within said opening $55^c$, and also provides for guiding the member E upon, or against, the vertical side surfaces (see Figs. 13, 31, $79^a$, $79^c$) of said bearing-block $3^s$, and thus prevent any undue tendency of the member E to turn or shift out of its proper position within the power-slide. This two-bar connection of said forward and rearward end-portions of the member E is found to be especially effective in operation, and it results in a strong formation of said member E while permitting the use of a minimum of weight of metal therein, which is deemed to be desirable by way of preventing too great an impact of the block E against the abutment-face $2^f$ of the frame, at the end of the power-stroke,—(see Fig. 5).

One advantageous result which I secure by means of the present improvements, is the non-repeating mode of operation of the firing-train without resorting to any device or construction in the nature of a compound sear, since in the preferred form of the mechanism herein illustrated, the sear S is, or may be, a member which is integral both structurally and operatively, and which has all the parts and working-faces thereof always in one and the same fixed relation to each other. By these means, and by employing the controller N, or an extension thereof, (see $14^k$, Figs. 15 to 18) as a trigger-end-shifter, I provide for the effective operation of the mechanism as a whole and in the required manner, while avoiding the use of any coacting or intervening device as between the sear-actuating face (as $6^n$, Figs. 15 to 18) of the trigger, and the coacting face (as $17^d$, Figs. 15 to 18) of the sear itself. Thus, on pulling the trigger, the desired disconnection in the operative continuity of the trigger-mechanism and the sear of the firing-train, is secured while preserving a direct bearing of the trigger-face $6^n$ against the sear-face $17^d$, during the entire period of the disengagement of the sear-catch $17^b$ from the cock-notch $8^j$ of the hammer H.

By reason of the slide-locking member N being initially moved downward (Figs. $57^a$ and 65) through a part of its stroke by the action of the trigger (this being done by a force transmitted through a part of the sear operating as a lever for such purpose), the lock-face $14^d$ of the member N is thereby withdrawn out of actual contact with the coacting lock-face $33^d$ of the slide C; and this being done prior to the disengagement of the sear from the hammer, (Fig. 15), therefore the initial forward stroke of the hammer,—and, also, the entire forward stroke thereof,—is freed from any resistance which might otherwise be due to the friction of the slide-locking faces $33^d$ and $14^d$; thus any liability of retarding the action of the firing-train or stalling the same, by an undue or accidental sticking or adhesive action of said slide-locking faces, $33^d$, $14^d$, is effectively prevented. By thus safeguarding the hammer against such an accidental resistance,—which, in practice, would be highly variable, and therefore correspondingly objectionable,—I provide for a more reliable and uniform operation of the hammer and its main-spring $8^e$, while providing for the use of a minimum weight of hammer and a minimum power of main-spring, and thus I secure, with a given weight of hammer and power of said spring, a most uniform force of blow upon the firing pin, and a high rate of movement and ratio of acceleration of the hammer itself during its forward or firing stroke.

Thus the member N, while coacting directly with the slide C,—and this for different purposes at successive times,—is not normally and usually operated downwardly by the slide while this is moving rearwardly, but is drawn downward in advance of such slide-movement, first, from the pull of the trigger and later from the firing stroke of the hammer, so that the power-slide is entirely free of any contact of the member N therewith, during the normal rearward movement of said slide.

In practice, I deem it to be desirable that usually the several parts of the mechanism shall be so fitted that the lock-face $14^d$ of the member N will fit or bear firmly against the coacting face $33^d$ of the power-slide B, when this slide, (and such part of the firing-mechanism as is directly connected therewith), is in the firing position indicated in Figs. 3, 56 and $56^a$; at this time the sear-face $17^b$ is normally in full engagement (Figs. 3 and 56) with the cock-notch, or face $8^j$ of the hammer H. Now, on the initial pull-movement of the trigger, as from its position in Fig. 56, to its position in Figs. 57 and $57^a$, said lock faces $14^d$ and $33^d$ of the members C and N, respectively, are slightly separated, and by an amount sufficient to relieve them of any tendency to adhere, or "bite," thereby relieving the member N from any resistance to a further downward movement, or retraction, except such as due to the constant and more nearly uniform action of the spring $14^n$ (see Fig. 4) which, in this instance, is shown arranged for also acting as the sear spring. When the member N is thus only initially withdrawn from the lock-face $33^d$ of the slide C, the face $14^d$ thereof is still located well within the path of said slide face, as indicated in Fig. $57^a$, and preferably is not drawn below the line $y$ (Figs. $56^a$ 58 and 59) until after the sear S shall have been moved beyond its hammer-releasing position shown in Fig. 58; but during such additional sear-movement,—as from the position in Fig. 58 to the fired position in Figs. 59 and $59^a$,—said lock-face $14^d$ will be withdrawn entirely below said line $y$, and out of the path-zone $y^1$, so that the power-stroke of the slide B not only can be inaugurated, but can also proceed for a considerable distance, while said slide is free from any contact whatever with said member N.

It will now be evident that in the arrangement of the mechanism as illustrated in Figs. 56 to 60, and during the operations therein indicated, the sear-engaging face $6^n$ of the trigger F may be located well within the path or stroke (as $y^2$, Fig. 58) of the trigger-engaging face $17^d$ of the sear, during the entire pull-stroke of the trigger. As a result of these features, (and notwithstanding some downward movement of the trigger by the shifter N during said pull-stroke), the said trigger-face $6^n$ is still in an effective sear-operating engagement with the sear-face $17^d$ when the sear reaches the hammer-releasing position shown in Fig. 58 (see, also, Figs. 4, and 15 to 18). It will also be evident that should the trigger remain in said position shown in Fig. 58, the sear would be prevented from properly engaging with the hammer cock-notch, so that the mechanism would cease to be non-automatic in its operation. This result might be avoided, of course, by the shooter allowing the trigger to be returned by its retraction spring $6^e$ (Fig. 3), to the initial position in Fig. 56; but the operation of the mechanism (after the hammer-release) is so rapid as to render that precaution practically useless. In view of this, and to insure a positive and correct mode of operation, I have provided the described means for effecting a further shifting of the trigger, (as from the position in Figs. 3, 15 to 18 and 58, to the position thereof in Figs. 4, 59 and 60),—so that on the return of the sear to its position in Figs. 56 and 60, the sear-face $17^d$ will come entirely above the trigger-face $6^n$ (see Figs. 4 and 60), this operation being accomplished by the member N and the means for imparting thereto a second-stage downward movement (Fig. 59) subsequently to the movement (Fig. 58) for hammer-release.

The arrangement and mode of action here explained, has the advantage not only of completing the shifting movement of the trigger before the beginning of the power-stroke of the power-slide, but also of maintaining the trigger-face in an effective position relatively to the sear, (as indicated in Fig. 58) during a substantial time-interval subsequent to the actual release of the hammer; hence the sear will be held positively in its said position in Fig. 58 during any period of delay which may occur after the hammer-release and before the hammer shall have gotten well under way in its firing-stroke.

In the preferred construction illustrated in the drawings, especially in Figs. 15 to 19, the hammer has two adjacent, sear-engaging faces, as $8^k$, $8^j$, which are operative in alternation with each other and of which one $8^j$ is arranged for holding the hammer "on" the sear, in firing position, while the other $8^k$, is located for actuating the sear, (considering this as a trigger-shifter actuator), through a stroke in excess of the sear-movement required for disengaging the sear-face $17^b$ from the hammer face $8^j$. Similarly, the sear S, considering this as a combined sear and trigger-shifter-actuator, has two faces as $17^b$, $17^n$, arranged respectively for engaging said hammer-faces $8^j$ and $8^k$ in succession. Thus the faces $8^j$ and $17^b$ engage each other (Fig. 56) for holding the hammer in firing-position, acting for this purpose in a well-known manner. On the separation of these faces, $8^j$, $17^b$, however, the adjacent faces $8^k$ and $17^n$ come into coöperative relation (Figs. 58-59) and the hammer-face $8^k$ then operates as an actuator against the sear-face $17^n$ for further actuating the sear through a stroke beyond that required for releasing the hammer, (see Fig. 59). This additional sear-movement I have herein designated as a second stage of the sear-movement, which is or may be, (as already indicated) for operating a combined trigger-shifter and slide-lock, as N, through a corresponding second stage of the total stroke thereof. And if, in any special case, the member B has the slide-engaging part thereof omitted, then said second stage of movement is transmitted only to the trigger-shifter portion of said member N; and if in any case, this member has the trigger-shifter part thereof omitted, then said second stage of movement is transmitted only to the slide-lock.

The upper end or slide-locking portion, $14^a$, of the controller N, is shown provided with a series of three faces,—see Figs. 21, $21^a$, $57^a$, $58^a$, $59^a$. This series of faces comprises the forward or slide-lock faces 14ᵈ, the rearward or bolt-engaging face 14ˢ, and the incline 14ᵛ, whereby the forward lower edge of the bolt E may depress the member N downwardly from position Fig. 68. The arrangement of the said faces is preferably such that on completion of the trigger-actuation of the member N as shown in Fig. 15, the rearward face 14ˢ will be drawn below the upper surface of the frame B, (as shown in Figs. 15, 57ᵃ, 65) and thus bring said inclined 14ᵛ into coaction with the forward end of the fully retracted block E, (Fig. 68), whereupon the constantly-exerted forward pull of the retracted slide C upon the block E, (due to the operating spring 4ᵈ), serves to instantly depress the controller N and thus allow the said operating-slide C and connected parts to return from their loading position in Fig. 9, to their firing position in Fig. 3. The controller N is shown in the fully depressed position in Figs. 4 and 9 by solid lines, while the slide-locking portion thereof is shown in Fig. 9 by dotted lines in the upward position which is also shown by solid lines in Fig. 3. In this upper position, the grip-safety G will, of course, if left free so to do, engage the face 14ᶜ of the controller N and thereby positively lock the breech-bolt in its fully retracted position, which is desirable when replenishing the magazine, or changing one magazine for another.

In practice, it is deemed to be desirable that the rearward face 14ˢ of the member N, shall have such a construction as to make the upward thrust upon the member N, by the spring 14ⁿ sufficient for reliably holding the breech-block and slide retracted (as indicated in Figs. 9 and 9ᵃ) notwithstanding the safety-member G may for the moment be held in the forward, and non-effective position, as shown by solid lines in said Fig. 9. Here it will be noted, that the hammer H is shown in Fig. 9 retracted to a substantial amount beyond the sear-engaging position shown in Fig. 3. If, now, the magazine having been supplied, the trigger is pulled, the member N is drawn downward and releases the bolt E and slide C, but the hammer cannot immediately go forward, because held down by the slide surface at e,—as in Fig. 9. But the depression of the member N has, in the meantime, carried the trigger free of the sear, similarly as in Fig. 18, but with the hammer in the position shown by dotted lines H′ in Fig. 4; this allows the sear to instantly reëngage the hammer cock-notch 8ʲ, so that on the slide C reaching its forward position (Fig. 3) the arm will be loaded and cocked ready for firing.

The peculiar manner of organizing the mechanism as herein described is of importance in another respect. It sometimes happens that while the user grasps the firearm in the hand,—thereby, of course, pressing forward the grip-safety G,—it is desired to throw out an unfired cartridge then in the barrel. In such an instance, the user may (regardless of whether the hammer is in cocked position) seize the slide C and forcibly draw it back the full stroke, thereby extracting and ejecting the unfired cartridge. Then by allowing the slide C to go forward, the arm will be reloaded. But during these operations, the user may inadvertently or otherwise have held the trigger pulled back, (Figs. 66–68), so that except for the described reëngagement of the sear with the hammer (this occurring during the early part of the forward movement of the operating-slide), the hammer might escape being caught by the sear, and might then follow forwardly with the slide so rapidly as to accidentally operate the firing-pin to the extent of driving the point thereof against the primer of the cartridge. Should the user, however, desire to thus discard an unfired cartridge, he has only to draw back the slide C as above explained, and then allow it to move forward slowly to the point where the hammer extends somewhat back of the face (roll) 3ᶜ, (this hammer position corresponding to any position between the one shown in Fig. 15 and the one shown in Fig. 18), when by pulling the trigger to retract the sear, the hammer will follow easily forward with the slowly moving slide, and thus remain uncocked although the arm is loaded. When thus situated, the hammer (while substantially without momentum) is pushed forward by the firing-spring 8ᵉ and is opposed by the spring 15ᵃ acting through the stem P of the firing-pin, with the result that the hammer when thus at rest assumes about the position shown by the dotted lines at H′, in Fig. 4, while the firing-pin P is in the position shown in Fig. 3.

From the foregoing description, it will now be understood that the term "breech action" refers herein to that portion of the firearm mechanism which (in a breech loader) is retractable rearwardly of, or relatively to, the barrel, this movement being for the purpose of first extracting the shell of a spent cartridge from the barrel and afterward inserting, or loading, a fresh cartridge in place thereof. Usually the element or part herein designated as "the breech action" will involve or include some suitable means for effecting the forward or return stroke of this action from a retracted position thereof. While the power-spring 4ᵈ constitutes one preferable means for such purpose, other suitable and well-known springs, devices or actuation-means may be employed in lieu thereof, but in and for some of the combinations and functions herein set forth or defined, the presence or absence of such a device, or the use of a particular kind or arrangement of the breech action-forwarding means, is regarded as being immaterial.

The term "fire-control action" refers to the mechanism which is assembled within the handle portion of the frame of the firearm, and by which the firing is effected and regulated. In the present instance, this action includes a firing-train and a controller-train together with supplemental devices of which a principal one consists of a grip-operable safety-member. In the present instance, also, this action comprises a firing-train consisting of members constituting a "firing-pair," and other features which are hereinafter more fully explained in detail.

By the term "firing-device" I refer to such suitable means or devices,—including the preferred form of firing-pin, as P, herein illustrated and any suitable equivalent therefor, of either integral or composite construction,—as may be adapted for receiving the blow of a firing-train hammer, (as for instance at $15^d$, Fig. 4), and then transmitting the force of such blow to the cartridge through some suitable point,—as $15^c$ or the like,—properly located with relation to the forward end of the breech-bolt member, as E, of the breeching mechanism, when this is in firing position,—see Fig. 3; and it will be evident that as regards many of the combinations residing in my improved firearm mechanism, and otherwise than as here explained, the particular construction and arrangement of the firing-device, or firing-pin member, is neither important nor essential.

By the term "firing position" as herein sometimes used with reference to a single member or to parts thereof, or with reference to some plurality thereof, I refer to the position or positions which such member or members,—or such part or parts,—normally occupy in the mechanism or relatively to a coacting member or part, at a time when the firearm-mechanism as a whole is in a proper condition for the user to fire a cartridge by pulling the trigger.

The part or element of combination herein sometimes designated as a "firing train" may be considered as ordinarily comprising the hammer or other firing-member and a sear-device therefor, it being understood that these members are provided with suitable operating means which may,—as in usual practice,—include a sear-actuating spring and a properly connected firing-spring for the firing-member, together with a trigger or like device for retracting the sear-member or device to release the firing-member or train from its firing position.

The "sear-controller" mechanism may also be designated as a "sear-and-controller mechanism," since this combined, or composite, element of some of the combinations herein set forth, comprises some device or element having the function of a sear, and also some device or element having the function of a "controller" such as herein set forth. This sear-and-controller mechanism is herein shown as having two locking-faces, as for instance the faces $17^b$ and $14^d$, in Fig. 15, one being arranged for engaging the cock-notch of a firing member, and the other for engaging a lock-face of the breech action, while both are arranged for simultaneous retraction in one of their modes of operation.

By the term "loading-stroke" as herein used with reference to the breech action or to a member thereof, or used in defining a subject-matter involving such a member, I refer to the relatively long rearward and forward movement whereby the shell of one cartridge will be withdrawn from, and a fresh cartridge be inserted into, the barrel; and this stroke whether more or less than a cartridge-length, I designate as the loading-stroke, and also as a loading-stroke in suitable correspondence with a cartridge-length. In some instances, especially when the breech action shall be arranged only for being operated manually, the loading-stroke may be of a length somewhat or considerably less than the length of such a cartridge as is suitable for use in the firearm, since the cartridges may then be inserted by hand, one at a time, and in a well-known manner, forwardly of the retracted breech-bolt. In magazine breechloading firearms, however, and especially when such arms are also autoloading, the loading-stroke of the breech action as a whole and also of the breech-bolt member thereof, should usually be of a length somewhat in excess of a cartridge-length, and I have therefore adopted this latter arrangement in the accompanying drawings, in which my present improvements are shown arranged for use in a breechloading firearm which is not only magazined, but is also auto-loading.

For convenience and to simplify description and definitions, I have herein employed such terms as shiftable, and shiftably-supported,—as used with relation to certain features of the trigger and the operation and coactions thereof,—as applying to a movement of or including the sear-engaging end, as $6^c$, and to define trigger-movements other than the usual pull-stroke by which the arm is fired. Thus, in the present instance, the trigger-end $6^c$ is shown arranged for a shiftable movement in a direction downwardly from its position in Figs. 3 and 56 (where the sear-catch $17^b$ has been disengaged from the hammer cock-notch $8^j$), for thereby shifting the trigger out of its sear-engaging position, this movement being accomplished by a corresponding movement of a suitable trigger-shifter, which, in the preferred form thereof consists, or may consist, of the lower portion, as 14$^k$, of the member N,—see Figs. 4, 9 and 59. The operation here described also, of course, shifts the face 6$^n$ of the trigger-end 6$^c$, out of the path of movement of trigger-engaging face 17$^d$ of the sear-arm 17$^e$,—see and compare Figs. 4 and 9; also, Figs. 15 to 20, inclusive. The path of the trigger part 6$^c$ will normally be such as indicated (on an enlarged scale) in the diagram Fig. 19, but should the trigger be pulled and then instantly released, the path of movement may be such as indicated in Fig. 20. Any given point on the part 6$^c$, will successively come to positions in a path or cycle of movement, as indicated in these diagrams by the dots, while arrow heads show the course of the movements.

By the term "four-motion trigger" as used herein with relation to certain combinations, I refer to a sear-actuating trigger of any suitable construction and arrangement which has the sear-engaging end thereof arranged in the mechanism for having imparted thereto movements rearwardly and forwardly and also downwardly and upwardly, relatively to another part of the firearm, as for instance, relatively to the frame. The trigger F, (see Figs. 15 to 18), is regarded as one suitable and desirable form for a trigger having the described four-motion arrangement, and is illustrated as having the sear-engaging end 6$^c$ thereof located and arranged for having imparted thereto, movements in the four ways as set forth. When said trigger-end (Fig. 3), it may then have a rearward movement, or "pull-stroke," and so be advanced to the position shown in Fig. 15, and may then or previously have a downward movement to positions, for instance, as shown in Figs. 16, 17, 18; from any such position, it may, of course, have an opposite or return movement. Thus the said trigger-end 6$^c$ may have working movements in two transverse directions, and have two movements in each said direction, with the result that a given point on the trigger may have a path of movement in two ways or paths, of which one is according to the diagram Fig. 19, and the other of which is of a circuit form as indicated in the diagram Fig. 20.

Since the safety-member G must be pressed forwardly for permitting the retraction of the locking-member, N, and since this member, or controller, has to be retracted before the firing train can make its firing stroke, therefore when the safety-member G is observed to be in the outer, or rearward, (spring-actuated) position,—(as in Figs. 1, 3, 48) the user is thereby assured,— by that position of the member G acting as an indicator,—that the mechanism of the firearm is in a condition for making the firing stroke. This self-indicating feature of the mechanism is of practical importance, and is secured, as will now be evident, through certain of the interlocking features as between the several members of the mechanism, and by the aid of locking and movement-resistant means having relation to the breech action and to some of the members of the fire control action.

The grip-stroke of the safety-member, G, (which is from the position in Fig. 3 to the position in Fig. 4), disengages the face 7$^f$ thereof from under the face 14$^c$ of the controller member N, and thus permits the member N to be retracted for bringing the other face 14$^t$ thereof into locking-engagement with the safety-member face 7$^j$, and thereby hold the safety-member locked in its ineffective position (as regards the locking of the breech action) during the firing-stroke of the firing-train, (see Figs. 4, 50). By thus locking the safety-member in said forward position, the firing-member-actuating spring 8$^e$ and connection 8$^b$ is also held in the position of maximum efficiency, relatively to the hammer H,—this being indicated in the diagram Fig. 50,—and this position is thereby maintained during the entire firing stroke, and also during the following retraction stroke of the breech action whereby the firing-train is reset in firing-position. Thus the member G,—which is preferably pivotally supported at or near the lower end thereof,—may be defined as a member having combined in one device, a breech action-locking member and a safety-member; and this combined member is preferably so arranged that the actuation-modifier,—or force modifying means,—for the firing-train-actuating means, operates to increase the actuation-force as applied to the firing-member, simultaneously with the releasing,—or unlocking,—of the breech action, and also in advance of a complete unlocking of said breech action.

The safety-member G constitutes a locking-member-blocking device which is arranged for a working-stroke in one direction,—(rearwardly when arranged, for instance, as illustrated in Fig. 4), into a blocking-engagement with the locking-member N, for blocking the retractive stroke of this locking-member, (Fig. 3), and thereby positively hold the breech action in forward position, so that when the said safety-member is thus positioned, a premature explosion of a cartridge in the barrel will be prevented from operating the main carrier C, and thereby also will prevent the auto-loading operation which might otherwise then take place. Said safety-member is also arranged for being grip-operable, but in a direction opposite to said working-stroke for unblocking the locking-member N, (Fig. 4), and thereby permit the breech action during the retractive loading-stroke thereof, to retract the locking-member, (as elsewhere explained in connection with Fig. 60ª), and so withdraw the movement-resisting means from the firing-member-resisting position thereof, (Fig. 18) and also to shift the trigger to its ineffective position,—as in Fig. 16. Thus by the operation of some suitably-arranged and grip-operable safety-member, as G, the function, or mode of action, of the locking-member, N, relatively to the breech action, and relatively to the lock-face 33ᵈ thereof, is changed from a positive locking effect to a detentive locking effect, and vice versa.

One feature of the fire-control action relates to the position and arrangement, in the controller train thereof, of the safety-stop-engaging face 14ᶜ and the firing-member-resisting face 14ᵉ, relatively to each other and to the coacting parts of the mechanism. The said safety-stop-engaging face is arranged for facing in the direction of the retractive stroke of the controller-member N, while the other said face, as 14ᵉ, (Fig. 21), is arranged for facing in an opposite direction, so that, when said two faces are arranged on one member,—as in Fig. 21,—that part of the member N which extends from one said face to the other, becomes a blocking member coacting directly with (and as between) the grip-safety member, as G, and the movement-transmitter or lever-device which more directly opposes the forward stroke of the firing-member when the controller-member is in its forward-stroke position; this position is, of course, also the breech action-engaging position when the member N has the lock-end portion 14ª, (see Fig. 21) arranged for engaging and releasing the breech action, or a member thereof, when this action is in its forward position,—see Figs. 3 and 4. In this arrangement, therefore, the resistance face 14ᵉ also constitutes an actuator device which on the forward or upward stroke of the member N, actuates the movement-transmitter toward the firing-member, as H, and into position for opposing the firing-stroke of such firing-member. Thus the face 14ᵉ may be considered as being a combined resistant-face and actuator-face.

The fire-control action,—in the preferred form and arrangement thereof,—may be regarded as comprising, as the chief component devices thereof, four members arranged in two inter-coacting trains, a firing-train and a controller-train. Each of these principal trains or pairs comprises a coacting pair of principal members, and each of these pairs consists of or includes a primary member and a secondary member. Supplementing and coacting with these members, suitable spring-actuation means are herein illustrated, one such means (including a spring, as 14ⁿ) being reciprocally-reactional as between and for actuating the primary member, N, of the controller-pair or train, and the secondary member, S, of the firing-pair or train, while another such means (in this instance including a firing-spring, as 8ᵉ) is arranged reciprocally-reactional as between and for actuating the primary-member, H, of the firing-pair and the secondary member, G, of the controller-pair.

The firing-train may therefore be regarded as comprising two principal members which, taken together, constitute the "firing-pair", viz. the primary or firing-member, as H, and the secondary or sear member thereof, as S. This firing-pair may be regarded as being supplemental and equipped with coacting and accessory devices; for instance, the trigger, F, is in some respects a device supplemental to the sear member, while spring-actuation means comprising the firing-spring, as 8ᵉ, may be regarded as an accessory device that is supplemental to the firing-member.

Similarly, the controller-train may be regarded as comprising two principal members which, taken together, constitute a "controller-pair", viz. the primary or controller-member, as N, and the secondary or grip-operable safety-member, as G, arranged for a reciprocally-interlocking coaction with such a controller-member. And these controller-pair members are, or may be, supplemented or equipped with suitable accessory means and devices,—preferably as elsewhere herein more fully explained,—as may be convenient for securing the desired functions and results in the various combinations, respectively, in which such pair or a member thereof, is comprised.

Considering the firing-train as comprising the firing-member, sear and trigger, one object of the invention is to furnish an improved safety-stop arrangement whereby the firing-member may be effectively blocked against forward movement without any direct coaction between the safety-member and the trigger. This arrangement has the advantage of avoiding any interference with the operative and direct relations of the trigger-face and a coacting sear-arm-face by the shifting of the safety-member, as G, from the blocking-position (Fig. 3) to the releasing, or unblocking position (Fig. 4), or vice versa. Thus I overcome an objection incident to a former practice of directly blocking the trigger by a grip-operable member, and enable the user to know by the resistance of the trigger that the firing-member itself is actually blocked against making its firing-stroke. To facilitate this action, the several parts may be so fitted as to give the trigger a slight amount of play even when the firing-member is thus blocked.

Thus, instead of directly blocking the trigger, I utilize that slight initial movement as a means whereby the user may know, by the "feel" of the arm, that the mechanism beyond the trigger is blocked against operation in any undue manner.

Within and for the purposes of the fire-control action, the controller-member (as N or the like, and whatever may be the specific form and arrangement thereof) may be said to constitute a means or device which is coöperative with the breech action for the purpose of placing the firing-member-resisting means or device in proper working position and at the precise moment required. Thus certain portions of the member N, and the coacting parts of the main carrier or slide C, constitute a placing-and-timing means, (comprised in part in the breech action, and in part in the fire-control action), which consists of transversely-disposed actuating devices, (each supported for reciprocatory movements and preferably slidably-supported), whereby to place the firing-member-resisting device in position for operation in the manner set forth. By properly locating and arranging this lock-face 33$^d$ and the locking face 14$^d$ relatively to the lines of movement of the members C and N,—about as indicated for instance, in the Fig. 3,—the carrier C may be positively locked in its forward and firing position by the member G, so that the mechanism will not be actuated as above described by a premature explosion of a cartridge. When the mechanism is thus arranged and operating, it will be necessary, of course, after any such premature explosion as described, for the user to draw back the carrier C by hand, after which the mechanism will be operable again in the automatic manner already explained.

In the preferred construction and arrangement of the lock-face 33$^d$ and the locking-face 14$^d$ as above explained, the locking effect as applied to the breech action may readily be made sufficient for resisting all ordinary usage and requirements, while capable of being overcome by a premature explosion. The locking in place of the breech action, therefore, may be said to be of a positive character as regards ordinary and normal requirements and conditions, and to be of a limited and detentive character as regards the described exceptional but important requirement. In this instance, however, the initial retractive movement of the breech action also operates to retract the locking-member, N, and withdraw the movement-resisting means from the firing-member-resisting position thereof. The member N then bears upwardly against the guide-surface $e$,—(Fig. 60) and finally enters the release space forward of the block E and forward of said guide-surface, (see Figs. 9, 55, 68), thereby restoring said resisting-means into the firing-member-resisting position thereof, as in Figs. 3, 9, 55.

One feature of the lock-actuating means relates to the arrangement thereof whereby such means is made effective not only for retracting this lock by means or devices appurtenant to and operable with the hammer, but also may be made effective for resisting or obstructing the firing-stroke or forward movement of the hammer itself, whenever, for any reason, the said retraction of the said lock shall be prematurely or otherwise restricted or stopped short of a complete withdrawal out of the carrier or slide engaging position thereof. Thus, in the preferred form thereof the movement-transmitter (whether in the form of a lever-device or otherwise), which is operatively intermediate to, and therefore coöperative with,—and as between,—the lock and the actuator-device that is appurtenant to the hammer, is a combined lock-actuating means or connection and hammer-stroke resistant.

By arranging in suitable relative position the slide-lock actuator-device which is apurtenant to the hammer, and the movement-transmitter which is operatively-intermediate to and coöperative with such actuator-device and the lock, the retraction of the slide-lock from, or out of, the path of movement (Fig. 59$^a$) of said stop-face 33$^d$ of the carrier or main-slide, will only be completed at a time when the hammer (as in Fig. 16) has nearly reached the firing-pin, and the end of its firing-stroke; by this means, the movements of the main operating member, as C, may be kept under a restriction and safe-guarded by said locking-member until the latest possible moment before the hammer operates the firing-pin. When the locker-actuating means comprises a cam-device located on the hammer, the desired result may be obtained by so locating the cam-face, 8$^k$, relatively to other portions of the hammer, as to operate the described movement-transmitter or lever-device, during a later portion of the firing-stroke of the hammer, as for instance, from the position in Fig. 16 to the position in Fig. 59. Thus, it will be noted, the sear-member S is shown comprising parts and faces so arranged and connected as to constitute a combined controller-actuating means and hammer-stroke resistant, this latter term referring, of course, to the blocking of, or resistance to, the forward or firing-stroke of the hammer.

A further feature of the coacting breech action and fire-control action relates to the locking in forward position and in a positive manner, of the breech action by the controller, when this member is blocked by the safety-member, as G, (Fig. 3), while at the same time, the mechanism is arranged for affording only an initial or temporary resistance to the retraction of the breech action in the case of a premature explosion occurring when the firing member is in firing position, and affording no such resistance to the breech action when a cartridge is fired in the usual and normal manner. When the controller N is blocked as described against retraction, (Figs. 3, 48, 53), the resistance exerted rearwardly thereon by the slide C,—through the face $14^d$, thereof,—will be transmitted to and sustained in large part by the frame-face $b^3$, and in some part by the face $7^f$ of the safety-member G, through which this part of the force of such resistance will be transmitted to the journal-pin $g$, and thence to the frame.

While the grip-safety member G, only coacts as a locking-device by direct engagement with one other member,—and with a member which is not a part of the firing-train,—nevertheless the grip-safety member (in the form thereof herein illustrated) coacts in some indirect way with each of the principal members which are comprised in the firing-train, or which are directly associated therewith. Said safety-member, for instance, does not coact thus directly with the trigger F, which, therefore, is at all times, left free of any restriction or interference due to such a direct contact or engagement. But said safety-member by its function of blocking the controller N in the position shown in Fig. 4, indirectly acts through said controller and thence through the lever-arm portion $S^{10}$, of the sear-member S for holding the trigger-engaging arm $s^8$ in the forward position thereof, (see Figs. 3, 56, 64, 68) so that the trigger itself is prevented from being operated through its pull-stroke by reason of the said blocking of the sear-member against having any working movement. In a similar manner, the action of the safety-member when in its released or "safety-position," extends through the member N,—or through some portion thereof,—to each of the several firing-train members; and also extends to the main carrier C, to the breech-block E, and to the extractor $5^a$.

As will be understood from Figs. 4, 50, as elsewhere herein more fully described, the controller member N when provided with the carrier-engaging upper end-portion $14^a$, not only serves to lock the grip-safety G in its forward position during the firing-stroke of the hammer, but also during the rearward stroke of the main carrier C, as also indicated in Fig. 9. For this purpose, among others,—see Fig. 60,—the upper end $14^a$ of the controller N bears against a lower guide-surface of the breech action and is thereby held downwardly notwithstanding that both the hammer and sear shall have been, in the meantime, reset in the positions shown in Fig. 56, where said member N is shown in its upward position. Thus the breech action during its long-stroke rearward movement immediately following the firing-stroke of the hammer, continues that locking of the member G which was previously and completely accomplished by the controller-actuating means appurtenant to the firing-train or to the hammer thereof. In this manner, and whether or not the user of the arm shall have released the grip-safety from the pressure of the hand, said safety device is continued in its locked and ineffective position until the complete cycle of operations has been performed and the reloading operation is finished; and thereby said safety-member, notwithstanding the considerable size and weight thereof, is prevented from having any movement in or relatively to the frame or to the operative or coacting members, during or because of either the primary or the secondary recoil.

Thus the safety-train may be said to comprise two coacting members, one of which is grip-operable, and constitutes a slide-lock member in position and arranged for locking and releasing the main-slide, and of which the second member is arranged for working movements in a direction transversely of the movements of the slide-lock member. Each of these safety-train members is herein shown provided with two stop-faces, and these four stop-faces are shown arranged in such a manner as to form two coacting pairs. Also, each one of these pairs of faces is in position and arranged to be rendered inoperative when the other pair of faces is rendered operative, so that on the working movement of the said second member of the safety-train in one direction, one of said pairs of stop-faces will be in position for locking said slide-lock into engagement with the main-slide, while on a reverse movement of said second member, the main-slide will be released from the locked position thereof, and at the same time said second member be locked in an ineffective position by the said first and slide-locking member. Thus said first and second members are reciprocally coactive, each being a locking-member for the other.

As already mentioned, in some instances the locking-end portion as $14^a$ (Figs. 21 and $21^a$) may be omitted from the member N, so that this member will not operate to lock the breech action either in forward or rearward position, but will continue as before to operate as a trigger-shifter, and as a firing-member-resisting device, and will directly coact with the safety-member G, for all purposes not involving the locking of a breech action member, including the purposes set forth in connection with Figs. 48, 49 and 50. When said locking-end $14^a$ is omitted, the operational features set forth in connection with, and illustrated in Figs. 56ª, 57ª and 59ª, also will be omitted, while the several operations taking place as between, and relatively to, the hammer H, sear S, member N and trigger F,—as these operations are elsewhere herein described,—will all be retained.

During the power-stroke,—from position Fig. 4 to position Fig. 5,—the face $14^d$ of the downwardly-retracted member N becomes located under the guide-surface $e$ of the breech action, so that prior to the time when the face $5^j$ (Fig. 5) of the breech-block E reaches the abutment face $2^f$, the controller N is for the time being held depressed by said guide-surface $e$, as in Fig. 60. Thus the breech action during the principal part of the retractive stroke thereof, positively holds the trigger-disconnection means in the position for rendering the trigger ineffective relatively to the sear (Fig. 16) and also holds the resistant face $14^e$ retracted to the non-effective position thereof (Figs. 4 and 16) relatively to the firing-member. These features also have relation to the means whereby to lock the safety-member in its forward position by the trigger-actuation of the slide-lock through the first stage of its retraction movement, and next to shift the hammer-resisting means to its non-effective position relatively to the safety-member by and during the firing stroke of the hammer and concurrently with the hammer-actuation of the slide-lock through a second stage of its said retraction-movement.

As regards the direct and coöperative relations of the main carrier C, the locker or controller N and the hammer H, certain parts of the sear-member S,—as already indicated,—may be considered as constituting or belonging to an actuator device or connection whereby the hammer operates as the source of power for the actuation of said member N in a direction away from the main carrier. But as regards the direct and coöperative, but essentially different relations of some suitable form of "grip-safety," as G, in connection with the controller N and the hammer H, there are certain parts of the sear-member S which (as elsewhere herein more fully explained) constitute a hammer-resistant means or firing-stroke-limiter, this being arranged for opposing the firing-stroke of the hammer by restricting such hammer-movement in accordance with a preceding stroke or retractive movement of the member N, and until this member, N, shall have been first released by a prior grip-movement of such grip-safety member into its "grip-position," (which is the "firing," or non-safety-position); in these operations, it will be noted, the carrier-locking function of the controller N is not directly involved.

The sear-and-controller spring-actuation means is shown so arranged that it actuates both the sear member and the controller member in the same relative working direction, and so actuates each said member at the same time, (see Figs. 64, 69). That is, the spring-actuation of the controller is in a direction toward the breech action-locking position thereof (Figs. 3, 9ª, 56, 64), and at the same time, the spring-actuation of the sear by the same means, is in a direction toward the firing-member-engaging position thereof, (Figs. 9 and 9ª, 64, 68); and such spring-actuation of the controller is by, or with a reaction against, the sear (and through the sear against the firing member, except when this resistance is temporarily against the trigger), while the spring-actuation of the sear is by or with a reaction against the controller.

One feature of my present improvements relates to a regulation of the action of the sear-spring $14^n$ relatively to the sear and in connection with the movement of the slide-lock face $14^d$ from or into engagement with the power-slide. As regards this object and feature, the firearm mechanism-members, considered as an organized system, may be said to comprise a series of groups of coacting members, including the following: A suitable power-slide, as C, carries a firing-pin, and is arranged in a coöperative relation to, and in combination therewith, a slide-lock (preferably of a reciprocatory character), having a slide-engaging face as $14^d$, movable transversely of the power-slide from and into engagement therewith; a hammer having a cock-notch and located for coacting with a sear and with the slide and the firing-pin; a sear,—preferably pivotally supported,—arranged to be coöperative with the hammer and also with the slide-lock; and a spring-device carried by, and coacting with, and between that pair of said mechanism-members which comprises the slide-lock and sear. This actuation-means or spring-device, in one preferred form and arrangement thereof is herein especially illustrated in Figs. 64 to 69, and in the form there shown, comprises a spring, as $14^n$, and also a spring-pressure transmitter, as $n$, located and arranged for increasing the spring-power upon the sear when the slide-lock is in locking engagement with the power-slide,—see Figs. 64, 68. At this time the sear is in full engagement with the cock-notch $8^j$ of the hammer H, and the said transmitter $n$, bears upon a sear face $17^c$ that is operative as a lever-arm; and the arrangement is such that the bearing point, (at $n^1$, Figs. 64, 69), will move toward a reduced lever length during the retraction of the slide-lock, as for instance from the point $n^1$, in Figs. 64, 69, to the point $n^2$, in Figs. 65, 69. By means of this, or of some analogous arrangement, the sear will be most forcibly held into engagement with the cocked hammer (Fig. 64) during the time the slide-lock, N, is in the uppermost, or slide-locking position thereof; and during the retraction of the member N, away from its position in Fig. 64, the spring-power applied by the spring $14^n$ to the sear S is gradually lessened.

In the preferred arrangement herein illustrated, (see Figs. 1 to 50), when the mechanism is operated by a premature explosion, (while the parts thereof are in firing position, Fig. 3, but with the grip-safety G pressed forward) the retractive movement of the breech action takes place with an excessive speed or power and is resisted, by the lock-face $33^d$ on the slide C; second, by the power-stroke-limiting face $5^j$ of the block E contacting with the abutment $2^f$ of the frame B, (Fig. 5), and, third, by the slide-face $33^f$ engaging forward of and under the block-face $5^k$, for lifting the block-end (Figs. 6, 8) out of engagement with the frame while the block and frame faces $5^j$ and $2^f$ are both under pressure. These resistances are, of course, in addition to that of the main-spring $8^e$, which normally operates in the same manner whether the breech action be driven rearwardly by a normal or by a premature firing of the cartridge. In the normal firing, however, the resistance of the slide-face $33^d$ against the controller-face $14^d$, is absent, but the resistance of the firing-train (from the position in Fig. 4 to the position in Fig. 3), is substituted therefor. Thus, for initially resisting the retractable breech action as operated by a premature explosion, a pair of faces,—as $14^d$ and $33^d$,—are provided, and a means is also provided for retracting one of these faces out of engagement with the other at the moment before the cartridge is fired in the normal manner.

A further feature of the foregoing arrangement relates to the said pairs of faces $33^d$, $14^d$, and $5^j$, $2^f$, respectively. The first said pair $33^d$, $14^d$, on the slide C and the controller N, respectively, operate in connection with the faces $14^h$ and $b^3$, on the controller N, and frame B, respectively, so that the line of resistance, in the case of the premature explosion described, is from the slide-face $33^d$, to the frame face $b^3$. The two faces $14^d$ are shown inclined, (see Figs. 15–18 and Figs. $56^a$–$60^a$) the slide face $14^d$, downwardly and forwardly, and the frame face $b^3$ downwardly and rearwardly, and with the included angle (as $t^{10}$, Fig. $59^a$) greater than the normal angle-of-repose, so that the pressures thereon,—due to such a premature explosion,—will normally retract, or force downwardly, the member N, which will thus, (after affording an initial resistance to the breech action as above set forth), allow the block and frame faces, $5^j$, $2^f$, to come into action. The latter pair of faces, however, are directly coöperative with the aforesaid slide and block faces $5^k$ and $33^f$, and these pairs are shown arranged in directions forming an angle, as $t^{12}$, Fig. 7, which is also greater than the normal angle-of-repose, and is located in an upward direction,—oppositely of the said angle $t^{10}$,—for effecting the upward movement of the rearward end of the block E relatively to the frame B.

From the drawings as above described, it will now be seen how the frame may be provided with two breech action-resisting faces, in position and arranged for an initial resistance (through the controller N) when the cartridge is fired prematurely, and with a face in position and arranged for a secondary resistance when the cartridge is fired prematurely (while the controller is not blocked by the member G) and for an initial abutment-resistance, (Fig. 5), when the cartridge is fired in a normal manner. The two said frame faces $2^f$ and $b^3$, are, or may be formed on an abutment-block, as $2^h$, which extends transversely of the frame, and connects (preferably in an integral manner) with the side-walls $2^z$, $2^{z\prime}$, (Figs. 13, 41, 42), and is located in position between the controller-space $2^b$ (Figs. 41, 42), and a firing-member space, or chamber $2^y$, located between said side-walls of the frame, and forward of the stroke-limiting stop or abutment $b^6$, (Figs. 4, 9), of the frame-end $b^5$. Thus the mechanism-chamber for the fire-control action, is divided in the upper part thereof, by said abutment-block $2^h$, to form the forward space, (as $2^b$, Fig. 42) through which the controller-train or a member thereof extends for coacting with the breech action; and, to form the rearward space or chamber, as $2^y$, through which the firing-train or a member thereof, extends for coacting with the same breech action.

In Figs. 9, $9^a$ and 55, the bolt-face $5^m$ is shown carried a considerable distance rearwardly of the wall $b^4$ of the magazine chamber, and the time required for the breech action to travel backwardly and then return through that extra or excess-stroke distance, provides a time-interval in which the usual magazine spring (not shown) can feed up a cartridge into position for being properly engaged and carried forward by the bolt E. The said extra-stroke distance also provides for carrying the retracted bolt-face, to a position rearwardly of the release-space, as in Fig. 9, so that the forward lower corner, as $e^2$, Fig. $9^a$, of the bolt E, is brought into position to serve as a detent or lock-notch for engaging the rearward face $14^e$ of the locking-member N, as indicated by the dotted-line position of N, in Fig. 9, and as shown in full lines in Fig. $9^a$. In order, however, to practically secure those advantages, I locate the member N,—preferably in a slidably supported manner,—close to the rearward side of the magazine-chamber, leaving only a thin wall, as $b^4$, between; also, I locate said member N forwardly of the firing-member H, and arrange the sear, as S, and suitable movement-resisting means, operatively-intermediate the members N and H.

When the breech action is retracted from the forward position (Fig. 3), while the trigger is forward and operable but is not given a pull-stroke,—as when the slide C is drawn back by hand or is driven back by a premature explosion,—the retractive or rearward movement, operating through the forwardly located-face $33^d$, (considering this as an actuator-face) first retracts the member N (considering this as the disconnector) and thus effects the trigger-and-sear disconnection; and next, in succession operating through the rearwardly-located face $3^c$, (in this instance shown as a roller-face), retracts the firing-member, H, and thereby withdraws the controller-retracting actuator, as $8^k$,—which is appurtenant to said firing-member H, (or is fixed thereon, as the case may be),—into the ineffective position thereof relatively to the disconnector, (Figs. 60, 67), and thereby permits the controller-member and such trigger disconnection means as may be appurtenant thereto, to be restored to their former and effective position (as in Fig. 9) whenever the breech action shall be in proper position therefor and the firing-member itself shall remain in a sufficiently retracted position or in the firing-position. Thus the said breech action faces $33^d$, $3^c$, operate in succession, under the conditions set forth, for successively effecting the trigger-disconnection and the retraction of a controller-retracting actuator which is an appurtenant of the firing-train, or of one of the members of such train.

In the complete cycle of movements and at one stage thereof, the normal operation of the several members brings or places the described movement-resisting means, (and does this by a spring actuated forward stroke,) into position for opposing a premature forward stroke of the firing-train,— (or of the firing-member thereof, as hammer H), simultaneously with the advancing of the depressed breech-bolt to firing-position (Figs. 3 and 4); and this is also done simultaneously with the advancing of the firing-pin to an effective position relatively to the bolt-face $5^m$ and relatively to a cartridge (as X, Fig. 25), located against said bolt-face. This placing-movement, for bringing the said resistant-face into position for opposing the forward or firing-stroke of the firing-member, is accomplished, of course, by the same forward stroke which brings the controller-member, as N, into position for locking-engagement with the main operating member, as C, of the breech action, as from the position in Fig. 4 to the position in Fig. 3. This operation being performed while the firing-member is in firing position, the mechanism as a whole will then be in position for being fired in the usual way by a pull-stroke of the trigger, and will also be prepared for being operated,—in a special manner as elsewhere herein more explained,—by a premature explosion of the cartridge, should this accident occur; in this case, of course the trigger-disconnection will be effected at the same time. When the slide C is locked back (Fig. 9) and the trigger is pulled, said slide will go forward, and if the trigger is not then instantly released before the slide completes its forward stroke the trigger will rest under the lever-arm $M^e$, (Fig. 68), of the sear-member, and thus prevent an automatic action of the firearm. If, now, the trigger be released, the parts assume their safety position in Fig. 3, and the firearm is ready for being fired by first pressing forward the safety-member G, and then pulling the trigger.

One purpose accomplished by the depending firing-pin bearing $3^s$ is to provide a spring-seat at $3^{x\prime}$ on the main-slide C for the firing-pin retracting spring $15^a$, whereby this pin, P, is normally held retracted, (see Figs. 5 and 9),—for keeping the end $15^d$ projected rearwardly into position for being struck and actuated by the hammer, as in Fig. 4. Said spring-seat $3^{x\prime}$ thus serves as the reaction-face on the main-slide, and thereby supports the spring $15^a$ in a position for acting forwardly against the oppositely-arranged spring-seat $5^v$, (Fig. 5) on the breech-block E, whereby this block will be itself moved forwardly within and relatively to the main-slide C, when permitted by the depression of the breech-block, on the returning breech action nearing the forward limit of its loading stroke. Thus the spring $15^a$ is a combined block-actuator and firing-pin retractor, and coöperates with the means for lifting and depressing the block-end from and to the respective positions thereof indicated in Figs. 6 and 8; and in these operations, said spring bears against a forward portion of the breech-block which has no material amount of upward or downward movement.

A further and important improvement is comprised in the breech action. The spring $15^a$, (see Fig. 5), may be considered as primarily a firing-pin retractor, but this spring also constitutes one form of a means for normally holding the breech-block forwardly with relation to the power-slide; this position is shown in Fig. 9. Thus during the long stroke of said slide C, from position Fig. 3 to position Fig. 9, the spring 15ᵃ tends to hold the breech-bolt forwardly, (toward the left-hand in Figs. 3, 4, 5, 9), and so hold the face 5ᵏ, in engagement with the inclined face 33ᶠ, and thereby hold the rearward and operating end of said bolt E upwardly from the slideway surfaces of the frame B. The spring 15ᵃ operates, therefore, after the manner of a safety-device for reducing or overcoming a frictional resistance which might otherwise occur as between the member E and the frame during the forward stroke of the slide C. Also, this peculiar feature and mode of co-action of said spring 15ᵃ, is such that the cartridge while being pushed forwardly out of the magazine, is normally driven forward by the member E backed up by a spring-pressure, and not by a solid or direct support against the main-slide itself, and thus the forces applied to the cartridge from the main-slide, are cushioned and modified by the said intervening spring operating as a buffer device. And this cushioned or yieldable cartridge-actuation is thus obtained without impairing the operation of driving forward the cartridge to the firing-position, and without preventing the locking of the cartridge into the barrel chamber by the grip-safety G acting through the breech action.

Because of the importance of the function of the principal member, N, of the controller-train, as a locker for the breech action, and also for convenience of description, that movement of said member which carries the locking-face 14ᵈ into position (Figs. 3, 15, 56), for coacting with the lock-face 33ᵈ of the breech action, I designate as the upward or forward, or the advancing movement, or stroke, while the movement of said member N in the reverse or opposite direction, I designate as the withdrawal or retractive movement or stroke. These strokes, or movements, of the member N, are also shown as being in a direction which is transverse to the line or path of movement of the main-member (herein shown consisting of the slide C) of the breech action, and which is or may be located at about right-angles thereto. Thus the direction of movement of the locking-face 14ᵈ is represented as being substantially "normal,"—relatively vertical to,—the path of movement of the lock-face 33ᵈ. In practice, however, this transverse and normal or vertical relation of the said directions of movement may include some deviation from a right-angle, such, for instance, as illustrated in Figs. 3 and 9, and in Figs. 15 to 18, where the member N is shown located with some inclination to an exact right-angle position; this illustrated position, however, is regarded as being within the meaning of the terms transverse, normal to, and vertical to, as herein applied and explained. Similarly, the magazine may be said to be transverse to the path of the breech-bolt E; and the fire-control action may be described as being located vertically with relation to the breech action and to the line or path of movement thereof. And in some instances, if preferred, the magazine may be located at an exact right-angle relatively to the slide C, and in such cases (not herein shown) the fire-control action may be similarly arranged; but for reasons elsewhere herein mentioned, a slight or moderate inclination of both the magazine and the fire-control action,—including the said controller-member thereof,—is regarded as being the more desirable arrangement.

The inclination of the member N,—or of the path of movement thereof,—downwardly and rearwardly from the slidably-supported main-carrier, C, of the breech action, has a further object and advantage which is especially indicated in the diagram views, Figs. 56ᵃ, 57ᵃ, 59ᵃ. When in the firing-position, Figs. 56, 56ᵃ, the locking-face 14ᵈ of member N normally stands close to and will usually bear against the coacting lock-face 33ᵈ of the member C, and consequently (this being the firing-position, as in Fig. 3), should the cartridge now be fired, (in some premature way and while the fire-control action remains in said firing-position), the full effect of the exploding cartridge upon the slide C will be delivered at once through the lock-face 33ᵈ to the member N through the said locking-face 14ᵈ of this controller-member. Therefore it is deemed to be important that the firearm mechanism shall as a whole operate in an approximately normal manner, and without serious risk of injury to itself, even when a cartridge shall be thus prematurely exploded in the barrel, as can sometimes happen if a defective cartridge,—especially one having a projecting primer,—should be jammed by the breech-bolt just at or before the completion of the loading-stroke thereof. But, as is well-known, such an excessive pressure applied transversely to a slidably-supported coacting member also transversely-located, (this being the arrangement herein shown of the members C and N), and so applied through coacting faces in sliding engagement,—as are the said faces 33ᵈ and 14ᵈ,—normally produces an intense frictional resistance which, in practice, tends to become an adhesion, thereby instantly and largely increasing the usual angle-of-repose, arresting or reducing the proper sliding movements and rapidly destroying the working surfaces, and so make the mechanism relatively or actually inoperative. For the purpose, among others of providing against those results, I have shown how to arrange the mechanism so as to locate the member N in an inclined position, and to reduce and relieve the stresses and adhesive resistance which otherwise might occur, while still providing for the substantial and needful amount of resistance to the slide C when this is accidentally operated in the abnormal manner here described.

In the diagram Fig. 60ª, the line of movement of the carrier C is indicated by the dotted line 21ª, and a reference line 21ᵇ is drawn at a right-angle thereto. The inclination of the member N, or rather of its line of movement, is indicated by the dotted line 21ᶜ, which crosses the reference line 21ª at the upper edge, 21ᶠ, of the locking-face 14ᵈ, and makes an angle 21ᵉ, relatively to said reference lines. This angle should in practice, and preferably, be somewhat greater than the normal angle-of-repose of the coacting members when operating under normal working conditions. If, now, the member N be retracted, as to position Fig. 59ª, said point 21ᶠ will move down the inclined line 21ᶜ to a lower position 14ᵈ′ and at the time will move along (to the right-hand, in this diagram) and away from the reference-line 21ᵇ by the distance 21ᵍ. If however, the said point 21ᶠ had moved down the reference line 21ᵇ (as would be the case were the member N slidable in a direction parallel to said reference line) then the rearward travel of the carrier C would be indicated by the distance 21ʰ, corresponding to the inclination of said lock-face. But with the inclined arrangement, as in this diagram Fig. 60ª, there is a combination of two travel-increments, or intervals, one through the distance 21ᵍ, due to the said inclined position of the carrier face 14ᵈ; the other increment being due to the said inclined direction of movement of the said coacting face 14ᵈ of the member N. These two distances 21ʰ and 21ᵍ make up the longer resisted-stroke 21ⁱ during which the carrier C is powerfully opposed, without being positively blocked in its rearward movement, under the abnormal operating conditions above set forth. By thus increasing the duration of the otherwise short period of locking-face resistance, the destructiveness of the abnormally great forces, at the time described, may be materially reduced.

In the normal operation of the firearm, the breech action during the rearward-stroke thereof does not of itself, nor directly or indirectly, actuate the member N in any manner nor for any purpose. Also, it will be evident that the normal actuation of said member N, (including its function as breech action locker and releaser, and also its function as a trigger-shifter means,— when it is provided or arranged for this purpose), is effected not from the carrier C, nor by or during the movement thereof, but is normally effected independently thereof. When, however, the mechanism while in firing-position, (and before the firing-stroke of the hammer is begun), as in Fig. 3, is subjected to the premature explosion of a cartridge, as already explained, then the premature rearward movement of the breech action resulting from such abnormal operation can shift the member N, and thereby also shift the trigger to its fully-shifted position, Fig. 60, while leaving the working parts free to resume their firing-position, (Fig. 56), on the return of the breech action to its forward and firing-position, Fig. 3.

Thus in the normal operation of the fire-arm, the rearward stroke of the breech action resets the hammer (see Figs. 59, 60, 56) and re-compresses the firing-spring 8ᵉ which thereby absorbs power from and thus aids in stopping the rearwardly-moving carrier C. In the above described premature or abnormal operation this firing-spring resistance is lost, and the resistance of the spring-resisted member N, is substituted therefor. Thus the fire-control action comprises two spring-resisted members each of which is operative as a resistant to the rearward movement of the breech action, but which can only so operate one at a time, and cannot so operate both at once in any instance.

From the foregoing explanations, it will now be seen that when the breech action is moved rearwardly,—as by a premature explosion,—while the firing-train remains in firing-position, the carrier lock-face 33ᵈ operates the trigger-disconnection means for discontinuing the operative relation as between the trigger-face 6ⁿ and the sear-arm face 17ᵈ, and that this trigger actuation, or disconnection, takes place without the pull-stroke of the trigger having been made; and that when the trigger is first pulled and thereby releases the firing-member or hammer of the firing-train, then this firing-train (acting through some suitable trigger-disconnection device or means substantially such as described), operates to effect the said trigger-disconnection in advance of any rearward movement of the breech action or of the said main-carrier member thereof.

Owing to the rapidity with which the mechanism normally goes through the cycle of operations following the pull-stroke of the trigger, and the consequent high velocity with which the several members perform their respective working strokes, each of these members acquires a considerable momentum. This is especially the case with the main carrier C, during both the rearward and the forward strokes thereof. The firing-pin P, by reason of that rapid movement and the sudden stopping of said carrier C at the end of its forward stroke,—in position Fig. 3,—will be normally thrown forwardly with a considerable force unless prevented in some effective way. For overcoming that danger the block-advancing spring 15$^a$ is utilized for the additional purpose of resisting any such premature forward movement of the firing-pin; this may be accomplished,—as herein illustrated,— by providing the stem of the firing-pin P with a collar, 15$^b$, located in a position for resting against the carrier-face 3$^{x\prime}$ when the firing-pin is in retracted position, (Figs. 3 and 5), and by making said spring 15$^a$ of sufficient and ample power to resist any material forward movement of the firing-pin relatively to the carrier C when this is suddenly arrested in its forward movement.

In practice, a spring having the strength which is required for properly operating the block E relatively to the carrier C, is found to be ample for also affording a sufficient resistance to prevent the firing-pin from having any material amount of forward movement due to its own momentum when the breech action, is suddenly stopped at the end of its forward stroke, in firing-position. Thus the spring 15$^a$ is a combined block-operating spring and firing-pin resistant, the force of which has to be overcome by the hammer in order to fire the cartridge. Also, when the block E has been advanced to firing-position (Fig. 3) and while the carrier C is still moving forwardly (as from position Fig. 6 to position Fig. 3 for thereby locating the depression faces 5$^d$, 3$^b$, in firing-position) the said spring 15$^a$ normally acts as a buffer-spring, as against the final increment of carrier-movement and as against the action of the main-spring 8$^e$, and thereby materially reduces the shock which might otherwise normally occur.

It will be remembered that heretofore it has been usual in firearms having breech-bolts, or breech-blocks, which are slidably-supported,—and even when the breech-bolt has a vertically or transversely shifting motion of some kind,—to have the firing-pin located within and carried by the breech-bolt itself. In my present improvements, however, particularly in the preferred form and arrangement thereof herein illustrated, the firing-pin, P, is shown mounted in and carried by the member, C, which constitutes the "momentum-block," and which, in the present instance, is also a power-slide. One advantage of this construction or arrangement is that the breech-block may have any suitable amount of tilting movement without thereby disturbing the proper relation as between the rearward end of the firing-pin and the hammer; also, the breech-block usually can be made less massive, and also of less length, than might otherwise be required. The breech-block may also, by means of the construction herein explained, be so fitted as to be loosely held in place, so that it may operate in a free and easy manner,—even when made relatively short and when having a large amount of tilting movement. Thus I avoid any risk of the breech-block sticking or being jammed, and accomplish this without affecting to any material extent, the position or reliability of operation of the firing-pin. The features here explained tend directly to avoid objections which have heretofore been common, and thereby tend to safeguard the firearm against accident and variability of operation. A further feature is that on the firing of the cartridge the inertia (as against the reversal of movement) of the then forwardly moving hammer directly and forcibly tends to hold the firing-pin point against the cartridge cap during a relatively considerable time-interval during the power-stroke of the breech-block. This mode of action is demed to be desirable and important as a safeguard when a cap shall be punctured, and as furnishing a resistant separate from the power-slide and firing-spring to retard the firing-pin in its rearward movement as compared with the initial and concurrent rearward movement of the breech-block and power-slide.

During the auto-loading operation as normally performed by the mechanism through the cartridge-actuation thereof, the hammer H is retracted by the rearwardly-moving slide C, to a position, (Figs. 60, 67), where the sear S turns back into engagement under the cock-notch 8$^j$, while the member N is still held down by the breech action, and, that movement of the sear brings the detent-face 17$^s$ thereof to a position directly above the face 6$^s$ of the trigger F, provided this trigger in the meantime is held retracted; this position is shown in Figs. 4, 17, 18 and 67, 68. In practice, owing to the rapidity of operation of the mechanism, the user ordinarily will hold the trigger so retracted,—when once it has been pulled clear back,—until after the breech action has been fully retracted and has then gone forwardly for a sufficient distance to prevent the face 14$^s$ of the member N from rising in front of the breech-block E, to the position shown in Fig. 68, and indicated by dotted lines in Fig. 9. In Figs. 60, 67, the breech action is shown in such a mid-stroke position as here explained, which position occurs once during the rearward stroke, and again during the forward stroke of the main-slide C. Thus while the breech action is moving rearwardly from position Fig. 3 to position Fig. 9, and also while returning from position Fig. 9 to position Fig. 3, said pair of trigger and sear faces 6$^s$ and 17$^s$, operate as slide-lock retraction faces, (that is, as controller retraction faces) and thus prevent any undue upward movement of the member N, provided the trigger shall be held retracted during that period of the cycle of movements; in Fig. 9, however, the trigger F is shown in the forward position thereof, see also, Fig. 68.

The pair of coacting power-stroke-limiting faces $2^f$ and $5^j$, are herein shown located each in an upwardly and rearwardly inclined position, and at about the normal angle-of-repose, on the frame and breech-block, respectively; and they are arranged for stopping the breech-block on the rearward movement of this block through a relatively short power-stroke. The pair of upwardly and forwardly inclined coacting power-transmission faces, $5^t$, $3^r$, on the breech-block and power-slide, respectively, are arranged for operating the power-slide from the breech-block during and to the end of the said power-stroke of said block. The pair of block-depression stop faces $5^d$, $3^b$, are located on the breech-block and power slide, respectively, and are arranged in position for the slide-depression face $3^b$ to pass over the block-depression face $5^d$ on the completion of the forward movement of the slide,—see Figs. 3 and 5. Said power-stroke-limiting faces, are located with an intervening space $2^g$, (Fig. 4). When the mechanism is in firing-position, said block-operating faces $33^f$, $5^k$, are arranged for operating and lifting the block E from (and by) the rearward movement of the power-slide only after this slide has moved backwardly for a short distance subsequently to the breech-block reaching the end of its own power-stroke,—see Figs. 6, 7, 8. By this means I provide for a time-interval (in addition to the time-interval of the breech-block power-stroke,) between the termination of the breech-block power-stroke, (Fig. 5) and the inauguration of the breech-block retraction by the power-slide, (Fig. 8). Thus the breech-block is released from the depression stop-face $3^b$ during such additional time-interval and prior to the beginning (Fig. 6) of the elevation of the rearward end of the breech-block by the power-slide. The successive movements and positions here described are indicated in and by a comparison of Figs. 5 to 8, in connection with the principal enlarged views, Figs. 3, 4 and 9.

As a means for more safely loading the cartridge into the barrel, the bolt member E is shiftably supported as regards its position longitudinally of the main-carrier member C, and is arranged for being held in a forward position, (Figs. 8 and 9), during the long-stroke forward movement whereby a cartridge is transferred from the magazine to the barrel. By this arrangement, the bolt face $5^m$, (Figs. 4 and 9) is located forwardly of its firing position, relatively to the member C, and beyond the reach of the point $15^c$ of the firing device, or firing-pin, even when this is carried so far forward that its rearward end $15^d$ is even with the wall face $33^a$ of said member C, as in Fig. 4. Thus during the loading operation, the firing-device stands retracted as in Fig. 9 and is thus prevented from reaching the cartridge; and said firing-device is not advanced forwardly into or toward the firing position thereof relatively to the bolt E (Fig. 3), until after this bolt is safely located in its depressed position forward of the recoil abutment $2^f$, Figs. 5 and 6. At this time, the cartridge shell will be in the position it occupies when the block E is at the end of the power stroke (Fig. 5), thereby well safeguarding both the shell and the mechanism against injury should the charge then be fired prematurely. The extent of the said forward movement of the block E relatively to the slide C is approximately shown in Figs. 5 and 9 by the lines $5^{m'}$ and $5^{m''}$ indicating the forward and rearward positions, respectively of the block face $5^m$ relatively to said member C; see, also, Figs. 54, $54^a$.

From the foregoing it will be seen that the time-interval during which the firing-point $15^c$ is brought up from the retracted position Figs. 8 and 9, to working position Figs. 3 and 5, by the rearward-movement of the breech-bolt E relatively to the main carrier C, (while this carrier is itself moving forwardly), corresponds with the time-interval during which,—immediately following the end of the power stroke,—the carrier C moves rearwardly relatively to the frame B and to the bolt E. During the earlier portion of this latter movement, however,—but subsequent to the power-stroke portion of such movement,—and while the carrier C (relatively to the frame) is in motion rearwardly, the bolt E is changing its location to a more forward position, (Figs. 7, 8, 9) relatively to said carrier member, and at the same time the firing-point $15^c$ is retracted relatively to the bolt face $5^m$, from its effective position in Fig. 3, to its ineffective position in Fig. 9. These operations are further illustrated in the diagrams Figs. 51 and 52, representing the movements of the members E and C relatively to each other during the rearward and forward strokes respectively, of the carrier C.

For more conveniently comparing the movements of the main-slide C and breech-block E, each relatively to the other, the rearward and forward strokes of these members are illustrated in a diagrammatic manner in the two views, Figs. 51 and 52, respectively, in which the line $z^6$ may be taken to indicate the path of a point, as $9^a$, (Figs. 5-8), of the main-slide, while the line $z^7$ indicates the path of a similar reference point, as $9^b$, on the rearward part of the breech-block. (These diagrams are not drawn to scale, and it will be understood that the distance between the path-lines $z^6$ and $z^7$ has no significance). In Fig. 4, (similarly as in Figs. 3, 25, 56) said slide and breech-block are each shown in their forward position so that the points $9^a$ and $9^b$, (Figs. 4 and 51) are on a line $z^2$, which is at right-angles to the path-of-movement $z^6$ of said point $9^a$. On firing the cartridge, the slide and block move back together (Fig. 5) through a power-stroke from line $z^2$ to line $z^3$, (Fig. 51), thus bringing the block-point $9^b$ to rest at $9^{b2}$. Next the slide moves through the free-stroke thereof (Fig. 6) and brings the slide-point $9^a$ to the line $z^4$, (Fig. 51) while the block-point $9^b$ remains at line $z^3$. The slide C now continues rearward (Fig. 8) and brings the slide-point $9^a$ to line $z^5$ (Fig. 51) while the block-point $9^b$ is raised from $9^{b2}$ (through the stroke required for disengaging the block from the frame-abutment, Fig. 8, to the position $9^{b3}$; and with the slide-point $9^a$ and block-point $9^b$ in said position $9^{a4}$, $9^{b3}$, respectively; the slide and block next move together to the end of their rearward strokes (Fig. 9) indicated by line $z^8$ in Fig. 51.

The three reference points $9^a$, $9^b$ and $9^c$, are shown in Fig. 4 in the initial position, in which they are located when the breech-bolt E is in firing position; said reference points, however, are arbitrarily located, but are shown in the same positions relatively to said part E, in all the views in which said points are represented. Different positions of the point "$9^a$" are designated by adding supplemental exponents, thus making $9^{a2}$ indicate the point $9^a$, in a second position, and similarly as regards the points $9^b$ and $9^c$. In this manner, the same character, "$9^a$" is applied to the point $9^a$ in each of its positions, and this simple notation makes the diagrams Figs. 51, 52, readily comparable with the views Figs. 4 to 8, which are especially arranged for showing successive stages in the movements of the member E.

For similarly comparing the relative movements of the main-slide and breech-block during the forward strokes thereof, Fig. 52, is drawn in alinement with and below Fig. 51, so that the path of movement of the slide-point and the several positions of this point in said path, are the same in each of these diagrams. But it is convenient to locate a separate block-point as $9^c$ on the block E, (Fig. 8), so that these two points, $9^a$ and $9^c$, will be on the same vertical line $z^{10}$, at the beginning of the forward stroke, and will arrive together at the vertical line $z^{11}$ (Fig. 52), when the slide and block in moving forwardly, reach their positions relatively to each other, (and relatively to the frame B,) which are indicated in Fig. 8. From this position, the slide-point moves forward from line $z^{11}$ to line $z^{12}$ while the block point moves down from position $9^{c3}$ to position $9^{c2}$, (Fig. 52); this movement, as shown in the diagram, corresponds to a movement of the slide and block from the positions in Fig. 8 to the positions in Fig. 6. The slide-point $9^a$ now moves forward (through the described free-stroke), from the vertical line $z^{12}$ to the inclined line $z^{13}$, (Fig. 52), while said block-point remains at $9^{c2}$; this movement corresponds to the change of positions from Fig. 6 to Fig. 5. Next the slide-point $9^a$ and block-point $9^c$ move forward together from the said line $z^{13}$ to the inclined line $z^{14}$, and thus bring the slide C and block E from their positions in Fig. 5 to the positions in Fig. 4, relatively to the frame B, thereby completing an entire cycle of the said slide-and-block movements.

The described rearward movement together of the main-slide and breech-block through the distance of the power-stroke of the breech-block, retracts the cartridge shell X, (Fig. 79) to the position where, later on, the operation of extracting and ejecting the empty shell will begin. During this power-stroke movement of the slide C, the ejection port $3^a$ remains so far forward of the block-face $5^m$ as to keep the slide-wall at $3^{a'}$ (Fig. 31) well forward of the head-flange of the cartridge, (see, also, Fig. 54); from this position the slide C continues moving back while the block E is halted, and thus the ejection port is drawn back (Figs. 29, $54^a$) slightly to the rearward of the block-face $5^m$, and simultaneously therewith the firing pin is retracted to the extent of withdrawing the firing-point $15^c$ away from the block-face $5^m$, to a completely inoperative position. When the slide C and block E, after being drawn farther back to the positions in Fig. 26, the cartridge shell is drawn by the extractor $5^a$ forcibly against the ejector face at $13^a$, and following a well-known mode of action will be thereby thrown out through the ejection port $3^a$, as will be understood by a comparison of Figs. 25 to 29.

Thus the breech-block-operating devices may be said to constitute a means for shifting the extractor $5^a$ to the relatively forward position indicated by Fig. 28, at a time immediately preceding the ejecting operation. This forward shifting movement is also accomplished while the cartridge shell is still well within the barrel, so that the shell, during such shifting is retained under full control. In this manner the head-portion and flange $x^2$, of the cartridge-shell X, (Fig. $79^a$), is closed in by the block-covering walls of the slide C, during the power-stroke. The breech-block E is arranged to constitute an extractor-actuator, while the operating slide C is a member distinct from the breech-block, so that the arrangement here explained has the important feature of carrying the wall edge $3^{a'}$ well forward of the bolt-face $5^m$ when this face is in firing position, and thereby covering the outlet for gases which would otherwise occur in case a cartridge should have a defective shell.

The initial retraction of the shell X, (Figs. 79, $79^a$), by the power-stroke brings the wall-edge $3^{a'}$ rearwardly but this movement should not be sufficient to open a free side-wise outlet for the gases; but when the block E is in position Fig. 5, the further retraction of the operating-slide C, by drawing said wall-edge farther to the rearward, (as in Figs. 26, 28), opens up such an outlet, so that in the case of the premature firing of a cartridge having a split shell, the gases may freely pass out of said side opening, before the breech-block E shall be lifted free of the frame, (Fig. 7), and before the breech action as a whole shall begin its longer rearward movement or loading-stroke, as from position Fig. 8 to position Fig. 9. Thus the different movements of the bolt E and slide C, together with other features as above mentioned, provides for locating the block E during the shell-ejecting operation, at a point forwardly of the firing-position thereof relatively to said slide. Also, this initial change of relative positions serves to retract the point $15^c$ of the firing-device P away from the bolt-face $5^m$; simultaneously with the retraction of the firing-member, H, to an ineffective position relatively to the firing-device; and, at the same time, the guide-surface $e$, immediately forward of the lock face $33^d$, is carried over the breech action-locking end, as $14^s$, of the controller-member N, for thereby shifting and holding the trigger-end $6^c$, in disconnection position (Fig. 16) relatively to the sear-face $17^d$, before the completion of the shell-ejecting operation. By these means also the firearm is rendered especially safe when the user has occasion to extract a live cartridge.

The frame B is herein shown provided with a pair of oppositely located faces, (Fig. 79), for the barrel and breech-block repectively, for simultaneously resisting the forward movement of the breech-block (relatively to the frame and to each other) during the time-interval between the completion of the power-stroke of the breech-block, and the unlocking of the breech-block from the said forwardly-facing abutment face. In practice, a single face, as $2^x$ (Figs. 74, 79), may be used as the said barrel-locating face, but in some instances, if deemed preferable, a plurality of such faces (not shown) may be provided and these may be arranged in a series, in any suitable or convenient manner. While the barrel-locating effect of one said face is obviously of the same character as a plurality of them, the latter arrangement would have the advantage of supplying a larger total bearing suface with a less width or depth, or both, of the said face.

In the diagram Fig. 79, the barrel is indicated as being pressed forward (toward the left-hand in this view) while resisted by the frame face $2^x$, and while a reaction or opposing force is exerted against a forwardly-facing frame-abutment $2^f$, and this opposing action takes place during the "time-interval" between the beginning of the power-stroke and the unlocking of the breech-block from said frame-abutment. During this time-interval, which instantly follows the firing of the charge, and while the gas-pressure is exerted forwardly against the rearwardly-facing frame-face $2^x$, and rearwardly against the forwardly-facing frame-face $2^f$, the power-slide continues moving rearwardly relatively to the frame and barrel; this movement will normally continue and be so timed, that the projectile $X^1$ will have passed out of the barrel, and also the gas-pressure be considerably reduced, by the time the breech-block begins its disengagement from the said forwardly-facing abutment as explained in connection with Figs. 5 to 8.

The forwardly-acting pull or draft of the projectile (as $x^1$, Fig. 79) upon the barrel—this force acting through the described rearwardly-facing frame-face—will normally be counteracted or opposed by the momentum or force of the breech-block being discharged against the said forwardly-facing frame-face $2^f$ (Figs. 5, 79) and thus the force stored up in the breech-block during the power-stroke thereof, is not continued or transmitted for actuating other operating parts at a later time, but is at once utilized for measurably counteracting the draft forwardly of the barrel on the arm as a whole; thus said breech-block force, is so disposed of,—and this at so early a moment in the operation-cycle of the firearm mechanism,—as to materially tend to diminish the final recoil of the arm, and so obtain a high degree of steadiness in operation, even when using powerful cartridges.

The spring $14^n$ is shown located in position and arranged (see Figs. 4 and 64 to 69) for operatively connecting the controller-member, as N, and the movement-transmitter means, whether this means comprises a lever-device, as $n$, or otherwise; and whether or not the said means comprises a lever device as $17^n$ (Fig. 22) which is included as a part of a sear-member. In this arangement of said spring and of the members actuatable thereby, the spring $14^n$ constitutes one convenient form or kind of resilient actuator-device for forwardly actuating the member N (whether this member is only a breech action-locking device or is also a trigger-disconnection means) into engagement with the breech action—or with a member thereof,—from and by a reaction against the said movement-transmitter or against a member or part thereof, and this whether or not the lever-device is a separate member (Figs. 70, 71), or is comprised in a sear-member as a part thereof, as in Fig. 22. Similarly, in this arrangement, the action of the said resilient actuator device in a reverse direction constantly tends to forwardly actuate the sear-member, (that is, in a direction for engaging the sear face $17^b$ with the cock-notch, as $8^j$, of a firing-member, and in a direction away from the resistant face $14^e$) from, or by and with, a reaction against the controller-member, N; and tends to do this whether the controller-member shall be in one or another of its positions within the range of its working strokes, and during both the forward stroke and the retractive stroke.

This direct spring-actuation of the said two members N and S (by one actuator device) each by a reaction against the other, avoids any direct connection of such resilient actuator with the frame of the firearm, and extends, of course, to said controller-member when this comprises any single one, or any plurality, of the three principal features operating therewith, viz: the breech action-engaging (or locking) end-portion, face or device; the trigger-disconnection means, and the movement-transmitter resistant means. As already explained in connection with Figs. 15 to 18, the resistant means may be a lever-actuating face, as $14^e$, (Fig. 21) located in position and arranged on or relatively to the controller-member for a working movement concurrently therewith, and for resisting the movement-transmitter when this is operated from and by the firing-member, and for forwardly actuating the movement-transmitter (or a lever-device or member thereof) from a forward movement (upwardly in Figs. 15 and 64) of the reciprocatory controller-member,—and this whether such reciprocatory controller-member shall be supported in a slidable manner or otherwise. In certain of the combinations, as will now be evident, a resistant-means,—(such, for instance, as the resistant face $14^e$), may be considered as a feature separate from but coöperative with the movement-transmitter means by or through which the controller-member is actuatable from the firing-member, while in other combinations, such resistant means or face may be considered as being comprised in a movement-transmitter which is operatively-intermediate to (as between) the controller-member on the one side, and the firing-train, or a member thereof, on the other side.

In respect of some of the combinations comprised in the fire-control action, the firing-train may be considered as consisting of the firing-member, as H, and the means for actuating this member, so that the sear-member is then a device which is an accessory to the firing-train proper, and may therefore constitute an element of one mechanism which as a whole may form one element in a larger combination, as for instance, when the sear-controller mechanism is defined as one element in a combination which also includes a firing-train as another element thereof. The two principal members of the sear-controller mechanism, (which in the preferred construction thereof herein illustrated, are the members N and S), are understood to be not only "coacting",—since each one of them is functionally coöperative with other members for effecting some given purpose,—but also, as regards certain of the operations and purposes, to be "inter-coacting", since each is at times an actuator for the other, and each for some purpose acts through the other as a transmitter of resistant or active forces to other portions of the firearm mechanism.

A similar reciprocality of action and reaction obtains, of course, as regards the spring-actuator and said members N and S, in the aforesaid preferred arrangement, and this reciprocal relation and mode of action applies to said members and actuator when the member N is considered as a slide-lock, or as a trigger-shifter, or as a combined slide-lock and trigger-shifter. In the spring-actuator arrangement shown in Fig. 71, when the sear turns from its position in Figs. 17, 59 and 82 toward the cock-notch-engaging position in Figs. 3, 56 and 80, naturally the sear-actuating spring, if arranged as at $14^{n'}$, Fig. 71, will be lengthened and the force thereof reduced; this and any similar arrangement, therefore, has the objection of holding the sear in engagement with the cock-notch by less spring-pressure or force than normally required to turn or swing the sear entirely out of such engagement. In the said preferred arrangement, however, during the turning movement of the sear S into engagement with the cock-notch,—as from the position in Fig. 15 to the position Fig. 3,—the spring-pressure as delivered against the sear is gradually increased, and I will next briefly explain one manner by which this result may be obtained, which is by the employment of a force-modifier device in position and arranged for transmitting the force of the spring from one said member to the other, and with varying effects in different positions, respectively, of the mechanism.

For comparison with and supplementing Figs. 15 to 18, I have illustrated in Figs. 64 to 69, a further feature of said sear-andcontroller spring-actuator whereby the normal increase in spring-compression by a retraction of the controller N,—as for instance from the position thereof in Figs. 3 and 15 to the position in Figs. 4 and 17,— will be transmitted to the sear-member S with a reduced effect. This object and result is accomplished in part by the manner of mounting or locating the lever or modifier $n$ on the controller-member N. On the retractive movement or stroke of the member N, said lever $n$ is correspondingly shifted in its position relatively to the coacting sear-member S, thereby sliding the lever-point $n^1$ downwardly on the sear-arm bearing-face to position $n^2$ and $n^3$, and thus applying the spring pressure to the sear at a much less distance from the sear-axis, which, of course, is the center of the sear-pivot $17^a$.

In Figs. 3, 4, and 64 to 69, the spring-actuator is illustrated as comprising the actuator-spring $14^n$ and the transmitter connection $n$, which, in the present instance, is in the nature of an angle-lever, and is shown in position and arranged for operating as a force-modifier as regards the force or spring-pressure as transmitted to the sear. For coöperating in those respects with said spring and the lever $n$, the sear S is shown provided with a lever-arm, as $17^c$, the face $f^3$ of which serves as a bearing for the longer end $14^l$ of the lever $n$. During the various movements of the sear-controller mechanism the said modifier-lever end $14^l$ slides outwardly and inwardly to various positions along said bearing-face $f^3$ of the sear, and meantime this bearing-face itself changes its angular position during such operations,— see Fig. 69. Two such successive positions are shown in Figs. 64, 65, respectively, and the said lever and bearing-face positions are also shown in Fig. 69. The increasing force of spring-pressure as transmitted to the sear through the force-modifier $n$, is indicated in Fig. 69 by the different angular positions of the dotted lines as compared with the angular positions of the face $f^3$ in Fig. 69. Thus while the spring $14^n$ may be somewhat reduced in force as it expands from its compressed condition in Fig. 67 to its expanded position in Fig. 64, this effect may be more than compensated by the action of modifier-lever $n$ and bearing face $f^3$ as regards the turning of the sear; so that in being shifted from its retracted position in Fig. 67 to its slide-locking position in Fig. 64, the sear may be held in engagement with the hammer with a maximum force when the hammer is in the fully cocked, or firing, position, Fig. 64.

Thus, as above set forth, any progressive increase of force in the spring $14^n$ during the said movement of the member N, may be transmitted to the sear S through a correspondingly reducing leverage at $n^3$, Fig. 69, and with a corresponding variation in the effect produced on the sear-member. And during said retraction of the member N,—as when releasing the lock-face $33^d$ of the breech action,—any suitable trigger-shifter appurtenant to the sear-controller mechanism will normally shift the trigger, as F, to an ineffective position (Fig. 66), at a time after the simultaneous retraction of the two inter-coacting members N and S has proceeded in a direction and through a stroke for releasing the firing-member, as H, from its engagement (in full-cocked position, Fig. 64) with the locking-face or sear-face, $8^j$.

When the initial retraction of the member N is thus effected by the trigger F acting through the sear as a lever therefor, (see Figs. 15, 65) the said reducing leverage tends to prevent an increase of resistance to the trigger-stroke which might otherwise be caused by the said compressing of the spring $14^n$ by the trigger acting through the sear to draw down the member N, and thereby further compress the spring. Thus the force-modifying spring-actuator,—this being reciprocally-acting, as set forth,—of the sear-controller mechanism, operates in reverse ways for distinctly different purposes, respectively; first, to increase the force of engagement of the sear with the hammer H, in the full-cocked position (Fig. 64); second, to reduce the otherwise normal amount of force which would be transmitted by the spring $14^n$ to the sear S during the retractive movement of the sear, and when this sear-movement takes place concurrently with the retraction of the controller N, (Fig. 66).

By reason of the coöperative relations of the controller N and sear S as here set forth, and the reciprocality of action of the intermediate force-modifying spring-actuator coacting therewith, these members may be said to constitute a sear-controller mechanism. Also, since, as elsewhere herein explained, the member N,—or a part thereof,—may be considered as a part of a complete locker-train, while the member S is, similarly, a part of a complete firing-train, the "sear-controller" mechanism may be said to be operatively-intermediate to and connecting a locker-train and a firing-train.

The sear-controller mechanism, as regards some functions, may be said to comprise a member of the locker-train and a member of the firing-train in combination with a reciprocally-acting spring - actuator operatively connecting those two members, as N and S. Also, in such a combination, said spring-actuator may be defined as being in position and arranged for increasing the force of the engagement of the sear with the hammer in the full-cocked position of the hammer; and, also, for decreasing the force transmitted from the spring-actuator to the sear during the retraction of the controller by the sear.

Furthermore, and similarly, as will now be evident, the sear-controller mechanism may be said to be operatively-intermediate to and connecting with the breech-action (or with a main-slide or carrier thereof) and the firing-train, and with the firing-train and shiftable trigger, and with the main-slide, firing-train and trigger. By reason of these features, the trigger may be so arranged as to begin its pull-stroke with a relatively maximum resistance to the finger of the operator, and continue through said stroke with a decreasing resistance, so that, in practice, when the finger-pressure is increased to the point of starting the sear out of engagement with the cock-notch, the said trigger-stroke will accelerate, and thus operate in a peculiarly quick or instantaneous manner while having the considerable initial resistance desirable for securing a high degree of safety in practical use.

As regards the more general relations of the safety-member,—as G, Fig. 3,—in coöperation with and as a blocking-means for the firing-member, H, and with the main-carrier, as C, of a retractable breech action, the operatively-intermediate part or parts constitute, in effect, one device or means which I designate as a combined firing-member-resisting and breech action-locking means, and which comprises a firing-stroke-resisting device in position and arranged operatively-intermediate to the firing-member and the safety-member, and also comprises a breech action-locking device similarly arranged as between the breech action or a member thereof, and the said safety-member. As shown in the principal views thereof, said one device, or combined means, is represented as comprising features of the controller-member N and sear-member S, but in practice, and as elsewhere herein more fully explained, those parts and features may be modified in various ways within the purview of my present invention; of such other ways, two modified arrangements are elsewhere herein described, in connection with Figs. 70 and 71.

In coöperative relation with both the main-slide or carrier and the firing-train, the controller member N operates as a "locker" for each. This "locker" is herein shown in coöperative relation directly with the firing-train through the sear S (when this member is regarded as being a member of that train), while the grip-safety member, as G, is arranged for locking the carrier-locker N into locking engagement with the main-carrier. This operation, however, also blocks the operation (Fig. 3) of the hammer by resisting a locker-actuating means (as S) which is operatively intermediate to the member N and the hammer, H. The grip-safety, therefore, may be said to be coöperative not only with the member N, considered as a "locker," but also by acting through such member, to be coöperative in one direction with the carrier C, and in another direction with the hammer H. Thus the grip-safety may simultaneously lock the carrier C,—and through this, the breech-block E,—and so block the firing-train that the hammer cannot make, or cannot complete, its firing-stroke. The controller, therefore, is operatively-intermediate, along one line of action, to and as between, the grip-safety G, and the main carrier, C, and, along another line of action, with and as between the grip-safety and the firing train. The peculiar kinematical features here mentioned, are further illustrated in the diagrams Figs. 61 and Fig. 63, inclusive.

Thus, as will now be evident, the coacting members E, C, N and G, or certain portions thereof, may be said to comprise a four-member cartridge-locking train which has therein a series of three coacting pairs, first, the breech action pair E and C; second, the slide-and-lock pair C and N; and third, the safety-train pair N and G. This train,— when the member G is in safety-position, Fig. 3,—not only locks the cartridge into the barrel, (Fig. 3), but may be so arranged that when such a locked-in cartridge is prematurely fired by some accidental means, (as for instance, by heating), the force of the explosion will be transmitted back to and through the member N, and then distributed to the frame B at two points, one being the abutment $2^f$, and the other being the frame-surface at $q'$, (Fig. 3), which supports the removable bearing $g$. The distribution of forces as here set forth, is effected in part by the inclined position and the working relations of the member N and of the face $33^d$ of the member C of said four-member train or combination. This positive locking of the cartridge into the barrel by a train which includes a grip-operable safety-member, as G, also has the advantage of safe-guarding the cartridge against being partly withdrawn from the barrel should the firearm be struck in such a direction and so violently (as by a blow or a fall) as would partially retract the slide C were this not directly locked in firing position by a safety-train member which is spring-actuated into the safety-position thereof.

The grip-operable safety-member G not only operates in a direct and positive manner for locking the breech-block E in the forward position thereof, (see Figs. 3 and 25), but this is done (when the firearm is not in use) by and through a train of coacting members, or parts of members, in which the trigger, the sear-member and the firing member are not included. When the safety-member G is in the retracted or safety-position thereof, (Figs. 3 and 61) the stop-face $7^t$ bears against or under some suitably-positioned face, as 14ᶜ, on the controller N, which is thus made to operate in a direct manner as a blocking piece between said member G and the face 33ᵈ of said slide C. The positively-acting resistance thus provided as against a premature rearward movement of the slide C, is transmitted, through a portion of the member C and through some suitable face or device thereof, to the block E, for holding this block with the cartridge-supporting face 5ᵐ thereof against or close to the rearward end of the barrel D, and thereby resist a rearward movement, prematurely, of the cartridge in the barrel,—see and compare Figs. 3, 15, 25, 48, 56, 80. The firearm-mechanism, therefore, comprises a four-member cartridge-resisting safety-train in which the breech-block and the safety-member are the terminal members of the train, and in which two of the members are included,—as one coacting pair,—in the breech action, while the other two members are included,—as a second coacting pair,—in the fire-control action; this train also serves to lock the cartridge in the barrel while the firing-member is blocked against making a firing-stroke by the firing-member-resisting means appurtenant to said second pair of members.

In the fire-control action, especially in such arrangements thereof as are illustrated in Figs. 3 and 4,—where the firing-member H is pivotally supported,—the firing-spring 8ᵉ is not only supported on the safety-member G, but is also operatively connected,—as by a thrust-rod, or connecting-rod, 8ᵇ,—for actuating the firing-member through the firing-stroke thereof; and said actuator-spring 8ᵉ, together with any connection appurtenant thereto, is also in position and arranged for normally actuating the safety-member into or toward the controller-blocking position thereof, (Fig. 3), and for doing this by a reaction against the firing-member.

A further feature,—see Figs. 48, 49, 50, as elsewhere herein described,—relates to that arrangement of the safety-member, G, and the firing-member-actuating spring, 8ᵉ, mounted thereon or arranged appurtenant thereto, whereby these members (with certain minor features appurtenant thereto) constitute in chief part a combined spring-actuation means and actuation-modifier means for actuating the firing-member with an increasing effect or leverage, (Fig. 50) and for simultaneously modifying the force of the spring-actuation as applied by the said spring 8ᵉ to said safety-member G. This modifying of the said actuation force as applied to the member G, may be carried to the extent of a complete interruption, as explained in connection with, and as will be obvious from, said diagram, (Fig. 50), so that when the firing-member H is in forward position (Figs. 4 and 50) the safety-member G may have, for the moment, no effective spring-actuation. Concurrently with this decreasing effect upon the safety-member, the increasing effect, or force, upon the forwardly-moving firing-member serves to supply, through said firing-member and the sear-member S, (or other suitable form of movement-transmitter operatively-intermediate to, or appurtenant to, the firing-member and controller) a correspondingly increasing power, or force, to the controller-member, as N, for completely and more readily withdrawing, or retracting, this member, as G, out of its breech action engaging position, and also for similarly completing the trigger-disconnection operation. Thus the firing-spring 8ᵉ is also a safety-member actuation-spring, and with suitable connections is one actuation-means for retracting the controller-member N toward the ineffective-position thereof, (Figs. 4, 17, 59, 66) as regards the locking of the breech action in its said forward position.

The said actuation-modifying means appurtenant to the firing-train, is also arranged for reducing the force of said safety-member actuation during the firing stroke of the firing-member, so that at the moment when the firing-member, as H, strikes the firing-device of the breech action, the spring-actuation of the grip-operable member G may, if desired, be nearly or completely interrupted, or reduced to zero. This result, and the action of the preferred means therefor, is also illustrated in the diagrams, Figs. 48, 49, 50. For instance, in Fig. 48, the line of force 10ᵃ, between the abutment pivot g and the hammer pivot 8ᵃ, deviates by the distance 10ᶜ from the line 10ᵇ, which indicates the line of the actuation force of the spring 8ᵉ. But in Fig. 50, corresponding to said Fig. 4, the line 10ᵇ has been swung past said line 10ᵃ, so that the distance 10ᶜ is here reduced to zero, while the firing-member, H, is near the forward end of its firing stroke. Thus the firing-member actuating-means (as a part of the firing-train,) is arranged, in the present instance, for also constituting actuation-modifying means as regards the actuation safety-member G.

Because of the foregoing features and cooperative relations, the member G, or the lower portion thereof, together with a suitable spring, as 8ᵉ, and some guide device, as 8ᶜ, (between said spring and a thrust rod or the like, as 8ᵇ, leading to the member H,) may be considered as regards some functions and for the purposes of some combinations, as being included in, or as being a part of the said firing-train and also of the said locker-train. A further feature of the member G considered as a part of, or as an appurtenant to, the firing-train, is the effect of the grip-stroke thereof for increasing the angle-of-action of the firing-spring 8ᵉ relatively to,—and as delivered to,—the hammer. This function is indicated in the diagrams Figs. 48, 49 and 50 where the effective angle at $z^{20}$, (Fig. 48), is shown increased to the angle $z^{21}$ in Fig. 49, while the change of "leverage" is approximately indicated by the proportionate increase in the length of the sines as indicated at $s^{20}$, Fig. 48; $s^{21}$, Fig. 49; and $s^{22}$, Fig. 50, respectively. In practice the advantage thus gained will be usually greater than the apparent increase of the said leverage, since the "angle-of-repose," as is well known, will be the same in each said position, and is to be deducted equally from each of the angles $z^{20}$, $z^{21}$, in order to obtain the actual effective proportions thereof. For instance, if such a deducted angle-of-repose should be equal to an angle of five degrees, then the remaining angles show by comparison the ratio of change in the effective leverage. This rate of change, may be increased, if desired, by shortening the thrust-rod $8^b$, which connects with the hammer, and rearranging the guide-means, as $8^c$, suitably therefor; or, if preferred, the amount of the angular or swinging movement of the member G may be modified for the same purpose.

From the foregoing description it will now be evident that, in addition to the breech-block, (which,—as usual in breech-loading firearms,—will be normally arranged for a loading-stroke of a length in excess of a cartridge length), the breech action comprises another member which is a main carrier arranged for a forward working-stroke in excess of the loading-stroke of the breech-block, and which is provided with some suitable firing-device and is also provided with a lock face (as $33^d$) in position, when the main carrier or slide is in its forward position, for co-action with a lock-face (as $14^d$) of a controller-train. Thus the controller-train comprises a member having a face in position and arranged for actuation into an engageable position relatively to the lock-face of the main carrier when this is in forward position, thereby to lock the carrier, C, and through this to lock the separate breech-block, E, in firing position,—see Fig. 3. The firing-train, therefore, is arranged with one member thereof, as H, in a coöperative relation with the firing-device and also is arranged in such a coöperative relation to the controller-train as first to unlock the carrier (as by retractively actuating the locker member N), and then to operate the firing device at the end of the firing-movement of the firing-train.

In practice, a considerable variation may be made as regards that portion of the firing-stroke of the hammer, within which the actuation of the trigger-shifter by or from the hammer, should take place. In some instances, if preferred, especially if or when the shifter-stroke shall be a relatively long one, such shifter-actuation may be continued during the larger portion of,— or even during the whole of,—the firing-stroke of the hammer. Usually, and particularly in the small-arms class of fire-arms, I deem it preferable to so arrange the minor structural features as to only actuate the trigger-shifter by and from the hammer during some portion of said firing-stroke, and for this portion I prefer to employ the latter part of the period of said firing stroke, (Figs. 16, 17), since this arrangement has the advantage among others that any resistance which might be caused by the said operation is thereby delayed until after the hammer-movement shall have been accelerated to a relatively high velocity and power.

One result effectively secured by means of the described safety-train, is the locking of the breech action in forward position by a locking-member which is itself directly locked in such breech action-engaging position by a safety-member, thereby securing a double-locking of the relatively heavy main-slide, C, upon the frame. With the main-slide thus securely held in place, this slide is prevented from having a slight movement (in a well-known manner) on the frame, as otherwise would be liable to occur when the firearm is carried by a person on horseback, or by one riding on a jolting vehicle; thus various coacting surfaces and operative parts are protected from an abrasive action which normally,—under such conditions as indicated,—would be destructive, and sometimes become dangerous. By these means, also, the hammer (or other form of firing-member as the case may be), is similarly blocked against accidental operation, being opposed by or from the member N, while this member is itself locked into engagement with the main-slide. Thus the safety-stop, as G, Fig. 3, operates to positively lock both the breech-action and the firing-train against a wrongly-timed working stroke.

From the foregoing description as herein illustrated, it will now be evident that as between the hammer and the sear there may be employed,—as a device or structural feature appurtenant thereto,—a sear-actuating means operable during the firing-stroke of the hammer, or during a portion thereof; that such means may consist of some suitable sear-actuating device arranged to be coöperative as between the hammer and sear; and that such a device may be in the form of an actuator or cam-face so located and arranged on or appurtenant to the hammer as to operate the sear relatively to and by power from the hammer, during a period subsequent to the beginning of, and before the end of, the firing-stroke of the hammer. Also, it will be evident that as between the sear and trigger-shifter, there may be employed,—as an appurtenance thereof,—a shifter-actuating means arranged for operating said shifter during and from the firing stroke of the hammer (that is, by power transmitted from the hammer) in a direction for shifting the trigger out of the sear-engaging position thereof, and consequently out of the path of movement of the sear-arm face 17$^d$, see Fig. 18. The trigger thus becomes inoperative,—or completely ineffective,—relatively to the sear at a time during, and before the completion of, the firing-stroke of the hammer; and this result is accomplished in such a manner as to time or determine the beginning of such period of trigger-inoperativeness,—or ineffectiveness,—from the movement of the hammer itself, and subsequently to the disengagement of the sear-face 17$^b$ from the cock-notch 8$^j$ of the hammer,—see Figs. 15, 16. Furthermore, it will now be evident that in practice, the shifter-actuating means may consist of some suitable device appurtenant to or coöperative as between the sear and said shifter, and located in position and arranged for engaging and actuating the trigger-shifter from the sear, (and thus through the sear from the hammer) during some portion of the firing-stroke of the hammer; and, that such an appurtenant device may be a face on,—or a lever-arm extending from,—the sear, and in any position and arrangement suitable for such purpose.

The member C may be considered as being a combined main operating-member and main carrier in that it carries certain details of the mechanism, and in that it also carries or transmits the power for driving or actuating other parts, including the actuation of the breech-block, as E, for carrying forward the cartridges into the barrels. In small-arms, especially in such auto-loading arms as are usually classed as pistols, the main-carrier will usually and preferably, in practice, have the form of a slide, and will then constitute a "main-slide" for the firearm mechanism; and this main-slide will preferably be arranged for a rectilinear movement, as shown in the accompanying drawings. And in those instances in which the main carrier is a slide and the breech-bolt, or breech-block, as E, is arranged to have a power-stroke, said main carrier will become cartridge-actuatable and thus be a power-carrier in the form of a "power-slide".

Having in mind the foregoing explanations, it will now be evident that in certain of the combinations herein set forth and defined,—including such as are indicated, for instance in Figs. 56 to 60,—it will usually be immaterial to the subject-matter of the combination whether the element indicated at (or as,) "C" shall be a "carrier" of some undefined specific character, or shall be a slide; or if, being a slide, it shall also be a power-slide. Thus the coöperative relations of and as between the parts of the firing-train, and of these relatively to the controller N, and of this member N and the several parts thereof relatively to the member C, are, in general,—and except as otherwise specified or limited in any given instance,—substantially the same whether said member "C" shall be defined or designated as a power-slide, a main-slide, or merely as some, or any, suitable kind or form of main carrier member for the mechanism. Therefore the term "slide-lock" when used with reference to the member N as a device for engaging or locking the member C, will usually have the same significance as the term "carrier-lock" and vice-versa, especially in any combination involving either the controller member or a part or appurtenant thereof, the sear-member or a part or appurtenant thereof, the grip-safety member or a part or appurtenant thereof, or the hammer or a part or appurtenant thereof.

While the main carrier C, constituting the main member of the breech-mechanism (breech action) and the principal operating member and the firing-pin carrier, has been shown herein as being a slide supported for straight-line forward and rearward, or reciprocatory, working movements, it should be understood that, within the purview of my present invention, such main breeching member or main carrier may be varied in form and arrangement, and may be slidably or otherwise supported; also that such main carrier when made in the sliding form herein selected for illustration thereof, may be arranged to have either a curvilinear or a rectilinear sliding or reciprocatory movement. Accordingly I have herein,—especially for the sake of convenience and brevity,—employed the term "carrier" and "main-carrier" as being suitable terms for designating or defining such a reciprocatory main operating member,—when of any suitable construction and arrangement,—as an element of a combination which is "in a firearm mechanism comprising a main carrier", and in which such "carrier" as an element of combination is not more specifically or otherwise defined. Similarly, by the term "main slide" I refer to such a carrier when slidably supported, or similarly arranged for reciprocatory working movements in either a rectilinear or a curvilinear manner. Such of those features and subjects-matter, however, as are herein described but are not herein specifically claimed, are intended to constitute in part the subject-matter of separate applications to be concurrently pending herewith.

In some instances, if desired, the firing-member as H, Figs. 3 and 4, and the coacting safety-member G, may be each operated by a separate spring (not shown), and my present improvements relate in part to combinations whereby both of said members are operated by a single main-spring, as $8^o$, Fig. 3. In this preferred arrangement, the main-spring is operatively-intermediate to and actuates both the safety-member and the firing-member, and also actuates each said member by a reaction against the other. Said spring also actuates the safety-member toward the mechanism-blocking position thereof, (see Fig. 3) and normally actuates the firing-member through the firing-stroke thereof from position Fig. 3 to position Fig. 4. And the slide-lock-retracting means is in position and arranged for retracting the slide-lock out of engagement with the main-slide lock-face by the force of the said main-spring transmitted through the firing-member. The safety-member is also actuatable into position for the face $7^t$ thereof to block the slide-lock into engagement with the main-slide, (Fig. 3), by the force of said main-spring transmitted through the safety-member and by a reaction which extends first against the firing-member, and then extends through the firing-member and the slide-lock-retracting means, (the sear-member S, in Fig. 3), and thence through the slide-lock to the said locking-face, as $7^t$, of the safety-member, thereby completing a circuit of active and resistance forces, and a circuit of coacting members which are blocked as against either individual or collective operation until released by a grip-stroke of the safety-member into the ineffective position thereof, in Figs. 4 and 9.

One feature of my invention relates to the blocking of the firing-member in a positive manner as against the making or completing of its firing-stroke by means of an intervening member or members which also are involved in the performance of other functions, as for instance, the simultaneous locking of the breech action and the trigger-disconnection operation. When the face $7^t$, of the safety-member G, as in Fig. 3, is located in proper position therefor, this member, G, operates through the lower part of the member N, and through the faces $14^c$ and $14^e$ thereof, to hold the sear-arm $s^{10}$ engaged with the cock-notch $8^j$ of the retracted firing-member H, and thus positively block this firing-member against making or beginning its firing-stroke. The partial movement shown in Fig. 15 of the firing-member H, brings the cam-face $8^k$ thereof against the face $17^n$ of the sear (as also indicated in Fig. 18) while the sear-arm $s^{10}$ bears against the face $14^e$ of the member N, (see Figs. 15 to 18) and thereby positively blocks the firing-member against completing its firing-stroke. This result may be accomplished while the resistance of the safety-member, G, is transmitted or acts through the said several faces and through the intervening portions of the members N and S as in Fig. 3. In the foregoing arrangement, the trigger-disconnection means may be so arranged as to be actuated concurrently with the initial movement of the firing-member through so much of the normal or proper stroke thereof as may be needed for rendering the trigger-face $6^n$ ineffective with relation to the sear-arm face $17^d$; also, the cam $8^k$ may be so fitted and arranged as to block the firing-member H in an intermediate part of its firing stroke, and with the member N so far withdrawn from the breech action face $33^d$, as to leave the breech action free to be retracted without bringing the rearward end $15^d$ of the firing-device P, into engagement with the face of the firing-member H. Thus the safety-member G, and the coacting members may be so arranged and freely fitted as to only block the firing-member in a mid-stroke-position (about as shown in Fig. 16 or Fig. 58) and without thereby blocking the trigger against making an ineffective pull-stroke.

The grasp of the user's hand on the grip-face $2^r$ (Fig. 3) of the safety-member G and upon the trigger,—respectively,—serves to apply these two active forces to the controller N, at the same moment of time and on adjacent faces, so that the safety-member and the trigger are thus directly coöperative. One effect is that the two pairs of coacting faces $14^c$ $14^t$ and $7^t$, $7^j$, respectively, of the controller and safety-member, are instantly shifted from a coaction of the faces $14^c$, $7^t$ (Fig. 3) to a coaction of the faces $14^t$, $7^j$, Fig. 9; and this is done prior to the withdrawal of the sear-face $17^b$ from the cock-notch $8^j$ of the hammer, (and also prior to the unlocking of the breech action), while the trigger-sear engagement is prolonged until after said sear-face is withdrawn and the hammer thereby released. Also, these features lead to the further result, that the separation of the trigger-surface $6^n$ from the sear-arm surface $17^d$ (Figs. 4 and 16) is by a direct withdrawal, and not by a slipping of one corner over another while under pressure, thus avoiding an injurious mode of action. Thus the initial act of the oppositely applied but coacting forces of the safety-member and trigger, is to lock the safety-member in a forward and inoperable, and for the time being, in an unretractable position, which is also a permanent locking thereof as regards the cycle of mechanism-action then beginning. And this result is accomplished while the hammer and sear are each free of any direct contact with, or direct resistance from the safety-member.

When the pistol is grasped in the hand, the first effect is, of course, to shift the grip-safety G to its forward, and ineffective position (Fig. 4) and thereby release the controller N and by drawing the member N downwardly, thereby prevent the retraction of the member G even if the hand-pressure thereon be relieved or reduced. Thus the grip-safety member is locked out of action by a member which is separate from the trigger and also separate from the sear. One result of this construction and mode of action is indicated in Fig. 60, where the controller N is being held depressed by the breech-block E, thereby leaving the sear S free of any direct or indirect engagement with, or restraint by, the grip-safety, and therefore leaving the sear free to be swung by the sear-spring 14ⁿ (Fig. 4) from its position in Fig. 59 and thereby engage the hammer very quickly at the moment the hammer has been sufficiently retracted by the power-slide; this position is also indicated in Figs. 60 and 67. Thus the grip-safety and each of the said faces thereof, coacts with the controller N, or with portions thereof, as regards each of the functional relations thereof, including the several portions which operate, respectively, as a trigger-shifter, as a slide-lock, and as a sear-blocking device, as elsewhere herein more fully described.

A further feature of the arrangements as here outlined, relates to a coöperative connection between the said combinations involving the member N or some portion thereof, and the main-spring system, whereby the grip-safety member G,—in the preferred form thereof herein illustrated,—is so arranged with relation to the main-spring 8ᵉ, and with the devices directly coacting therewith, as to reduce, and preferably to reduce substantially to zero (see Figs. 4 and 49), that part of the spring-thrust upon the member G which normally tends to move the member in a rearward or outward direction, and so relieve this member of any tendency to move toward or into its "safe" or controller-locking position, (Fig. 3) except when this action is properly required by the hammer being carried backward to its cocked position. Thus the operation of cocking the hammer instantly restores to the safety-grip G the spring-pressure applied thereon for moving this safety member into its effective position (Figs. 3 and 48) should there, at such instant, be a need for such movement. By reason of such a relieving of the member G from rearwardly-acting spring-pressure at the moment the cartridge is fired, (Fig. 50), the recoil of the arm operates upon the safety-grip G while this has its full quantum of inertia, and while this inertia is unopposed by any countervailing spring-pressure or force; the primary recoil thus holds, for the instant, the member G in its forward position relatively to the frame, (Fig. 4, without the aid of hand-pressure.

By so arranging the mechanism that the hand-operated safety-grip member,—whatever may be the specific form thereof,—coacts directly with a member, as N, separate from both sear and trigger, the continued depression of the member N during the rearward movement of the power-slide,—as from position Figs. 4 and 59 to position Figs. 9 and 60,—operates to hold the grip-member, as G, locked in its forward or ineffective position (Figs. 4 and 9), during the entire period of the re-cocking of the hammer and the re-engagement of the sear with the hammer; these features are shown in Fig. 60 (the re-cocked position) by comparison with the fired position shown in Fig. 59. Heretofore, it will be remembered, "grip-safety" devices, have been arranged in some instances for coacting directly with the trigger and in other cases, for coacting directly with the sear of the firearm mechanism, but the different organization herein illustrated has various and important advantages including a direct coaction of the safety-grip member with the power-slide and thence to the breech-block, and thence to the cartridge itself, as elsewhere herein more fully set forth.

As regards the retraction downwardly of the controller member N from the forward movement of the hammer H,—from position Fig. 58 to position Fig. 59,—it will be understood that the actuator (as for instance the cam 8ᵏ, Figs. 15-18) which is an appurtenant of the hammer, constitutes one controller-retractor, or actuator, and that in the preferred arrangements herein illustrated, so much of the sear-member S as is operatively intermediate to the said actuator appurtenant to the hammer, and the member N (see Figs. 15 and 85), may be considered as being also an appurtenant of the hammer for the purposes of such downward actuation of the controller from and by the firing-stroke of the hammer; and, hence, in the organization of said mechanism elements as herein set forth, the hammer,—although acting through those appurtenant devices,—is regarded as directly actuating the member N, and as also directly actuating the slide-lock portion 14ᵃ (Fig. 16), the safety-grip-engaging portion, and the trigger-shifter portion of said member N, each in a direction away from the power-slide and during the firing-stroke of the hammer.

The sear-member S,—in the preferred form thereof (Fig. 22) herein illustrated,—may be regarded as comprising therein a series of levers each functionally distinct from the others; these several features, which are diagrammatically indicated collectively in Fig. 85, comprise the trigger-engaging face 17ᵈ, the cock-notch face 17ᵇ, the controller-actuating face 17$^f$, (arranged for actuating the controller N in one direction from the initial trigger movement), the hammer-actuatable face 17$^n$, and the sear-resetting lever-face 17$^c$. In the system as here illustrated, the face 17$^f$, arm $s^{10}$, arm $s^{11}$ and face 17$^d$ may be said to constitute a controller-retracting lever which is comprised within the sear member S. Similarly, the face 17$^f$, lever arm $s^{10}$, lever arm $s^{12}$ and face 17$^n$ may be said to constitute a lever-device whereby the force is transmitted from the hammer H,—acting as an actuator therefor,—to the controller N. The face 17$^f$, lever arm $s^{10}$; lever arm $s^{11}$ and face 17$^b$ constitute a lever-device through which the face 14$^e$ of the controller N acts for holding said face 17$^b$ in locking engagement with the cock-notch 8$^j$ of the hammer H, when this is in firing position,—see Figs. 4 and 64. Said face 17$^c$, lever arm $s^{13}$, lever arm $s^{11}$ and face 17$^b$ constitute a lever whereby the actuator member $n$ (see Figs. 64–68), normally tends to actuate said face 17$^b$ toward the said hammer-engaging position thereof. Also, the face 17$^c$, arm $s^{13}$, arm $s^8$ and face 17$^d$, constitute a lever-device whereby the said actuator means through the lever $n$ thereof tends in some positions of the mechanism to oppose the pull-stroke of the trigger F,—see Figs. 3, 15, 64.

From the foregoing explanations, it will now be evident that the sear-member S is primarily a motion-transmitter comprising a plurality of component levers, and that this composite member can be conveniently arranged in the form of a pivotally supported mechanism-element, and can be located operatively-intermediate to several pairs of coacting parts, including the trigger and hammer; the trigger and trigger-shifter, and the trigger and slide-lock, and the hammer and controller. Also, it will be evident that each of the said lever-devices, is a motion-transmitter only for some one, or for some limited purpose. And it should be understood that in practice, and as regards combinations herein defined but not otherwise or specifically limited, those several lever-devices,—and also the sear-member S considered as a whole,—may be either of integral or of compound construction, may be supported in a pivotal or other suitable manner, and may be variously arranged and modified within the scope of my present invention. Modifications such as above indicated are illustrated in Figs. 70, 71, in which certain of the "lever-devices" of Fig. 85 are formed separately from the other components of the complete "sear-member S" of Figs. 15–18 and Fig. 22.

In Figs. 60 and 67, the guide-surface at $e$ is shown holding the controller N so far retracted that the lower end-face 17$^s$ of the sear S can freely pass over the trigger-surface 6$^s$ (Fig. 60) without encountering any resistance therefrom. When, however, said guide $e$ passes to the rearward of the member N, as in Fig. 9, while the trigger is held in the position shown in Figs. 4 and 65, then the member N will only rise to the position indicated in Fig. 68 so that on a forward movement of the breech action, the lower edge, $e^2$, of the block E engages on the actuation face 14$^v$, and thereby force the member N down again to said position in Figs. 60 and 67, and so that the breech action will not be locked in the retracted position while the trigger is held retracted after a pull-stroke thereof. Thus, the upper end, or slide-locking portion (as 14$^a$, Fig. 21), of the member N,—(when this member is considered in the more complete form thereof and as regards all the functions thereof herein set forth),—has a combined locking and actuation face, 14$^d$, which faces in a forward direction; a detent face, 14$^l$; an actuation face, 14$^v$, (Figs. 21 and 21$^a$,) facing in a rearward and upward direction; and, a breech action-locking face 14$^s$, facing in a rearward direction. Should this latter face 14$^s$, be omitted, the member N will then be unable, in the absence of some substitute (not shown) for said face, to hold the breech action in the retracted position. Thus the several said faces of the member N while all coacting for some purpose, (i. e., in respect of the complete cycle of operations), and coacting by threes and in pairs for other purposes, are nevertheless, individually operative for distinctly different purposes, respectively, and each operates in a distinct manner and relation to other members, for its respective purpose or function.

A further feature of improvement relates to that part of the fire-control action whereby the locking-train thereof comprises one principal member, as N, located forward of the firing-member, H, while another principal member, G, is located rearwardly of the firing-member. By this means the locking-member, or controller, is arranged in position close to the magazine chamber, while the grip-face, (as at 2$^r$, Figs. 3 and 4); of the grip-operable member G, is directly back of the firing-member, the operative connection being made by an arm (or arms), as 7$^e$, 7$^e$,—see Fig. 12,—extending from one to the other of said principal members N and G, and these members having coacting stop-faces as already explained. In the present instance, I have shown such an arm, 7$^e$, extending from the forward side of said principal member, G, forwardly to the other said member, N, and this arrangement will usually be preferable.

It will be observed that with relation to the pivotal or rotative movement of the sear-member, S, the trigger F, on its pull-stroke, and the controller N, on its retractive stroke, each have a movement in the same direction. This feature will be obvious on comparing Fig. 85 with Figs. 15–18 and Figs. 64–68. By this arrangement, the movement of the member N is continued in the same direction after the pull-stroke of trigger F has terminated, and when being driven by the hammer-cam $8^k$ while the hammer is moving in the same rotative direction as the sear-member. One result of this peculiar organization and mode of action is to enable the force of the hammer to continue a controller-movement which is already begun, so that the hammer-force, or the momentum thereof, is not in part expended for inaugurating such controller retraction, nor for overcoming any inertia or initial adhesive effect thereof; and by these means the firing-member is safeguarded as against any substantial amount of variability in the efficiency thereof, which might otherwise arise from a variation in some such inertia or initial adhesion resistance. By the term "initial," as here applied to the adhesive effect as a resistance to initial movement of the controller, I refer to the well-known circumstance or result, that normally and usually it requires a much larger force to start a slide into motion from a state of rest, than it does to continue the motion thereof after the slide is once started moving, and that initial frictional-resistance or adhesive effect of the slide or controller upon its supporting surfaces, is understood to be much more variable than is the later frictional-resistance to a continuance of such initial sliding movement.

When in the position illustrated in Figs. 56 and $56^a$, (and in other views corresponding therewith), the locking member N of the fire-control action, has the two faces $14^d$ and $14^s$ thereof advanced to a position for holding the breech action in two different positions, respectively. The forward, or breech action-locking face $14^d$ is in position and arranged for engaging with the lock-face $33^d$ for thereby holding the breech action in forward or firing position, as in Fig. 3. And also,—while the member N is in the same position,—the said rearward face $14^s$, is in position for engaging with some suitable face on the breech action or on a member thereof, when the breech action is near or at its fully retracted position, as in Fig. $9^a$. The said two faces of the breech action preferably should, of course, be located at a distance apart which corresponds with the required length of the loading stroke of the breech action.

Should the firing of the arm in the usual manner be followed by an instant release of the trigger, the breech action normally would take the rearward and locked position as in Fig. $9^a$; this allows the user,—should the magazine be empty or absent,—to insert a cartridge by hand, and then by another pull of the trigger, to retract the locking member N from the position in Fig. $9^a$ to the position in Fig. 4, whereupon the mechanism will normally resume its firing position, as in Fig. 3. When fitting up the mechanism for operation as here described, the slide-spring $4^d$ should preferably be made of only a moderate power, and thus provide for a relatively slow initial forward movement of the breech action; while the trigger spring, as $6^e$, may be adjusted or fitted to provide for a quick retractive movement of the trigger F.

By comparing Figs. 3 and 56–60, with the other views and the description thereof, it will be seen that the pivot-bearing $g$ constitutes a single support or fulcrum from which (as a point of initial action and resistance) both the firing-train and the locker-train extend upwardly until each said train of mechanism comes into a coöperative relation with the other, while the two said trains are each of them individually and directly in coöperative relation with the breech action and are also, as a pair of coacting trains, collectively coöperative with the same breech action. One feature of such a collective coaction takes place while the member N of the locker-train is held depressed (Fig. 60), by the breech action and while, at the same time, the member H of the firing-train is being operated by and from the same breech action; at this time, also, the features of trigger, trigger-shifter, sear and hammer are in coactive relation, while at another location the hammer-actuation means of the firing-train and the grip-operable member G of the locker-train are in coaction for modifying the operative effects of the firing-spring $8^e$, (see Figs. 48–50), from and by which one of the members in each said train is actuated in one and the same direction.

The system of organization of the fire-control action, as illustrated, for instance, in Figs. 3, 4, 9, provides for the use of a powerful main-spring as $8^e$, (preferably of the usual helical form as shown) located remotely from the complex of coacting devices adjacent to and including the sear and controller members; and also provides for carrying such main-spring upon the safety-member G, and for utilizing the reaction of the spring for actuating the safety-member itself into, or toward, the mechanism-blocking position thereof.

The controller and sear members, as N and S, constitute, as regards some functions of the firearm mechanism, a single means through which a safety-member, as G, can block, or lock, both the breech action and the firing-train in their respective firing-positions, indicated in Fig. 3, and the lines of resistance then existing are further indicated in the diagram of forces, Figs. 48–50, and 61–63.

In the arrangement shown in Fig. 3, the sear-member S is spring-actuated by the force of the main-spring $8^e$ acting through the firing-member,—in this case, the hammer H,—for moving the sear-arm $s^{10}$ toward the face $14^e$ of the controller or slide-lock N, while the slide-lock-actuating spring $14^n$ actuates the said controller in the reverse direction and thus normally holds these two members in engagement,—as in said Figs. 16–18,—excepting when the controller may be forced down by the rearward stroke of the lock-face $33^d$, of the main-slide, to the position illustrated in Fig. 9.

Of the two different forms and arrangements of the firing-member shown in Figs. 3 and 70, respectively, both are operably-supported, but only the one in Fig. 3, is properly designated as pivotally-supported, and this kind of such member is therefore herein termed "the hammer." In some instances, therefore, the term firing-member refers equally to either, or to any similar, form of said member, as H, Fig. 3, or $H^2$, Fig. 70, while the term pivotally-supported hammer, in some of the combinations herein defined, has a more particular reference to the kind of firing-member which is represented by the member H, when arranged or employed substantially as indicated in the principal views,—see Figs. 3 to 18.

While the trigger and sear disconnection may be effectively accomplished by the simple means herein described for shifting the trigger itself relatively to the sear-member, (as may be seen by comparing Figs. 56, 59 and 60), in some instances a modified arrangement of the details may be employed for effecting that disconnection for thereby discontinuing the coöperative relation of the trigger and sear,—as regards the actuation of the sear by the trigger,—while the carrier locking portion (including the face $14^d$) of the controller N is withdrawn from its carrier-locking position. One such modified arrangement is illustrated in Figs. 80, 82 and 83, which correspond to Figs. 56, 59 and 60, respectively. This modified construction, however, is not specifically claimed herein, but is intended to constitute in part the subject-matter of a separate application to be concurrently pending herewith.

In Figs. 80, 81 (similarly as in Figs. 56, 59), the "disconnection" is shown as being accomplished by the hammer acting through the sear-member, and thereby moving the controller N to its lower or fully retracted position; in this arrangement, the trigger-disconnection means is in the form of a disconnection block $k$ and is shown arranged for being drawn downwardly from between the sear-face $17^d$ and the trigger-face $6^n$; this permits the return movement of the sear as shown in Fig. 83, (corresponding to Fig. 60), as required for reëngaging the hammer while the member N is continued in its lowered position by the sliding engagement of the upper end $14^l$ thereof with a guide-surface of the breech action, as shown in Fig. 60. Thus in both of the specific arrangements illustrated, the complete trigger-and-sear disconnection is normally effected by power transmitted from the firing-spring $8^e$ and through the hammer H during the firing-stroke thereof, and is later continued by the breech action, as indicated in Figs. 60 and 83. There is also an analogous similarity of operation as to the initial retraction of the controller N by the pull-stroke of the trigger, shown in Figs. 59 and 81, respectively.

In the particular form of trigger-disconnection means illustrated in Figs. 80–81, the block $k$ is operable in one direction with the slidably-supported and reciprocatable member N, relatively to which, and for certain purposes, said block may be regarded as an appurtenant. But the upper end of the block $k$ is also operable in the direction of the movement of the sear arm $17^e$, (compare Figs. 80, 81), and hence in some respects may be also regarded as an appurtenant to the sear member S, or of the sear and trigger when these are considered as being in combination. In this arrangement, the forward and rearward faces of the block $k$ have a movement with the said controller member and in the same direction, so that in passing from position Fig. 80, to position Fig. 81, the block slides downwardly between the trigger and sear while under the pressure of the pull-stroke of the trigger. After reaching the position in Fig. 81 (corresponding to Figs. 15 and 58), the firing member, as H, further operates the controller N and thus draws the block $k$ to a position below the trigger-face $6^{s'}$, as in Fig. 82, whereupon the block $k$ is snapped under said trigger-face as in Fig. 83. The sear-member being thus relieved of the trigger-resistance (engagement) is now free to be reëngaged with the hammer, as in Fig. 83, as soon as the hammer has been sufficiently retracted therefor, by the rearward stroke of the slide C.

Some of the various coaction-circuits, and certain of the lines of acting and opposing forces within the fire-control action, including some which involve parts of the breech action, have been described or referred to in the preceding description, and are further illustrated in the diagrams, Figs. 61, $61^a$, 62, $62^a$ and 63. For convenience of illustration, in these views the several principal members have been only partially shown, but the arrangement thereof will be readily understood by comparison with the other figures of the drawings, particularly with the preceding Figs. 3, 4, 9, 15 to 23, 48 to 51, and with the succeeding views Figs. 64 to 69, inclusive, and the descriptions thereof. Some of these circuits of coaction involve a three-member group or series, while others involve or include a four-member set or group, or extend to a larger number of the coacting members.

In these diagrams, Figs. 61 to 63, I have indicated the principal operative members in a fragmentary manner only, including the grip-safety G, the firing-member H, the firing-device P, the sear-member S, the trigger F, the controller-member N, a portion of the frame B, and the controller engaging portion of the main-slide C. Lines of action arranged for representing in a diagrammatic manner some of the "coaction-circuits" are indicated by the heavier dotted lines $r^1$ to $r^{17}$, some of such circuits being indicated in one of the diagrams and other circuits and lines of action in other of the diagrams. One of the shorter circuits is indicated in Fig. 62$^a$ by the lines $r$, $r^{14}$ and $r^{15}$, for illustrating a circuit involving the trigger, F, the sear-member, S, and the trigger shifting portion of the controller N. In Fig. 61 the same circuit as thus shown in Fig. 62$^a$ is illustrated in connection with a larger circuit extending from the abutment or pivot $g$ through the lines $r^2$, $r^4$, $r^5$, $r^6$ and $r^7$, to the trigger F, and involving also the said safety-member G, hammer H, firing-device P, main-slide C and trigger shifting controller N.

In Fig. 62 a line of action $r^2$ extends from said abutment pivot $g$ to the hammer H and thence extends through a line $r^3$ to the sear-member S, and through this member by the line $r^{16}$ to the trigger shifting portion of the controller N, finally reaching the trigger by a line indicated by $r^{15}$. This circuit illustrates how the firing-spring 8$^e$, (as already explained) reacts against the pivot $g$ for actuating the hammer H and through this for actuating the sear-member S in such a manner as to retract the trigger shifting member N and thus shift the trigger F from the operative position thereof in Fig. 62 to the inoperative position thereof in Fig. 63. This peculiar system of coacting members is further illustrated in Fig. 63 by the repetition therein of the said circuit of Fig. 62 together with the addition of a larger circuit such as shown in Fig. 61, but with the variation that the lines of action are here extended (in Fig. 63) through the faces of the members N and G whereby the retraction of the member N locks the member G in its forward or non-safety position, which corresponds with the position thereof also indicated in Figs. 49 and 50 as hereinbefore more fully described.

In Fig. 61$^a$ the larger circuit of Fig. 61 is repeated with the addition of certain of the lines of action shown in Fig. 62. In this diagram (Fig. 61$^a$) it will be noted that the lines of action indicate how the force applied by the member C to the member N will be extended and distributed for ultimately reaching the trigger F through the line $r^{10}$, the safety-member G through the line $r^9$, the sear-member S through the line $r^{17}$; and also how at the same time the force of the firing spring 8$^e$ will reach the hammer H through the line $r^2$ and thence by the line $r^3$ extend to the sear-member, and through this by the line $r^3$ to the controller-member N, and thence through the line $r^{12}$ to the safety-member G, and there meet the resistance indicated by the line $r^1$, when the safety-member G is in the safety-position thereof which has already been described in connection with preceding views and especially as indicated in the diagram, Fig. 48. Another line or path of action extends from the member C (Fig. 61$^a$) through the lines $r^7$, $r^{17}$, and $r^{13}$ directly to the trigger F and operates for resisting the pull-stroke of the trigger, since the line $r^{17}$ indicates the action, as between the members N and S, of the actuator $n^{14}$ as already explained in connection with Figs. 64–68.

From these explanations and by comparison of the described lines of action shown in Figs. 61 to 63, inclusive, it will now be obvious that the trigger F, sear-member S and controller-member N constitute a three-member group or circuit of coacting members. Also, it will be evident that the firing-member H, sear member S and controller-member N constitute a three-member circuit and that the safety-member G, firing-member H, sear member S and controller-member N similarly constitute a four-member group or circuit. When these members or several of them are considered with relation to their coaction with the breech action, as indicated for instance in Fig. 61 by the lines $r^5$ and $r^6$ with reference to the firing-device P and the slide C, other coaction groups are formed involving four-member circuits and five-member circuits. Some of these circuits or groups may be considered as extending forward to and including the breech-block E and thus reach forward through the coaction circuits represented in Figs. 61–63 to the cartridge which (as hereinbefore explained) is blocked in firing-position in the barrel by a series of members through which there are lines of action, or resistance, which extend ultimately to the abutment pivot $g$.

The grip-operable member G,—considered as a member of the controller-train;— coöperates with the locker member N as an intercepter therefor, and when thus or otherwise retarded or intercepted, (Figs. 3, 48, 61) said locker-member or controller also becomes an intercepter of the firing-member of the firing-train. Thus the member N constitutes, in effect, a combined breech action locker and firing-train intercepter or resistant. The latter function of firing-train interception may be accomplished in the arrangement illustrated in Figs. 3 and 4, by or through some suitable supplemental device or means (as a lever or other form of resistant or transmitter) arranged operatively intermediate to the member N and a member,—preferably the firing-member, as H,—of the firing-train. In some instances, however, this interaction as between the locker-member which is directly coöperative with the breech action, and with a firing-member which is directly coöperative with the firing-device of the breech action, may be accomplished in some modified manner, as indicated, for instance, in Figs. 70 and 71.

In the principal views, including Figs. 3, 4 and 9, the firing-member of the fire-control action, consists of the oscillating hammer H, pivotally supported at $8^a$, and arranged for operation as already described. The firing-member, however, may be arranged, in some instances if preferred, to have a relatively sliding movement, and one such construction is shown in Fig. 70. In this view, the specific organization or arrangement and mode of action, of the locking-train conforms substantially to the arrangement thereof in said Figs. 3, 4 and 9, but the controller N, is here shown with the interlock-faces $14^c$ and $14^t$ thereof located below (instead of above) the trigger F.

The firing-member in Fig. 70 is designated by $H^2$ and consists of an enlarged extension of the rod $8^b$, so that the firing-member has a vertical motion and does not have a pivotal or swinging movement, properly so called. The upper end of the member $H^2$ is shown guided by a roller $8^p$, and is provided with a face at $8^s$ for engaging an arm, $8^t$, of the lever $L^2$ which is here shown arranged for actuating the firing-pin P in a manner which will be evident from the drawing. Said lever $L^2$ is shown provided with an inclined surface at $8^w$ for operating on the roller $8^r$ which is fixed to the firing-member $H^2$, so that on the firing of the cartridge the rearward movement of the breech action will operate to depress the firing-member $H^2$ to its cocked or firing-position (not shown). On the forward side thereof, said member $H^2$ is shown provided with a cock-notch $8^j$ for engaging with the sear-notch or face $17^b$ of the sear-member S. This sear-member is shown comprising two arms designated by $s^8$ and $s^{11}$ which correspond in function with the arms thus designated in the diagram, Fig 85.

The sear S, in Fig. 70, is supported on a pin $17^a$, and alongside of the sear is a combined firing-member resistant device and controller-retracting device which consists of a lever mounted on the said pin $17^a$ and comprising two arms, $s^{10}$, $s^{12}$, which correspond with the arms $s^{10}$ and $s^{12}$ in said diagram, Fig. 85. Thus the several kinematical features and functions which are described in connection with Fig. 85 are shown in Fig. 70 as being supplied by separate lever-like members which may not be in all cases the same, nor related in every way to each other in the same manner, as the sear arms shown, for instance, in Figs. 3 and 9, and 15 to 18, where the arm functionally corresponding to arm $s^8$ is specifically indicated by $17^e$. The lever arm $s^{10}$ bears against the face $14^e$ of the member N while the lever arm $s^{12}$ bears against a face $8^{k\prime}$ which corresponds in purpose and principal function with the cam face $8^k$ as already described in connection with Figs. 15 to 18 inclusive. In the operation of this modified arrangement of the fire-control action (Fig. 70) the upward or firing-movement of the member $H^2$ operates with the said lever arms $s^{12}$ and $s^{10}$ for retracting the controller N, and when the controller shall be blocked in its upper position by the safety-member G, (similarly as in Fig. 3), then said lever device operates for resisting the firing-movement of the firing-member in a manner similar to the mechanism as arranged in the principal views, Figs. 3, 4 and 9. The specific arrangement of the controller, sear, firing-member and the actuating and resistant devices coöperative therewith, as shown in Fig. 70, are not herein specifically claimed but the same will constitute in part the subject matter of a separate application.

A further modification is shown in Fig. 71. The member N, of the controller-train is here shown provided with an upwardly-facing bearing or face $14^e$, and a member of the firing-train,—in this instance the thrust-rod $8^b$,—is shown provided with a similar bearing or face, as $8^{k\prime\prime}$. The lever-device, having the two arms $s^{10}$ and $s^{12}$, (as in Figs. 70 and 85), is shown supported on a pivot-bearing at $17^{a\prime}$, and with the ends thereof in coöperative relation with said faces $14^e$ and $8^{k\prime\prime}$, of the controller-train and the firing-train members, respectively. Thus, as will be evident, an upward movement of the firing-train-member, $8^b$, will draw the controller-train member, N, downwardly, and vice versa. The lever-device, therefore, is not only operatively-intermediate to the firing-train and the controller-train, but is also a movement-transmitter and a firing-train resistant, whereby the firing-member of the firing-train will be intercepted, during its firing-stroke, by the action of the controller-train, in any position of the mechanism in which the locker-member, as N, shall not have been withdrawn from its engageable position relatively to the breech action. Thus, when arranged as shown in Fig. 71, the two coacting trains (independently of any coaction as between the locker N and the grip-safety member G), become reciprocally coöperative each as an actuator for, and as a resistant to, the other; also, when either one of the said trains is retracted, this train operates through the intermediate device as a releaser of the other said train.

On comparing the modified and the preferred arrangements as here explained, it will be noted that in the forms and arrangements herein illustrated, the firing-train acting through an intermediate means or a lever-device, is normally operative as a locker-retractor for withdrawing the locker N out of its coöperative position relatively to the breech action, (see Figs. 4 and 70). On the other hand, owing to the proportions and arrangement of the several actuator faces, the controller-train would not be able, normally and by any forward movement of its own, to operate the firing-train, nor retractively actuate the firing-member, as H or $H^2$, especially in view of the normally small power of the actuating-spring $14^n$ as compared with the power of the firing-spring $8^e$. In the said preferred arrangement, therefore, the two trains coact, and are coöperative, but are not interactive as regards the retractive actuation of either one by a forward movement of the other. In each of said arrangements, however, the controller-train, acting through some member or means comprised therein or appurtenant thereto, intercepts and resists the firing-train or the firing-member thereof, thus halting or resisting the firing-movement, whenever the breech action remains locked in forward position or when the locker-member, as N, of the controller-train is retarded in its retractive movement. Thus within the fire-control action, (and independently of the coaction of the members N and G), each of said trains comprised therein is an intercepter of the other as regards the forward movement, or non-retractive movement, of such other train; that is, the controller-train intercepts the firing-train, and vice versa.

The fire-control action, therefore, may be said to comprise, in each of the forms or arrangements described, a breech action-locking member and a firing-member, each arranged for a spring-actuated forward stroke and for a retractive stroke; and also to comprise movement-resisting means, coöperative with said locking-member and said firing-member and arranged for resisting the forward stroke of one said member when the other said member is in forward stroke position; and, also, to comprise spring-power actuation-means in position, and arranged and connected for normally actuating each of said members through a forward stroke. And these coöperative elements and features are so arranged and connected that the relatively stronger or greater spring-power means, (which in this instance includes some suitable firing-spring, as $8^e$), as applied or connected to the firing-member, overcomes the relatively weaker or smaller spring-power means, as applied or connected to the slide-locking member N. In this manner, and during the normal forward stroke of the firing-member, as H or $H^2$, of the firing-train, the said locking-member of the controller-train is retracted out of the breech action-locking position thereof. And in this locker-retracting operation, the aforesaid movement-resisting means, (which is also a firing-train-resisting means, when the controller-train is in one position thereof), may be said to constitute, or to serve as a movement-transmitter and as a locking-member actuation device, as elsewhere herein more fully explained.

One feature of the combination of sear-and-controller devices considered as a mechanism, and when of the preferred arrangement herein illustrated, relates to a spring-actuator which is shown as being located operatively intermediate to and connecting the sear and controller members, and which is shown in a preferable form in Figs. 3, 4, and 64–68, and in four different relative positions. In some instances, if for any reason deemed desirable, such a spring-actuator may consist of a suitable helical or other spring acting directly between the sear-member and the controller-member, as indicated for instance at $14^{n'}$ in Fig. 71, where the spring rests at one end in a socket in the controller-member N, and at the other end is fitted to bear against the sear-member S. In the arrangement shown, Figs. 64 to 68, said spring is an actuator for the member N, and the reaction of the spring will be directly against the member S, and is also an actuator for the member S, by a reaction against the member N.

In Fig. 53, I have illustrated one of the various ways by which the safety-stop device and train may be arranged in a modified manner for effecting the desired locking engagements with the power-slide C (in both the rearward and forward positions of this slide) through the use of some suitable intermediate and adjunctive or auxiliary part. In this view, the intermediate part N' is shown movably-supported on the pivot $k^2$, and is arranged for effecting the direct contact with the rearwardly and upwardly inclined face $33^d$ of said slide C. As in the form and arrangement of safety-stop device as shown for instance, in Figs. 3, 4 and 9, the member N has as an appurtenance thereof, a lock-face which is located in position for actuation into a slide-locking position relatively to the power-slide, and rearwardly of a coöperating face thereon. The lockface $k^3$ (this being on the part N itself) also coacts,—though less directly,—with the co-operating face $33^d$ of the power-slide, while furnishing a means whereby the pressure on the face $7^t$ of the member G, may be reduced. Also, the auxiliary detail N', is shown arranged for having working movements transversely of the power-slide, so that the part N and the part N' may be considered,—as regards several combinations comprised in the mechanism,—as components of a compound member, or a plural-member of the safety-stop train. The said parts N and N' also when taken together constitute a "controller-stop" and a slide-lock which is located and arranged for engaging slide C and the breech-block E for holding this block and the slide in their several positions, in the manner already explained.

Instead of the guideway mode of operatively connecting the controller-train and the trigger,—see Figs. 3 to 18—other modes of making such a connection may be employed in some instances. In Fig. 84, for instance, the controller-member N is shown connected by the link, as $L^3$ of any suitable form with the sear-engaging end of the trigger F, so that the trigger-end will be moved or shifted vertically, either up or down, with the member N, while remaining free to be moved in a forward or rearward direction independently of said controller member. Thus within and for the purposes of some of the subjects-matter as herein set forth and defined and which may include or involve a trigger-shifter feature, the particular form or arrangement of the trigger-shifter connection, whereby to guide or control the portion of the trigger relatively to the controller-train or to a movable member thereof, is not material or important.

In some instances, also, the trigger-guide means may be arranged for omitting the initial downward movement of the member N, (as from position Fig. $56^a$ to position Fig. $57^a$), and thus leave the entire trigger-shifting, or disconnection movement to be effected by the firing-train, or by a member thereof, and during the firing-movement thereof. This result may be accomplished in various ways, of which one way is shown in Figs. 58, 59, where the member N and the arm $s^{10}$ of the sear S move together from position Fig. 58 to position Fig. 59, during the firing-stroke of the hammer H. For general use, however, I prefer a construction which will not omit the described initial trigger-actuation of the locking face $14^d$ of the member N, as illustrated by Fig. $57^a$.

One modified arrangement is illustrated in Fig. 55, where a light spring $n^{10}$ is provided for normally upholding the trigger-end F, against the bearing $14^k$ of the member N, while reacting against some abutment, as $9^t$, on the frame. The trigger is thus allowed to remain in the same longitudinal position while the member N is moved up or down. In this arrangement the initial downward movement of the member N,—as from position Fig. $56^a$ to Fig. $57^a$,—by actuation from the pull-stroke of the trigger, will take place as already explained.

The trigger F, when provided with the two faces $6^n$ and $6^s$, and suitably arranged and connected, constitutes not only a sear-actuating means or device, but also constitutes a blocking means whereby to hold a breech action-locking member, as N, in a retracted position through an interposition of a blocking-portion (as in Fig. 68) of the member F between a pair of suitable oppositely-disposed faces on the members N and S, respectively. This function of the trigger F is illustrated in and by Figs. 18 and 68 where said blocking part of the trigger is shown interposed between the face $14^t$ of the member N and the face $17^s$ of the sear S, thereby holding the said locking member N so far retracted as to render the same ineffective for locking the breech action in its retracted position.

The controller-member,—of which the slidable kind is illustrated in the principal views,—may be arranged in some instances with a pivoted instead of a slide-support, and thereby avoid some of the sliding surface friction which appertains to this member when moving between and against guide surfaces by a sliding movement only. A pivotal construction such as here indicated is illustrated in Figs. 84 and $84^a$. In this modified form of the sear-controller mechanism, the trigger, F, sear-member, S, actuator $14^n$, the safety-member G (not shown in Fig. 84) and the relations of these parts to the breech action, and the firing-member, (here designated by $H^3$) and to the principal part of the controller-member, (here designated by $N^2$) are or may be the same in all material respects as already described in connection with preceding figures. The said controller-member $N^2$, is here shown provided with an extended arm, $14^w$, which is shown pivotally-supported at $9^h$ to the frame B, and is to be fitted up in such a manner as to permit of the free operation of the member $N^2$ and the coacting parts, within the required ranges of movement. For these purposes, the hammer $H^3$, is indicated as having a central mortise, or space, $n^5$, for said arm $14^w$, as will now be obvious from comparison of Figs. 84 and $84^a$. While the safety-member, G, is not shown in Fig. 84, it is to be understood that this member may be applied to the arrangement here shown, and then may have the same position and mode of action as in Fig. 4, and as already described.

The spring-actuator $n^{10}$, of Fig. 55, is shown applied in Fig. 71, in a modified manner, being here arranged on a downward extension, $n^6$, of the member N. As thus arranged in Figs. 71 and 55, said spring reacts against the abutment $9^f$ for normally holding the trigger F upwardly and thus through the connecting means between the members N and F, tends constantly to also force the locking member N upwardly so that this member will operate substatially in the manner described in connection with Figs. 15 to 18 and Figs. 64 to 68. In Figs. 71 and 70, a further variation is illustrated consisting in a change in the position of the faces on the member N which interlock with the coacting faces on the safety-member G. From a comparison of this interlocking series of faces as here illustrated and the similar faces as illustrated in preceding figures,—see for instance Figs. 61 to 63,—it will be obvious that the operation of the safety-member will, when thus arranged, substantially coincide with the mode of action already described in connection with preceding figures.

Regarding the organization of the breech action, it will be seen that in the preferred form and arrangement thereof, the breech-block member E is not "carried" in a supportive sense, by the power-slide C, but, on the contrary is or may be directly supported on and by the frame, while being guided and retained in place on, and also longitudinally operated along, the frame, by said power-slide. But in some instances, if desired, the forward end of the block E, may be supportively connected with the power-slide C, and accordingly in Figs. 72 and 72$^a$; I have shown one manner in which such a supportive connection may be conveniently arranged, within the purview of some of the principal features and the claims therefor, which are herein set forth. Referring to said Figs. 72, 72$^a$, the slide C is there shown with a slot, $c^2$, in the upper wall 33$^j$ thereof, and a stud $c^3$ extends from the block E upwardly through said slot, and has a head $c^4$, extending over and bearing on the upper surfaces at $c^5$, of the power-slide; these parts should be so fitted, of course, as to provide for the member E freely sliding within the slide C through the required stroke. In practice, the stud $c^3$ may be made integral with the block E, or it may,—as herein indicated, be screwed into said block. This arrangement is one convenient way for holding the member E assembled within the slide C after this shall have been removed from the frame. For this purpose, said supportive connection coacts, of course, with the block-operating means which connects the rearward end of the block E with the slide C, as for instance, the inclined faces shown therefor in Figs. 5 to 8.

In connection with the arrangements already described in connection with Figs. 3, 10, 40 and 79$^a$ for slidably supporting the barrel within the main-slide C, some convenient means or device may be provided for normally preventing the barrel from being rotated in a direction for releasing or retracting the rearward end, 4$^e$, of the barrel from its normal position relatively to the frame. In practice, such a supplemental device, in view of the manner in which the barrel engages with the frame, will not always be essential. One convenient arrangment, however, for releasably detaining the barrel against a retractive rotation is particularly illustrated in and by Figs. 3, 9, 10, 74 and 79$^b$. Said retaining device in the form here illustrated comprises a rearwardly extending blade or projection 4$^h$ which is preferably integral with the guide-bushing or sleeve 4$^c$. Referring to Figs. 10 and 74, this projecting part 4$^h$ is shown located below the barrel and within a groove or channel therefor which is formed in the barrel; and, the rearward end, 4$^g$, of said blade or projection, (Fig. 74), is shown beveled so as to bear against an inclined face 2$^i$ formed in the rib 2$^c$ of the frame B. The pressure of the spring 4$^d$ by forcing the sleeve 4$^c$ in a rearward direction (toward the right hand in Fig. 74) operates in connection with said inclined face 2$^i$ for turning the sleeve 4$^c$ and the barrel together in the proper direction by a pressure of the projection 4$^h$ against the face 4$^i$ of the barrel, as will be obvious from a comparison of Figs. 3, 9, 10 and 74. By these arrangements, the mounting and the precision of alinement of the barrel relatively to the power-slide, and relatively to firearm-sights thereon, is made independent of, and unaffected by, the alinement relations between the power-slide and the frame, and also independent of the positioning connection between the barrel and the frame.

Referring to the explanations already made,—especially in connection with Figs. 5 to 8,—of the operation of the rearward end of the breech-block E with the main-carrier C and the frame B, it should be understood that the inclined faces for elevating and lowering the breech-block relatively to said member C from the lower position shown in Fig. 5 to the upper position shown in Fig. 8, may be accomplished by other suitable means than the described inclined coacting surfaces. One suitable means for effecting the described movement of the member E relatively to the member C is illustrated in three successive positions, respectively, in Figs. 76, 77 and 78. The relative position of the member E in Fig. 130

76 corresponds to the position thereof in Fig. 3. In Fig. 77, said position corresponds to the position in Fig. 7, and in Fig. 78 the position of the member E relatively to the member C corresponds with such position as shown in Fig. 8. For controlling and regulating the described movements of the member E, I have shown in said Figs. 76–78 a guide-link $L^6$ which is shown connected to the member E at the pivot point $c^7$ and to the main carrier or slide C by the pivot point $c^8$. In this arrangement or modification, and as regards the operating means as between the members E and C, the coaction of the power-stroke-limiting faces $5^j$ and $2^f$, of the members E and C respectively, is substantially the same as already described in connection with said Figs. 3 to 8 inclusive; this explanation also applies to the coacting surfaces $5^d$ and $3^b$, and applies generally to those details and features of, or appurtenant to the breech-block E which are co-operative with other members of the breech action and fire-control action.

From a comparison of the several drawings with each other, it will be obvious that the mechanism within the main carrier C, and also the operative parts comprised in the fire-control action, may be described as being arranged in, and with relation to, three zones, these comprising a mid-zone, a left-side zone and a right-side zone. These relative divisions of the mechanism space, are approximately indicated in Figs. $3^a$, 11, 12, $79^a$ and $84^a$, by and between the lines $n^{12}$, $n^{14}$, showing the left zone $z^{30}$; the lines $n^{14}$, $n^{16}$, showing the mid-zone $z^{40}$; and, the lines $n^{16}$, $n^{18}$, showing the right-zone $z^{50}$. In Fig. $79^a$, for instance, the firing-pin P and its bearing are clearly shown located in the mid-zone $z^{40}$, while the slide-bars of the breech-block E are shown located in the left-zone and right-zone, $z^{30}$ and $z^{40}$, respectively, in correspondence with Figs. 13, 41 and 35. In a similar manner, the mechanism of the fire-control action, is shown arranged (in a like and preferred way) within the chamber-spaces of the frame. These features of the structural organization are illustrated in several of the views, including Figs. 11, 12 and $84^a$. In Figs. 11 and 12 (see also, Figs. 21 and $53^a$), the controller-member N is shown with the stem or main portion thereof located in said central or mid-zone $z^{40}$, while the bearing-arms $14^p$ and $14^p$ (Fig. 21) thereof extend into said side-zones $z^{30}$ and $z^{50}$, respectively. Likewise (as best shown in Fig. 22), the operating-arm and face, $17^e$, of the sear-member S, are shown disposed in said mid-zone $z^{40}$ of the frame-space, and are thus in proper position for coacting with the actuator-spring $14^a$ and lever $n$, which are also located in said mid-zone. The sear-member arms $17^f$, $17^f$, however, are located, respectively, in said side-zones $z^{30}$ and $z^{50}$, and there directly coact with the side-bearings of the controller-stem N (Fig. 11). The sear-face, which is here shown as comprising the areas at $17^b$ and $17^n$ for engaging the cock-notch of the hammer H, is similarly shown arranged in two parts,—that is, in duplicate,—with one part in each side-zone, and in position for engaging the duplicate cock-notch faces $8^j$, $8^j$, respectively.

The lower arms $17^e$, $17^e$, of the sear-member S, (Figs. 11, 12, 22), are also shown spaced apart, for passing forwardly and outside of the lower part or trigger-connector $14^b$ (Figs. 11, 21) of the member N, and thereby directly coact with the correspondingly-separated faces of the trigger F. The sear-member, therefore may be considered as a duplex sear, it being composed of the duplicated and connected lever-arms and faces forming one "sear" device connected, preferably in an integral manner, by the hub-portion, as clearly shown in the drawings, (see Fig. 22). The space, as $17^j$, Fig. 22, between the lower or trigger-actuated sear-arms, provides for properly locating and operating the actuator connection $8^b$, of the firing train, and permits the sear-member to be turned as illustrated in Fig. 4, where said lower arms pass by the sides of said actuator connection or rod $8^b$, which is located directly rearwardly of said controller stem $14^b$, and in the said mid-zone of the frame-space, (see Fig. 12). Said lower sear-arms, however, are brought near enough together for permitting the two stop-face arms, $7^e$, $7^e$, of the safety-member G, to pass outside of the sear-arms $17^d$, $17^d$, and thus reach to and coact directly with the hereinbefore described interlock-faces on the said laterally-extending portions of the controller-member N, (see Figs. 11 and 12). Thus,—in the present instance,—the coacting faces of the controller, the sear-member, the hammer and the safety-member, are arranged in pairs, each composed of one face in each said side-zones, so that in practical operation, the forces and resistances thereof are balanced and symmetrically applied, (relatively to a central, vertical plane), thereby avoiding any tendency of said mechanism parts to operate in an irregular or constrained manner, while permitting a free movement without undue play. But it will be understood, that in some instances, if desired, said lever-arms and coacting faces and pairs of faces in one of said side-zones, (as $z^{30}$, or $z^{50}$) may be omitted, and the mechanism be then operated without the balanced arrangement here explained, especially, may this be done when the controller-member is operably and retractively supported in a pivotal manner, as for instance, in Fig. 70 or Fig. 84, as elsewhere herein described.

The several modified constructions and improvements which are specially illustrated and described herein, and which, excepting so far as herein claimed broadly, or claimed in combination, are not specifically claimed in this application, constitute in part the subjects-matter of separate copending applications that are respectively identified as follows:

The improved barrel and frame connection and the guiding and control means appurtenant thereto, which is herein described, chiefly in connection with Figs. 3, 5, 9, 10, 40, 40ª, 74, 75, 79 and 79ª, but which is not specifically claimed herein constitutes subject-matter in a copending application Serial No. 370,830.

The improved shell-extractor devices and preferred constitution thereof herein illustrated in Figs. 28 to 34, inclusive, and in Figs. 38, 39, 39ª, (and incidentally indicated in part in other views), are not specifically claimed herein, but constitute subject-matter in a copending application Serial No. 371,861.

The improved trigger-mechanism, involving the actuating means appurtenant thereto and including the members F, and $f$,—see Figs. 3, 4, 9, 12,—is not specifically claimed herein, but constitutes subject-matter in a copending application Serial No. 344,675.

The improved magazine-lock,—this comprising the members M, $13^t$,—see Figs. 1, 3, 9, 41ª,—is not specifically claimed herein but constitutes subject-matter in a copending application Serial No. 344,419.

The improved connecting and releasing device between the frame B, and a grip-safety member, as G, and comprising the pivot or pin $g$ and parts $7^b$ see Figs. 3, 3ª, 41, 46,—is not specifically claimed herein, but constitutes subject-matter in a copending application Serial No. 344,676.

The modifications and improvements which are herein described in connection with the illustration thereof in Fig. 70, but which are not specifically claimed herein, constitute subject-matter in a copending application Serial No. 344,027.

The modifications and improvements which are herein described in connection with the illustration thereof in Figs. 71 and 71ª, but which are not specifically claimed herein, constitute subject-matter in a copending application Serial No. 345,177.

The modifications and improvements which are herein described and are illustrated in Figs. 76, 77 and 78, but which are not specifically claimed herein, constitute subject-matter in a copending application Serial No. 345,550.

The modifications and improvements which are herein described in connection with the illustration thereof in Figs. 80 to 83, inclusive, are not specifically claimed herein, but constitute subject-matter in a copending application Serial No. 344,677.

The modified arrangements and improvements which are herein described in connection with Fig. 84, are not specifically claimed herein, but constitute subject-matter in a copending application Serial No. 347,436.

The improvements which are herein described in the stocks or side-plates on the grip portion of the frame B, and the means for releasably holding such stocks, are not specifically claimed herein, but constitute subject-matter in a copending application, Serial No. 378,470.

Having thus described my invention I claim:

1. In a firearm, in combination, a frame, a breech action retractable on the frame and comprising a power-slide having a relatively long stroke and having therein a breech-block chamber, and having a firing-pin bearing located in said chamber midway of the width thereof, a breech-block located within said chamber of the slide, and arranged for a relatively short reciprocatory movement therein, and having an open space therein for said firing-pin bearing, and coacting stop-faces on the slide and the block in position for limiting said reciprocatory block-movement.

2. In a firearm, in combination, a frame, a breech action retractable on the frame and comprising a power-slide having a relatively long stroke and having therein a breech-block chamber, and having a firing-pin bearing located in said chamber midway of the width thereof and provided with a rearwardly-facing lock-face; a breech-block located within said chamber of the slide, and arranged for a relatively short reciprocatory movement therein, and having an open space therein for said firing-pin bearing; coacting stop-faces on the slide and the block in position and arranged for limiting said reciprocatory block-movement, and a fire-control action comprising a breech action-locking device in position and arranged for engaging and coacting with said lock-face.

3. In a firearm, in combination, a frame, a breech action retractable on the frame and comprising a power-slide having a relatively long stroke and having therein a breech-block chamber, and having a firing-pin bearing located in said chamber midway of the width thereof, a breech-block located within said chamber of the slide, and arranged for a relatively short reciprocatory movement longitudinally therein, and having an open space therein for said firing-pin bearing, and coacting stop-faces on the slide and the block in position for limiting said reciprocatory block-movement, and block-end lifting means including inclined faces in position and arranged for lifting one end of the breech-block at a time during the retraction of the breech-action.

4. In a firearm, in combination, a main operating slide retractable from a forward position through a loading-stroke and having a lock-face in position for use in forward position and also having the rearward portion of the guide-surface coöperative with a slide-locking member; a breech-bolt movably supported between the main-slide and the frame and having a detent-face in position for use in a retracted position of the main-slide and also having the forward portion of a guide-surface coöperative with a slide-locking member; breech-bolt-shifting means in position and arranged for forwardly shifting the breech-bolt relatively to the main-slide and thereby extend the guide-surface length during the retractive stroke of the main-slide, and a slide-locking member in position and arranged for engaging and releasing said lock-face and detent-face of the main-slide and breech-bolt, and for riding against said guide-surface during the said retractive stroke of the main-slide.

5. In a firearm, in combination, a main operating slide retractable from a forward position through a loading-stroke and having a lock-face in position for use in forward position and also having the rearward portion of a guide-surface coöperative with a slide-locking member; a breech-bolt movably supported between the main-slide and the frame having a detent-face in position for use in a retracted position of the main-slide and also having the forward portion of a guide-surface coöperative with a slide-locking member; breech-bolt-shifting means in position and arranged for forwardly shifting the breech-bolt relatively to the main-slide and thereby extend the guide-surface length during the retractive stroke of the main-slide, and a slide-locking member in position and arranged for engaging and releasing said lock-face and detent-face of the main-slide and breech-bolt, and for riding against said guide-surface during the said retractive stroke of the main-slide, a trigger, and locking-member-retracting means actuatable by the trigger for disengaging the locking-member from said detent face of the breech-bolt when the main slide is in the retractive position thereof.

6. In a firearm, in combination, a frame, a breech action retractable on the frame from a firing position and comprising a cartridge-supporting face, a shell-extractor operatively supported in the breech action contiguous to said cartridge-supporting face, and extractor-retracting means operatively connecting the extractor with the breech action and in position and arranged for drawing rearwardly the extractor while this relatively to the breech action is in a position which is forwardly of the firing position thereof, said breech action having an ejection port located with its rearward end adjacent to and forwardly of the extractor when both extractor and the breech action are in firing-position, and a shell-ejector face located in the path of the retracting cartridge-shell and at a position longitudinally of the frame which is forward of the fully retracted position of the extractor.

7. In a firearm, in combination, a frame, a breech action comprising a main-slide retractable on the frame from a firing-position and also comprising a breech-bolt having a cartridge-supporting face and a shell-extractor operatively supported in the breech action contiguous to said cartridge face; said breech-bolt being arranged for operatively connecting with the extractor and for drawing the extractor rearwardly within the breech action, and the breech action having an ejection port located with its rearward end adjacent to and forwardly of the extractor when both extractor and the breech action are in firing-position, a shell-ejector face located in the path of the retracting cartridge-shell and at a position longitudinally of the frame which is forward of the fully retracted position of the extractor, and breech-bolt-operating means in position and arranged for forwardly actuating the breech-bolt during the retraction of the main-slide and relatively thereto, and thereby bring the ejection port rearwardly to said cartridge-supporting face of the breech-bolt, before the shell-ejecting operation is begun.

8. In a firearm, in combination, a frame having an abutment-face constituting a power-stroke-limiter for a breech-block, a breech action retractable from a forward position through a loading-stroke, and comprising a main operating slide, and a slide-operated breech-block having at its forward end a cartridge-supporting face, and having in a fixed position thereon and at the rearward part thereof a frame-abutment-engaging face, and provided adjacent thereto with block-end-elevating means coöperative with the main-slide and in position and arranged for bodily elevating the rearward end of the breech-block and thereby elevate said frame-abutment-engaging face out of engagement with said frame abutment at a time subsequent to the completion of the power-stroke of the breech-block.

9. In a firearm, in combination, a frame having an abutment-face constituting a power-stroke-limiter for a breech-block, a breech action retractable from a forward position through a loading-stroke, and comprising a main operating slide; a slide-operated breech-block having at its forward end a cartridge-supporting face, and provided with a shell-extractor having the hook thereof adjacent to said cartridge-supporting face, and having in a fixed position thereon and at the rearward part thereof a frame-abutment-engaging face, and provided adjacent thereto with block-end-elevating means coöperative with the main-slide and in position and arranged for bodily elevating the rearward end of the breech-block and thereby elevate said frame-abutment-engaging face out of engagement with said frame-abutment at a time subsequent to the completion of the power-stroke of the breech-block, and a shell-ejector device in position and arranged for coacting with the shell-extractor at a time subsequent to said elevation of said rearward part of the breech-block.

10. In a firearm mechanism, the combination with a breech action retractable from a forward position through a loading-stroke and provided with a controller-operating actuator-face and with a guide-surface extending forwardly from said actuator-face, and having a release-space located forwardly of said guide-surface, of a firing-train having a firing-member, in coöperative relation with the breech action; a sear coöperative with the firing-member, a sear-actuating trigger, a reciprocatable controller-member in position and arranged for spring-actuation through a forward stroke into engagement with said actuator face when the breech action is in forward position and through a forward stroke into said release-space when the breech action is in a rearward position, and trigger-disconnection means appurtenant to the controller and trigger, said controller-member being in position and arranged for a positive actuation by said actuator-face through a retractive stroke during the initial part of the retractive-stroke of the breech action, whereby the sear and trigger disconnection is effected by an initial retractive movement of the breech action occurring while the firing-train is in firing-position, and whereby the resetting of the trigger-disconnection means in the sear-actuating position is effected when the breech action reaches the rearward end of its said retractive movement.

11. In a firearm mechanism comprising a breech action in coöperative relation with a firing-train and retractable from a forward position through a loading-stroke and provided with a combined lock-face and controller-operating actuator-face and a guide-surface extending forward from the actuator-face, and having a release-space located forwardly of said guide-surface, the combination with the breech action, of a firing-train in coöperative relation with the breech action and having appurtenant thereto a sear and a sear-actuating trigger, a breech action-locking controller member in position and arranged for spring-actuation through a forward stroke into locking engagement with said actuator-face when the breech action is in forward position and through a forward stroke into said release-space when the breech action is in rearward position, and for a positive actuation by said actuator-face through a retractive stroke during the initial part of the retractive-stroke of the breech action, trigger-disconnection means appurtenant to the controller and trigger, and a grip-operable safety-member in position and arranged for locking and releasing the controller member into and from engagement with said breech action combined lock-face and actuator-face, whereby sear and trigger-disconnection is effected by an initial retractive movement of the breech action subject to the control of a grip-operable safety-member, and whereby the resetting of the trigger-disconnection means in the sear-actuating position is effected when the breech action reaches the rearward end of its said retractive movement.

12. In a firearm mechanism, the combination with a breech action retractable from a forward position through a loading-stroke and provided with a controller-operating actuator-face and a guide-surface extending forwardly from said actuator-face, and having a release-space located forwardly of said guide-surface, of a firing-train in coöperative relation with the breech action and comprising a sear and a sear-actuating trigger, a combined trigger-shifter and controller-member in position and arranged for spring-actuation through a forward stroke into engagement with said actuator-face when the breech action is in forward position and through a forward stroke into said release-space when the breech action is in rearward position, and also for a positive actuation by said actuator-face through a retractive-stroke during the initial part of the retractive-stroke of the breech action, whereby the trigger is shifted into an ineffective position relatively to the sear by an initial retractive movement of the breech action occurring while the firing-train is in firing-position, and whereby the shifting of the trigger back to the sear-actuating position thereof, is effected when the breech action reaches the rearward end of its said retractive movement.

13. In a cartridge-actuatable firearm mechanism, the combination with a frame having a slideway for a breech action which is retractable from a forward position, and having a mechanism-chamber located between side-walls and extending downwardly from the breech action and provided with an abutment-block located adjacent to the breech action and in position for dividing the upper part of said chamber into a forward controller-space and a rearward firing-member compartment, and said abutment-block having a controller-abutment face and a power-stroke abutment face, of a breech action retractable along the slideway of the frame and having a lock-face which, when the breech action is in forward position, is located in a position forward of said controller-abutment, and also having a power-stroke-limiting face in position rearwardly of said controller-space, and when in said forward position also having a free space between said power-stroke-limiting face and the power-stroke abutment of the frame; a breech action-locking controller member operably located in said controller-space of the frame and in position and arranged for interposition between said lock-face of the breech action and said controller-abutment face of the frame, for locking the breech action in forward position; a firing-train comprising a firing-member operably supported in said firing-member compartment of the mechanism-chamber, and in position and arranged for making a firing-stroke while the breech action is in forward position, and controller-retracting means appurtenant to the firing-train and the controller-member and in position and arranged for retracting the controller before the completion of said firing-stroke, from between said breech action lock-face and said controller-abutment face for unlocking the breech action and thereby permit this action, after the completion of said firing-stroke, to retract and bring said power-stroke-limiting face against said power-stroke abutment of the frame.

14. In a cartridge-actuatable firearm mechanism, the combination with a frame having a slideway for a breech action which is retractable from a forward position, and having a mechanism-chamber located between side-walls and extending downwardly from the breech action and provided with an abutment-block located adjacent to the breech action and in position for dividing the upper part of said chamber into a forward controller-space and a rearward firing-member compartment, and said abutment-block having a controller-abutment face and a power-stroke abutment face, of a breech action retractable along the slideway of the frame and having a lock-face which, when the breech action is in forward position, is located in a position forward of said controller-abutment, and also having a power-stroke-limiting face in position rearwardly of said controller-space, and when in said forward position also having a free space between said power-stroke-limiting face and the power-stroke abutment face, a firing-member operably supported in said firing-member compartment, and a breech action-locking controller member operably located in said controller-space of the frame and in position and arranged for interposition between said lock-face and said controller-abutment face for locking the breech action in forward position, and thereby maintain said free space forward of the power-stroke-limiting face of the frame, while the firing-member is in firing-position.

15. In a cartridge-actuatable firearm mechanism, the combination with a frame having a slideway for a breech action which is retractable from a forward position, and having a mechanism-chamber located between side-walls and extending downwardly from the breech action and provided with an abutment-block located to the breech action and in position for dividing the upper part of said chamber into a forward controller-space and a rearward firing-member compartment, said abutment-block having a controller-abutment face and a power-stroke abutment face, of a breech action retractable along the slideway of the frame and having a lock-face which, when the breech-action is in forward position, is located in a position forward of said controller-abutment, and also having a power-stroke-limiting face in position rearwardly of said controller-space, and when in said forward position also having a free space between said power-stroke-limiting face and the power-stroke abutment face, and a fire-control action located within said mechanism chamber and comprising a firing-member operably located in the firing-member-compartment and coöperative with the breech action, and also comprising a breech action-locking controller-member operably located in said controller-space in coöperative relation to said breech action lock-face and to said controller-abutment face of the frame when the breech action is in forward position, the fire-control action also comprising a grip-operable safety-member in position and arranged for engaging and thereby blocking, on one stroke thereof, the controller-member against retraction.

16. In an auto-loading firearm, the combination with a frame and with a long-stroke power-slide slidably mounted on the frame and having therein a breech-block chamber located above the frame, of a breech-block located within said chamber in the power-slide and arranged for having a short-stroke movement longitudinally therein, and block-elevating and depressing means operatively-connecting the slide and the breech-block, and in position and coöperative for lowering the rearward block-end of said breech-block on the slide reaching the forward part of its stroke, and for raising said rearward block-end after the slide and block have together moved rearwardly from the firing position through a part of their stroke.

17. In an auto-loading firearm, the combination with a frame and with a long-stroke power-slide slidably mounted on the frame and having therein a breech-block chamber located above the frame, of a breech-block located within said chamber of the slide and arranged for having a short-stroke movement longitudinally therein, and a block-elevating and depressing means comprising a series of coacting stop-faces and guide-faces arranged on the frame and the slide and the breech-block, and in position and arranged for lowering the rearward block-end of said breech-block on the slide reaching the forward part of its stroke, and for raising said rearward block-end after the slide and block have together moved rearwardly from the firing-position through a part of their stroke.

18. In an auto-loading firearm, the combination with a frame and with a long-stroke power-slide slidably mounted on the frame and having therein a breech-block chamber located above the frame, of a breech-block located within said chamber in the power-slide and arranged for having a short-stroke movement longitudinally therein, and block-elevating and depressing means operatively-connecting the slide and the breech-block and in position and arranged for lowering the rearward block-end of said breech-block on the slide reaching the forward part of its stroke, and for raising said rearward block-end after the slide and block have moved rearwardly together through a part of their strokes, said block-elevating means comprising a pair of power-stroke-limiting faces of which one such face is on the breech-block and the other on the frame.

19. In an auto-loading firearm, the combination with a frame and with a long-stroke power-slide slidably mounted on the frame and having therein a breech-block chamber located above the frame, of a breech-block located within said chamber of the slide and arranged for having a short-stroke movement longitudinally therein, and a block-elevating and depressing means comprising a series of coacting stop-faces and guide-faces on the frame, the slide and the breech-block and in position and arranged for lowering the rearward block-end of said breech-block on the slide reaching the forward part of its stroke, and for raising said rearward block-end after the slide and block have together moved rearwardly from the firing-position through a part of their strokes, said series of faces including a pair of power-stroke-limiting faces of which one is on the breech-block and the other on the frame.

20. In an auto-loading firearm, in combination, a frame, a breech action having a power-slide retractable on the frame through a relatively long loading stroke, a breech-block cartridge-actuatable through a power-stroke and slidable on the frame, and in position and arranged for having a relatively short forward and rearward movement relatively to the power-slide; a pair of coacting power-stroke-limiting-faces located one on the frame and the other on the breech-block, in position and arranged for stopping the breech-block on the rearward movement thereof through a relatively short power-stroke; a pair of upwardly and forwardly inclined coacting power-transmission faces, on the breech-block and power-slide, respectively, and in position and arranged for operating the power-slide from the breech-block during the power-stroke of said block; a pair of block-depression stop-faces located on the breech-block and power-slide, respectively, and in position for the depression-face of the slide to pass over the depression face of the block on the completion of the forward movement of the slide, and hold the breech-block against lifting while the power-slide moves rearwardly through a time-interval subsequently to the breech-block reaching the end of its own power-stroke.

21. In an auto-loading firearm, in combination, a frame, a breech action having a power-slide retractable on the frame through a relatively long loading stroke, a breech-block cartridge-actuatable through a power-stroke and slidable on the frame, and in position and arranged for having a relatively short forward and rearward movement relatively to the power-slide; a pair of coacting power-stroke-limiting-faces located one on the frame and the other on the breech-block, in position and arranged for stopping the breech-block on the rearward movement thereof through a relatively short power-stroke; a pair of upwardly and forwardly inclined coacting power-transmission faces, on the breech-block and power-slide, respectively, and in position and arranged for operating the power-slide from the breech-block during the power-stroke of said block; a pair of block-depression stop-faces located on the breech-block and power-slide, respectively, and in position for the depression-face of the slide to pass over the depression-face of the block on the completion of the forward movement of the slide; and, block-end-lifting means operatively-connecting the breech-block and power-slide and arranged for lifting the block-end by the power-slide after the slide has moved rearwardly during a time-interval subsequently to the breech-block reaching the end of its own power-stroke, and thereby provide a time-interval in addition to the time-interval of the breech-block power-stroke, and between the end of the breech-block power-stroke and the inauguration of the breech-block retraction by the power-slide, whereby to release the breech-block from the said depression-face of the slide during such additional time-interval and prior to the beginning of the elevating-movement of the rearward end of the breech-block by the power-slide.

22. In an auto-loading firearm, in combination, a frame, a breech action having a power-slide retractable on the frame through a relatively long loading stroke, a breech-block cartridge-actuatable through a power-stroke and slidable on the frame, and in position and arranged for having a relatively short forward and rearward movement relatively to the power-slide; a pair of coacting power-stroke-limiting-faces located each in an upwardly and rearwardly inclined position at about the angle-of-repose, and located one on the frame and the other on breech-block, in position and arranged for stopping the breech-block on the rearward movement thereof through a relatively short power-stroke; a pair of upwardly and forwardly inclined coacting power-transmission faces, on the breech-block and power-slide, respectively, and in position and arranged for operating the power-slide from the breech-block during the power-stroke of said block; a pair of block-depression stop-faces located on the breech-block and power-slide, respectively, and in position for the depression-face of the slide to pass over the depression-face of the block on the completion of the forward movement of the slide; and, a pair of upwardly and forwardly inclined coacting block-operating faces located on the breech-block and power-slide, respectively, forwardly of said power-stroke-limiting-faces, and located with an intervening space when the mechanism is in firing position, and arranged for lifting the block-end by the power-slide after this slide has moved rearwardly during a time-interval subsequently to the breech-block reaching the end of its own power-stroke, and thereby provide a time-interval in addition to the time-interval of the breech-block power-stroke, and between the end of the breech-block power-stroke and the inauguration of the breech-block retraction by the power-slide, whereby to release the breech-block from the said depression-face of the slide during such additional time-interval and prior to the beginning of the elevating-movement of the rearward end of the breech-block by the power-slide.

23. In a firearm, in combination, a frame having slide-way surfaces for a main-slide and for a breech-block, a long-stroke main-slide engaging and slidable on said slide-way of the frame, and having therein a breech-block chamber; a breech-block located within said slide-chamber and movable with the main-slide along the slide-way surface of the frame, and arranged for a short stroke therein relatively to said stroke of the main-slide and having an opening in the forward face thereof for the point of a firing-pin, and also having therein a bearing-space; a firing-pin bearing depending from the main-slide and located within said bearing-space; a firing-pin slidably-supported in said firing-pin bearing, and having the point thereof projectable through the said opening in the breech-block face, when the slide and block are both advanced forwardly to their firing positions.

24. In a firearm, in combination, a frame having slide-way surfaces for a main-slide and for a breech-block, a long-stroke main-slide engaging and slidable on said slide-way of the frame, and having therein a breech-block chamber; a breech-block located within said slide-chamber and movable with the main-slide along the slide-way surface of the frame, and arranged for a short stroke therein relatively to said stroke of the main-slide and having an opening in the forward face thereof for the point of a firing-pin, and also having therein a bearing-space; a firing-pin bearing depending from the main-slide and located within said bearing-face; a firing-pin slidably-supported in said firing-pin bearing, and having the point thereof projectable through the said opening in the breech-block face, when the slide and block are both advanced forwardly to their firing positions; and block-shifting means coöperative with and as between the frame, the breech-block and the main-slide, and in position and arranged for advancing the breech-block relatively to the main-slide during the retraction of said slide and block and thereby withdraw the firing-pin into an inoperative position relatively to the face of the breech-block, and safeguard a fresh cartridge from being accidentally fired during the next succeeding loading operation.

25. In a firearm, in combination, a frame having slide-way surfaces for a main-slide and for a breech-block, a long-stroke main-slide engaging and slidable on said slide-way of the frame, and having therein a breech-block chamber; a breech-block located within said slide-chamber and movable with the main-slide along the slide-way surface of the frame, and arranged for a short stroke therein relatively to said stroke of the main-slide and having an opening in the forward face thereof for the point of a firing-pin, and also having therein a bearing-space; a firing-pin bearing depending from the main-slide and located within said bearing-space; a firing-pin slidably-supported in said firing-pin bearing, and having the point thereof projectable through the said opening in the breech-block face, when the slide and block are both advanced forwardly to their firing positions; a firing-train having a firing-member in position and arranged for striking the firing-pin when the main-slide is in said forward position, and a combined controller and locking device coöperative with the slide and also with the firing-train, and in position and arranged for locking the main-slide in forward position, and for blocking the approach of the firing-member to the firing-pin when the main-slide is not unlocked ready for retraction on the firing of a cartridge.

26. In an auto-loading firearm, a breech mechanism comprising a reciprocatory breech-block having a forwardly-facing detent-face, in combination with a reciprocatory trigger-shifting controller having a stop-face in position for engaging forwardly of said breech-block detent-face when the breech-block is in a fully retracted position, and also having trigger-guiding means, a trigger, a sear-member actuatable by the trigger and having actuating means in position and arranged for retractively operating the controller for withdrawing the said stop-face from the breech-block concurrently with the shifting of the trigger to an ineffective position.

27. In an auto-loading firearm, a breech mechanism comprising a reciprocatory breech-block having a forwardly-facing detent-face, in combination with a vertically movable trigger-shifting slide having at the upper end thereof a stop-face in position for engaging said breech-block detent-face when the breech-block is in a fully retracted position, and having near the lower end thereof a trigger-engaging guide-way, a trigger operatively engaging with said guide-way, and actuating means operatively-intermediate to the trigger and slide, and in position and arranged for retractively operating the slide and thereby withdraw the said stop-face from and thereby release the breech-block while shifting the trigger to an ineffective position.

28. In a firearm mechanism, the combination with a cartridge-actuatable power-slide provided with a firing-pin and having a lock-face, a hammer in position for coacting with the power-slide and firing-pin, of a slide-lock in position for engaging said lock-face when the power-slide is in forward position, and slide-lock-retracting means operatively-intermediate to the slide-lock and the hammer and arranged for actuation by the hammer during the firing-stroke thereof, said slide-lock and retracting means being also arranged for timing the movement of the slide-lock relatively to the firing-stroke of the hammer for only withdrawing said slide-lock out of the path of said lock-face when the hammer has approached near to and is about to strike the firing-pin.

29. In an auto-loading firearm mechanism, in combination, a breech action comprising a slidably-supported breech-bolt arranged for a loading-stroke in excess of the length of a cartridge suitable for use in the firearm, and also comprising a main operating-slide provided with a firing-device and arranged for a forward working-stroke in excess of the loading-stroke of the breechbolt, and having a lock-face in position, when said operating-slide is at the forward end of said excess stroke, for coaction with a lock-face of a controller-train member, of a slide-locking controller-train comprising a member having a face in position for actuation into engagement with said lock-face of the operating-slide when this slide is in forward position, thereby to lock the slide and through this to lock the breechbolt in firing position, and a firing-train coöperative with the firing-device and also coöperative with the controller-train and arranged for unlocking said operating slide from the firing movement of the firing-train.

30. In a firearm mechanism having a breech action comprising a breechbolt arranged for a loading-stroke of a length in suitable correspondence with a cartridge-length and also comprising a main carrier arranged for a forward working-stroke in excess of the loading-stroke of the breechbolt, and also provided with a lock-face in position when said main carrier is at the forward end of said excess stroke, for coaction with a locking-face of a controller-train, the combination with the breech action, of a carrier-locking controller-train comprising a locking-member having a locking-face in position for engaging said lock-face and thereby lock the carrier and the breechbolt in firing position, and also comprising a locking-member-blocking safety-member grip-operable into a locking-member-releasing position for thereby also unlocking the carrier and breechbolt prior to the firing of a cartridge.

31. In a firearm mechanism having a breech action comprising a breechbolt arranged for a loading-stroke of a length in suitable correspondence with a cartridge-length and also comprising a main carrier provided with a firing-device and arranged for a forward working-stroke in excess of the loading-stroke of the breechbolt, and also provided with a lock-face in position when said main carrier is at the forward end of said excess stroke, for coaction with a locking-face of a controller-train, the combination with the breech action of a carrier-locking controller-train comprising a locking-member having a locking-face in position for actuation into an engageable position relatively to said lock-face of the main carrier when this carrier is in forward position and thereby lock the breechbolt in firing position; a firing-train coöperative with the firing-device and also coöperative with the controller-train and arranged therewith for first unlocking the said carrier and breechbolt and for operating the firing device, the controller-train also comprising locking-member-blocking safety-member grip-operable into a locking-member-releasing position.

32. In a firearm mechanism having a breech action comprising a breechbolt arranged for a loading-stroke of a length in suitable correspondence with a cartridge-length and also comprising a main carrier retractable from a forward position and which is provided with a firing-device and is arranged for a forward working-stroke in excess of the loading stroke of the breechbolt, and which is also provided with a lock-face in position when said main carrier is at the forward end of said excess stroke, for coaction with a lock-face of a controller-train, the combination with the breech action, of a carrier-locking controller-train comprising a locking-member having a face in position for actuation into an engageable position relatively to said lock-face of the main carrier when this carrier is in forward position, thereby to lock said carrier and through this to lock the breechbolt in firing position, and a locking-member-retracting firing-train coöperative with the firing-device and also coöperative with the controller-train and arranged therewith for first unlocking said main carrier and for then operating the firing device.

33. In a firearm mechanism having a breech action comprising a breechbolt arranged for a loading-stroke of a length in suitable correspondence with a cartridge-length and also comprising a main carrier consisting of a main operating-slide which is provided with a firing-device and is arranged for a forward working-stroke in excess of the loading-stroke of the breechbolt, and which is also provided with a lock-face in position when said operating-slide is at the forward end of said excess stroke, for coaction with a lock-face of a controller-train, the combination with the breech action of a slide-locking controller-train comprising a locking-member having a face in position for actuation into an engageable position relatively to said lock-face of the main operating slide when this slide is in forward position, thereby to lock said slide and through this to lock the breechbolt in firing position, and a locking-member-retracting firing-train coöperative with the firing-device and also coöperative with the controller-train and arranged therewith for first unlocking said main-slide and for then operating the firing device.

34. In a firearm comprising a frame and a power-slide slidable on the frame, the combination with the power-slide of a breech-block slidable on the frame and within the power-slide, and a controller-stop in position and arranged for engaging a forward part of the breech-block for holding this block and the slide in their retracted position and with the block in its forward position relatively to the power-slide, and a trigger-mechanism and connections coöperative with said stop for withdrawing the stop and thereby releasing the block and slide.

35. In a firearm, a frame having slideways for a long-stroke power-slide, a power-slide fitted to slide on said slide-ways and having a space between the slide and frame for a breech-block, and a breech-block slidable on the frame and located between the slide and frame, and arranged for a short-stroke relatively to the slide-stroke, and series of guiding and block-actuating bearing-faces comprising block-lifting and block-retracting faces arranged some on the slide and others on the block and comprising a pair of inclined faces for first elevating one end of the block and then drawing the block backwardly with the slide.

36. In an auto-loading firearm, in combination, a frame having guides for a power-slide and for a power-slide-actuating breech-block, and having an abutment-face in position for limiting the power-stroke of, and thereby initially stopping said block; a sliding-and-tilting breech-block in position and arranged for having a non-tilting power-stroke and provided with a power-stroke-limiting face for engaging said stroke-limiting abutment-face of the frame at the termination of the power-stroke, and having a power-transmitting face for engaging and actuating the power-slide during the power-stroke thereof; and a series of coacting block-actuating devices on and connecting the slide and breech-block, and in position and arranged for only coming into operative engagement after the power-slide has moved backward through a distance and at time-interval for allowing the projectile to be discharged and the gas pressure to be reduced subsequently to the initial stopping of the breech-block, and also arranged for first tilting and then further retracting the breech-block along with the power-slide through a loading-stroke.

37. In a firearm mechanism comprising a breech action in coöperative relation with a firing-member and retractable from a forward position through a loading-stroke and provided with a locking-member-actuating lock-face, the combination with the breech action of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive stroke during the initial part of the retractive-stroke of the breech action, and movement-resisting means operatively connecting said locking-member and the firing-member, and located in position and arranged for resisting the forward stroke of the firing-member when both the breech action and said locking-member are in forward position, and for withdrawing such resistance on the initial retractive movement of the breech action.

38. In a firearm mechanism comprising a breech action in coöperative relation with a firing-member and retractable from a forward position through a loading-stroke and provided with a locking-member-actuating lock-face, the combination with the breech action of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech-action, and movement-resisting means comprising an actuator-device appurtenant to the firing-member, and operatively connecting said locking-member and the firing-member, and located in position and arranged for resisting the forward stroke of the firing-member when both the breech action and said locking-member are in forward position, and for withdrawing such resistance on the initial retractive movement of the breech action.

39. In a firearm mechanism comprising a breech action in coöperative relation with a firing-member and retractable from a forward position through a loading-stroke and provided with a locking-member-actuating lock-face, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising an actuator-device consisting of a cam-face appurtenant to the firing-member, and operatively connecting said locking-member and the firing-member, and located in position and arranged for resisting the forward stroke of the firing-member when both the breech action and said locking-member are in forward position, and for withdrawing such resistance on the initial retractive movement of the breech action.

40. In a firearm mechanism comprising a breech action in coöperative relation with a firing-member and retractable from a forward position through a loading-stroke and provided with a locking-member-actuating lock-face, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through a forward stroke thereof, and for a positive actuation through a retractive-stroke during the initial part of the retractive-stroke of the breech action, and movement-resisting means comprising a lever-device and also comprising an actuator-device appurtenant to the firing-member, and operatively connecting said locking-member and the firing-member, and located in position and arranged for resisting the forward stroke of the firing-member when both the breech action and said locking-member are in forward position, and for withdrawing such resistance on the initial retractive movement of the breech action.

41. In a firearm mechanism comprising a breech action in coöperative relation with a firing-member and retractable from a forward position through a loading-stroke and provided with a locking-member-actuating lock-face, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising a lever portion of a sear-member having therein a lever-device, and also comprising a lever-actuating cam carried on the firing-member, said movement resisting means being arranged for operatively connecting said locking-member and the firing-member, and located in position and arranged for resisting the forward stroke of the firing-member when both the breech action and said locking-member are in forward position, and for withdrawing such resistance on the initial retractive movement of the breech action.

42. In a firearm mechanism comprising a breech action in coöperative relation with a firing-member and retractable from a forward position through a loading-stroke and provided with a locking-member-actuating lock-face, the combination with the breech action of a firing-member in coöperative relation with the breech action and arranged for a forward firing-stroke and for a retractive-stroke to firing-position; a breech action-locking member operatively supported in position for engaging with the lock-face of the breech action when this action is in forward position, and also arranged for spring-actuation through a forward stroke into a firing-member-resisting position, and for a positive actuation by said lock-face through a retractive-stroke during the retractive-stroke of the breech action made while the firing-member is in firing-position; and movement-resisting means operatively connecting said locking-member and the firing-member, and located in position and arranged for resisting the forward stroke of the firing member when both the breech action and said locking-member are in forward position, and a locking-member-blocking safety-member in position and arranged for a working stroke in one direction into a blocking-engagement with the locking-member when this member is in the lock-face-engaging position thereof, and thereby positively hold the breech action in forward position, and also arranged for a grip-operable stroke in a direction opposite to said working-stroke for unlocking the locking-member and thereby permit the breech action during a said retractive-stroke thereof made while the firing-member is in firing-position, also to retract the locking-member and withdraw the movement-resisting means from the firing-member-resisting position thereof, and without releasing the firing-member from said firing-position thereof.

43. In a firearm mechanism comprising a breech action in coöperative relation with a firing-member and retractable from a forward position through a loading-stroke and provided with a locking-member-actuating lock-face, the combination with the breech action, of a firing-member in coöperative relation with the breech action and arranged for a forward firing-stroke and for a retractive-stroke to firing position; a breech action-locking member operatively supported in position for engaging with the lock-face of the breech action when this action is in forward position, and also arranged for spring-actuation through a forward stroke into a firing-member-resisting position, and for a positive actuation by said lock-face through a retractive-stroke during the retractive-stroke of the breech action made while the firing-member is in firing-position; and movement resisting means comprising an actuator-device appurtenant to the firing-member and operatively connecting said locking-member and the firing-member, and located in position and arranged for resisting the forward stroke of the firing-member when both the breech action and said locking-member are in forward position, and a locking-member-blocking safety-member in position and arranged for a working-stroke in one direction into a blocking-engagement with the locking-member when this member is in the lock-face-engaging position thereof, and thereby positively hold the breech action in forward position, and also arranged for a grip-operable stroke in a direction opposite to said working-stroke for unblocking the locking-member and thereby permit the breech action during a said retractive-stroke thereof made while the firing-member is in firing-position, also to retract the locking-member and withdraw the movement-resisting means from the firing-member-resisting position thereof, and without releasing the firing-member from said firing-position thereof.

44. In a firearm mechanism comprising a breech action in coöperative relation with a firing-member and retractable from a forward position through a loading-stroke and provided with a locking-member-actuating lock-face, the combination with the breech action, of a firing-member in coöperative relation with the breech action and arranged for a forward firing-stroke and for a retractive-stroke to firing position; a breech action-locking member operatively supported in position for engaging with the lock-face of the breech action when this action is in forward position, and also arranged for spring-actuation through a forward stroke into a firing-member-resisting position, and for a positive actuation by said lock-face through a retractive-stroke during the retractive-stroke of the breech action made while the firing member is in firing-position; and movement resisting means comprising an actuator consisting of a cam-face appurtenant to the firing-member, and operatively connecting said locking-member and the firing-member, and located in position and arranged for resisting the forward stroke of the firing-member when both the breech action and said locking-member are in forward position, and a locking-member-blocking safety-member in position and arranged for a working-stroke in one direction into a blocking-engagement with the locking-member when this member is in the lock-face-engaging position thereof, and thereby positively hold the breech action in forward position, and also arranged for a grip-operable stroke in a direction opposite to said working-stroke for unblocking the locking-member and thereby permit the breech action during a said retractive-stroke thereof made while the firing-member is in firing-position, also to retract the locking-member and withdraw the movement-resisting means from the firing-member-resisting position thereof, and without releasing the firing - member from said firing - position thereof.

45. In a firearm mechanism comprising a breech action in coöperative relation with a firing-member and retractable from a forward position through a loading-stroke and provided with a locking-member-actuating lock-face, the combination with the breech action, of a firing-member in coöperative relation with the breech action and arranged for a forward firing-stroke and for a retractive-stroke to firing-position; a breech action-locking member operatively supported in position for engaging with the lock-face of the breech action when this action is in forward position, and also arranged for spring-actuation through a forward stroke into a firing-member-resisting position, and for a positive actuation by said lock-face through a retractive-stroke during the retractive-stroke of the breech action made while the firing-member is in firing-position; and movement resisting means comprising a lever-device and also comprising an actuator-device appurtenant to the firing-member, and operatively connecting said locking-member and the firing-member, and located in position and arranged for resisting the forward stroke of the firing-member when both the breech action and said locking-member are in forward position, and a locking-member-blocking safety-member in position and arranged for a working-stroke in one direction into a blocking-engagement with the locking-member when this member is in the lock-face-engaging position thereof, and thereby positively hold the breech-action in forward position, and also arranged for a grip-operable stroke in a direction opposite to said working-stroke for unblocking the locking-member and thereby permit the breech action during a said retractive-stroke thereof made while the firing-member is in firing-position, also to retract the locking-member and withdraw the movement-resisting means from the firing-member-resisting position thereof, and without releasing the firing-member from said firing-position thereof.

46. In a firearm mechanism comprising a breech action in coöperative relation with a firing-member and retractable from a forward position through a loading-stroke and provided with a locking-member-actuating lock-face, the combination with the breech action, of a firing-member in coöperative relation with the breech action and arranged for a forward firing-stroke and for a retractive-stroke to firing position; a breech action-locking member operatively supported in position for engaging with the lock-face of the breech action when this action is in forward position, and also arranged for spring-actuation through a forward stroke into a firing-member-resisting position, and for a positive actuation by said lock-face through a retractive-stroke during the retractive-stroke of the breech action made while the firing-member is in firing-position; and movement resisting means comprising a lever portion of a sear-member having therein a lever-device, and also comprising a lever-actuating cam carried on the firing-member, said movement-resisting means being arranged for operatively connecting said locking-member and the firing-member, and located in position and arranged for resisting the forward stroke of the firing-member when both the breech action and said locking-member are in forward position, and a locking-member-blocking safety-member in position and arranged for a working-stroke in one direction into a blocking-engagement with the locking-member when this member is in the lock-face-engaging position thereof, and thereby positively hold the breech action in forward position, and also arranged for a grip-operable stroke in a direction opposite to said working-stroke for unblocking the locking-member and thereby permit the breech action during a said retractive-stroke thereof made while the firing-member is in firing-position, also to retract the locking-member and thereby withdraw the movement-resisting means from the firing-member-resisting position thereof, and without releasing the firing-member from said firing-position thereof.

47. In a firearm mechanism comprising a breech action in coöperative relation with a firing-member and retractable from a forward position through a loading-stroke and provided with a locking-member-actuating lock-face, the combination therewith of a fire-control action which comprises a firing-member pivotally-supported in coöperative relation with the breech action and arranged for a forward stroke and for a retractive - stroke, a breech action - locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement - resisting means operatively connecting said slidable locking-member and the firing-member, and located in position and arranged for resisting the forward stroke of the firing-member when both the breech action and said locking-member are in forward position, and for withdrawing such resistance on the initial retractive movement of the breech action.

48. In a firearm mechanism comprising a breech action in coöperative relation with a firing-member and retractable from a forward position through a loading-stroke and provided with a locking-member-actuating lock-face, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising an actuator-device appurtenant to the firing-member, and operatively connecting said slidable locking-member and the firing-member, and located in position and arranged for resisting the forward stroke of the firing-member when both the breech action and said locking-member are in forward position, and for withdrawing such resistance on the initial retractive movement of the breech action.

49. In a firearm mechanism comprising a breech action in coöperative relation with a firing-member and retractable from a forward position through a loading-stroke and provided with a locking-member-actuating lock-face, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising an actuator-device consisting of a cam-face appurtenant to the firing-member, and operatively connecting said slidable locking-member and the firing-member, and located in position and arranged for resisting the forward stroke of the firing-member when both the breech action and said locking-member are in forward position, and for withdrawing such resistance on the initial retractive movement of the breech action.

50. In a firearm mechanism comprising a breech action in coöperative relation with a firing-member and retractable from a forward position through a loading-stroke and provided with a locking-member-actuating lock-face, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereon, and for a positive actuation through a retractive-stroke during the initial part of the retractive-stroke of the breech action, and movement-resisting means comprising a lever-device and also comprising an actuator-device appurtenant to the firing-member, and operatively connecting said slidable locking-member and the firing-member, and located in position and arranged for resisting the forward stroke of the firing-member when both the breech action and said locking-member are in forward position, and for withdrawing such resistance on the initial retractive movement of the breech action.

51. In a firearm mechanism comprising a breech action in coöperative relation with a firing-member and retractable from a forward position through a loading-stroke and provided with a locking-member-actuating lock-face, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising a lever portion of a sear-member having therein a lever-device, and also comprising a lever-actuating cam carried on the firing-member, said movement-resisting means being arranged for operatively connecting said slidable locking-member and the firing-member, and located in position and arranged for resisting the forward stroke of the firing-member when both the breech action and said locking-member are in forward position, and for withdrawing such resistance on the initial retractive movement of the breech action.

52. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means operatively connecting said locking-member and the firing-member, and also located in position and arranged for resisting the forward stroke of the firing-member when both the breech action and said locking-member are in forward position, and also arranged for withdrawing such resistance on the initial retractive movement of the breech action, and for the locking-member, by the spring-actuation thereof, to engage in said release-space when the breech action reaches the rearward end of the loading-stroke.

53. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position, and also arranged for spring-actuation through the forward stroke thereof, and for a positive actuation through a retractive-stroke during the initial part of the retractive-stroke of the breech action, and movement-resisting means comprising an actuator-device appurtenant to the firing-member, and operatively connecting said locking-member and the firing-member, and also located in position and arranged for resisting the forward stroke of the firing-member when both the breech action and said locking-member are in forward position, and also arranged for withdrawing such resistance on the initial retractive movement of the breech action, and for the locking member, by the spring-actuation thereof, to engage in said release-space when the breech action reaches the rearward end of the loading-stroke.

54. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising an actuator consisting of a cam-face appurtenant to the firing-member, and operatively connecting said locking-member and the firing-member, and also located in position and arranged for resisting the forward stroke of the firing-member when both the breech action and said locking-member are in forward position and also arranged for withdrawing such resistance on the initial retractive movement of the breech action, and for the locking-member, by the spring-actuation thereof, to engage in said release-space when the breech action reaches the rearward end of the loading-stroke.

55. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising a lever-device and also comprising an actuator-device appurtenant to the firing-member, and operatively connecting said locking-member and the firing-member, and also located in position and arranged for resisting the forward stroke of the firing-member when both the breech action and said locking-member are in forward position, and also arranged for withdrawing such resistance on the initial retractive movement of the breech action, and for the locking-member, by the spring-actuation thereof, to engage in said release-space when the breech action reaches the rearward end of the loading-stroke.

56. In a firearm mechanism comprising a breech action in coöperative relation with a firing-member and retractable from a forward position through a loading-stroke and provided with a locking-member-actuating lock-face, a guide-surface extending forward of said lock face, the combination therewith of a fire-control action which comprises a firing-member in coöperative relation with the breech action and arranged for a forward stroke and for a retractive-stroke, a breech action-locking member operatively supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising a lever portion of a sear-member having therein a lever-device, and also comprising a lever-actuating cam carried on the firing-member, said movement-resisting means being arranged for operatively connecting said locking-member and the firing-member, and also located in position and arranged for resisting the forward stroke of the firing-member when both the breech action and said locking-member are in forward position, and also arranged for withdrawing such resistance on the initial retractive movement of the breech action, and for the locking-member, by the spring-actuation thereof, to engage in said release-space when the breech action reaches the rearward end of the loading-stroke.

57. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means operatively connecting said slidable locking-member and the firing-member, and also located in position and arranged for resisting the forward stroke of the firing-member when both the breech action and said locking-member are in forward position, and also arranged for withdrawing such resistance on the initial movement of the breech action, and for the locking-member, by the spring-actuation thereof, to engage in said release-space when the breech action reaches the rearward end of the loading-stroke.

58. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member pivotally-supported in coöperative relation with the breech action and arranged for a forward stroke, and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising an actuator-device appurtenant to the firing-member, and operatively connecting said slidable locking-member and the firing-member, and also located in position and arranged for resisting the forward stroke of the firing-member when both the breech action and said locking-member are in forward position, and also arranged for withdrawing such resistance on the initial retractive movement of the breech action, and for the locking-member, by the spring-actuation thereof, to engage in said release-space when the breech action reaches the rearward end of the loading stroke.

59. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising an actuator consisting of a cam-face appurtenant to the firing-member, and operatively connecting said slidable locking-member and the firing-member, and also located in position and arranged for resisting the forward stroke of the firing-member when both the breech action and said locking-member are in forward position and also arranged for withdrawing such resistance on the initial retractive movement of the breech action, and for the locking-member, by the spring-actuation thereof, to engage in said release-space when the breech action reaches the rearward end of the loading-stroke.

60. In a firearm mechanism comprising a breech action in coöperative relation with a firing-member and retractable from a forward position through a loading-stroke and provided with a locking-member-actuating lock-face and a guide-surface extending forward from the lock-face, and having a release-space located forwardly of said guide-surface, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising a lever-device and also comprising an actuator appurtenant to the firing-member, and operatively connecting said slidable locking-member and the firing-member, and also located in position and arranged for resisting the forward stroke of the firing-member when both the breech action and said locking-member are in forward position and also arranged for withdrawing such resistance on the initial retractive movement of the breech action, and for the locking-member, by the spring-actuation thereof, to engage in said release-space when the breech action reaches the rearward end of the loading-stroke.

61. In a firearm mechanism comprising a breech action in coöperative relation with a firing-member and retractable from a forward position through a loading-stroke and provided with a locking-member-actuating lock-face, a guide-surface extending forward of said lock face, the combination therewith of a fire-control action which comprises a firing-member pivotally-supported in coöperative relation with the breech action and arranged for a forward stroke and for a retractive-stroke, a breech action-locking member operatively and slidably supported in position for coacting with the lock-face of the breech action when this action is in forward position and also arranged for spring-actuation through the forward stroke thereof, and for a positive actuation through a retractive-stroke during the initial part of the retractive-stroke of the breech action, and movement-resisting means comprising a lever portion of a sear-member having therein a lever-device, and also comprising a lever-actuating cam carried on the firing-member, said movement-resisting means being arranged for operatively connecting said slidable locking-member and the firing-member, and also located in position and arranged for resisting the forward stroke of the firing-member when both the breech action and said locking-member are in forward position, and also arranged for withdrawing such resistance on the initial retractive movement of the breech action, and for the locking-member, by the spring-actuation thereof, to engage in said release-space when the breech action reaches the rearward end of the loading-stroke.

62. In a firearm, the combination with a breech action having a main operating-slide which is retractable from a forward position through a loading-stroke and is provided with an actuator-face, and with a firing-train having a firing-member which is located in position and arranged for making a firing-stroke when the breech action is in forward position, and is provided with an actuator-device, of a sear and a sear-actuating trigger, and trigger-and-sear disconnection means in position intermediate to and operatively connecting the breech action, the firing-member and the trigger, and arranged for actuation in a direction for the operative disconnection of the trigger and sear by the said actuator-face of the slide on the retractive movement of the slide while the firing-member is in firing-position, and also for operation in the same direction by the said actuator-device of the firing-member when the firing-member makes its firing-stroke while the breech action is in forward position.

63. In a firearm, the combination with a breech action which is retractable from a forward position through a loading-stroke and is provided with an actuator-face, of a firing-train having a firing-member which is located in position and arranged for making a firing-stroke when the breech action is in forward position, and is provided with an actuator-device; a sear and a sear-actuating trigger, and trigger-and-sear disconnection means in position intermediate to and operatively connecting the breech action, the firing-member and the trigger, and arranged for actuation in a direction for the operative disconnection of the trigger and sear by the said breech action actuator-face on the retractive movement of the breech action while the firing-member is in firing-position, and also arranged for operation in the same direction by the said actuator-device of the firing-member when the firing-member makes its firing-stroke while the breech-action is in forward position, and a safety-member spring-actuated in one direction and grip-operable in a reverse direction, and located in position and arranged for blocking, when in the spring-actuated position thereof, the said disconnection means against operation by the breech action and also against operation by the firing-member, and thereby also resisting the retractive movement of the breech action and the firing-stroke of the firing-member.

64. In a firearm mechanism, the combination with a breech action comprising a main operating slide supported for a retractive movement from a forward position, and with a safety-member grip-operable from a rearward safety-position to a forward non-safety and firing-position and having a rearwardly-facing interlock-face, of a slide-lock member operable into a slide-locking position and retractable to a slide-releasing position, and having a forwardly-facing interlock-face in position for engaging the rearwardly-facing interlock-face of the safety-member when the safety-member is in forward position and the slide-lock is in retracted position, and a firing-train member provided with a slide-lock-actuator in position and arranged for actuating during a forward stroke of the firing-train, the slide-lock into engagement with the said safety-member interlock-face when the safety-member is in forward position, and thereby prevent the retraction of the safety-member during said firing-stroke.

65. In a firearm mechanism, the combination with a breech action comprising a main operating slide supported for a retractive movement from a forward position, and with a safety-member grip-operable from a rearward safety-position to a forward non-safety and firing-position and having a rearwardly-facing interlock-face, of a slide-lock member operable into a slide-locking position and retractable to a slide-releasing position, and having a forwardly-facing interlock-face in position for engaging the rearwardly-facing interlock-face of the safety-member when the safety-member is in forward position and the slide-lock is in retracted position, and a firing-train member provided with a slide-lock-actuator in position and arranged for actuating during a forward stroke of the firing-train, the said slide-lock into engagement with the said safety-member interlock-face when the safety-member is in forward position, and thereby prevent the retraction of the safety-member during said firing stroke, and a guide-surface in position on the breech action for engaging and holding the slide-lock retracted during a retractive movement of said operating slide, and thereby continue the locking of the safety-member in forward position during the retraction of the firing-train member after a firing-stroke thereof.

66. In a firearm mechanism comprising a breech-action retractable through a loading-stroke and coöperative with a firing-member and with a locking-member, the combination with the breech action of a fire-control action which comprises a firing-member and a breech action-locking member each arranged for a forward stroke and for a retractive stroke, and which also comprises a movement-resisting means operatively connecting said locking-member and firing-member and in position and arranged for resisting the forward stroke of each one said member when the other said member is in forward stroke position.

67. In a firearm mechanism comprising a breech-action retractable through a loading-stroke from a forward position and coöperative with a firing-member and with a locking-member, the combination with the breech action of a fire-control action which comprises a firing-member and a breech action-locking member each arranged for a forward stroke and for a retractive stroke, and which also comprises a movement-resisting means operatively connecting said locking-member and firing-member and in position and arranged for resisting the forward stroke of the firing-member when the breech action and said locking-member are both in forward position.

68. In a firearm mechanism comprising a breech action retractable through a loading-stroke from a forward position and coöperative with a firing-member and with a locking member, the combination with the breech action of a fire-control action which comprises a firing-member arranged for a forward stroke and for a retractive-stroke, a breech action-locking member slidably-supported in a position transversely of the breech action, and also arranged for a forward stroke and for a retractive-stroke, and movement-resisting means operatively connecting said slidable locking-member and the firing-member, and in position and arranged for resisting the forward stroke of the firing-member when the breech action and said locking-member are both in forward position.

69. In a firearm mechanism comprising a breech action retractable through a loading-stroke and coöperative with a firing-member and with a locking-member, the combination with the breech action of a fire-control action which comprises a firing-member and a breech action - locking member each arranged for a forward stroke and for a retractive-stroke, and which also comprises a movement-resisting means consisting of an actuator-device appurtenant to the firing-member and combined with movement-transmitting means in operative connection with the locking-member, and in position and arranged for resisting the forward stroke of the firing member when the locking-member is in forward stroke position.

70. In a firearm mechanism comprising a breech action retractable through a loading-stroke and coöperative with a firing-member and with a locking-member, the combination with the breech-action of a fire-control action which comprises a firing-member and with a breech action-locking member each arranged for a forward stroke and for a retractive-stroke, and which also comprises a movement-resisting means consisting of a cam-face actuator-device combined with movement-transmitting means consisting of a lever-device in operative connection with the locking-member, and in position and arranged for resisting the forward stroke of the firing member when the locking-member is in forward stroke position.

71. In a firearm mechanism comprising a breech action retractable through a loading-stroke and coöperative with a firing-member and with a locking-member, the combination with the breech action of a fire-control action which comprises a firing-member and a slidably - supported breech action - locking member each arranged for a forward stroke and for a retractive-stroke, and which also comprises a movement-resisting means consisting of a cam-face on the firing-member combined with movement - transmitting means in operative connection with the said locking-member, and in position and arranged for resisting the forward stroke of the firing-member when the locking-member is in forward stroke position.

72. In a firearm mechanism comprising a reciprocatory member constituting a main operating member and main-carrier which is retractable from a firing-position and is provided with a firing-device and with a lock-face, the combination with the main-carrier, of a firing-train comprising a hammer in position and arranged to operate the firing-device on the forward stroke of the hammer when the reciprocatory main-carrier is in firing-position, a carrier-locker in position for engaging said lock-face of the main-carrier and thereby lock this carrier member in firing-position, and locker-actuating means appurtenant to and operable with the hammer and arranged for retracting the carrier-locker toward an ineffective position relatively to the main-carrier, and at a time during the firing-stroke of the hammer.

73. In a firearm mechanism comprising a reciprocatory member constituting a main operating member and main-carrier which is provided with a firing-device and with a lock-face, the combination with the main-carrier, of a firing-train comprising a hammer in position and arranged to operate the firing-device on the forward stroke of the hammer when the reciprocatory main-carrier is in firing-position, a carrier-locker in position for engaging said lock-face of the main-carrier and thereby lock this carrier member in firing-position, and locker-retracting means comprising an actuator device appurtenant to the hammer, and a movement-transmitter coöperative with said actuator device and with said locker and arranged for retractively actuating the locker during the firing-stroke of the hammer, for thereby unlocking the main-carrier before the hammer can operate the firing-device.

74. In a firearm mechanism comprising a reciprocatory member constituting a main operating member and main-carrier which is provided with a firing-device and with a lock-face, the combination with the main-carrier, of a firing-train comprising a hammer in position and arranged to operate the firing-device on the forward stroke of the hammer when the reciprocatory main-carrier is in firing-position, a carrier-locker in position for engaging said lock-face of the main-carrier and thereby lock this carrier member in firing-position, and locker-actuating means comprising an actuator device appurtenant to the hammer, and a movement-transmitter coöperative with said actuator device and with the carrier-locker, said actuator device being in position and arranged relatively to the hammer, and the movement-transmitter being arranged in position relatively to the actuator device and to the said locker for only completing the retraction of the locker out of the path of movement of said lock-face of the main-carrier at a time when the hammer has nearly reached the end of its firing-stroke.

75. In a firearm mechanism comprising a reciprocatory member constituting a main operating member and main-carrier which is provided with a firing-device and with a lock-face, the combination with the main-carrier, of a firing-train comprising a hammer in position and arranged to operate the firing-device on the forward stroke of the hammer when the reciprocatory main-carrier is in firing-position, a carrier-locker in position for engaging said lock-face of the main-carrier and thereby lock this carrier in firing-position, and locker-actuating means comprising a cam-face appurtenant to and operable with the hammer, and a lever-device coöperative with said cam-face and with said locker and in position and arranged for retracting the locker during a portion of the firing-stroke of the hammer.

76. In a firearm mechanism comprising a reciprocatory member constituting a main operating member and main-carrier which is provided with a firing-device and with a lock-face, the combination with the main-carrier, of a firing-train comprising a hammer in position and arranged to operate the firing-device on the forward stroke of the hammer when the reciprocatory main-carrier is in firing-position, a carrier-locker in position for engaging said lock-face of the main-carrier and thereby lock this carrier member in firing-position, and locker-actuating means comprising a cam-face appurtenant to and operable with the hammer, and a lever-device coöperative with said cam-face and with the carrier-locker, said cam-face being in position and arranged relatively to the hammer, and said lever-device being in position and arranged relatively to the cam-face and to the said locker, for only completing the retraction of the locker at a time during a later portion of the firing-stroke of the hammer.

77. In a firearm mechanism comprising a reciprocatory member constituting a main operating member and main-carrier which is provided with a firing-device and with a lock-face, the combination with the main-carrier, of a hammer in position and arranged to operate the firing-device on the forward stroke of the hammer when the reciprocatory main-carrier is in firing-position, a carrier-locker in position for engaging said lock-face of the main-carrier and thereby lock this carrier member in firing-position, and locker-actuating means comprising a cam-face appurtenant to and operable with the hammer, and a sear-member coöperative with said cam-face and with said locker, and comprising portions constituting a lever-device which is arranged for retracting the locker at a time during the firing-stroke of the hammer.

78. In a firearm mechanism comprising a reciprocatory member constituting a main operating member and main-carrier which is provided with a firing-device and with a lock-face, the combination with the main-carrier, of a hammer in position and arranged to operate the firing-device on the forward stroke of the hammer when the reciprocatory main-carrier is in firing-position, a carrier-locker in position for engaging said lock-face of the main-carrier and thereby lock this carrier member in firing-position, and locker-actuating means comprising a cam-face appurtenant to and operable with the hammer, and a sear-member coöperative with said cam-face and with said locker, and comprising portions constituting a locker-engaging lever-device, said cam-face being arranged in position relatively to the hammer, and said sear-member being arranged in position relatively to the hammer and to the locker for only completing the locker-retracting movement of the sear-member at a time when the hammer during its forward stroke has nearly reached the firing-device.

79. In a firearm mechanism comprising a reciprocatory main-carrier retractable from a firing-position and provided with a firing-device and with a lock-face, the combination with the main-carrier, of a hammer in position for coacting with the firing-device when the main-carrier is in firing-position, a controller member having a face in position and operable for engaging with said lock-face of the main-carrier when this carrier member is in firing-position, a grip-safety member movably supported in coöperative relation to the controller and grip-operable from a controller-locking safety-position to a non-safety position for unlocking the controller, and a sear-member coöperative with the hammer and comprising portions constituting a movement-transmitter from the hammer to the controller, and also constituting a hammer-resisting device extending from the controller to the hammer, and in position and arranged for resisting the firing-stroke of the hammer by a resistance of the safety-member acting through the controller when the safety-member is in safety-position.

80. In a firearm mechanism comprising a reciprocatory member constituting a main operating member and main-carrier which is retractable from a firing-position and is provided with a firing-device and with a lock-face, the combination with the main-carrier, of a firing-train comprising a hammer in position and arranged to operate the firing-device on the forward stroke of the hammer when the reciprocatory main-carrier is in firing-position, a carrier-locking controller member having a face in position and operable for engaging with said lock-face of the main-carrier and thereby lock this carrier member in firing-position, a grip-operable safety-member supported in coöperative relation to the controller and operable to a safety-position for locking the controller against retraction, and operable to a non-safety position for unlocking the controller, and a combined controller-retractor and firing-stroke-limiter coöperative between the controller and the hammer, and arranged, when the safety-member is in the non-safety position, for retractively actuating the controller from the hammer during the firing-stroke of the hammer, and arranged, when the safety-member is in said safety position, for resisting the firing-stroke of the hammer from the opposition of the controller while this is locked against retraction by the said safety-member.

81. In a firearm mechanism-system comprising a frame and a reciprocatory breech action arranged for coöperation with a locker-train and with a firing-train, the combination with the breech action, of a firing-train and a locker-train each of which is coöperative with the other and also with the breech action, and each of which comprises one member which is common to both said trains and which is also a grip-operable safety-member, and a firing-stroke-resistant means operatively-intermediate to one said train and a member of the other said train through which such other train directly coacts with the breech action.

82. In a firearm mechanism-system comprising a frame and a reciprocatory breech-action arranged for coöperation with a locker-train and with a firing train, the combination with the breech action of a pair of coacting mechanism-trains consisting of a firing-train and a locker-train each of which is coöperative with the other and also with the breech action, and each of which comprises one member which is common to both said trains and which is also a grip-operable safety-member in position and arranged for coaction with a firing-stroke-resistant means comprised in the pair of trains and arranged operatively-intermediate to members of said trains through which these trains, respectively, directly coact with the breech action.

83. In a firearm mechanism comprising a breech action retractable from a forward position through a loading-stroke and provided with a firing-device and with a lock-face, the combination with the breech action, of a fire-control action comprising two co-acting mechanism trains, of which one train is a firing-train having a firing-member in position and arranged for coacting with said firing-device when the breech action is in forward position, and of which the other train is a controller-train having a member which is coöperative with said lock-face when the breech action is in a firing-position, and having firing-member-resisting means arranged for resisting in one position of the controller-train, the firing-movement of the firing-train.

84. In a firearm, in combination, a breech action retractable from a firing-position and having a lock-face, a firing-member retractable to a firing-position and coöperative with the breech action and having a cock-notch; and a sear-controller mechanism operatively-intermediate to the breech action and the firing-member and comprising two inter-coacting members in position and arranged, respectively, for engaging and releasing said breech action lock-face and said firing-member cock-notch, and also comprising a spring-actuator operatively-connecting said inter-coacting members and consisting of a spring combined with a force-modifier device through which the spring-force is transmitted with a varying effect in different relative positions of the sear-controller mechanism.

85. In a firearm, in combination, a breech action retractable from a firing-position and having a lock-face, a firing-member retractable to a firing-position and coöperative with the breech action and having a cock-notch, and a sear-controller mechanism operatively-intermediate to the breech action and the firing-member and comprising two inter-coacting members in position and arranged, respectively, for engaging and releasing said breech action lock-face and said firing-member cock-notch, and also comprising a spring-actuator operatively-connecting said inter-coacting members and consisting of a spring combined with a force-modifier device consisting of a lever pivotally-supported on said one member and in position and arranged for transmitting the force of the spring to the other of said members with varying effects in different positions, respectively, of the mechanism.

86. In a firearm, in combination, a breech action retractable from a firing-position and having a lock-face, a firing-member retractable to a firing-position and coöperative with the breech action and having a cock-notch; a sear-controller mechanism operatively-intermediate to the breech action and the firing-member and comprising two inter-coacting members in position and arranged respectively, for engaging and releasing said breech action lock-face and said firing-member cock-notch, and also comprising a spring-actuator operatively-connecting said inter-coacting members and consisting of a spring directly acting against one of said members and combined with a force-modifier device consisting of a lever pivotally-supported on one member, and in position and arranged for transmitting the spring-force to the other of said members with a varying effect in different positions, respectively, of the working movement.

87. In a firearm, in combination, a breech action retractable from a firing-position and having a lock-face, a firing-member retractable to a firing-position and coöperative with the breech action and having a cock-notch; a sear controller mechanism operatively-intermediate to the breech action and the firing-member and comprising two inter-coacting members in position and arranged, respectively, for engaging and releasing said breech action lock-face and said firing-member cock-notch, and also comprising a spring-actuator operatively-connecting said inter-coacting members and consisting of a spring combined with a force-modifier device supported on said one member and through which the spring-force is transmitted to the other said member, and a trigger in position and arranged for simultaneously retracting said two inter-coacting members in a direction and through a stroke for releasing the firing member.

88. In a firearm, in combination, a breech action retractable from a firing-position and having a lock-face, a firing-member retractable to a firing-position and coöperative with the breeech action and having a cock-notch; a sear-controller mechanism operatively-intermediate to the breech action and the firing-member and comprising two inter-coacting members in position and arranged, respectively, for engaging and releasing said breech action lock-face and said firing-member cock-notch, and also comprising a spring-actuator operatively-connecting said inter-coacting members and consisting of a spring directly acting against one of said members and combined with a force-modifier device consisting of a lever through which the spring-force is transmitted to the other of said members with varying effects in different positions, respectively, of the working movements, a trigger in position and arranged for simultaneously retracting said two inter-coacting members in a direction and through a stroke for releasing the firing-member, and trigger-shifting means appurtenant to the sear-controller mechanism and arranged for shifting the trigger to an ineffective position after such releasing of the firing-member.

89. In a firearm, in combination, a breech action retractable from a firing-position and having a rearwardly-facing lock-face, a firing-member retractable to a firing-position and coöperative with the breech action and having a cock-notch, a sear-controller mechanism having two locking-faces of which one said face is in position and arranged for engaging said cock-notch of the firing-member when this member is in firing-position, and of which the other said face is in position and arranged for engaging said breech action lock-face when this action is in firing-position, said two faces of the sear-controller mechanism also being in position and arranged for simultaneous retraction, and a trigger in position and arranged for actuating the sear-controller mechanism in a direction for simultaneously retracting the said two locking faces thereof.

90. In a firearm, in combination, a breech action retractable from a firing-position and having a rearwardly-facing lock-face and also having a firing-device, a firing-member retractable to a firing-position and coöperative with the firing-device and having a cock-notch, a sear-and-controller mechanism having two locking-faces of which one said face is in position and arranged for engaging said cock-notch of the firing-member when this member is in firing-position, and of which the other said face is in position and arranged for engaging said breech action lock-face when this action is in firing-position, said two faces of the sear-and-controller mechanism also being in position and arranged for simultaneous retraction, and a trigger in position and arranged for actuating the sear-controller mechanism in a direction for simultaneously retracting the said two locking faces thereof.

91. In a firearm, in combination, a slidably-supported breech action retractable from a firing-position and having a rearwardly-facing lock-face and also having a firing-device, a pivotally-supported firing-member retractable to a firing-position and coöperative with the firing-device and having a cock-notch, a sear-and-controller mechanism having two locking-faces of which one said face is in position and arranged for engaging said cock-notch of the firing-member when this member is in firing-position, and of which the other said face is in position and arranged for engaging said breech action lock-face when this action is in firing-position, said two faces of the sear-controller mechanism also being in position and arranged for simultaneous retraction, and a trigger in position and arranged for actuating the sear-and-controller mechanism in a direction for simultaneously retracting the said two locking faces thereof.

92. In a firearm, in combination, a breech action retractable from a firing-position and having a rearwardly-facing lock-face, a firing-member retractable to a firing-position and coöperative with the breech action and having a cock-notch, a sear-and-controller mechanism having two locking-faces of which one said face is in position and arranged for engaging and releasing said cock-notch of the firing-member when this member is in firing-position, and of which the other said face is in position and arranged for engaging said breech action lock-face when this action is in firing-position, said two faces of the sear-controller mechanism also being in position and arranged for simultaneous retraction; a trigger in position and arranged for retractively actuating the sear-and-controller mechanism in a direction for simultaneously retracting the said two locking-faces thereof, and trigger-shifting means appurtenant to the sear-controller mechanism and operable for shifting the trigger toward an ineffective position simultaneously with said simultaneous retraction of the two said sear-controller lock-faces.

93. In a firearm, in combination, a breech action retractable from a firing-position and having a rearwardly-facing lock-face, a firing-member retractable to a firing-position and coöperative with the breech action and having a cock-notch, a sear-and-controller mechanism having two locking-faces of which one said face is in position and arranged for engaging and releasing said cock-notch of the firing-member when this member is in firing-position, and of which the other said face is in position and arranged for engaging said breech action lock-face when this action is in firing-position, said two faces of the sear-and-controller mechanism also being in position and arranged for simultaneous retraction; a trigger in position and arranged for retractively actuating the sear-and-controller mechanism in a direction for simultaneously retracting the said two locking-faces thereof, and trigger-shifting means appurtenant to the sear-and-controller mechanism and operable for shifting the trigger toward an ineffective position simultaneously with said simultaneous retraction of the two said locking faces, and actuator means appurtenant to the firing-member and in position and arranged for further retractively actuating the sear-and-controller mechanism after the release of the firing-member and thereby shift the trigger to its ineffective position.

94. In a firearm, in combination, a frame, a slidably supported breech action retractable on the frame from a firing-position and having a lock-face, a firing-member operatively supported on the frame in position for coöperating with the breech action and having a cock-notch and retractable to a firing-position; a sear-controller mechanism comprising a sliding-member and a coacting pivotally-supported member, and having two faces in position and arranged respectively, one on the sliding member for engaging and releasing said breech action lock-face, and the other on the pivotally-supported member for engaging with said cock-notch of the firing-member, and having said sliding member retractable by said pivotally-supported member; and a trigger in position and arranged for retracting said sliding-member by a force transmitted thereto through said pivotally-supported member of the sear-controller mechanism.

95. In a firearm, in combination, a frame, a slidably supported breech action retractable on the frame from a firing-position and having a lock-face, a firing-member operatively supported on the frame in position for coöperating with the breech action and having a cock-notch, and retractable to a firing-position; a sear-controller mechanism comprising a sliding-member and a coacting pivotally-supported member, and having two faces in position and arranged respectively, one on the sliding member for engaging and releasing said breech action lock-face, and the other on the pivotally-supported member for engaging with said cock-notch of the firing-member, and having said sliding-member retractable independently of the retraction of the pivotally-supported member and also retractable by the retractive movement of said pivotally-supported member; and a trigger in position and arranged for retracting said sliding-member by a force transmitted thereto through the pivotally-supported member of the sear-controller mechanism.

96. In a firearm, in combination, a frame, a breech action retractable on the frame from a firing-position and having a lock-face, a firing-member operatively supported on the frame in position for coöperating with the breech action and having a cock-notch and retractable to a firing-position; a sear-controller mechanism comprising a sliding-member and a coacting pivotally-supported member, and having two faces in position and arranged respectively, one on the sliding-member for engaging and releasing said breech action lock-face, and the other on the pivotally-supported member for engaging with said cock-notch of the firing-member, and having said sliding-member retractable by said pivotally-supported member; a trigger in position and arranged for retracting said sliding-member by a force transmitted thereto through the pivotally-supported member of the sear-controller mechanism, and a trigger-shifting connection operatively connecting the sear-controller mechanism with the trigger and arranged for shifting the trigger toward an ineffective position simultaneously with the retraction of one of the members of the sear-controller mechanism.

97. In a firearm, in combination, a frame, a slidably supported breech action retractable on the frame from a firing-position and having a lock-face, a firing-member operatively supported on the frame in position for coöperating with the breech action and having a cock-notch and retractable to a firing-position; a sear-controller mechanism comprising a sliding-member and a coacting pivotally-supported member, and having two faces in position and arranged respectively, one on the sliding-member for engaging and releasing said breech action lock-face, and the other on the pivotally-supported member for engaging with said cock-notch of the firing-member, and having said sliding-member retractable independently of the retraction of the pivotally-supported member and also retractable by said pivotally-supported member; a trigger in position and arranged for retracting said sliding-member by a force transmitted thereto through the pivotally-supported member of the sear-controller mechanism, and trigger-shifting means operatively connecting the trigger with the sear-controller mechanism and arranged for shifting the trigger toward an ineffective position simultaneously with the retractive operation of said pivotally-supported member by the trigger, and while the breech action is in the firing-position thereof.

98. In a firearm mechanism comprising a hammer and a trigger-actuatable sear-device coöperative with the hammer, the combination therewith of a trigger in position and arranged for normally having, when the hammer is in firing-position, a coöperative relation to the sear-device for thereby retracting the sear-device and permit the hammer to make its firing-stroke, an operatively supported controller-member having appurtenant thereto a trigger-disconnection means arranged for discontinuing the said coöperative relation of the trigger and the sear-device on the actuation of the controller-member through a stroke in one direction, and controller actuating means appurtenant to the hammer and arranged for the actuation of the controller-member in the said one direction during the firing-stroke of the hammer and through a stroke for discontinuing said coöperative relation of the trigger and sear-device before the hammer completes its firing-stroke.

99. In a firearm mechanism comprising a hammer with a trigger-actuatable sear-device coöperative with the hammer, the combination therewith of a trigger in position and arranged for normally having, when the hammer is in firing-position, a coöperative relation to the sear-device for thereby retracting the sear-device and permit the hammer to make its firing-stroke, a slidably-supported controller-member having appurtenant thereto a trigger-disconnection means arranged for discontinuing the said coöperative relation of the trigger and the sear-device on the sliding movement of the controller-member through a stroke in one direction, and controller actuating means appurtenant to the hammer and arranged for sliding the controller-member in the said one direction during the firing-stroke of the hammer and through a stroke for discontinuing said coöperative relation of the trigger and sear-device before the hammer completes its firing-stroke.

100. In a firearm mechanism comprising a hammer and a trigger-actuatable sear-device coöperative with the hammer, the combination therewith of a trigger in position and arranged for normally having, when the hammer is in firing-position, a coöperative relation to the sear-device for thereby retracting the sear-device and permit the hammer to make its firing-stroke, an operatively-supported controller-member having appurtenant thereto a trigger-disconnection means arranged for discontinuing the said coöperative relation of the trigger and the sear-device on the actuation of the controller through a stroke in one direction, and controller actuating means comprising a lever-device, and a cam appurtenant to the hammer and in position and arranged for the actuation of the controller-member in the said one direction during the firing-stroke of, and by power from the hammer, and through a stroke for discontinuing said coöperative relation of the trigger and sear-device before the hammer completes its firing-stroke.

101. In a firearm mechanism comprising a hammer and a trigger-actuatable sear-device coöperative with the hammer, the combination therewith of a trigger in position and arranged for normally having, when the hammer is in firing-position, a coöperative relation to the sear-device for thereby retracting the sear-device and permit the hammer to make its firing-stroke, a slidably-supported controller-member having appurtenant thereto a trigger-disconnection means arranged for discontinuing the said coöperative relation of the trigger and the sear-device on the sliding movement of the controller through a stroke in one direction, and controller actuating means comprising a lever-device, and a cam appurtenant to the hammer, and in position and arranged for sliding the controller-member in the said one direction during the firing-stroke of and by power from the hammer, and through a stroke for discontinuing said coöperative relation of the trigger and sear-device before the hammer completes its firing-stroke.

102. In a firearm mechanism, the combination with a frame, and with a breech action retractable from a forward position through a loading stroke and having a lock-face, of a firing-member operably-supported in the frame in position for coacting with the breech action, a controller member operably-supported in position for coacting with said lock-face, controller-actuating means coöperative with and as between the controller-member and the firing-member, a controller-blocking safety-member in position and arranged for spring-actuation into a controller-blocking position and grip-operable into a controller-releasing position, and spring-power actuation means operatively-connecting the safety-member and the firing-member for actuating the firing-member through the firing-stroke thereof, and also in position and arranged for normally actuating the safety-member into the controller-blocking position thereof.

103. In a firearm mechanism, the combination with a frame, and with a breech action retractable from a forward position through a loading stroke and having a lock-face, of a firing-member operably supported in the frame in position for coacting with the breech action, a controller member operably-supported in position for coacting with said lock-face, controller-actuating means coöperative with and as between the controller-member and the firing-member, a controller-blocking safety-member in position and arranged for spring-actuation into a controller-blocking position and grip-operable into a controller-releasing position, and a firing-spring carried by the safety-member and operatively connected with the firing-member for actuating the firing-member through the firing-stroke thereof, and also in position and arranged for actuating the safety-member toward the controller-blocking position thereof by a reaction against the firing-member.

104. In a firearm mechanism, the combination with a frame, and with a breech action retractable from a forward position through a loading stroke and having a lock-face, of a firing-member operably-supported in the frame in position for coacting with the breech action, a controller member operatively-supported in position for co-acting with said lock-face, a combined firing-member-resisting and controller-actuating means coöperative with and as between the controller-member and the firing-member, a conntroller-blocking safety-member in position and arranged for spring-actuation into a controller-blocking position and grip-operable into a controller-releasing position, and a spring-power actuator-device operatively-connecting the safety-member and the firing-member for actuating the firing-member through the firing-stroke thereof, and also in position and arranged for actuating the safety-member toward the controller-blocking position thereof by a reaction against the firing-member.

105. In a firearm mechanism, the combination with a frame, and with a breech action retractable from a forward position through a loading stroke and having a lock-face, of a firing-member operably-supported in the frame in position for coacting with the breech action, a controller member operably-supported in position for coacting with said lock-face, a firing member-resisting and controller-actuating sear-member coöperative with and as between the controller-member and the firing-member, a trigger coöperative with the sear-member, a controller-blocking safety-member in position and arranged for spring-actuation into a controller-blocking position and grip-operable into a controller-releasing position, and a spring-power actuator-device operatively-connecting the safety-member and the firing-member for actuating the firing-member through the firing-stroke thereof, and also in position and arranged for actuating the safety-member toward the controller-blocking position thereof by a reaction against the firing-member.

106. In a firearm mechanism, the combination with a frame, and with a breech action retractable from a forward position through a loading stroke and having a lock-face, of a firing-member pivotally-supported in the frame in position for coacting with the breech action, a controller member slidably-supported in position for coacting with said lock-face, controller-actuating means coöperative with and as between the controller-member and the firing-member, a controller-blocking safety-member in position and arranged for spring-actuation into a controller-blocking position and grip-operable into a controller-releasing position, and spring-power actuation means operatively connecting the safety-member and the firing-member for actuating the firing-member through the firing-stroke thereof, and also in position and arranged for normally actuating the safety-member into the controller-blocking position thereof.

107. In a firearm mechanism, the combination with a frame, and with a breech action retractable from a forward position through a loading stroke and having a lock-face, of a firing-member pivotally-supported in the frame in position for coacting with the breech action, a controller member slidably-supported in position for coacting with said lock-face, controller-actuating means coöperative with and as between the controller-member and the firing-member, a controller-blocking safety-member in position and arranged for spring-actuation into a controller-blocking position and grip-operable into a controller-releasing position, and a firing-spring carried by the safety-member and operatively connected with the firing-member for actuating the firing-member through the firing-stroke thereof, and also in position and arranged for actuating the safety-member toward the controller-blocking position thereof by a reaction against the firing-member.

108. In a firearm mechanism, the combination with a frame, and with a breech action retractable from a forward position through a loading stroke and having a lock-face, of a firing-member, pivotally-supported in the frame in position for coacting with the breech action, a controller member slidably-supported in position for coacting with said lock-face, a combined firing-member-resisting and controller-actuating means coöperative with and as between the controller-member and the firing-member, a controller-blocking safety-member in position and arranged for spring-actuation into a controller-blocking position, and grip-operable into a controller-releasing position, and a spring-power actuator-device operatively-connecting the safety-member and the firing-member for actuating the firing-member through the firing-stroke thereof, and also in position and arranged for actuating the safety-member toward the controller-blocking position thereof by a reaction against the firing-member.

109. In a firearm mechanism, the combination with a frame, and with a breech action retractable from a forward position through a loading stroke and having a lock-face, of a firing-member pivotally-supported in the frame in position for coacting with the breech action, a controller member slidably-supported in position for coacting with said lock-face, a firing-member-resisting and controller-actuating sear-member coöperative with and as between the controller-member and the firing-member, a trigger coöperative with the sear-member, a controller-blocking safety-member in position and arranged for spring-actuation into a controller-blocking position and grip-operable into a controller-releasing position, and a spring-power actuator-device operatively-connecting the safety-member and the firing member for actuating the firing-member through the firing-stroke thereof, and also in position and arranged for actuating the safety-member toward the controller-blocking position thereof by a reaction against the firing-member.

110. An auto-loading firearm comprising a cartridge-actuated power-slide and having, in combination therewith, a grip-operable safety-stop device consisting of a plurality of movably-supported coacting members including therein a first member and a second member, and of which the said second member is provided with a lock-face in position and arranged for actuation into a slide-locking engagement with a coacting face on the power-slide; and of which the said first member is supported for a working movement including a grip-stroke and a return safety-stroke, and is provided with a stop-face in position for locking, on said safety-stroke, the said first member in said slide-locking position thereof, and for unlocking the said second member and thereby also unlocking the power-slide, on the grip-stroke of said first member.

111. An auto-loading firearm comprising a cartridge-actuated power-slide and having, in combination therewith, a grip-operable safety-stop device consisting of a plurality of movably-supported coacting members including therein a first member and a second member which are arranged for working movements in transverse directions, respectively, and of which the second member is provided with a lock-face in position and arranged for actuation into a slide-locking engagement with a coacting face on the power-slide when this slide is in the forward position thereof; and of which the first member is supported for a working movement including a grip-stroke and a return safety-stroke, and is provided with a locking means in position for locking, on said safety-stroke, the said first member in the said slide-locking position thereof, and for unlocking the said second member and thereby also unlocking the power-slide, on the grip-stroke of said first member.

112. An auto-loading firearm comprising a cartridge-actuated power-slide and having, in combination therewith, a grip-operable safety-stop device consisting of a plurality of coacting members including therein a pivotally-supported and oscillatory first member and a slidably-supported and reciprocatory second member which are arranged for working movements in transverse directions, respectively, and of which the second member is provided with a lock-face and is located in position and arranged for actuation into a slide-locking position relatively to the power-slide; and of which the first member is supported for a working movement including a grip-stroke in one direction and a return safety-stroke in an opposite direction, and is provided with a stop-face in position for locking, on said safety-stroke, the said second member in the said slide-locking position thereof, and for unlocking the said second member and thereby also unlocking the power-slide, on the grip-stroke of said first member.

113. In a firearm mechanism comprising a breech action retractable through a loading-stroke and coöperative with a locking-member and with a firing-member, the combination with the breech action, of a fire-control action comprising a breech action-locking member and a firing-member each arranged for a forward stroke and for a retractive-stroke, and provided with a combined movement-resisting and movement-transmitting means in position and arranged for resisting the forward stroke of either one of said members when the other said member is in forward stroke position, the fire-control action also comprising a pair of spring-power actuation means which are one of them of a relatively smaller and the other of them of a relatively greater power, and which are in position and arranged for the forward actuation of said locking and firing members, respectively, and which are also arranged for said actuation means of the greater power to overcome said actuation means of the smaller power and thereby during the forward stroke of the firing-member, retract the locking-member.

114. In a firearm mechanism comprising a breech action retractable through a loading-stroke and coöperative with a locking-member and with a firing-member, the combination with the breech action, of a blockable breech action-locking member and a firing-member each arranged for a forward stroke and for a retractive-stroke, and provided with a combined movement-resisting and movement-transmitting means arranged for resisting the forward stroke of either one of said members when the other said member is in forward stroke position; a pair of spring-power actuation means which are one of them of a relatively smaller and the other of them of a relatively greater power, and which are arranged for the forward actuation of said locking and firing members, respectively, and which are also arranged for said actuation means of the greater power to overcome said actuation means of the smaller power and thereby during the forward stroke of the firing-member, retract the locking-member, and a safety-member in position for blocking by movement in one direction the said blockable member having the relatively smaller spring-power actuation means, the safety-member being also grip-operable by a movement in a reverse direction into a position for unblocking said blockable member.

115. In a firearm mechanism comprising a breech action retractable through a loading-stroke and coöperative with a combined locking-member and trigger-disconnection member and with a firing-member, the combination with the breech action, of a fire-control action having therein a trigger and sear normally in operative relation one to the other, and comprising a combined breech action-locking and trigger-disconnection member and a firing-member each arranged for a forward stroke and for a retractive-stroke, and provided with a combined movement-resisting and movement-transmitting means arranged for resisting the forward stroke of either one of said members when the other said member is in forward stroke position, the fire-control action also comprising a pair of spring-power actuation means which are one of them of a relatively smaller and the other of them of a relatively greater power, and which are arranged for the forward actuation of said combined locking and trigger-disconnection member and firing member, respectively, and which are also arranged for said actuation means of the greater power to overcome said actuation means of the smaller power and thereby during the forward stroke of the firing-member, effect a disconnection of the operative relation of the trigger relatively to the sear.

116. In a fire-control action for firearm mechanisms, the combination with a trigger and a sear normally in operative relation the one to the other, of a trigger-disconnector member and a firing-member each arranged for a forward stroke and for a retractive-stroke; a combined movement-resisting and movement-transmitting means arranged for resisting the forward stroke of either one of said members when the other said member is in forward stroke position; a pair of spring-power actuation means which are one of them of a relatively smaller and the other of them of a relatively greater power, and which are arranged for the forward actuation of said disconnector member and said firing-member, respectively, and are also arranged for said actuation means of the greater power to overcome said actuation means of the smaller power and thereby during the forward stroke of the firing-member, retract the trigger-disconnector member.

117. In an auto-loading firearm, in combination, a frame, a non-sliding barrel, a breech action reciprocatable relatively to the barrel and comprising a power-slide, a firing train comprising a firing-member, and a safety-train comprising two coacting locking members of which the first said member is a grip-operable member in position and arranged for controlling the operation of a second said locking-member which is provided with a slide-locking face in position for engaging and thereby locking and releasing the power-slide.

118. In an auto-loading firearm, in combination, a frame, a non-sliding barrel, a breech action reciprocatable relatively to the barrel and comprising a power-slide, a firing train comprising a firing-member, and a safety - train comprising two interlocking members of which one of said members is retractable by the firing-train and is a slide-engaging member, and of which the other is a coacting grip-operable member, these two safety-train members each having a stop-face located in position and arranged for one of these stop-faces to engage the other and thereby effect the locking of the power-slide, and each of said two members being arranged for blocking the other said member.

119. In an auto-loading firearm, in combination, a frame, a non-sliding barrel, a breech action reciprocatable relatively to the barrel and comprising a power-slide, a firing-train comprising a firing member, and a combined power-slide-locking and firing member-resisting safety-stop device having a pair of coacting members operably-supported and arranged each for locking and unlocking the other, and also having one of said pair of coacting members grip-operable to a position for unlocking the power-slide.

120. In an auto-loading firearm, in combination, a frame, a non-sliding barrel, a breech action reciprocatable relatively to the barrel and comprising a power-slide, a firing-train comprising a firing-member, and a safety-stop device which comprises, as an appurtenant thereof, a slidable member having a power-slide-locking face operatively supported in position for retraction by the firing-member, and for engaging and thereby locking the power-slide, and which also comprises a grip-operable member arranged for locking and releasing said power-slide-locking member.

121. In a firearm mechanism, in combination, a breech action retractable from a forward position through a loading-stroke, a fire-control action comprising a firing-member in coöperative relation with the breech action, a movement-transmitter actuatable by the firing-member, a reciprocatable member in position and arranged for retractive actuation by the movement-transmitter and also for engaging by a forward movement and for releasing by a retractive movement the breech action when this action is in forward position, and having a resistant device in position thereon for engaging and resisting the movement-transmitter, and thereby resisting the firing-member, when the breech action and said reciprocatable member are each in forward position.

122. In a firearm mechanism comprising a breech action retractable from a forward position through a loading-stroke and coöperative with a firing-member and with a locking-member, the combination with the breech action, of a fire-control action which comprises a firing-member and a breech action-locking member each arranged for a forward stroke and for a retractive-stroke, and which also comprises movement-resisting means consisting of an actuator-device combined with a movement-transmitting-device in coöperative relation with said members and located in position and arranged for resisting a forward stroke of either one of said members when the other said member is in the forward position thereof.

123. In a firearm mechanism comprising a breech action retractable from a forward stroke through a loading-stroke and coöperative with a firing-member and with a locking-member, the combination with the breech action, of a fire-control action which comprises a firing-member and a breech action-locking member each arranged for a stroke forwardly from a firing-position and for a retractable stroke, and which also comprises movement-resisting means consisting of an actuator-device appurtenant to the firing-member and combined with a movement-transmitting device in coöperative relation with the locking-member, and located in position and arranged for resisting a forward stroke of the locking-member when the firing-member is in a position forward of the firing-position thereof.

124. In a firearm comprising a firing-train having a hammer and a hammer-operated sear, and comprising a hammer-resetting power-slide, the combination with the power-slide and the sear, of a trigger, a trigger-shifter, an actuator-face in position on the power-slide for operating the trigger-shifter in one direction during one part of the cycle of mechanism-action, and a trigger-shifter-actuator on the sear in position and arranged for operating the trigger-shifter in the same said direction during another part of the same cycle of mechanism-action.

125. In a firearm comprising a firing-train having a hammer and a hammer-operated sear, and comprising a hammer-resetting power-slide, the combination with the power-slide and the sear, of a trigger, a trigger-shifting-slide, an actuator-face in position on the power-slide for operating the trigger-shifting-slide in one direction during one part of the cycle of mechanism-action, and an actuator-arm on the sear in position for engaging and operating the trigger-shifting-slide in the same said direction during a later period in the cycle of mechanism-action.

126. In an auto-loading firearm mechanism having a cartridge-actuatable power-slide and also having a sear and a hammer in coöperative relation each with the other, the combination with the power-slide, sear and hammer, of a shiftable trigger normally located in a sear-engageable position when the mechanism is in a firing-position, a combined trigger-shifter and power-slide lock, in position and arranged for actuation by and from the trigger through a first stage of a trigger-shifting stroke, and trigger-shifter-actuating means in position and arranged for operating said combined trigger-shifter and slide-lock through a second stage of its trigger-shifting stroke and thereby shift the trigger to an ineffective position relatively to the sear and simultaneously withdraw said power-slide lock from the path of the power-slide.

127. In an auto-loading firearm having a cartridge-actuatable breech action comprising a power-slide, the combination with the breech action, of a controller-member constituting a combined slide-lock and firing-train resistant, a firing-train provided with a trigger, a hammer-actuated sear and a sear-operating hammer; a bearing-face on the sear in position for engaging the controller in a direction for retracting the controller away from the power-slide during the firing-stroke of the hammer, and a safety-stop member in position for engaging the controller in the slide-locking position thereof, and thereby retract the controller by the operation of the hammer, and resist the firing-stroke of the hammer by said safety-stop acting through the controller and the sear.

128. In an auto-loading firearm mechanism, the combination with a breech action having a retractive loading-stroke in suitable correspondence with a cartridge-length and provided with a firing-device and with a lock-face in position when the breech action is in forward position, for coaction with the locking-face of a controller-train member, of a controller-train comprising a member having a locking-face in position for actuation into an engagable position relative to said lock-face of the breech action when this action is in forward position and thereby lock the breech action in firing-position, and a breech action-unlocking firing-train in position and arranged for first retracting said locking-face member and thereby unlock the breech action and thereafter operate the firing-device.

129. In an auto-loading firearm mechanism, the combination with a breech action having a loading-stroke in suitable correspondence with a cartridge-length and provided with a firing-device and with a lock-face in position when the breech action is in forward position, for coaction with the locking-face of a reciprocatable breech action-locking member, of a reciprocatable member having a locking-face in position for actuation into an engageable position relatively to said lock-face of the breech action when this action is in forward position and thereby lock the breech action in firing-position, and a firing-train in position and arranged for coacting with said firing-device and also with the locking-member, and comprising actuation-means in position and arranged for first retracting said reciprocatable member during one period of the firing-movement of the firing-train and afterward operating the firing-device during a later period of said firing-movement.

130. In an auto-loading firearm mechanism, the combination with a breech action having a retractive loading-stroke in suitable correspondence with a cartridge-length and provided with a firing-device and with a lock-face in position when the breech action is in forward position, for coaction with the locking-face of a controller-train member, of a controller-train comprising as a member thereof, a slide having a locking-face in position for actuation by a sliding movement into locking-engagement with said lock-face of the breech action when this action is in forward position, and thereby lock the breech action in firing-position, and a firing-train in position and arranged for coacting with said firing-device and also with the sliding controller-train member, and comprising actuation means in position and arranged for first unlocking the breech action during one period of the firing-movement of the firing-train and afterward operating the firing-device during a later period of said firing-movement.

131. In a firearm mechanism, the combination with a breech action retractable from a lockable and firing-position, and with a sear and a coacting trigger, of a combined breech action-locking and sear-and-trigger disconnection device, spring-actuation means arranged for actuating said combined device toward the breech action-locking position thereof, and a spring-actuated, combined firing-member and retractor in position and arranged for retractively actuating said combined locking and disconnection device.

132. In a firearm mechanism, the combination with a breech action retractable from a firing-position and having a lock-face, of a breech action-locking controller-member in position and arranged for actuation into engagement with said lock-face when the breech action is in firing-position, and for retraction away from a breech action-locking position; spring-actuation means arranged for actuating the controller-member toward the breech action-locking position thereof; a combined firing-member and controller-retractor operably-supported for a firing-stroke in a direction for retracting the controller-member, and spring-actuation means arranged for actuating said combined firing-member and controller-retractor in said controller-retracting position.

133. In a firearm mechanism comprising a breech action retractable through a loading-stroke and coöperative with a firing-member and with a locking-member, the combination with the breech action, of a fire-control action comprising a firing-member and a breech action-locking member each arranged for a forward stroke and for a retractive-stroke, said fire-control action also comprising movement-resisting means operatively connecting said locking-member and firing-member and located in position and arranged for resisting the forward stroke of one said member when the other said member is in forward stroke position.

134. In a firearm mechanism comprising a breech action retractable through a loading-stroke and coöperative with a firing-member and with a locking-member, the combination with the breech action, of a fire-control action comprising a firing-member and a breech action-locking member each arranged for a forward stroke and for a retractive-stroke, and also comprising a movement-resisting means in position and arranged for resisting the forward stroke of one said member when the other said member is in forward stroke position, and also comprising a grip-operable safety-member in position and arranged for directly blocking and unblocking the locking-member and for indirectly blocking the firing-member through said movement-resisting means when the safety-member is in one position thereof.

135. In a firearm mechanism comprising a breech action retractable through a loading-stroke from a forward position and coöperative with a firing-member and with a locking-member, the combination with the breech action, of a fire-control action which comprises a firing-member, and a breech action-locking member each arranged for a forward stroke and for a retractive-stroke, and which also comprises a movement-resisting means operatively connecting said locking-member and firing-member and located in position and arranged for resisting the forward stroke of the firing-member when the breech action and said locking-member are both in forward position.

136. In a firearm mechanism, the combination with a breech action comprising a reciprocatory main-carrier slidably supported for retraction from a firing-position and provided with a firing-pin and having a lock-face, of a hammer in position for coacting with the firing-pin when the main-carrier is in firing-position, an operably supported locking-member having a locking-face in position for engaging said lock-face of the main-carrier when this carrier member is in firing-position and having a second-face in position for engaging a lever-arm of a sear-member, a safety-member operably supported in coöperative relation to the locking-member and grip-operable from a locking-member-blocking safety-position to a locking-member-unblocking position, and a sear-member coöperative with the hammer and provided with a lever-arm in position and arranged for engaging said second-face of the locking-member and thereby hold the sear-member in engagement with the hammer by a resistance of the safety-member through said second-face of the locking-member and through the sear-member when the safety-member is in the locking-member-blocking position thereof.

137. In a firearm mechanism, the combination with a breech action comprising a reciprocatory main-carrier retractable from a firing-position and provided with a firing-pin and having a lock-face, of a hammer in position for coacting with the firing-pin when the main-carrier is in firing-position; an operably-supported locking-member having a locking-face in position for engaging said lock-face of the main-carrier when this carrier member is in firing-position, and having a second-face in position for engaging an arm of a lever-device; a safety-member operably-supported in coöperative relation to the locking-member and grip-operable from a locking-member-blocking safety-position to a locking-member-unblocking position, and a lever-device coöperative with the hammer and having a lever-arm in position and arranged for engaging said second-face of the locking-member and thereby resist the hammer by a resistance of the safety-member through said second-face of the locking-member and through the lever-device when the safety-member is in the locking-member-blocking position thereof.

138. In a firearm mechanism, the combination with a breech action comprising a reciprocatory main-carrier retractable from a firing-position and having a lock-face, of a firing-train comprising a hammer in coöperative relation with the breech action when the main-carrier is in firing-position, a carrier-locking member retractably supported in position and arranged for engaging said lock-face of the main-carrier when this carrier is in firing-position, a safety-member operably-supported in coöperative relation to said locking member and grip-operable from a locking-member-blocking safety-position to a locking-member-unblocking position, and a hammer-resisting device coöperative with and as between the locking-member and the hammer, and arranged, when the safety-member is in said safety position, for resisting the hammer from the opposition of said carrier locking member while this member is blocked by the safety-member into locking engagement with the main-carrier.

139. In a firearm mechanism, the combination with a breech action comprising a slidably-supported main-carrier retractable from a firing-position and having a lock-face, of a firing-train comprising a pivotally-supported hammer in coöperative relation with the breech action when the main-carrier is in firing-position, a carrier-locking slide retractably supported in position and arranged for engaging said lock-face of the main-carrier when this carrier member is in firing-position, a safety-member operably-supported in coöperative relation to said locking-slide and grip-operable from a locking-slide-blocking safety-position to a locking-slide-unblocking position, and a hammer-resisting device coöperative with and as between the locking-slide and the hammer, and arranged, when the safety-member is in said safety-position, for resisting the hammer from the opposition of said carrier-locking slide while the slide is blocked by the safety-member into locking engagement with the main-carrier.

140. In a firearm mechanism, the combination, with a reciprocatory controller-member located in a position adjacent to a sear-member and having a guideway for a trigger and arranged for engaging a sear-member arm, of a sear-member-actuating trigger guided in said guideway of the controller-member and having a sear-arm-engaging trigger-face; a sear-member having a trigger-engaging arm in position on the sear-member for being engaged by the said trigger-face when the trigger and the controller-member are in a sear-member-actuating position, and also having a controller-member-actuating arm in position and arranged on the sear-member for engaging and actuating the controller-member in a direction for shifting the trigger away from said sear-member-actuating position thereof during an actuation of the sear-member by the trigger.

141. In a firearm mechanism, the combination with a reciprocatory controller-member located in a position adjacent to a sear-member and having trigger-guiding means for a trigger and arranged for engaging a sear-member-arm, of a sear-member-actuating trigger in operative connection with said trigger-guiding means of the controller-member and having a sear-arm-engaging trigger-face, and a sear-member having an arm in position on the sear-member for being engaged and actuated by said trigger-face when the trigger and the controller-member are in a sear-member-actuating position, and also having a controller-member-actuating arm in position and arranged on the sear-member for engaging and actuating the controller-member in a direction for shifting the trigger away from said sear-member-actuating position thereof.

142. In a firearm mechanism, the combination with a reciprocatory controller-member located in a position adjacent to a sear-member and having a guideway for a trigger and arranged for engaging a sear-member arm, of a sear-member-actuating trigger guided in said guideway of the controller-member and having a sear-arm-engaging trigger-face; a sear-member having one arm in position on the sear-member for being engaged and actuated by said trigger-face when the trigger and the controller-member are in a sear-member-actuating position, and also having a controller-member-actuating arm in position and arranged on the sear-member for engaging and actuating the controller-member in a direction for shifting the trigger away from said sear-member-actuating position thereof during an actuation of the sear-member by the trigger, and spring-actuation means operatively-intermediate to the controller-member and the sear-member and in position and arranged for actuating the controller-member in a direction for shifting the trigger toward said sear-member-actuating position thereof.

143. In a firearm mechanism, the combination with a reciprocatory controller-member located in a position adjacent to a sear-member and having trigger-guiding means for a trigger and arranged for engaging a sear-member-arm, of a sear-member-actuating trigger in operative connection with said trigger-guiding means of the controller and having a sear-arm-engaging trigger-face; a sear-member having an arm in position on the sear-member for being engaged by the said trigger-face when the trigger and the controller-member are in a sear-member-actuating position, and also having a controller-member-actuating arm in position and arranged on the sear-member for engaging and actuating the controller-member in a direction for shifting the trigger away from said sear-member-actuating position thereof, and a single spring-actuation device operatively-intermediate to and arranged for actuating both the controller-member and the sear-member, and in position and arranged for actuating the controller-member in a direction for shifting the trigger toward said sear-member-actuating position thereof, and for concurrently actuating the sear-member in a direction the reverse of a controller-member-actuating movement thereof.

144. In a firearm mechanism, the combination, with a breech action retractable from a forward position and having a firing-device, of a firing-member operably-supported in position for coacting with the firing-device when the breech action is in forward position, and also having appurtenant thereto a firing-stroke-resisting face, a safety-member having a safety-stop face and grip-operable from a blocking-position to a releasing position, and provided with spring-actuation means arranged for normally operating the safety-member from the releasing-position toward the blocking-position thereof, and an operably-supported firing-member-resisting device operatively-intermediate to the firing-member and said safety-stop face when the safety-member is in the blocking-position thereof, and arranged for engaging with said firing-stroke-resisting face of the firing-member and thereby positively resisting the firing-stroke of the firing-member by a reaction against said safety-stop face when the safety-member is in said blocking-position thereof.

145. In a firearm mechanism, the combination, with a breech action retractable from a forward position and having a firing-device, of a firing-member pivotally supported in position for coacting with the firing device when the breech action is in forward position, and also having a firing-stroke-resisting face, a safety-member having a safety-stop face and grip-operable from a blocking-position to a releasing position and provided with spring-actuation means arranged for normally operating the safety-member from the releasing-position toward the blocking-position thereof, and a firing-member-resisting device comprising a lever-device and operatively-intermediate to the firing-member and said safety-stop face when the safety-member is in the blocking-position thereof, and also arranged for engaging with said firing-stroke-resisting face of the firing-member and thereby positively resisting the firing-stroke of the firing-member by a reaction directed against said safety-stop face when the safety-member is in said blocking-position thereof.

146. In a firearm, the combination with a breech action retractable from a forward position and having a lock-face, of a spring-actuated breech action-locking member operably supported in position for coacting with the lock-face when the breech action is in forward position, and provided with a safety-member-engaging face; a safety-member having a safety-stop face and grip-operable from a blocking-position to a releasing-position and provided with spring-actuation means arranged for normally operating the safety-member from the releasing-position toward the blocking-position thereof, for thereby engaging with said safety-member-engaging face of the locking-member to positively resist the retraction of the breech action when the safety-member is in said blocking-position thereof, and a firing train having a member arranged to engage with and retract said breech action-locking member when this is released by said grip-operable member.

147. In a firearm mechanism, the combination, with a breech action retractable from a forward position and having a lock-face and a firing-device, of a spring-actuated firing-member operably-supported in position for coacting with the firing-device when the breech action is in forward position, and also having appurtenant thereto a firing-stroke-resisting face, a safety-member having a safety-stop face and grip-operable from a blocking-position to a releasing-position and provided with spring-actuation means arranged for normally operating the safety-member from the releasing-position toward the blocking-position thereof, and a combined firing-member-resisting and breech action-locking means which comprises a firing-stroke-resisting device operatively-intermediate to the firing-member and the safety-stop face when the safety-member is in the blocking-position thereof, and which also comprises a breech action-locking device operatively-intermediate to said lock-face of the breech action and said safety-stop face when the safety-member is in blocking-position, and which is in position and arranged for engaging with said firing-stroke-resisting face and thereby positively resisting the firing-stroke of the firing-member, and is also arranged for simultaneously engaging with said lock-face for thereby resisting the retraction of the breech action, when the safety-member is in said blocking-position thereof.

148. In a firearm mechanism, the combination with a breech action retractable from a forward position and having a lock-face and a firing-device, of a spring-actuated firing-member pivotally-supported in position for coacting with the firing-device when the breech action is in forward position, and also having thereon a firing-stroke-resisting face, a safety-member having a safety-stop face and grip-operable from a blocking-position to a releasing-position and provided with spring-actuation means arranged for normally operating the safety-member from the releasing-position toward the blocking-position thereof, and a combined firing-member-resisting and breech action-locking means which comprises a firing-stroke-resisting device operatively-intermediate to the firing-member and the safety-member and the safety-stop face when the safety-member is in the blocking-position thereof, and which also comprises a breech action-locking slide operatively-intermediate to said lock-face of the breech action and said safety-stop face when the safety-member is in blocking-position.

149. In a firearm mechanism comprising a breech action retractable through a loading-stroke and coöperative with a firing-train, and provided with a lock-face, the combination with the breech action, of a fire-control action comprising two coacting mechanism trains, of which one train is a firing-train coöperative with said breech action when this is in forward position, and of which the other train is a controller-train having a breech action-locking member which is coöperative with said lock-face when the breech action is in forward position, the fire-control action also comprising therein a firing-train-resisting means arranged for resisting, in one position of the controller-train, the firing movement of the firing-train, and also comprising therein a safety-member which is spring-actuatable in one direction into a position for blocking the operation of the fire-control action, and is grip-operable in a reverse direction into an unblocking position.

150. In a firearm mechanism comprising a retractable main-carrier provided with a firing-device and a lock-face, and coöperative with a hammer and with a carrier-locking portion of a controller-member, the combination with the main-carrier, of a hammer and a firing-spring therefor, a trigger-actuatable sear-device coöperative with the hammer, a trigger normally in a sear-actuating relation to the sear-device, when the hammer is in firing-position, for retracting the sear-device and thereby permit the hammer to make a firing-stroke; a reciprocatable controller-member having a locking portion coöperative in one position thereof with the main-carrier for locking this carrier member in firing-position, and also having appurtenant thereto a trigger disconnection means in position and arranged for discontinuing the sear-actuating relation of the trigger and the sear-device when the said carrier-locking portion of the controller is withdrawn from the carrier locking position thereof, and controller retracting means operatively-intermediate to the hammer and controller and arranged for withdrawing the controller from its carrier-locking position by the power of the firing-spring transmitted through the hammer during the firing-stroke thereof.

151. In a firearm mechanism comprising a breech action retractable through a loading-stroke and provided with a firing-device and with a lock-face, the combination with the breech action, of a fire-control action comprising two coacting mechanism trains, of which one is a firing-train having a firing-member that is coöperative with said firing-device when the breech action is in firing-position, and of which the other train comprises a locker-member arranged for actuation into a position for coacting with said lock-face when the breech action is in firing-position, the mechanism trains also having intercepter means in position for coacting with a firing-train member and arranged for intercepting the firing-member during the firing-movement thereof when the locker-member is in a mid-stroke position relatively to said lock-face of the breech action.

152. In a firearm mechanism comprising a breech action retractable through a loading-stroke from a forward position and coöperative with a firing-member and with a locking-member, the combination with the breech action, of a fire-control action which comprises a firing-member arranged for a forward stroke and for a retractive-stroke, a breech action locking member slidably-supported in a position transversely of the loading-stroke of the breech action, and also arranged for a forward stroke and for a retractive-stroke, the fire-control action also comprising movement-resisting means having an actuator-device which is an appurtenant of the firing-member and also having coacting movement-transmitting means appurtenant to the locking-member, and located in position and arranged for resisting the forward stroke of the firing-member when the breech action and said locking-member are both in forward position.

153. In a firearm mechanism, the combination with a breech action retractable from a firing-position through a loading-stroke and provided with a firing-device and with a lock-face, of a fire-control action comprising two coacting mechanism trains, of which one train is a firing-train having a firing-member in coöperative relation with said firing-device when the breech action is in firing-position, and of which the other train is a controller-train having a member coöperative with said lock-face when the breech action is in firing-position, the fire-control action also comprising movement-resisting means in position and arranged for resisting the firing-movement of the firing-train in one position of the controller-train and for resisting the controller-train in one position of the firing-train.

154. In a firearm mechanism, the combination with a breech action retractable from a firing-position through a loading stroke and provided with a firing-device and with a lock-face, of a fire-control action comprising two coacting mechanism trains, of which one train is a firing-train having a firing-member in coöperative relation with said firing-device when the breech action is in firing-position, and of which the other train is a controller-train comprising two interlocking members and having one of these members coöperative with said lock-face when the breech action is in firing-position, the fire-control action also comprising firing-member-resisting means arranged for resisting the firing-movement of the firing-train in one position of the controller-train.

155. In a firearm mechanism, the combination with a breech action retractable from a firing-position through a loading-stroke and provided with a firing-device and with a lock-face, of a fire-control action comprising two coacting mechanism trains, of which one train is a firing-train having a firing-member in coöperative relation with said firing-device when the breech action is in firing-position, and of which the other train is a controller-train comprising two interlocking members and having one of these members coöperative with said lock-face when the breech action is in firing-position, the fire-control action also comprising movement-resisting means in position and arranged for opposing each said train when the other said train is in one of the positions thereof.

156. In a firearm mechanism comprising a breech action retractable through a loading-stroke and coöperative with a locking-member and with a firing-member, the combination with the breech action, of a fire-control action comprising a firing-member and a breech action-locking member each arranged for a forward stroke and for a retractive-stroke, and also comprising a combined movement-resisting and movement-transmitting means in position and arranged for resisting the forward stroke of either one of said firing and locking members when the other said member is in forward stroke position, and also arranged for retracting the locking-member by power transmitted from the firing-member during the forward stroke thereof.

157. In a firearm mechanism comprising a breech action retractable through a loading-stroke and coöperative with a locking-member and with a firing-member, the combination with the breech action, of a fire-control action comprising a firing-member and a breech action-locking member each arranged for a forward stroke and for a retractive-stroke and each provided with an actuation-and-resistant face, and also comprising a combined movement-resisting and movement transmitting means in position for coacting with said actuation-and-resistant faces of the locking-member and said firing-member, respectively, and arranged for resisting the forward stroke of either one of said members when the other said member is in forward stroke position, and for retracting the locking-member by power transmitted from the firing-member during the forward stroke thereof.

158. In a firearm mechanism comprising a breech action retractable through a loading-stroke and coöperative with a locking-member and with a firing-member, the combination with the breech action, of a fire-control action comprising two principal members, a firing-member and a breech action-locking member, each arranged for a forward stroke and for a retractive-stroke, and also having a combined movement-resisting and movement-transmitting means which comprises a lever-device in position for coacting with said locking-member and said firing-member and also arranged for resisting the forward stroke of either one of said members when the other said member is in forward stroke position, and for retracting the locking-member by power transmitted from the firing-member during the forward stroke thereof, the fire-control action also comprising a grip-operable safety-member in position and arranged for blocking both of said principal members by a direct blocking engagement with one of said members.

159. In a firearm mechanism comprising a breech action retractable through a loading-stroke and coöperative with a firing-member and with a locking-member, the combination with the breech action, of a fire-control action which comprises a firing-member and a breech action-locking member each arranged for a forward stroke and for a retractive-stroke, and which also comprises a firing-member-resisting means consisting of a cam-face on the firing-member combined with movement - transmitting means consisting of a lever-device in operative relation to the locking member and said cam-face, and located in position and arranged for resisting the forward stroke of the firing-member when the locking-member is in forward stroke position, the fire-control action also comprising a safety-member grip-operable into a blocking-engagement with said locking-member when in a breech action-locking position thereof.

160. In a firearm mechanism, the combination with a breech action retractable from a forward position through a loading-stroke and having a controller-engaging lock-face, of a fire-control action comprising a sear-member-actuating firing-member and a sear-actuating trigger, and also comprising a controller operably located adjacent to the firing-member and having a locking-face in position for coacting with said breech action lock-face when the mechanism is in firing-position, and a sear-member coöperative with the firing-member and having two lever-faces, of which one lever-face is in position for coacting with the trigger for the trigger-actuation of the sear-member, and of which the other lever-face is in position and arranged for actuating the controller through an initial stroke and in a direction away from the breech action lock-face concurrently with the trigger-actuation of the sear-member, and through a further stroke by a firing-member-actuation of the sear-member.

161. In a firearm mechanism, the combination with a breech action retractable from a forward position through a loading-stroke and having a controller-engaging lock-face, of a fire-control action comprising a sear-member-actuating firing-member and a trigger, and also comprising a controller operably supported for working movements transversely to the breech action movement, and having a locking-face in position for coacting with said breech action lock-face when the mechanism is in firing-position, and a sear-member coöperative with the firing-member and having two lever-faces, of which one lever-face is in position for coacting with the trigger for the trigger-actuation of the sear-member, and of which the other lever-face is in position and arranged for actuating the controller in a direction away from the breech action lock-face concurrently with the firing-member actuation of the sear-member.

162. In a firearm mechanism, the combination with a breech action retractable from a forward position through a loading-stroke and having a controller-engaging lock-face, of a fire-control action comprising a sear-member-actuating firing-member and a trigger, and also comprising a slidable controller located forward of the firing-member and having a locking-face in position for coacting with said breech action lock-face when the mechanism is in firing-position, and a sear-member coöperative with the firing-member and having two lever-faces, of which one lever-face is in position for coacting with the trigger for the trigger-actuation of the sear-member, and of which the other lever-face is in position and arranged for sliding the controller in a direction away from the breech action lock-face concurrently with the trigger-actuation of the sear-member.

163. In a firearm mechanism, the combination with a breech action retractable from a forward position through a loading-stroke and having a controller-engaging lock-face, of a fire-control action comprising a sear-member-actuating firing-member and a trigger, and also comprising a controller operably-supported forward of the firing-member and having a locking-face in position for coacting with said breech action lock-face when the mechanism is in firing-position, and also having a sear-and-trigger disconnection means, and a sear-member coöperative with the firing-member and having two lever-faces, of which one lever-face is in position for coacting with the trigger for the trigger-actuation of the sear-member, and of which the other lever-face is in position and arranged for actuating the controller, in a direction away from the breech action lock-face and thereby simultaneously effect the withdrawal of the controller from said lock-face, and the operative disconnection of the sear-and-trigger by a firing-member-actuation of the sear-member.

164. In a firearm mechanism, the combination with a breech action retractable from a forward position through a loading-stroke and having a controller-actuating lock-face, of a fire-control action comprising a sear-member-actuating firing-member and a trigger, and also comprising a slidable controller having a locking-face in position for coacting with said breech action lock-face when the mechanism is in firing-position, and also having a sear-and-trigger disconnection means, and a sear-member coöperative with the firing-member and having two lever-faces, of which one lever-face is in position for coacting with the trigger for the trigger-actuation of the sear-member, and of which the other lever-face is in position and arranged for sliding the controller and the disconnection means in a direction from the breech action lock-face and thereby simultaneously effect the withdrawal of the controller from the breech action and the operative disconnection of the sear-and-trigger by a firing-member-actuation of the sear-member.

165. In a firearm mechanism, in combination, a frame, a breech action comprising a firing-pin and a main-slide which is retractable on the frame, a reciprocatable slide-lock, a slide-lock-retracting sear operably supported in the frame, a sear-actuating hammer, and a grip-operable safety-member in position and arranged for engaging said slide-lock in a direction in opposition to the direction of the sear-action upon the slide-lock, and thereby block the slide-lock, the main-slide and the sear against retraction, while also blocking the hammer from reaching the firing-pin.

166. In a firearm mechanism, in combination, a frame, a breech action comprising a firing-pin and a main-slide which is retractable on the frame; a reciprocatable slide-lock having a trigger-shifter and guide appurtenant thereto; a slide-lock-retracting sear operably supported in the frame, and a trigger in operative connection with said shifter and guide, and in a sear-actuating position when the slide-lock engages the main-slide; a sear-actuating hammer, and a grip-operable safety-member in position and arranged for engaging said slide-lock in a direction in opposition to the sear-action upon the slide-lock, and thereby block the slide-lock, the main-slide and the sear against retraction, while also blocking the hammer from reaching the firing-pin, and blocking the trigger against a pull-stroke and also against being shifted out of the sear-engaging position thereof.

167. In a firearm mechanism, the combination with a breech action comprising a main operating slide arranged for a rearward stroke from a forward position, of a three-member trigger-sear mechanism comprising a slide-locking trigger-shifter, a trigger-shifter-actuating sear coöperative with a firing-member, and a sear-actuating trigger in position and arranged for a shifting movement with the trigger-shifter from a sear-actuating position to a trigger-and-sear disconnection position; a sear-retracting firing-member, in position and arranged for a forward firing-stroke and for actuating the sear through a retractive-stroke beyond a firing-member-releasing position thereof during the firing-stroke of the firing-member, said main operating slide having a trigger-shifter-actuating face in position for engaging the trigger-shifter when the trigger is in the sear-actuating position thereof, and also having a firing-member-retracting face in position for retracting the firing-member rearwardly of the sear-retracting position thereof during the rearward stroke of said slide.

168. In an auto-loading firearm mechanism, the combination with a cartridge-actuatable breech action arranged for a relative short power-stroke from a forward position, followed by a longer and rearward loading-stroke, of a three-member trigger-sear mechanism comprising a slide-locking trigger-shifter, a trigger-shifter-actuating sear coöperative with a firing-member, and a sear-actuating trigger in position and arranged for a shifting movement with the trigger-shifter from a sear-actuating position to a trigger-and-sear disconnection position; a sear-retracting firing-member, in position and arranged for a forward firing-stroke and for actuating the sear through a retractive-stroke beyond a firing-member-releasing position thereof and during the firing-stroke of the firing-member, a main operating slide having a trigger-shifter-actuating lock-face in position for engaging the trigger-shifter when the trigger is in the sear-actuating position thereof, and also having a firing-member-retracting face in position for retracting the firing-member rearwardly of the sear-retracting position thereof during the rearward stroke of said slide subsequent to the power-stroke thereof.

169. In a firearm mechanism, the combination, with a retractable breech action comprising a main-slide, of a safety-train comprising a slide-lock member in position and arranged for locking and releasing the main-slide, and also comprising a second member, arranged for working movements in a direction transversely of the movements of the slide-lock member, each of these safety-train members being provided with two stop-faces, and the four such faces of the two members being arranged in two coacting pairs, of which one pair is in position and arranged to be rendered inoperative while the other pair is rendered operative, by each of the working movements of the said second member of the safety-train, and one of said pairs of stop-faces being in position and arranged for locking said slide-lock into engagement with the main-slide.

170. In a firearm mechanism, the combination with a cartridge-actuatable power-slide retractable from a forward position and having a lock-face, and with a hammer and a sear therefor, of a slide-lock slidably supported in position for engaging with said lock-face when the power-slide is in forward position, a slide-lock-actuating spring arranged for sliding said slide-lock into the path of, and for engagement with, said lock-face, and slide-lock-actuating means operatively intermediate to the slide-lock and the hammer and in position and arranged for actuation by the hammer in a direction for withdrawing the slide-lock out of the path of said lock-face after the release of the hammer by the sear.

171. In an auto-loading firearm, in combination, a frame, a trigger normally in a sear-engaging position; a main-slide provided with a firing-pin, a firing-train operatively intermediate to the trigger and power-slide and having a combined sear-operating and firing-pin-actuating hammer; a controller-retracting sear in position and arranged for a controller-actuation in one direction and for a hammer release in a reverse direction; a combined trigger-shifting and slide-locking and sear-actuating controller-member, having a working stroke in a direction transversely of the power-slide and having a guide-connection with the trigger whereby the controller-member and the trigger may be operated each transversely of, and independently of, the other; and, an actuator-face on the power-slide in position and arranged for retractively operating the controller-member and thereby shift the trigger out of the sear-engaging position thereof when the power-slide is retracted prior to a firing-stroke of the hammer.

172. In a firearm mechanism, in combination, a frame, a cartridge-actuatable power-slide having a lock-face and provided with a firing-pin; a hammer in position for striking the firing-pin when the power-slide is in forward position, and for being retracted to cocked position by the power-slide on the rearward movement thereof; a grip-operable safety-member having stop-faces in position for coacting with coacting stop-faces on a controller-member arranged for interlocking therewith; a sear, and a trigger therefor; a controller-member arranged for interlocking with the safety-member and having a stop-face in position for engaging said safety-member stop-face when the safety-member is in a safety position, and having a slide-lock face in position for engaging a lock-face on the power-slide, and also having a trigger-shifter portion arranged for shifting the trigger out of engagement with the sear during the firing-stroke of the hammer; and, an actuator appurtenant to the hammer and arranged for retracting the controller-member away from the power-slide during the firing-stroke of the hammer, for thereby simultaneously unlocking the power-slide, locking the safety-member in ineffective position, and shifting the trigger out of a sear-engaging position.

173. In a firearm mechanism, the com-

-bination with a firing-train comprising a hammer-engaging-sear, and also comprising a hammer provided with sear-actuating means in position and arranged for operating the sear during the firing-stroke of the hammer, of a shiftable trigger normally located in a sear-engaging position; a trigger-shifter; and trigger-shifter-actuating means coöperative as between the sear and the trigger-shifter and in position and arranged for engaging and actuating the trigger-shifter during the firing-stroke of the hammer and in a direction for shifting the trigger out of the sear-engaging position thereof and into an inoperative position relatively to the sear, and thereby time said trigger-shifting movement to begin at a period subsequent to the beginning and before the end of the firing-stroke of the hammer.

174. In a firearm mechanism comprising a breech action retractable through a loading-stroke and provided with a firing-device and with a lock-face, the combination with the breech action, of a fire-control action comprising two inter-coacting mechanism trains, of which one is a firing-train having a firing-member which is coöperative with relation to said firing-device when the breech action is in firing-position, and of which the other is a controller-train having a locking-member in coöperative relation with said lock-face and also with said firing-train, when the breech action is in firing-position.

175. In a firearm mechanism comprising a breech action retractive through a loading-stroke and provided with a lock-face, the combination with the breech action, of a controller-train comprising a grip-operable member having a stop-face, and also comprising a reciprocatable member having one face in position for coacting with the breech action lock-face and having another face in position for coacting with said stop-face of the grip-operable member, said reciprocatable member being in position and arranged for actuation into position for engaging said lock-face of the breech action and for then being engaged and held in that position by said stop-face of the grip-operable member.

176. In a firearm mechanism comprising a slidably-supported breech action retractable through a loading-stroke and provided with a lock-face, the combination therewith of a controller-train comprising a grip-operable member having a stop-face, and also comprising a slidably-supported and reciprocatable member having at one end thereof one face in position for coacting with the breech action lock-face and having another face in position for coacting with said stop-face of the grip-operable member, said reciprocatable member being arranged for a sliding-movement into engagement with said lock-face and for then being engaged and held in that position by said stop-face of the grip-operable member.

177. In an auto-loading firearm, in combination, a cartridge-actuated power-slide, a grip-operable safety-stop device consisting of two coacting members of which the first said member is provided with a locking-face in position for engaging with a coacting face on the power-slide, and of which the second said member is provided with a movement-limiter face in position for locking the said first coacting member in the said slide-engaging position, for thereby locking the power-slide in the forward position thereof on the release of said grip-operable device.

178. In a firearm mechanism, in combination, a breech action comprising a power-slide having a lock-face in position for engaging with a slide-lock when the slide is in the forward position thereof, a slide-lock in position for engaging said lock-face; a hammer coöperative with the breech action; slide-lock retracting means operatively intermediate to the slide-lock and the hammer and in position and arranged for actuation by the hammer during the firing-stroke thereof, and also arranged and connecting for withdrawing the slide-lock from the path of said lock-face during the time while the hammer is making its firing-stroke; a safety-member having a spring-actuation stroke into a rearward and effective position, and grip-operable into a forward and ineffective position, and movement-resisting means operatively-intermediate to the safety-member and the slide-lock and hammer, and in position and arranged, when the safety-member is in the said rearward and effective position thereof, for simpultaneously blocking the slide-lock against withdrawal from the power-slide and the hammer against making its firing-stroke.

179. In a firearm mechanism, in combination, a breeching mechanism which comprises a power-slide retractable through a loading-stroke and carrying a firing-device; a slide-lock having a slide-engaging face and movable transversely of the power-slide from and into engagement therewith; a hammer having a cock-notch and in position and arranged for coacting with a sear and with the power-slide and the firing-device; a combined sear and slide-lock retractor coöperative with the hammer and the cock-notch thereof, and also with the slide-lock; spring-actuation means coöperative with and as between the slide-lock and the sear, and in position and arranged for actuating the slide-lock toward the slide-engaging position thereof, and for simultaneously actuating the sear toward the cock-notch-engaging position thereof, and in a direction reversely to the slide-lock-retracting movement thereof; and, a grip-operable safety-member in position and arranged on one stroke thereof for blocking both the power-slide and the sear by a resistance through the slide-lock, and for simultaneously blocking the hammer against making its firing-stroke by a resistance through both the slide-lock and the sear.

180. In a firearm, in combination, a frame, a breech action having a main-slide retractable on the frame and provided with a firing-device and a lock-face; of a mechanism-blocking safety-member operably-supported on the frame and spring-actuatable into a mechanism-blocking position and also grip-operable into a mechanism-releasing position; a firing-member operably-supported in position and arranged for coacting with the breech action and with said firing-device thereof; a main-spring operatively-intermediate to and actuating the safety-member and the firing-member and actuating each said member by a reaction against the other, and in position and arranged for actuating the safety-member toward the mechanism-blocking position thereof, and for normally actuating the firing-member through the firing-stroke thereof.

181. In a firearm, in combination, a frame, a breech action having a main-slide retractable on the frame and provided with a firing-device and a lock-face; of a mechanism-blocking safety-member operably-supported on the frame and spring-actuatable into a mechanism-blocking position and also grip-operable into a mechanism-releasing position; a firing-member operably-supported in position and arranged for coacting with the breech action and with said firing-device thereof; a main-spring operatively-intermediate to and actuating the safety-member and the firing-member and actuating each said member by a reaction against the other, and in position and arranged for actuating the safety-member toward the mechanism-blocking position thereof, and for normally actuating the firing-member through the firing-stroke thereof; a spring-actuated slide-lock in position for engaging said lock-face of the main-slide, and slide-lock-retracting means in position and arranged for retracting the slide-lock out of engagement with said lock-face by the force of said main-spring transmitted through the firing-member.

182. In a firearm, in combination, a frame, a breech action having a main-slide retractable on the frame and provided with a firing-device and a lock-face; of a mechanism-blocking safety-member operably-supported on the frame and spring-actuatable into a mechanism-blocking position and also grip-operable into a mechanism-releasing position; a firing-member operably-supported in position and arranged for coacting with the breech action and with said firing-device thereof; a main-spring operatively-intermediate to and actuating the safety-member and the firing-member and actuating each said member by a reaction against the other, and in position and arranged for actuating the safety-member toward the mechanism-blocking position thereof, and for normally actuating the firing-member through the firing-stroke thereof; a spring-actuated slide-lock in position for engaging said lock-face of the main-slide; slide-lock-retracting means in position and arranged for retracting the slide-lock out of engagement with said lock-face by the force of said main-spring transmitted through the firing-member, and a locking-face on the safety-member and actuatable into position for blocking when in said spring-actuated position thereof, the slide-lock into engagement with the main-slide, and actuatable by the force of said main-spring transmitted through the safety-member and by a reaction which extends first against the firing member and then extends through the firing-member and the slide-lock retracting means, and thence through the slide-lock, to the said locking-face of the safety-member; thereby completing a circuit of active and resistant forces, and a circuit of coacting members blocked against individual or collective operation until released by a grip-stroke of the safety-member.

183. In an auto-loading firearm, in combination, a frame, a breech action having a main-slide retractable on the frame from a firing-position and through a loading-stroke, and provided with a lock-face; of a mechanism-blocking safety-member pivotally-supported on the frame and spring-actuatable into a mechanism-blocking position and also grip-operable into a mechanism-releasing position; a firing-member pivotally-supported in position and arranged for coacting with the breech action when this action is in said firing-position thereof; a main-spring operatively-intermediate to and actuating the pivotally-supported safety-member and the pivotally-supported firing-member and actuating each said member by a reaction against the other, and in position, connected and arranged for actuating the safety-member toward the mechanism-blocking position thereof by a swinging movement in one direction, and for normally actuating the firing-member through the firing-stroke thereof by a swinging movement in a reverse direction.

184. In an auto-loading firearm, in combination, a frame, a breech action having a main-slide retractable on the frame from a firing-position and through a loading-stroke, and provided with a lock-face; of a mechanism-blocking safety-member pivotally-supported on the frame and spring-actuatable into a mechanism-blocking position and also grip-operable into a mechanism-releasing position; a firing-member pivotally-supported in position and arranged for coacting with the breech action when this action is in said firing-position thereof; a main-spring operatively-intermediate to and actuating the pivotally-supported safety-member and the pivotally-supported firing-member and actuating each said member by a reaction against the other, and in position, connected and arranged for actuating the safety-member toward the mechanism-blocking position thereof by a swinging movement in one direction, and for normally actuating the firing-member through the firing-stroke thereof by a swinging movement in a reverse direction; a slide-lock operably-supported in position for engaging said lock-face of the main-slide when the breech action is in firing-position, and slide-lock-retracting means in position and arranged for retracting the slide-lock out of engagement with said lock-face by the force of said main-spring transmitted through the firing-member.

185. In an auto-loading firearm, in combination, a frame, a breech action having a main-slide retractable on the frame from a firing-position and through a loading-stroke, and provided with a lock-face; of a mechanism-blocking safety-member pivotally-supported on the frame and spring-actuatable into a mechanism-blocking position and also grip-operable into a mechanism-releasing position; a firing-member pivotally-supported in position and arranged for coacting with the breech action when this action is in said firing-position thereof; a main-spring operatively-intermediate to and actuating the pivotally-supported safety-member and the pivotally-supported firing-member and actuating each said member by a reaction against the other, and in position, connected and arranged for actuating the safety-member toward the mechanism-blocking position thereof by a swinging movement in one direction, and for normally actuating the firing-member through the firing-stroke thereof by a swinging movement in a reverse direction; a slide-lock operably-supported in position for engaging said lock-face of the main-slide when the breech action is in firing-position; and slide-lock-retracting means in position and arranged for retracting the slide-lock out of engagement with said lock-face by the force of said main-spring transmitted through the firing-member, and a locking-face on the safety-member in position for blocking,—when the safety-member is in said spring-actuated position thereof,—the slide-lock into engagement with said lock-face of the main-slide by the force of said main-spring transmitted through the safety-member and by a reaction against the firing-member.

186. In a firearm mechanism, the combination with a sear and a hammer in coöperative relation each with the other, of a shiftable trigger normally located in a sear-engaging position when the mechanism is in a firing-position, a trigger-shifter, and trigger-shifter actuating means in position and arranged for operation by the hammer during the firing-stroke thereof.

187. In a firearm mechanism, the combination with a sear and a hammer in coöperative relation each with the other, of a sear-actuating trigger shiftable from an operative to an inoperative position and located in a sear-engaging position when the mechanism is in a firing-position, a trigger-shifter, and a trigger-shifter-actuating device in position for engaging the trigger-shifter and arranged for operation by the hammer during the firing-stroke thereof.

188. In a firearm mechanism, the combination with a sear and a hammer in coöperative relation each with the other, of a shiftable trigger normally located in a sear-engagable position when the mechanism is in a firing-position, a trigger-shifter, and a trigger-shifter actuating device comprising a lever-arm in position for engaging and actuating the trigger-shifter and also comprising lever-arm-actuating means appurtenant to the hammer and arranged for operation by the hammer during the firing-stroke thereof.

189. In a firearm mechanism, the combination with a sear-member and a hammer in coöperative relation each with the other, of a shiftable trigger normally located in a sear-engageable position when the mechanism is in a firing-position, a trigger-shifter, and a trigger-shifter actuating device comprising an actuator-face in position on the sear-member for engaging the trigger-shifter, and a sear-actuating cam-face appurtenant to the hammer and in position and arranged for operating the sear and thereby operating the trigger-shifter after the disengagement of the sear from the hammer by the pull-stroke of the trigger, and during the firing-stroke of the hammer.

190. In a firearm mechanism, the combination with a trigger-actuatable sear arranged for engaging the cock-notch of a hammer, and with a hammer provided with a sear-engaging cock-notch and with sear-actuating means arranged for operating the sear by power from the hammer subsequent to the disengagement of the sear from the hammer cock-notch and during some portion of the firing-stroke of the hammer, of a shiftable trigger normally located in a sear-engaging position when the firing mechanism is in a firing-position, a trigger-shifter, and trigger-shifter-actuating means in coöperative relation with the sear and also with the trigger-shifter and in position and arranged for actuating the trigger-shifter during some portion of the firing-stroke of the hammer and in a direction for shifting the trigger out of the sear-engaging position thereof, whereby to make the trigger become inoperative relatively to the sear at a time during the firing-stroke of the hammer.

191. In a firearm mechanism, in combination, a frame, a power slide retractable from a firing-position and having a rearwardly-facing stop-face, a reciprocatable trigger-shifting contrtoller-membere having a face in position for engaging said stop-face of the power-slide, a firing-train comprising a sear-actuating device arranged for retractively-operating a sear-member at a time during a firing-stroke of the firing-train, a controller-retracting sear-member arranged for actuation by the sear-actuating device of the firing-train, and a four-motion trigger in position and arranged in coöperative relation with the controller-member and the sear-member, and thereby shiftable to an inoperative position relatively to the sear-member by a retraction of the power-slide acting through said stop-face and controller-member, and also by the firing-stroke of the firing-train acting through the sear-member and controller-member.

192. In a firearm mechanism, in combination, a frame, a power-slide retractable from a firing-position and having a rearwardly-facing stop-face, a reciprocatable trigger-shifting controller-member having a face in position for engaging said stop-face of the power-slide, a firing-train comprising a sear-actuating device arranged for retractively-operating a sear-member at a time during a firing-stroke of the firing-train, a sear-member in position and arranged for actuation by the sear-actuating device of the firing-train, a controller-retracting lever-device on the sear-member and in position for engaging and retracting the controller-member out of engagement with the stop-face of the power-slide, and a four-motion trigger coöperative with the controller-member and with the sear-member, and in position and arranged for being shifted by the controller member to an inoperative position relatively to the sear-member by a retraction of the power-slide acting through said stop-face and controller-member, and also by the firing-stroke of the firing-train acting through the sear-member and controller member.

193. In a firearm mechanism, in combination, a frame, a power-slide retractable from a firing-position and having a rearwardly-facing stop-face, a reciprocatable trigger-shifting controller-member having a face for engaging said stop-face of the power-slide, a firing-train comprising a sear-actuating device consisting of a cam-face arranged for retractively-operating a sear at a time during a firing-stroke of the firing-train, a controller-retracting sear in position and arranged for actuation by the sear-actuating cam-face of the firing-train, and a four-motion trigger coöperative with the controller-member and with the sear, and in position and connected for being shifted by the controller-member to an inoperative position relatively to the sear-member by a retraction of the power-slide acting through said stop-face and controller-member, and also by the firing-stroke of the firing-train acting through the sear-member and controller-member.

194. In a firearm mechanism, in combination, a frame, a power-slide retractable from a firing-position and having a rearwardly-facing stop-face, a trigger-shifting controller-member having a face for engaging said stop-face of the power-slide, a firing-train comprising a sear and also provided with controller-retracting means in position and arranged for retractively-operating the controller-member at a time during the firing-stroke of the firing-train, and a four-motion trigger coöperative with the controller-member and the sear, and in position and arranged for being shifted by the controller to an inoperative position relatively to the sear by a retraction of the power-slide acting through said stop-face and controller, and also by the firing-stroke of the firing-train acting through the controller-retracting means and the controller-member.

195. In a firearm, in combination, a breech action retractable from a forward position and having a lock-face, a safety-control train comprising a breech action-locking member and a safety-member; said locking-member having one lock-face in position and arranged for engaging said breech action lock-face and having another lock-face for engaging a lock-face of the safety-member, and also in position and arranged for beginning a locking engagement with the breech action before disengaging from the lock-face of the safety-member, and for beginning a locking-engagement with the safety-member before disengaging from the lock-face of the breech action, whereby the breech action and the safety-member are always one of them in locked position and both are not unlocked at any one time.

196. In a firearm, in combination, a breech action retractable from a forward position and having a lock-face, a firing-train having a firing-member in coöperative relation with the breech action, a sear and a trigger therefor, a safety-control train comprising a breech action-locking member and a safety-member, said locking-member having one lock-face in position and arranged for engaging said breech action lock-face and having another locking-face for engaging a lock-face for the safety-member, and also in position and arranged for beginning a locking engagement with the breech action before disengaging from the lock-face of the safety-member, and for beginning a locking-engagement with the safety-member before disengaging from the lock-face of the breech action, whereby the breech action and the safety-member are always one of them in locked position and both are not unlocked at any one time; trigger-shifting means operatively connecting the trigger with the locking-member, and locking-member actuator means also constituting firing-stroke-resisting means relatively to the firing-train, and together with the trigger-shifter, being in position and arranged for shifting the trigger to an ineffective position relatively to the sear, and also for withdrawing the firing-stroke-resisting means to the ineffective position thereof relatively to the firing-train during that portion of the locking-member retractive movement in which the breech action lock-face and a safety-member lock-face are both in locking engagement with the said locking-member.

197. In a firearm, in combination, a retractable breech action having a main-slide provided with a lock-face, and also provided with a guide-surface extending forwardly from said lock-face, and with a release-space located forwardly of said guide-surface, a safety-control train comprising a 'slide-lock member having a slide-engaging face in position and operable for engaging and releasing the lock-face of the main-slide, and having a face for engaging against said guide-surface during the retractive movement of the breech action and thereby hold the slide-lock in retractive position, and also having two faces for engaging two coacting faces, respectively, on a grip-operable safety-member; the safety-control train also comprising a safety-member having a face in position and arranged for engaging and thereby holding, on one stroke thereof, the slide-lock in engagement with said main-slide lock-face when the breech action is in forward position, and for holding the slide-lock projecting into said release space when the breech action is fully retracted; said safety-member also having a face in position and arranged, when the slide-lock is retracted, for engaging a face on the slide-lock and thereby holding the safety member in the ineffective position thereof relatively to the locking of the main-slide.

198. In a firearm mechanism, the combination with a breech action retractable from a forward position through a loading-stroke and having a pair of actuator faces comprising a rearwardly-located firing-member-retracting face and a forwardly-located disconnector-retracting face, of a firing-member operably-supported in position for a forward firing-movement and for retraction by said rearwardly-located face of the breech action from the forward position thereof; a sear coöperative with the firing-member, and a trigger coöperative with the sear and also coöperative with a trigger-and-sear disconnector; a trigger-and-sear disconnector operably-supported in position and arranged for a retractive actuation by said forwardly-located face of the breech action when this action is retracted from said forward position thereof, and for maintaining the trigger in a sear-actuating position while the disconnector is in engagement with said forwardly-located face and the breech action is in forward position; and a disconnector-retracting actuator device appurtenant to the firing-member, and in position and arranged for retracting said disconnector during the firing-stroke of the firing member when said forwardly-located face of the breech action is in forward-position, and also arranged for a retraction to an ineffective position relatively to the trigger-and-sear disconnector on the retraction of the firing-member by a retractive movement of said rearwardly located face of the breech action from said forward position thereof.

199. In a firearm mechanism, the combination with a breech action retractable from a forward position through a loading-stroke and having a pair of actuator faces comprising a rearwardly-located firing-member-retracting face and a forwardly-located disconnector-retracting face, of a firing-member pivotally-supported in position for a forward firing-movement and for retraction by said rearwardly-located face of the breech action from the forward position thereof; a sear coöperative with the firing-member, and a trigger coöperative with the sear and also coöperative with a trigger-and-sear disconnector; a trigger-and-sear disconnector slidably-supported in position and arranged for a retractive actuation by said forwardly-located face of the breech action when this action is retracted from said forward position thereof; and for maintaining the trigger in a sear-actuating position while the disconnector is in engagement with said forwardly-located face and the breech action is in forward position; and a disconnector retracting actuator device appurtenant to the firing-member, and in position and arranged for retracting said disconnector during the firing-stroke of the firing-member when said forwardly-located face of the breech action is in forward-position and also arranged for a retraction to an ineffective position relatively to the trigger-and-sear disconnection on the retraction of the firing-member by a retractive movement of said rearwardly-located face of the breech action from said forward position thereof.

200. In a firearm mechanism, the combination with a breech action retractable from a forward position through a loading-stroke and having a pair of actuator faces comprising a rearwardly-located firing-member-retracting face and a forwardly-located disconnector-retracting face, of a firing-member pivotally-supported in position for a forward firing-movement and for retraction by said rearwardly-located face of the breech action from the forward position thereof; a sear coöperative with the firing-member, and a trigger coöperative with the sear and also coöperative with a trigger-and-sear disconnector; a trigger-and-sear disconnector slidably-supported in position and arranged for a retractive actuation by said forwardly-located face of the breech action when this action is retracted from said forward position thereof, and for maintaining the trigger in a sear-actuating position while the disconnector is in engagement with said forwardly-located face and the breech action is in forward position; and a disconnector-retracting actuator device carried on the firing-member, and in position and arranged for retracting said disconnector during the firing-stroke of the firing-member when said forwardly-located face of the breech action is in forward-position and also arranged for a retraction by and with the firing-member to an ineffective position relatively to the trigger-and-sear disconnector on the retraction of the firing-member by a retractive movement of said rearwardly-located face of the breech action from said forward position thereof.

201. In a firearm mechanism, the combination with a breech action retractable from a forward position through a loading-stroke and having a pair of actuator faces comprising a rearwardly-located firing-member-retracting face and a forwardly-located disconnector-retracting face, of a firing-member operably-supported in position for a forward firing-movement and for retraction by said rearwardly-located face of the breech action from the forward position thereof; a sear coöperative with the firing-member, and a trigger coöperative with the sear and also coöperative with a trigger-and-sear disconnector; a trigger-and-sear disconnector operably-supported in position and arranged for a retractive actuation by said forwardly-located face of the breech action when this action is retracted from said forward position thereof, and for maintaining the trigger in a sear-actuating position while the disconnector is in engagement with said forwardly-located face and the breech action is in forward position; and a disconnector-retracting actuator device carried on the firing-member, and in position and arranged for retracting said disconnector during the firing-stroke of the firing-member when said forwardly-located face of the breech action is in forward position and also arranged for a retraction by and with the firing-member to an ineffective position relatively to the trigger-and-sear disconnector on the retraction of the firing-member by a retractive movement of said rearwardly-located face of the breech action from said forward position thereof.

202. In an auto-loading firearm comprising a power-slide carrying the firing-pin, the combination with the power-slide, of a firing-train comprising a trigger and a trigger-shifter, and also comprising a hammer, coöperative with the firing-pin, and a hammer actuated sear which connects with and actuates the trigger-shifter.

203. In a firearm mechanism comprising a breech action supported for a retractive movement from a forward position and provided with a firing-device and with a lock-face, the combination with the breech action of a firing-train comprising a hammer, coöperative with the firing-device, and a controller-member in position and arranged for engaging and withdrawing from said lock-face when the breech action is in forward position, and also having hammer-resisting means appurtenant thereto and in position and arranged for blocking the hammer against making its firing-stroke when the controller-member is in position for engaging said lock-face.

204. In an auto-loading firearm, in combination, a frame, a non-sliding barrel, a breech action reciprocatable relatively to the barrel and comprising a power-slide, a firing-train comprising a firing-member, a safety-train which has a grip-operable safey-member in position and arranged for controlling the operation thereof, and which also has a slide-locking face in position for engaging and thereby locking the power-slide in its forward and firing-position on the grip-release of said grip-operable member, and means appurtenant to the firing-train for retracting said slide-locking face during the firing-stroke of the firing-member.

205. In an auto-loading firearm mechanism, a cartridge-actuatable power-slide, a sear and a hammer in coöperative relation each with the other; a shiftably-supported trigger normally located in a sear-engageable position when the firearm mechanism is in firing-position; a combined trigger-shifter and hammer-resistant and power-slide lock, in position and arranged for actuation by and from the trigger and sear through a first stage of its trigger-shifting stroke; and actuating means in position and arranged for operating said combined trigger-shifter and slide-lock through a second stage of its trigger-shifting stroke and shift the trigger to an ineffective position relatively to the sear and simultaneously withdraw said lock in a direction away from the power-slide.

206. In a firearm mechanism comprising a retractable breech action provided with a firing-device and a lock-face, the combination with the breech action of a firing-train comprising a hammer coöperative with the firing-device, a controller member in position and arranged for actuation into a lock-face-engaging position and for being withdrawn from said lock-face, and also having means appurtenant thereto for blocking the hammer against making its firing-stroke when the controller is in position for engaging the lock-face, and a grip-operable safety-device in position and operable for blocking and releasing the controller-member and thereby simultaneously locking the breech action in firing-position and blocking the hammer against making its firing-stroke.

207. In a firearm mechanism, the combination with a breech action mechanism supported for a retractive-stroke from a forward position and having a lock-face, of a firing-member operably supported in position for coacting with the breech action mechanism, a controller-member operably-supported in position for coacting with said lock-face, a sear-member consisting of a combined sear and controller-retractor, and coöperative with the firing-member and also with the controller-member, a trigger coöperative with the sear-member, and a controller-blocking safety-member in position and arranged for spring-actuation into a controller-blocking position and grip-operable into a controller-releasing position.

208. In a firearm mechanism, the combination with a breech action mechanism supported for a retractive-stroke from a forward position and having a lock-face, of a firing-member operably-supported in position for coacting with the breech action mechanism, a breech action-locking controller member operably-supported in position for coacting with said lock-face, a sear-member consisting of a combined sear and controller-retractor, and coöperative with the firing-member and also with the controller-member, a trigger coöperative with the sear-member, and a controller-blocking safety-member in position and arranged for spring-actuation into a controller-blocking position and grip-operable into a controller-releasing position.

209. In a firearm mechanism, the combination with a breech action retractable from a forward position and having a lock-face and a firing-device, of a firing-member operably-supported in position for coacting with said firing-device when the breech action is in forward position, a breech action-locking controller-member operably-supported in position for coacting with said lock-face and also for direct coaction with a safety-member, a sear-member consisting of a combined sear and controller-retractor, and coöperative with the firing-member and also with the controller-member, a trigger coöperative with the sear-member, and a controller-blocking safety-member in position and arranged for spring-actuation into a controller-blocking position and grip-operable into a controller-releasing position.

210. In a firearm mechanism, the combination with a breech action retractable from a forward position and having a lock-face and a firing-device, of a firing-member pivotally-supported in position for coacting with said firing-device when the breech action is in forward position, a breech action-locking controller-member slidably-supported in position for coacting with said lock-face and also for direct coaction with a safety-member, a sear-member consisting of a combined sear and controller-retractor, and coöperative with the firing-member and also with the controller-member, a trigger coöperative with the sear-member, and a controller-blocking safety-member in position and arranged for spring-actuation into a controller-blocking position, and grip-operable into a controller-releasing position.

211. In a firearm mechanism, the combination with a breech action retractable from a forward position and having a lock-face, of a firing-member supported in position for a firing-stroke and for coacting with the breech action, a breech action-locking controller-member in position and arranged for coacting with said lock-face, a controller-retracting sear-member coöperative with the firing-member and also with the controller-member, a controller-blocking safety-member in position and arranged for spring-actuation into a controller-blocking position and grip-operable into a controller-releasing position, and spring-actuation means in position and arranged for actuating the firing-member with a force increasing during the firing-stroke thereof, and for actuating said safety-member into the controller-blocking position thereof when the firing-member is in firing-position.

212. In a firearm mechanism, the combination with a breech action retractable from a forward position and having a lock-face, of a firing-member pivotally-supported in position for a firing-stroke and for coacting with the breech action, a breech action-locking controller-member slidably-supported in position and arranged for coacting with said lock-face, a controller-retracting sear-member coöperative with the firing-member and also with the sliding controller-member, a controller-blocking safety-member in position and arranged for spring-actuation into a controller blocking position and grip-operable into a controller-releasing position, and spring-actuation means in position and arranged for actuating the firing-member with a force increasing during the firing-stroke thereof and simultaneously actuating said safety-member toward the controller-blocking position thereof.

213. In a firearm mechanism, the combination with a breech action retractable from a forward position and having a lock-face, of a firing-member operably-supported in position for coacting with the breech action, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and spring-actuation means supported by and connecting the firing-member and safety-member and arranged for actuating the firing-member with a force which increases during the firing-stroke thereof, and actuating said safety-member toward the controller-blocking position thereof with a force which decreases during the firing-stroke of the firing-member.

214. In a firearm mechanism, the combination with a breech action retractable from a forward position and having a lock-face, of a firing-member operably-supported in position for a firing-stroke and for coacting with the breech action, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and spring-actuation means connected with the firing-member and with the safety-member and arranged for actuating the firing-member and simultaneously actuating said safety-member toward the controller-blocking position thereof.

215. In a firearm mechanism, the combination with a breech action retractable from a forward position and having a lock-face and a firing-device, of a firing-member operably-supported in position for coacting with said firing-device, a breech action-locking controller member operably-supported in position for coacting with said lock-face, a sear-member coöperative with the firing-member and also with the controller-member, a trigger coöperative with the sear-member, a controller-blocking safety-member in position and arranged for spring-actuation into a controller-blocking position and grip-operable into a controller-releasing position, and spring-actuation means in position operatively-intermediate to the safety-member and the firing-member and arranged for actuating the firing-member through the firing-stroke thereof, and also in position and arranged for actuating the safety-member toward the controller-blocking position thereof by a reaction against the firing-member.

216. In a firearm mechanism, the combination with a breech action retractable from a forward position and having a lock-face and a firing-device, of a firing-member pivotally-supported in position for coacting with said firing-device, a breech action-locking controller-member slidably-supported in position for coacting with said lock-face, a sear-member coöperative with the firing-member and also with the controller-member, a trigger coöperative with the sear-member, a controller-blocking safety-member in position and arranged for spring-actuation into a controller-blocking position and grip-operable into a controller-releasing position, and spring-actuation means in position operatively-intermediate to the safety-member and the firing-member and arranged for actuating the firing-member through the firing-stroke thereof, and also in position and arranged for actuating the safety-member toward the controller-blocking position thereof by a reaction against the firing-member.

217. In a firearm mechanism, the combination with a breech action retractable from a forward position and having a lock-face and a firing-device, of a firing-member operatively-supported in position for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and a spring supported on the safety-member and operatively connected with the firing-member, for actuating the firing-member through the firing-stroke thereof, and also in position and arranged for normally actuating the safety-member into the controller-blocking position thereof by a reaction against the firing member.

218. In a firearm mechanism, the combination with a breech action retractable from a forward position and having a lock-face and a firing-device, of a firing-member pivotally-supported in position for coacting with said firing-device, a breech action-locking controller-member slidably-supported in position for coacting with said lock-face, a sear-member coöperative with the firing-ing-member and also with the controller-member; a controller-blocking safety-member in position and arranged for spring-actuation into a controller-blocking position and grip-operable into a controller-releasing position, and a spring supported on the safety-member and operatively connected with the firing-member, for actuating the firing-member through the firing-stroke thereof, and also in position and arranged for normally actuating the safety member into the controller-blocking position thereof by a reaction against the pivotally-supported firing-member.

219. In a firearm mechanism, the combination with a breech action retractable from a forward position and having a lock-face, of a firing-member operably-supported in position for coacting with the breech action, a breech action-locking controller-member operably-supported in position for coacting with said lock-face, a controller-retracting sear-member coöperative with the firing-member and also with the controller-member, and a combined spring-actuation means and actuation-modifier means comprising a grip-operable safety-member and an actuator-device supported on the safety-member and operatively connected with the firing-member and arranged for actuating the fireing-member through the firing-stroke thereof by a reaction against the safety-member, and in position and arranged for normally actuating the safety-member into the controller-blocking position thereof by a reaction against the firing-member.

220. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and spring-actuation means in position and arranged for actuating the firing-member and for actuating said safety-member into the controller-blocking position thereof when the firing-member is in firing-position, and actuation-modifying means appurtenant to the firing-train and in position and arranged for interrupting the spring-actuation of the safety-member when the firing-member reaches the latter part of the firing-stroke thereof.

221. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and spring-actuation means in position and arranged for actuating the firing-member with a force increasing during the firing-stroke thereof, and for actuating said safety-member into the controller-blocking position thereof when the firing-member is in firing-position, and actuation-modifying means appurtenant to the firing-train and in position and arranged for interrupting the spring-actuation of the safety-member when the firing-member reaches the latter part of the firing-stroke thereof.

222. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and spring-actuation means in position and arranged for actuating the firing-member and for actuating said safety-member into the controller-blocking position thereof when the firing-member is in firing-position, and actuation-modifying means appurtenant to the firing-member of the firing-train and in position and arranged for interrupting the spring-actuation of the safety-member when the firing-member reaches the latter part of the firing-stroke thereof.

223. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, and spring-actuation means arranged for actuating the firing-member with a force increasing during the firing-stroke thereof, and for actuating said safety-member into the controller-blocking position thereof when the firing-member is in firing-position, and actuation-modifying means appurtenant to the firing-member of the firing-train and in position and arranged for interrupting the spring-actuation of the safety-member when the firing-member reaches the latter part of the firing-stroke thereof.

224. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, spring-actuation means arranged for actuating the firing-member through the firing-stroke thereof, and for actuating said safety-member into the controller-blocking position thereof when the firing-member is in firing-position, and actuation-modifying means appurtenant to the firing-train and in position and arranged for decreasing the force of the spring-actuation of the safety-member during the firing-stroke of the firing-member.

225. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a controller-blocking safety-member in position and arranged for spring-actuation into a controller-blocking position and grip-operable into a controller-releasing position, spring-actuation means arranged for actuating the firing-member with a force increasing during the firing-stroke thereof, and for actuating said safety-member into the controller-blocking position thereof when the firing-member is in firing-position, and actuation-modifying means appurtenant to the firing-train and in position and arranged for decreasing the force of the spring-actuation of the safety-member during the firing-stroke of the firing-member.

226. In a firearm mechanism, the combination with a breech action retractable from a forward position and having a lock-face and a firing-device, of a firing-train comprising a firing-member operably-supported in position for a firing-stroke and for coacting with said firing-device, a breech action-locking controller-member operably-supported in position for coacting with said lock-face, a sear-member coöperative with the firing-member and also with the controller-member, a trigger and sear-and-trigger disconnection means coöperative with the controller-member and the sear-member, a controller-blocking safety-member in position and arranged for spring-actuation into a controller-blocking position and grip-operable into a controller-releasing position, spring-actuation means arranged for actuating the firing-member through the firing-stroke thereof and for actuating said safety-member into the controller-blocking position thereof when the firing-member is in firing-position, and actuation-modifying means appurtenant to the firing-train and in position and arranged for decreasing the force of the spring-actuation of the safety-member during the firing-stroke of the firing-member and concurrently with the sear-and-trigger disconnection by a movement of the controller-member.

227. In a firearm mechanism, the combination with a breech action retractable from a forward position and having a lock-face and a firing-device, of a firing-train comprising a firing-member pivotally-supported in position for a firing-stroke and for coacting with said firing-device, a breech action-locking controller-member slidably-supported in position for coacting with said lock-face, a sear-member coöperative with the firing-member and also with the controller-member, a trigger and sear-and-trigger-disconnection means coöperative with the controller-member and also with the sear-member, a controller-blocking safety-member in position and arranged for spring-actuation into a controller-blocking position and grip-operable into a controller-releasing position, spring-actuation means arranged for actuating the firing-member through the firing-stroke thereof and for actuating said safety-member into the controller-blocking position thereof when the firing-member is in firing-position, and actuation-modifying means appurtenant to the firing-train and in position and arranged for progressively decreasing the force of the spring-actuation of the safety-member during the firing-stroke of the firing-member and concurrently with the sear-and-trigger disconnection by a sliding movement of the controller-member.

228. In a firearm mechanism, the combination with a cartridge-actuatable power-slide having a lock-face, and with a hammer, of a slide-lock supported for reciprocatory movements from and into the path of said lock-face, a spring arranged for actuating said slide-lock into the path of said lock-face, and slide-lock-retracting means operatively-intermediate to the slide-lock and the hammer and in position and arranged for actuation by the hammer and thereby moving the slide-lock out of said path of the lock-face.

229. In a firearm mechanism, the combination with a cartridge-actuatable power-slide having a lock-face, and with a hammer, of a slide-lock slidably supported in position for engaging said lock-face when the power-slide is in forward position, a slide-lock-actuating spring arranged for sliding said slide-lock into the path of and for engagement with said lock-face, and slide-lock-actuating means operatively-intermediate to the slide-lock and the hammer and arranged for actuation by the hammer and also arranged for sliding the slide-lock out of the path of said lock-face during the firing-stroke of the hammer.

230. In a firearm mechanism, the combination with a cartridge-actuatable power-slide provided with a firing-pin and having a lock-face, and with a hammer, of a slide-lock operably-supported in position for engaging and releasing said lock-face when the power-slide is in forward position, and slide-lock-retracting means operatively-intermediate to the slide-lock and the hammer and arranged for actuation by the hammer during the firing-stroke thereof, said slide-lock and said retracting means being also in position and arranged for timing the movement of the slide-lock relatively to the firing-stroke of the hammer for only withdrawing said slide-lock out of the path of said lock-face when the hammer has approached near to and is about to strike the firing-pin.

231. In an auto-loading firearm mechanism, in combination, a power-slide provided with a lock-face and carrying a firing-pin, a slide-lock supported for working movements toward and from the power-slide and in position for coacting with said lock-face, a hammer in position and arranged for striking the firing-pin when the power-slide is in forward position, and slide-lock retraction means in position and arranged for holding the slide-lock out of the path of said lock-face at the moment the firing-pin is struck by the hammer.

232. In a firearm mechanism, in combination, a frame, a breech action comprising a main-slide and a firing-pin, and having a rearwardly-facing detent-face; a slide-detaining controller-member in position and arranged for engaging said detent-face when the slide is in firing-position; a sear coöperative with said controller and connected for withdrawing the controller out of engagement with the slide on a full forward movement of the sear; a hammer pivotally-supported on the frame in position for striking the firing-pin when the slide is in firing-position, and a sear-operating actuator-face in position on the hammer for engaging and actuating the sear and for completing a full-stroke movement of the sear before the hammer reaches and strikes the firing-pin, whereby said controller is withdrawn from said detent-face of the slide by the sear during the forward stroke of the hammer and by an actuator carried on the hammer.

233. In a fire-arm having a frame provided with a guideway for a barrel-carrying power-slide adapted for also carrying the firearm-sights, the combination with the frame of a power-slide provided with the firearm-sights and in sliding engagement with said guideway of the frame and having a barrel-chamber, a barrel located in said barrel-chamber and having a recess provided with a pair of faces located transversely of the barrel, said barrel being mounted in and supported by the power-slide free of supportive engagement with the frame, and also supported and arranged for sliding and rotative movements within said chamber relatively to the power-slide, a barrel-positioning connection between the barrel and the frame and consisting of a projection carried on the frame and provided with barrel-locating faces in position for engaging with said recess-faces without supportive engagement with the barrel, and barrel-detaining means arranged for holding the barrel against rotation, and also operable for releasing and thereby permitting the barrel to be rotated within said barrel-chamber out of engagement with said projection of the frame, whereby the precision of alinement of the barrel relatively to the power-slide and to firearm-sights thereon is made independent of the alinement relations between the slide and the frame, and also independent of the positioning connection between the barrel and the frame.

234. In a firearm having a frame provided with a guideway for a barrel-carrying power-slide adapted for also carrying the firearm-sights, the combination with the frame of a power-slide provided with the firearm-sights and in sliding engagement with said guideway of the frame and having a barrel-chamber, a barrel located in said barrel-chamber and provided with a pair of transversely-located faces, said barrel being mounted in and supported by the power-slide free of supportive engagement with the frame, and also supported and arranged for sliding and rotative movements within said chamber relatively to the power-slide, a barrel-positioning connection on the frame and comprising a pair of faces in position for engaging said barrel-faces without supportive engagement with the barrel, and barrel-detaining means arranged for releasably holding the barrel against rotation, and operably arranged for permitting the barrel to be rotated within said barrel-chamber into engagement and out of engagement with said barrel-positioning faces of the frame, whereby the precision of alinement of the barrel relatively to the power-slide and to firearm-sights thereon is made independent of the alinement relations between the slide and the frame, and also independent of the barrel-positioning connection between the barrel and the frame.

235. In a firearm having a frame provided with a guideway for a barrel-carrying slide adapted for also carrying the firearm-sights, the combination with the frame of a slide arranged for carrying the firearm-sights and supported in sliding engagement with said guideway of the frame and having a barrel-chamber, a barrel rotatively and slidably supported in said barrel-chamber and free of supportive engagement with the frame, and having a recess, a barrel-positioning connection located on the frame in position for engaging said recess of the barrel without supportive engagement with the barrel, and releasable holding means operable for permitting the barrel to be connected with and disconnected from said barrel-positioning connection of the frame, whereby the precision of alinement of the barrel relatively to the slide and to firearm-sights thereon is made independent of the alinement relations between the power-slide and the frame, and also independent of the barrel-positioning connection between the barrel and the frame.

236. In a firearm, in combination, a frame, a breech action retractable on the frame from a forward position through a loading-stroke, and provided with a lock-face; a reciprocatable locking-member having a face in position and arranged for engaging and releasing said lock-face when the breech action is in forward position and having an opposing stop-face for engagement with a grip-operable safety-member; a reciprocatable safety-member having a stop-face in position for engaging by a spring-actuated rearward movement and releasing by a grip-actuated forward movement, the said stop-face of the breech action-locking member when this locking-member is in engagement with said lock-face of the breech action, and a pair of stroke-limiting stop-faces in position one on the frame and one on the safety-member, and arranged for limiting the spring-actuated rearward stroke of the safety-member to a position for bringing the said locking-member-engaging stop-face thereof into engagement with said reciprocatable breech action-locking member and thereby block the breech action against retraction by a resistance from the safety-member transmitted through said locking-member.

237. In a firearm, in combination, a frame, a breech action retractable on the frame from a forward position and through a loading-stroke, and provided with a lock-face; a reciprocatable locking-member having a face in position and arranged for engaging and releasing said lock-face when the breech action is in forward position and having an opposing stop-face for engagement with a grip-operable safety-member; a reciprocatable safety-member having a stop-face in position for engaging by a spring-actuated rearward movement and releasing by a grip-actuated forward movement, the said stop-face of the breech action-locking member when this locking-member is in engagement with said lock-face of the breech action; a pair of stroke-limiting stop-faces in position one on the frame and one on the safety-member, and arranged for limiting the spring-actuated rearward stroke of the safety-member, to a position for bringing the said locking-member-engaging a stop-face thereof into engagement with said reciprocatable breech action-locking member and thereby block the breech action against retraction by a resistance from the safety-member transmitted through said locking-member, and a pair of safety-member-locking faces one on the safety-member and the other on said locking-member, and in position and arranged for locking the safety-member in forward position by the retracted locking-member.

238. In a firearm having a mechanism-chamber and having a trigger-shifter member located in a mid-zone position within said chamber and between two side-zones thereof, a device for the actuation of the trigger-shifter member by balanced forces applied in said side-zones while the stem of the shifter-member is located in an intervening mid-zone, said device comprising the shifter-member operably-supported in a mid-zone position and provided with lever-engaging faces on and extending laterally from the two opposite sides, respectively, of said shifter-member; an oscillatory sear-member having a pair of shifter-member-actuating arms located in said side-zones and in position and arranged for engaging with said lever-engaging faces, respectively, of the shifter-member; a trigger in position and arranged for actuating the sear-member; and, trigger-guiding means operatively connecting the shifter-member and trigger, and for shifting the trigger toward a non-engaging position thereof relatively to the sear-member concurrently with the actuation of the shifter-member by said pair of lever-arms.

239. In a firearm having a mechanism-chamber and having a trigger-shifter member located with the stem thereof in a mid-zone position within said chamber and between two side-zones thereof, a device for the actuation of the trigger-shifter member by balanced forces applied in side-zones which are on each side respectively of the mid-zone in which the stem of the shifter-member is located, said device comprising a shifter-member having a reciprocatable stem supported in the said mid-zone position and provided with lever-engaging faces on and extending laterally from the two opposite sides of said stem and into said side-zones respectively; a pivotally-supported sear-member having a pair of shifter-member-actuating arms located in said side-zones and in position and arranged for engaging with said lever-engaging faces, respectively, of the shifter-member; a trigger in position and arranged for actuating the sear-members; and, trigger-guiding means operatively connecting the stem of the shifter-member with the trigger, for thereby shifting the trigger toward a non-engaging position thereof relatively to the sear-member concurrently with the actuation of the shifter-member by said pair of lever-arms.

240. In a firearm, a combined trigger-sear and safety-control mechanism comprising a reciprocatable trigger-shifter member having a stem operably-supported in a mid-zone position and provided with safety-stop faces on and extending laterally from the two opposite sides, respectively, of said stem; a grip-operable safety-member having a pair of stop-face arms extending forwardly in side-zone positions and having stop-faces in position for engaging by one stroke and releasing by an opposite stroke, the said safety-stop faces, respectively, of the shifter-stem; a shifter-actuating sear-member; a sear-member-actuating trigger in position and arranged for actuating the shifter-member by a force transmitted through the sear-member; and, trigger-guiding means operatively connecting the trigger and said shifter-stem, whereby the operating of the mechanism may be blocked through the pairs of coacting faces of the safety-member and shifter-member and by balanced forces applied in the said side-zone positions, substantially as described.

241. In a firearm, a combined trigger-sear and safety-control mechanism comprising a reciprocatable trigger-shifter member having a stem portion thereof slidably-supported in a mid-zone position and provided with safety-stop faces on and extending laterally from the two opposite sides, respectively, of said stem; a grip-operable safety-member having a pair of stop-faces located in side-zone positions, and arranged for engaging by one stroke and releasing by an opposite stroke the said safety-stop faces, respectively, of the shifter-stem; a shifter-actuating sear-member; a sear-member-actuating trigger in position and arranged for actuating the shifter-member by a force transmitted through the sear-member; and, trigger-guiding means operatively connecting the trigger and said shifter-member, whereby the operating of the mechanism may be blocked through the said pairs of coacting faces of the safety-member and shifter-member and by balanced forces applied in the said side-zone positions, substantially as described.

242. In a firearm mechanism, in combination, a reciprocatable trigger-shifter member having a stem operably-supported within the mechanism in a mid-zone position and provided with safety-stop faces and with opposing lever-engaging faces on and extending laterally from the two opposite sides of said stem and into side-zone positions, respectively; a grip-operable safety-member having a pair of stop-faces located in corresponding side-zone positions and in position for engaging by one stroke and releasing by an opposite stroke the said safety-stop faces on the shifter-stem; a sear-member having a pair of shifter-member-actuating lever-arms located in said side-zone positions and arranged for engaging said lever-engaging faces, respectively, of the shifter-member; a trigger in position and arranged for actuating the sear-member, and thereby actuating the shifter-member through said lever-arms; and, trigger-guiding means operatively-connecting the trigger and said shifter-member, whereby the operating of the mechanism may be blocked by the safety-member acting against one said pair of faces by balanced forces transmitted through said opposing faces on the shifter-member to the pair of lever-arms on the sear-member, substantially as described.

243. In a firearm, a combined trigger-sear and safety-control mechanism comprising a reciprocatable shifter-member having a stem operably-supported in a mid-zone position and provided with one pair of safety-stop faces and with another pair of lever-engaging faces oppositely disposed to said safety-stop faces, and with one face of each pair extending laterally from each of the two opposite sides, respectively, of said stem; a grip-operable safety-member having a pair of stop-face arms extending forwardly in side-zone positions and having stop-faces in position for engaging by one stroke and releasing by an opposite stroke the said safety-stop faces on the shifter-stem; an oscillatory sear-member having a pair of shifter-member-actuating lever-arms located in side-zone positions and arranged for engaging said lever-engaging faces, respectively, of the shifter-member; a trigger in position and arranged for actuating the sear-member, and thereby actuating the shifter-member through said lever-arms; and means operatively-connecting the trigger and said shifter-stem, whereby the operating of the mechanism may be blocked by the safety-member acting against one said pair of faces, by balanced forces transmitted through said opposing faces on the shifter-member to the pair of lever arms on the sear-member, substantially as described.

244. In a firearm, in combination, a frame having a power-stroke-limiting abutment-face, a main-slide retractable on the frame through a relatively long-stroke from a forward position and having therein a breech-block chamber, and also provided with a firing-pin; a breech-block having a cartridge-supporting face and located within said chamber of the main-slide, and arranged for a long-stroke movement with said slide and for a relatively short-stroke within said chamber, and having a power-stroke-limiting face; a firing-pin carried by the main-slide and having the point thereof adjacent to the forward face of the breech-block when this block is in a forward position thereof relatively to the main-slide; a combined firing-pin-retracting and breech-block-actuating spring in position operatively-intermediate to said firing-pin and the breech-block, and arranged for withdrawing the firing-pin away from and to an inoperative position relatively to the breech-block face on the simultaneous forward actuation of said block relatively to the main-slide by said spring.

245. In a firearm, in combination, a frame having a power-stroke-limiting abutment-face, a main-slide retractable on the frame through a relatively long-stroke from a forward position and having therein a breech-block chamber, and also provided with a firing-pin bearing; a breech-block having a cartridge-supporting face and located within said chamber of the main-slide, and arranged for a long-stroke movement with said slide and for a relatively short-stroke within said chamber, and also having a space for a firing pin bearing which is on the main-slide, and having a power-stroke-limiting face; a firing-pin carried in said bearing and having the point thereof adjacent to the forward face of the breech-block when this block is in a rearward position thereof relatively to the main-slide; a combined firing-pin-retracting and breech-block-actuating spring in position operatively-intermediate to said firing-pin and the breech-block, and arranged for withdrawing the firing-pin point away from and to an inoperative position relatively to the breech-block face on the simultaneous forward actuation of said block relatively to said main-slide by said spring and by a reaction against said firing-pin bearing.

246. In a firearm mechanism, in combination, a frame, a breech action operably-supported on the frame, and a fire-control action coöperative with the breech action and comprising in connection therewith a plurality of inter-acting circuits each having a plurality of coacting members, and of which one said circuit comprises a trigger, a trigger-shifting controller, and a trigger-actuated and a controller-actuating sear; and of which a second said circuit comprises the said controller, the sear, a sear-actuating firing-member, and a breech action coöperative with both the controller and firing-member; and of which a third said circuit comprises the controller, the sear, the firing-member, and a grip-operable safety-member in position and connected for coöperation with both the controller and the firing-member; and said mechanism having one member thereof included as a member of each of said inter-acting circuits, and each of said first two circuits having two-members thereof comprised in the next following said circuit.

247. In a firearm mechanism, in combination, a frame, a breech action operably-supported on the frame, and a fire-control action coöperative with the breech action and comprising in connection therewith a plurality of inter-acting circuits each having a plurality of coacting members, and of which one said circuit comprises a trigger, a triggeer-shifting controller, and a trigger-actuated and a controller-actuating sear; and of which a second said circuit comprises the said controller, the sear, a sear-actuating firing-member, and a breech action coöperative with both the controller and firing-member; and of which a third said circuit comprises the controller, the sear, the firing-member, and a grip-operable safety-member in position and connected for coöperation with both the controller and the firing-member; and of which a fourth said circuit comprises the breech action, the controller, the firing-member, a safety-member coöperative with the controller, and a spring-power actuation means connecting the safety-member and the firing-member, and said mechanism having the said controller-member thereof included as a member of each of said inter-acting circuits, and each of said first three circuits having two-members thereof comprised in the next following said circuit.

248. In a firearm of the class described, in combination, a frame having slideways for a breech action and having located transversely thereto, a mechanism-chamber for a fire-control action; a breech action operably-supported on said slideways and retractable on the frame from a forward position and having a lock-face and a firing-device; a safety-member forming the rearward wall and cover for the said mechanism-chamber, and operably-supported by a pivotal support adjacent to the end thereof which is remote from the breech action; a main-spring carried by the safety-member and located with the line-of-action thereof to the rearward of the axis of said pivotal support, whereby the reaction of said spring tends to operate the safety-member in a rearward direction and into a grip-operable position, relatively to the frame; a firing-member comprised in the fire-control action and operably-supported in said mechanism-chamber adjacent to the breech action and in position for coacting with the said firing-device thereof; firing-member-actuating means operatively-connecting the main-spring and said firing-member; and a trigger-sear-controller mechanism comprising firing-member-resisting means and a locking-face coöperative with said lock-face of the breech action and also having a safety-stop face in position and arranged for coaction with a stop-face on the safety-member.

249. In a firearm of the class described, in combination, a frame having slideways for a breech action and having located transversely thereto, a mechanism-chamber for a fire-control action; a breech action operably-supported on said slideways and retractable on the frame from a forward position and having a lock-face and a firing-device; a safety-member forming a yieldable rearward wall for the said mechanism-chamber, and operably-supported by a pivotal support adjacent to the end thereof which is remote from the breech action; a main-spring carried by the safety-member and located with the line-of-action thereof to the rearward of the axis of said pivotal support, whereby the reaction of said spring tends to operate the safety-member in a rearward direction and into a grip-operable position, relatively to the frame; a firing-member comprised in the fire-control action and located in said mechanism-chamber adjacent to the breech action and in position and operable for coacting with the said firing-device thereof; firing-member-actuating means operatively-connecting the main-spring and said firing-member and comprising a sliding spring-guide fixedly-located on the safety-member; and a trigger-sear-controller mechanism comprising firing-member-resisting means and a locking-face coöperative with said lock-face of the breech action and having a safety-stop face in position and arranged for coaction with a stop-face on the safety-member.

250. In a firearm of the class described, in combination, a frame having slideways for a breech action and having located transversely thereto, a mechanism-chamber for a fire-control action; a breech action operably-supported on said slideways and retractable on the frame from a forward position and having a lock-face and a firing-device; a safety-member forming the rearward wall for the said mechanism-chamber, and operably-supported by a pivotal support adjacent to the end thereof which is remote from the breech action; a main-spring carried by the safety-member and located with the line-of-action thereof to the rearward of the axis of said pivotal support, whereby the reaction of said spring tends to operate the safety-member in a rearward direction and into a grip-operable position, relatively to the frame; a firing-member comprised in the fire-control action and pivotally-supported in said mechanism-chamber adjacent to the breech action and in position for coacting with the said firing-device thereof; firing-member-actuating means operatively-connecting the main-spring and said firing-member and comprising a spring-guide fixedly-located on the safety-member; and a trigger-sear-controller mechanism comprising firing-member-resisting means and a locking-face coöperative with said lock-face of the breech action, and in position and arranged operatively-intermediate to the breech action, the firing-member and the safety-member, and having a safety-stop face in position and arranged for coaction with a stop-face on the safety-member for thereby blocking the firing-member against a firing-stroke and the breech action against a retractive-stroke by a resistance against the same pivotal support which sustains the reaction-force of said main-spring.

251. In a firearm mechanism having a breech action which comprises a main-slide and a breech-block arranged and operable as one pair of coacting-members, and having a fire-control action which comprises a firing-train and which also comprises a grip-operable safety-member and a slide-blocking member arranged and operable as a second pair of coacting members, a cartrdige-locking safety-train having, in combination, the said two pairs of coacting-members in position and constituting a four-member cartridge-locking safety-train in which the breech-block and the said safety-member, respectively, are the terminal members of such four-member train, and having said second pair of coacting-members provided with firing-train-resisting means in position and arranged for blocking the firing-train against making a firing-stroke while the said four-member train is in the cartridge-locking position thereof.

252. In a firearm mechanism having a breech action which comprises a main-slide and a breech-block arranged and operable as one pair of coacting-members, and having a fire-control action which comprises a firing-member and which also comprises a grip-operable safety-member and a slide-blocking member arranged and operable as a second pair of coacting-members, a cartridge-locking safety-train having, in combination, the said two pairs of coacting-members in position and constituting a four-member cartridge-locking safety-train in which the breech-block and the said safety-member, respectively, are the terminal members of such four-member train, and having said second pair of coacting-members provided with firing-member-resisting means in position and arranged for blocking the firing-member against making a firing-stroke while the said four-member train is in the cartridge-locking position thereof.

253. In a firearm mechanism having a breech action which comprises a main-slide and a breech-block arranged and operable as one pair of coacting-members, and having a fire-control action which comprises a firing-member and which also comprises a grip-operable safety-member and a slide-blocking member arranged and operable as a second pair of coacting-members, a cartridge-locking safety-train having, in combination, the said two pairs of coacting-members in position and constituting a four-member cartridge-locking safety-train in which the breech-block and the said safety-member, respectively, are the terminal members of such four-member train, and having the slide-locking member of said second pair of coacting-members provided with firing-member-resisting means in position and arranged for blocking the firing-member against making a firing-stroke while the said four-member train is in the cartridge-locking position thereof.

254. In a firearm mechanism having a breech action which comprises a main-slide and a breech-block arranged and operable as one pair of coacting-members, and having a fire-control action which comprises a grip-operable safety-member and a slide-blocking member arranged and operable as a second pair of coacting-members, a cartridge-locking safety-train having, in combination, the said two pairs of coacting-members in position and constituting a four-member cartridge-locking safety-train in which the breech-block and the said safety-member, respectively, are the terminal members of such four-member train.

255. In a firearm mechanism having a breech action which comprises a main-slide and a breech-block arranged and operable as one pair of coacting-members, and having a fire-control action which comprises a grip-operable safety-member and a slide-blocking member arranged and operable as a second pair of coacting-members, a cartridge-locking safety-train having, in combination, the said two pairs of coacting-members in position and constituting a four-member cartridge-locking safety-train in which the breech-block and the said safety-member, respectively, are the terminal members of such four-member train, a firing-train in position and connected operatively-intermediate to the breech action and said safety-member, and firing-train-resisting means appurtenant to said slide-blocking member of said second pair of coacting-members, and operatively-intermediate to said four-member train and the firing-train.

256. In a firearm mechanism having a breech action which comprises a main-slide and a breech-block arranged and operable as one pair of coacting-members, and having a fire-control action which comprises a grip-operable safety-member and a slide-blocking member arranged and operable as a second pair of coacting-members, a cartridge-locking train comprising, in combination, three coacting pairs, of which one pair comprises the breech-block and the main-slide, and of which a second pair comprises the safety-member and the slide-blocking member, and of which the third said pair comprises the main-slide and said slide-blocking member.

257. In an auto-loading firearm, in combination, a breech action comprising a main-slide retractable from a forward position through a loading-stroke and having a lock-face, a guideway extending forwardly from the lock-face, and a release space forward of said guideway; a combined slide-locking and trigger-shifting controller member reciprocatable into and out of engagement with said lock-face; a sear-actuating trigger having a guide connection with the controller-member, and provided with a sear-engaging face and also with a controller-retraction face; a controller-retracting sear in position and arranged for retracting the controller-member out of the slide-engagement position thereof and thereby release the breech action, said sear being provided with a trigger-engaging actuation-face and also with a controller-retraction face, and said controller-retraction faces of the trigger and sear being a coacting pair having the members thereof in position and arranged for engagement with each other when both the controller and trigger are retracted and the sear is allowed to resume the firing-position thereof, and thereby hold the controller out of said release space and out of the slide-locking position thereof during one portion of the auto-loading operation of the firearm.

258. In an auto-loading firearm mechanism, in combination, a main-slide retractable from a forward position through a loading-stroke and having a lock-face, a guideway extending forwardly from the lock-face, and a release space forward of said guideway; a trigger-shifting controller-member coöperative with said lock-face and reciprocatable into and out of said release space; a sear-actuating trigger having a guide connection with the controller-member, and provided with a sear-engaging face and also with a controller-retraction face; a controller-retracting sear in position and arranged for retracting the controller-member out of said release space and thereby release the main-slide from a rearward position thereof, said sear being provided with a trigger-engaging actuation-face and also with a controller-retraction face, and said controller-retraction faces of the trigger and sear being a coacting pair having the members thereof in position and arranged for engagement with each other when both the controller and trigger are retracted and the sear is allowed to resume the firing-position thereof, and thereby hold the controller out of said release space during one portion of the auto-loading operation of the firearm.

259. In an auto-loading firearm, in combination, a trigger-shifting controller-member supported for reciprocating movements, a sear-actuating trigger having a guide connection with the controller-member, and provided with a sear-engaging face and also with a controller-retraction face; a controller-retracting sear in position and arranged for actuating the controller-member in a direction for shifting the trigger into a non-effective position, said sear being provided with a trigger-engaging actuation-face and also with a controller-retraction face, and said controller-retraction faces of the trigger and sear being a coacting pair having the members thereof in position and arranged for engagement with each other when both the controller and trigger are retracted and the sear is allowed to resume a firing-position thereof.

260. In an auto-loading firearm mechanism, the combination with a frame having longitudinally thereof a slideway for a power-slide, of a power-slide supported in sliding-engagement with the slideway of the frame, a breech-block in position and arranged between the frame and power-slide and for actuation through a power-stroke by a cartridge, and a power-transmitting means on and coöperative with the breech-block and the power-slide and in position and arranged for applying the transmitted force to the slide partly in an upward direction, and thereby increase the frictional resistance and braking action as between the slide and frame during the power-stroke.

261. In an auto-loading firearm mechanism, the combination with a frame having longitudinally thereof a slideway for a power-slide, of a power-slide supported in sliding-engagement with the slideway of the frame, a breech-block in position between the frame and power-slide, and arranged for actuation through a power-stroke by a cartridge, and a pair of coacting power-transmitting faces, one on the breech-block and the other on the power-slide, and located in position and arranged for increasing the frictional resistance as between the slide and frame during the power-stroke.

262. In an auto-loading firearm mechanism, the combination with a frame having longitudinally thereof a slideway for a power-slide, of a power-slide supported in sliding-engagement with the slideway of the frame, a breech-block in position between the frame and power-slide, and arranged for actuation through a power-stroke by a cartridge, and a pair of coacting power-transmitting faces, one on the breech-block and the other on the power-slide, and located in an upwardly and forwardly inclined position for thereby increasing the frictional braking effect as between the slide and frame during the power-stroke.

JOHN D. PEDERSEN.

Witnesses:
 M. HAUGHTON,
 J. E. BRENNAN.